US012795781B2

(12) United States Patent
Yoden

(10) Patent No.: US 12,795,781 B2
(45) **Date of Patent: *Nov. 10, 2026**

(54) EDGE-BASED COMMUNICATION AND INTERNET COMMUNICATION FOR MEDIA DISTRIBUTION, DATA ANALYSIS, MEDIA DOWNLOAD/UPLOAD, AND OTHER SERVICES

(71) Applicant: Koji Yoden, Tamba (JP)

(72) Inventor: Koji Yoden, Tamba (JP)

( * ) Notice: Subject to any disclaimer, the term of this patent is extended or adjusted under 35 U.S.C. 154(b) by 285 days.

This patent is subject to a terminal disclaimer.

(21) Appl. No.: 18/776,225

(22) Filed: Jul. 17, 2024

(65) Prior Publication Data

US 2024/0373511 A1 Nov. 7, 2024

Related U.S. Application Data

(63) Continuation of application No. 18/195,452, filed on May 10, 2023, now Pat. No. 12,063,715, and a continuation of application No. 16/920,508, filed on Jul. 3, 2020, now Pat. No. 11,683,861.

(60) Provisional application No. 62/957,333, filed on Jan. 6, 2020.

(51) Int. Cl.

*H04W 88/18* (2009.01)
*H04W 36/14* (2009.01)
*H04W 48/18* (2009.01)
*H04W 84/12* (2009.01)
*H04W 88/06* (2009.01)
*H04W 92/02* (2009.01)

(52) U.S. Cl.

CPC ........... *H04W 88/18* (2013.01); *H04W 36/14* (2013.01); *H04W 48/18* (2013.01); *H04W 84/12* (2013.01); *H04W 88/06* (2013.01); *H04W 36/1443* (2023.05); *H04W 92/02* (2013.01)

(58) Field of Classification Search

CPC ..... H04W 88/18; H04W 36/14; H04W 48/18; H04W 84/12; H04W 88/06; H04W 36/1443; H04W 92/02; H04L 65/1069; H04L 65/612; H04L 67/561; H04L 67/568; H04L 67/289; H04L 67/12

USPC .......................................................... 370/338

See application file for complete search history.

(56) References Cited

U.S. PATENT DOCUMENTS 11,431,776 B2 * 8/2022 Upadhyaya ............. H04L 65/70
2018/0049179 A1 * 2/2018 Shah ..................... H04W 72/51
2021/0153271 A1 * 5/2021 Yang ..................... H04W 76/14

* cited by examiner

*Primary Examiner* — Huy C Ho

(57) ABSTRACT

Generally, according to aspects of the present invention, a multi-access edge computing a.k.a., mobile edge computing (MEC) server may be deployed in a wireless communication network such as a cellular communication system and wireless local area network (WLAN) for provision of an edge-based MEC service in an edge site. The MEC service may include a local communication for an audio/video distribution, data analysis, audio/video upload, etc. An access to the Internet may be provided via an access point, gateway, etc. in the wireless communication network. An Internet server accessible over the Internet may provide an Internet service associated with the MEC service. The Internet service may include recording of the edge-based local communication, backup communication as an alternative to the edge-based local communication, transfer of a media file to be used in the edge-based local communication, etc.

20 Claims, 85 Drawing Sheets

50
| MEC Name (50a) | MEC ID (50b) | Coverage Area (50c) | Status (50d) |
|---|---|---|---|
| MEC001 | aaa.bbb.ccc.ddd | AAA, BBB, CCC | Active |
| MEC002 | eee.fff.ggg.hhh | FFF | Inactive |
| MEC003 | iii.jjj.kkk.lll | GGG, HHH | Active |
FIG. 5A
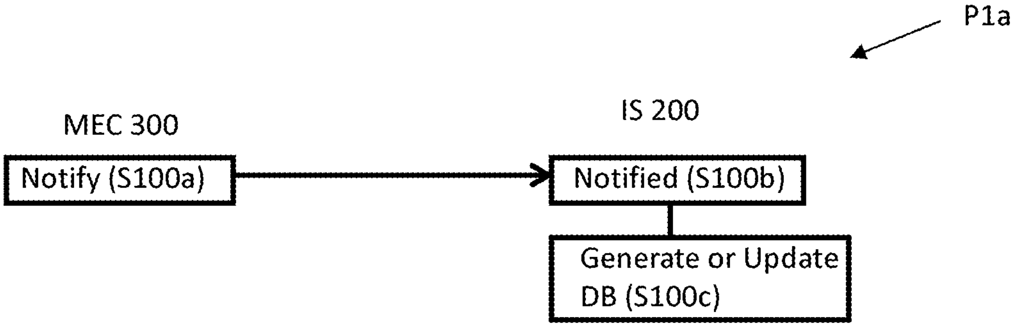
FIG. 5B
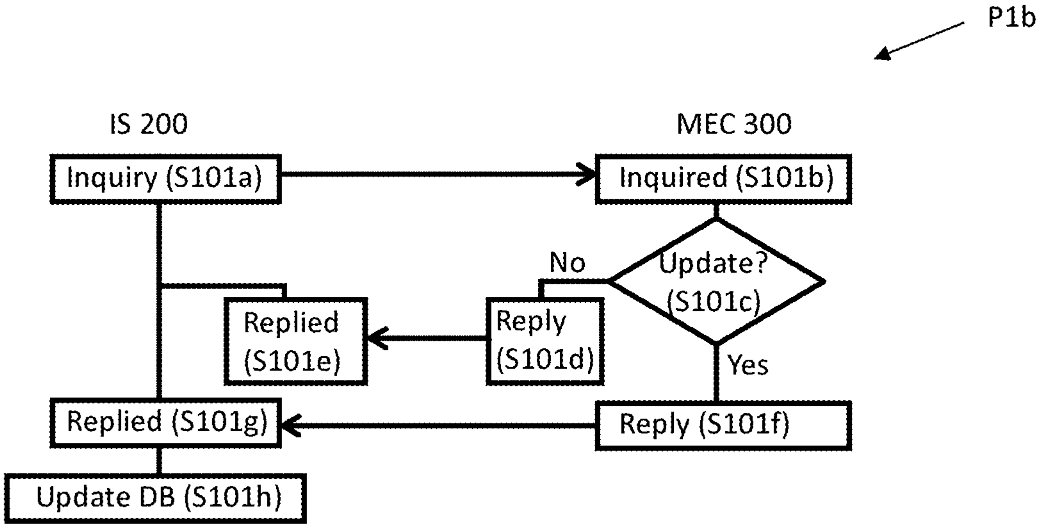
FIG. 5C 50
| MEC Name (50a) | MEC ID (50b) | Coverage Area (50c) | Status (50d) | IS ID (50e) |
|---|---|---|---|---|
| MEC001 | aaa.bbb.ccc.ddd | AAA, BBB, CCC | Active | AAA.BBB.CCC.DDD |
| MEC002 | eee.fff.ggg.hhh | FFF | Inactive | EEE.FFF.GGG.HHH |
| MEC003 | iii.jjj.kkk.lll | GGG, HHH | Active | III.JJJ.KKK.LLL |
FIG. 6E
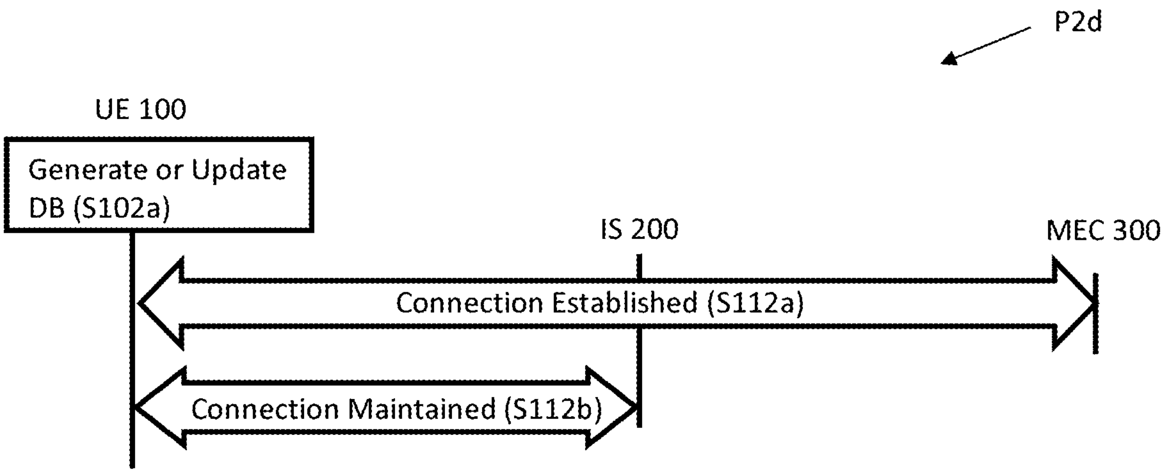
FIG. 6F
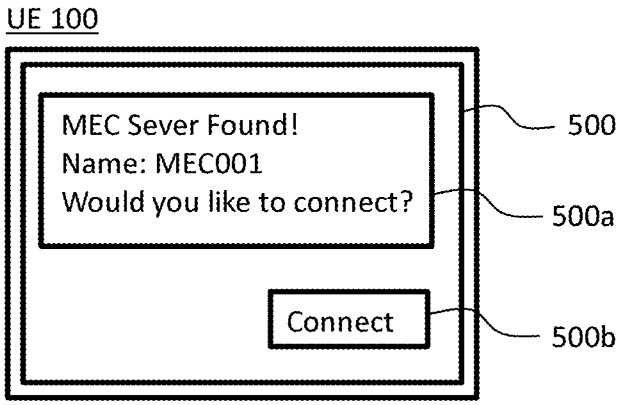
FIG. 6G

51

| UE ID (51a) | MEC Discovered (51b) |
|---|---|
| UE001 | MEC001 |
| UE002 | MEC001 |
| UE003 | N/A |

52
52a 52b 52c
| ID | Password | Participants |
|---|---|---|
| LSG001 | xxxyyy | UE001, UE003, UE020 |
| LSG002 | aaabbb | UE008, UE010 |
FIG. 10C
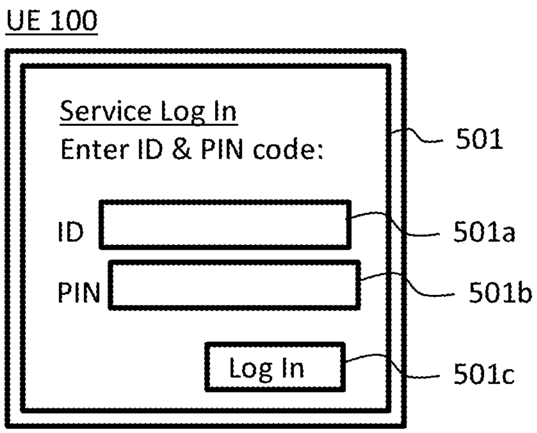
FIG. 10D
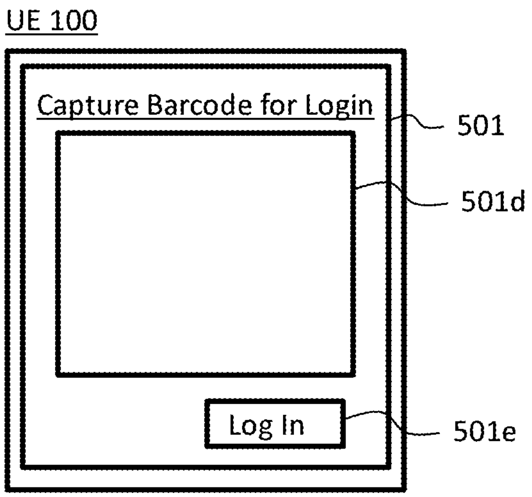
FIG. 10E

53

| First Media File (53a) | Coverage Area (53b) | Schedule (53c) |
|---|---|---|
| Movie01.mp4 | MEC001 (AAA, BBB, CCC) | 2019/10/11 14:00 |
| | MEC003 (GGG, HHH) | 2019/10/11 14:30 |
| Morning News.mp4 | MEC002 (FFF) | 2019/10/15 06:30 |
| Drama01.mp4 | MEC003 (GGG, HHH) | 2019/10/15 21:00 |

54
54a 54b 54c
| First Media File | Coverage Area | Statistics |
| --- | --- | --- |
| Movie01.mp4 | MEC001 (AAA, BBB, CCC) | 50 Units 2019/10/11 14:00-14:30 |
| | MEC003 (GGG, HHH) | 30 Units 2019/10/11 14:30-15:00 |
| Morning News.mp4 | MEC002 (FFF) | 15 Units 2019/10/15 06:30-07:30 |
| Drama01.mp4 | MEC003 (GGG, HHH) | 80 Units 2019/10/15 21:00-23:00 |
FIG. 11E
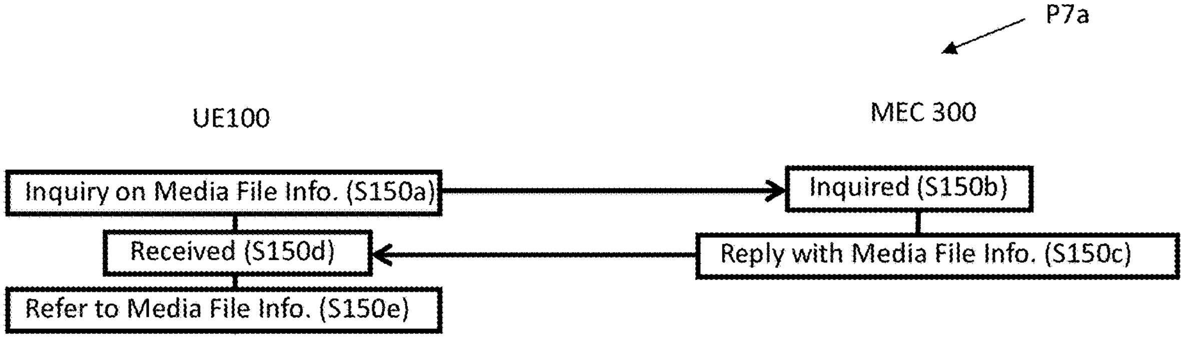
FIG. 11G
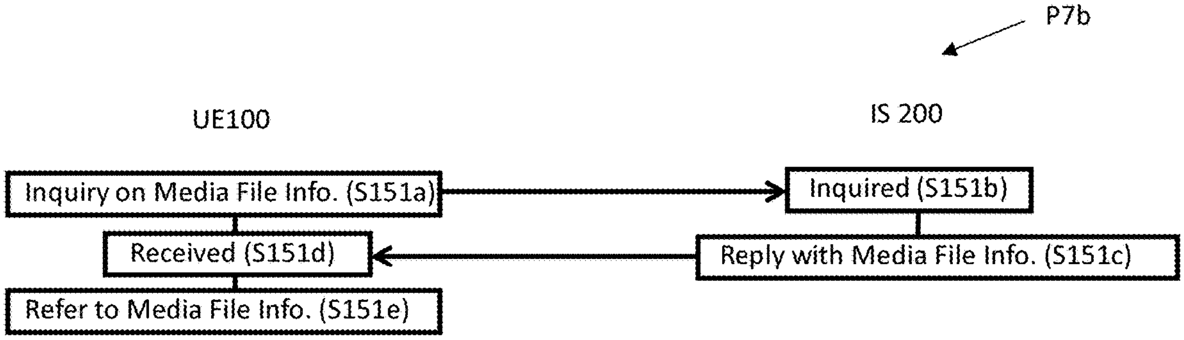
FIG. 11H

55

55a 55b

| Participants | Attribute |
|---|---|
| UE001 | Source UE |
| UE003 | Destination UE |
| UE020 | Source UE |

55

55a 55b

| Participants | Attribute |
|---|---|
| UE007 | Source UE, Destination UE |
| UE008 | Source UE, Destination UE |

56

56a 56b 56c

| Record File | Participants | Duration |
| --- | --- | --- |
| REC001.mp3 | UE001, UE004, UE010 | From 09:00 20191210<br>To 09:30 20191210 |
| REC002.mp3 | UE004, UE010 | From 09:40 20191210<br>To 10:40 20191210 |
| REC003.mp3 | UE004, UE010, UE020 | From 10:40 20191210<br>To 11:15 20191210 |

56

| Record File (56a) | Participants (56b) | Duration (56c) | ID (56d) | PW (56e) |
|---|---|---|---|---|
| REC001.mp3 | UE001, UE004, UE010, UE020 | From 09:00 20191210 To 10:40 20191210 | LSG002 | aaabbb |

56

| Record File (56a) | Participants (56b) | Duration (56c) | ID (56d) | PW (56e) |
|---|---|---|---|---|
| REC001.mp3 | UE001, UE004, UE010 | From 09:00 20191210 To 09:30 20191210 | LSG002 | aaabbb |
| REC002.mp3 | UE004, UE010 | From 09:30 20191210 To 09:50 20191210 | LSG002 | aaabbb |
| REC003.mp3 | UE004, UE010, UE020 | From 09:50 20191210 To 10:40 20191210 | LSG002 | aaabbb |

60

| Participants (60a) | Attribute (60b) | Location (60c) | Map (60d) |
|---|---|---|---|
| UE001 | Source UE | A |  |
| UE003 | Source UE | B | |
| UE007 | Source UE | C | |
| UE020 | Destination UE | | |
| UE030 | Destination UE | | |

62

| Video File (62a) | Source UE (62b) | Destination UE (62c) | Master Video ID (62d) |
|---|---|---|---|
| REC01-A.mp4 | UE001 | UE020<br>UE030 | REC01 |
| RE01-B.mp4 | UE003 | UE020<br>UE030 | |
| REC01-C.mp4 | UE007 | UE020<br>UE030 | |
| REC01-D.mp4 | UE010 | UE020<br>UE030 | |

FIG. 13Q

63

| Video File (63a) | Source UE (63b) | Destination UE (63c) |
|---|---|---|
| REC01.mp4 | UE 100a<br>UE 100b<br>UE 100c<br>UE 100d | UE020<br>UE030 |

FIG. 13R

| Participants (65a) | Attribute (65b) | Location (65c) | Map (65d) |
|---|---|---|---|
| UE001 | Video Capture | A |  |
| UE003 | Video Capture | B | |
| UE005 | Video Capture | C | |
| UE025 | Sound Capture | D | |
| UE026 | Sound Capture | E | |
| UE040 | Destination UE | | |
| UE042 | Destination UE | | |

66
66a 66b 66c
| Rule ID | Name | Target Image |
|---|---|---|
| RID001 | Adam W. D. |  |
| RID002 | Jessica H. | 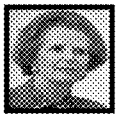 |
| | | |
FIG. 14H
67
67a 67b 67c
| Rule ID | Event | Module |
|---|---|---|
| RID001 | Car Crash | Car Crash Detection.exe |
| RID002 | Car Identification | License Plate Detection.exe |
| RID003 | Scream | Scream Detection.exe |
FIG. 14I
68
68a 68b 68c
| Time | Identified Target | File |
|---|---|---|
| 10:21 2019/12/22 | Name: Adam W. D. | FR001.mp4 |
| 19:05 2019/12/22 | Event: Scream | ED001.mp3 |
| 01:18 2019/12/23 | Event: Car Crash | ED002.mp4 |
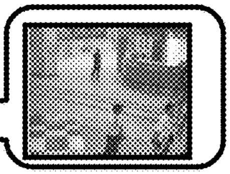
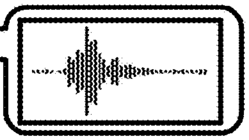
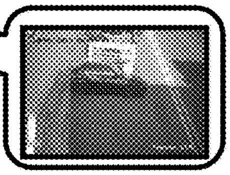
FIG. 14J

70

| UE001 | UE002 | UE003 |
|---|---|---|
| 36.114689 -115.163803 | 36.114583 -115.163677 | 36.114336, -115.163857 |
| 36.114673, -115.163804 | 36.114587, -115.163647 | 36.114336, -115.163857 |
| 36.114667, -115.163804 | 36.114589, -115.163626 | 36.114336, -115.163857 |
| 36.114667, -115.163804 | 36.114587, -115.163593 | 36.114336, -115.163857 |
| ⋮ | ⋮ | ⋮ |

70a (header row)
70b (data rows)

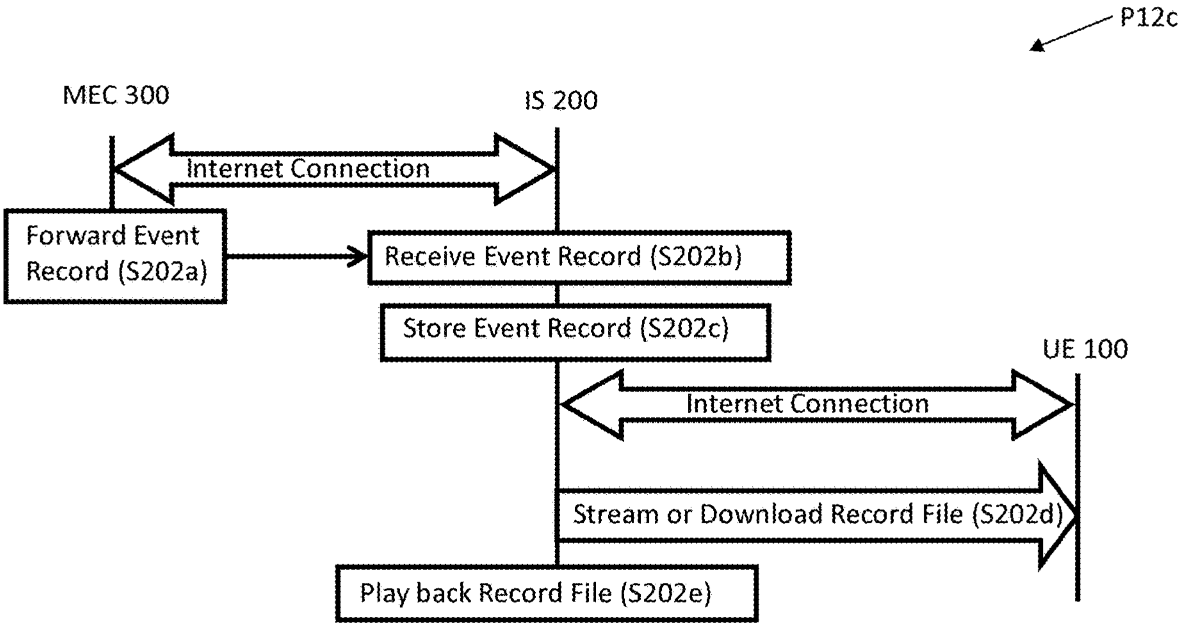
FIG. 15O
| | | |
|---|---|---|
| UE005 | 36.114554, -115.164330 | Time: 10:21 2019/12/22 |
| UE007 | 36.114493, -115.164169 | |
FIG. 15P
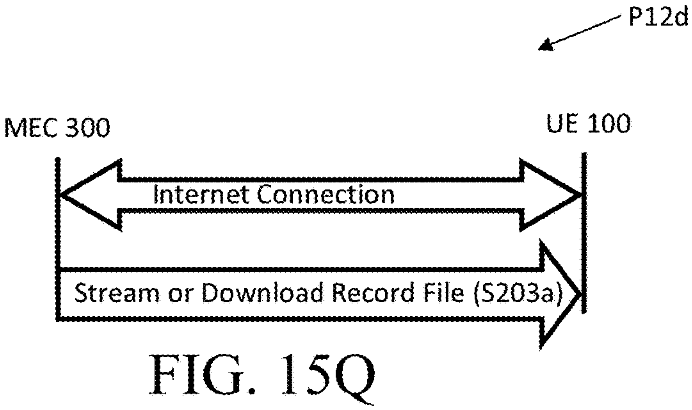
FIG. 15Q

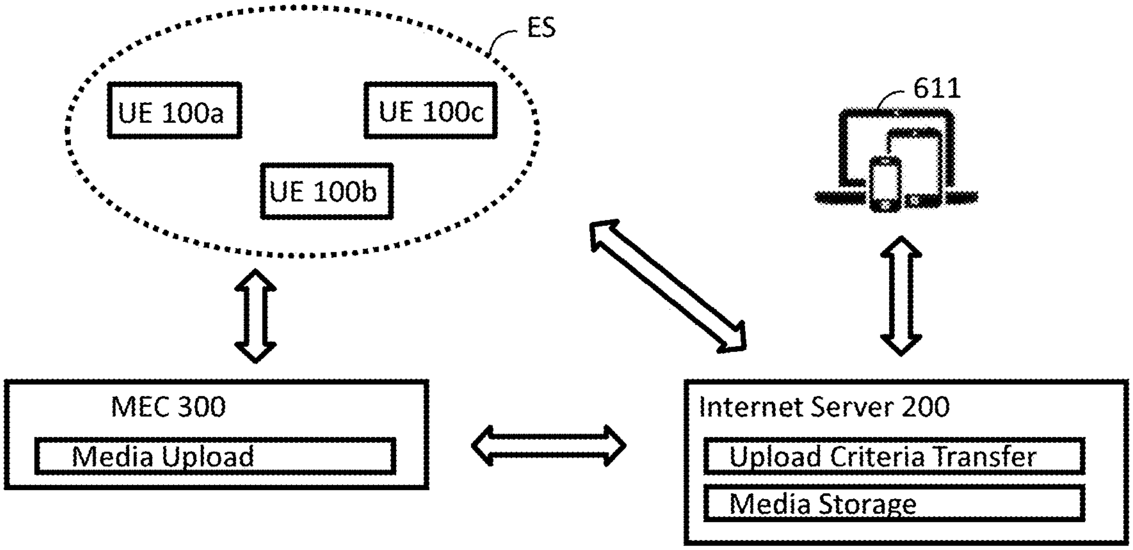
FIG. 16A
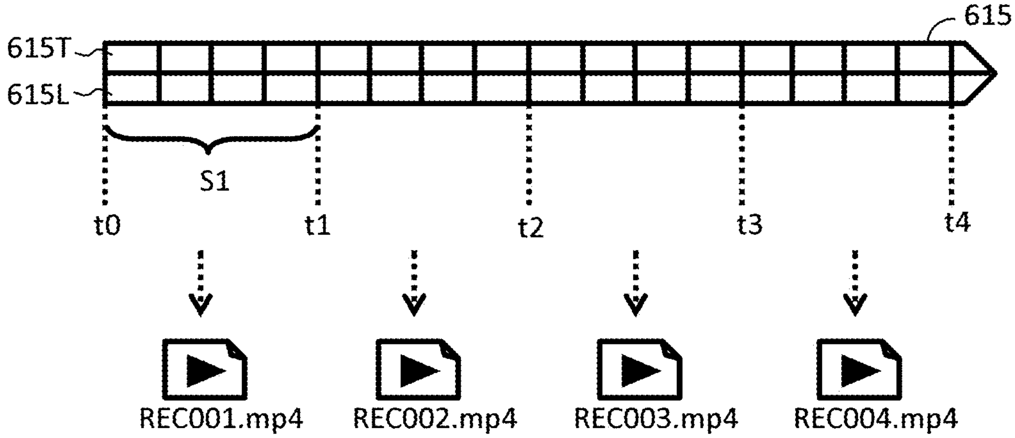
FIG. 16B
71
| Time | Place |
|---|---|
| 10:20 2019/12/22 | 36.114560, -115.165137 |
FIG. 16E

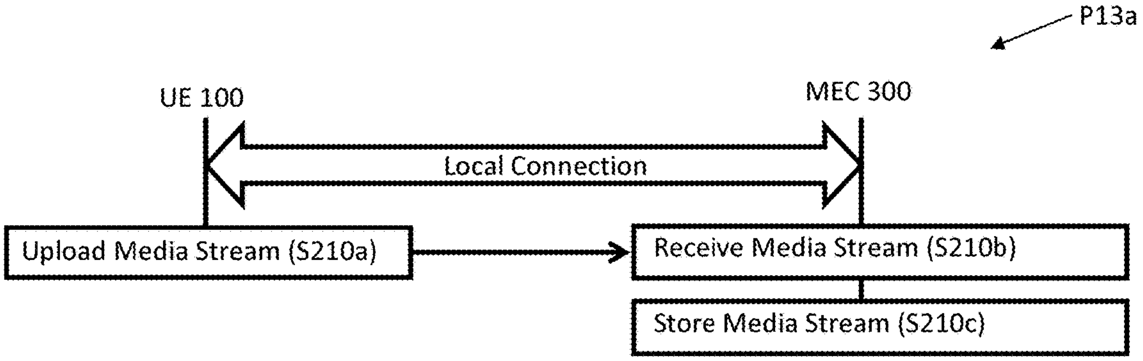
FIG. 16F
| UE ID | Media Stream |
|---|---|
FIG. 16G
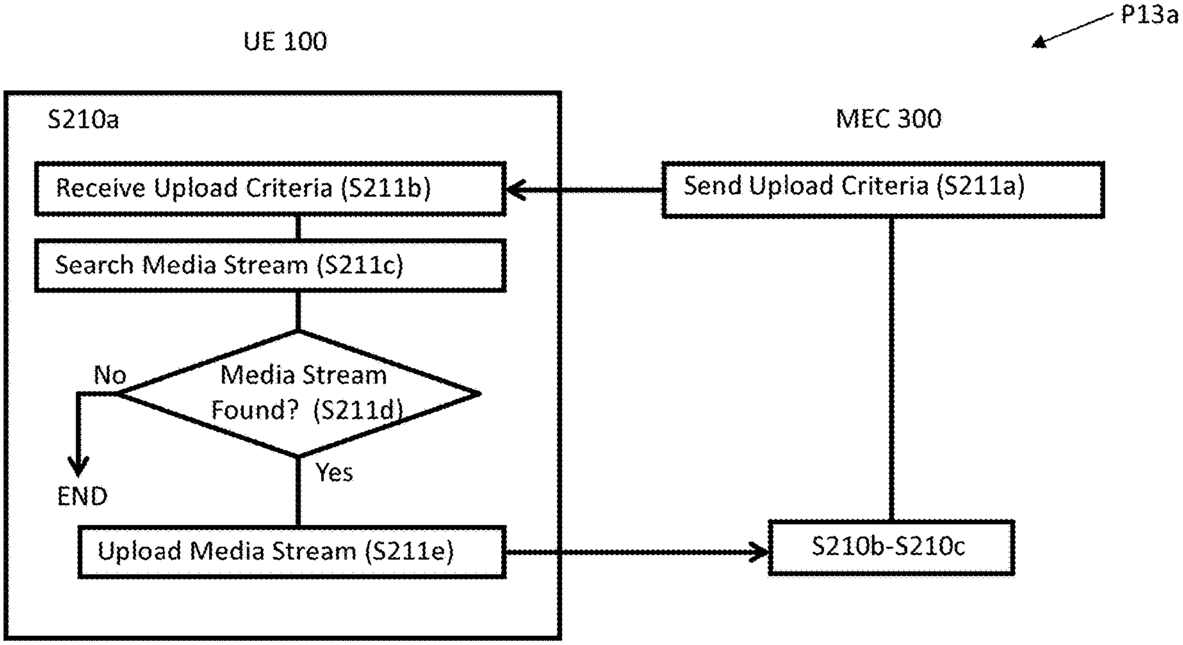
FIG. 16H

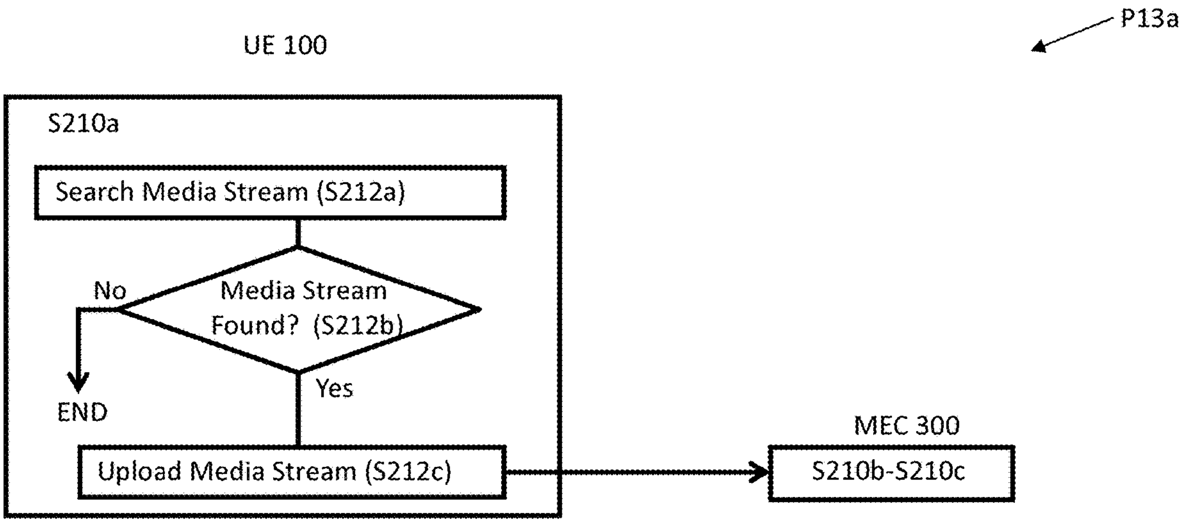
FIG. 16I
72
| Time | MEC ID |
|---|---|
| 10:20 2019/12/22 – 10:25 2019/12/22 | MEC002 |
| 12:40 2019/12/22 – 12:58 2019/12/22 | MEC005 |
| 18:00 2019/12/22 – 19:05 2019/12/22 | MEC011 |
FIG. 16J
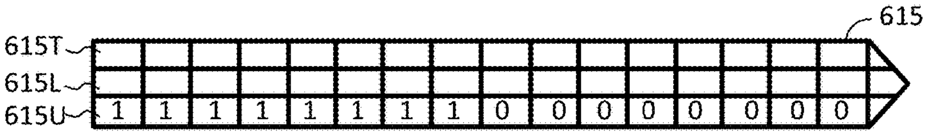
FIG. 16K 74
(a) 74a, 74b
| Object | Attribute |
|---|---|
| UE001 | Vehicle (Car) |
(b) 74a, 74b
| Object | Attribute |
|---|---|
| UE001 | Vehicle (Bus) |
(c) 74a, 74b
| Object | Attribute |
|---|---|
| UE001 | Non-Vehicle (Smartphone) |
(d) 74a, 74b
| Object | Attribute |
|---|---|
| UE001 | Non-Vehicle (Child) |
FIG. 17E
Vehicle UE 100
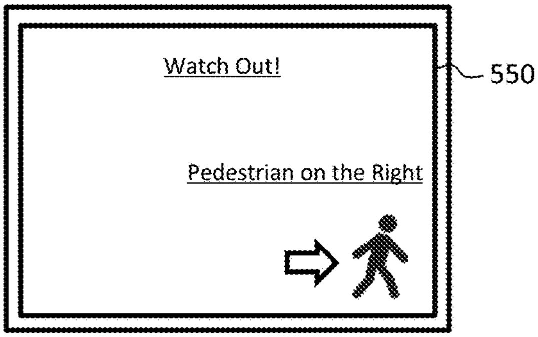
FIG. 17F
Non-Vehicle UE 100
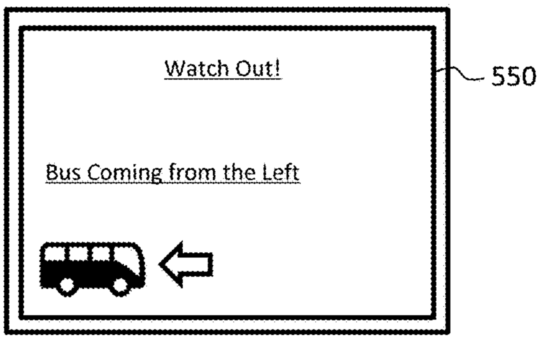
FIG. 17G

75

75a

Facility ID: FA001

| UE ID (75b) | Category (75c) | Location (75d) |
|---|---|---|
| UE001 | Detector | A |
| UE002 | Detector | B |
| UE003 | Detector | C |
| UE010 | Notifier Audio | D |
| UE011 | Notifier Audio | E |
| UE012 | Notifier Video | F |
| UE013 | Notifier A/V | G |
| UE020 | Detector | H |
| UE021 | Detector | I |
| UE022 | Detector | J |
| UE030 | Notifier Audio | K |
| UE031 | Notifier Audio | L |
| UE032 | Notifier Audio | M |
| UE033 | Notifier Video | N |

Map (75e)

| | | | | |
|---|---|---|---|---|
| Time: 10:21 2019/12/22 | Facility ID: FA001 | Detector UE001 | | |
| | | Notifier UE010<br>Notifier UE011<br>Notifier UE012<br>Notifier UE013 | Message A1.mp3 | Message V1.mp4 |
| | | Notifier UE030<br>Notifier UE031<br>Notifier UE032<br>Notifier UE033 | Message A2.mp3 | Message V2.mp4 |

50

| MEC Name (50a) | MEC ID (50b) | Coverage Area (50c) | Event Name (50f) |
|---|---|---|---|
| MEC001 | aaa.bbb.ccc.ddd | AA Arena | NBA Finals 2020 |
| MEC002 | eee.fff.ggg.hhh | BB Arena | WWE SmackDown Friday Night |
| MEC003 | iii.jjj.kkk.lll | CC Hall | Pop Music Concert |

EDGE-BASED COMMUNICATION AND INTERNET COMMUNICATION FOR MEDIA DISTRIBUTION, DATA ANALYSIS, MEDIA DOWNLOAD/UPLOAD, AND OTHER SERVICES

CROSS-REFERENCE TO RELATED APPLICATIONS

This application claims priority from U.S. patent application Ser. No. 16/920,508 filed on Jul. 3, 2020 that claims the benefit from U.S. Provisional Patent Application Ser. No. 62/957,333 filed on Jan. 6, 2020. The contents of U.S. Ser. No. 16/920,508 and U.S. 62/957,333 are expressly incorporated herein by reference in their entireties.

BACKGROUND OF THE INVENTION

The present disclosure generally relates to wireless communication systems and related methods. Particularly, the present disclosure is directed to improvement in provision of services using edge computing over cellular wireless communication or wireless local area networks.

Today, a variety of services have been provided on wireless communication platforms as a huge amount of data is able to be conveyed over wireless communications. An example of such wireless communication platforms may be a cellular communication system, including a system pursuant to the third-generation (3G) mobile communication standard in compliance with International Mobile Telecommunications (IMT) 2000 specifications, fourth-generation (4G) mobile communication standard in compliance with IMT-Advanced specifications, fifth-generation (5G) mobile communication standard in compliance with IMT-2020, and/or beyond. In such cellular communication systems, there are provided services such as a telephone communication via a Core Network (CN) of the system for communication between distant users in a circuit-switched connection; a connection to the Internet via the CN; a voice communication using a Voice Over Internet Protocol (VOIP) server coupled to the Internet for a VoIP communication between distant users; a video and/or audio streaming using a streaming server coupled to the Internet for streaming of media content items to users. Another example of the wireless communication platforms may be a wireless local area network (WLAN) or Wi-Fi network defined by, for example, IEEE 802.11 and/or 802.15 specifications. There are provided services over a WLAN such as: discovery of devices in the same WLAN for wireless communication between the devices; and a "cast" of a media content item that enables a user's mobile device (e.g., a smartphone) in the WLAN to initiate streaming of a local or online media content item to a discovered media playback device such as a smart TV in the same WLAN for second screen experience. "Google Cast" or "Chromecast built-in" technology introduced by Google may be an example of implementation of the cast service. Aspects of the technology underlying the cast service are described, for example, in U.S. issued U.S. Pat. No. 9,037,683 filed in Feb. 24, 2013, entitled "Media Asset Streaming Over Network To Devices", the content of which is incorporated herein by reference in its entirety.

The present disclosure addresses improvement, enhancement, or augmentation in provision of services using edge computing over the wireless communication platforms.

SUMMARY OF THE INVENTION

Generally, according to aspects of the present invention, a multi-access edge computing or mobile edge computing (MEC) server may be deployed in a wireless communication network such as the cellular communication system and WLAN. An access to the Internet may be provided via an access point, gateway, etc. in the wireless communication network. An Internet server connected to and accessible over the Internet may provide an Internet service over the Internet, and the MEC server may provide a MEC service associated with the Internet service locally over the wireless communication network in which the MEC server is deployed. The service coverage area of the Internet service may correspond to the coverage area of the Internet, namely, the area in which an access to the Internet is possible. In contrast, the service coverage area of the MEC service may correspond to the coverage area of the wireless communication network in which the MEC server is deployed. In other words, the Internet service may be provided to users as long as they are in communication with the Internet server over the Internet, while the MEC service may be provided to users only when they are within the coverage area of the wireless communication network in which the MEC server is deployed.

In some detailed aspects, the MEC server may be deployed in a radio access network (RAN) or a core network (CN) of a cellular communication network, so that the MEC service may be provided to users within the coverage area of the RAN or CN respectively. In some detailed aspects, the MEC server may be deployed in a WLAN, so that the MEC service may be provided to users within the coverage area of the WLAN.

In some aspects of the present invention, each UE of a user may discover the presence of the MEC server, namely, the availability of the MEC service provided by the MEC server. The presence of the MEC server may be notified to the user when the MEC service is available by the user as the user is in communication with the wireless communication network in which the MEC server is deployed. The notification may be made by way of a graphical user interface (GUI) displayed on the UE. In one aspect, the Internet server for providing the Internet service may manage the location of the MEC server, namely, where in the wireless communication network the MEC server is deployed. The UE may be notified by the Internet server of the presence of the MEC server for the MEC service when the UE is in the coverage area of the wireless communication network in which the MEC server is deployed. In response to the notification, the UE may provide a user interface (UI) through which to choose to connect to the notified MEC server to enjoy the MEC service.

In some aspects of the present invention, the UE may automatically connect to the MEC server in response to establishing a communication with the wireless communication network in which the MEC server is deployed.

In some aspects of the present invention, a local service group may be formed for provision of the MEC service. The local service group may consist of two or more UEs as a group which are in communication with the same MEC server. The common MEC service may be provided to the UEs participating in the same local service group. In some aspects, the local service group may be formed or hosted by one of the UEs as a host and other invited one or more UEs. A password may be assigned to the local service group to control access to the local service group. The MEC server may manage a plurality of local service groups, each of which is identified by a unique ID (local service group ID), allowing the UE to participate in a specific local service group by logging in to the MEC server using the local service group ID uniquely assigned to the local service group.

In some aspects of the present invention, the MEC service may be an edge-based local media distribution service that involves distribution of an audio stream and/or video stream (audio/video stream) based on a first media file on the MEC server. In connection with the local media distribution service, the Internet service may include at least one of (i) a media file delivery service that involves regularly or irregularly delivering the first media file to the MEC server; (ii) a statistics recording service that involves recording of statistics such as audience measurement associated with the distribution of the audio/video stream; and (iii) a wide-area media distribution service that involves distribution of an audio/video stream based on a second media file over the Internet, alternatively to the local media distribution service. The first media file may be uploaded or transferred to the Internet server from an external media source.

In some aspects of the present invention, the MEC service may be an edge-based local real-time audio communication service between the UEs, which involves distribution of an audio stream generated by at least one UE (source UE) to other at least one UE (destination UE) over a local connection. The local real-time audio communication may be performed and managed under control of the MEC server. In connection with the local real-time audio communication service, the Internet service may include at least one of (i) a wide-area real-time audio communication service that involves distribution of an audio stream generated by at least one source UE to at least one destination UE over the Internet under control of the Internet server, alternatively to the local real-time audio communication service; and (ii) a communication recording service that involves recording of local communications performed between the UEs in the local real-time audio communication. Each UE may be configured to operate as at least one of a source UE and destination UE. Examples of the source UE may include: a wireless microphone product (a.k.a., radio microphone product); and a musical instrument such as an electric guitar, electric piano, electric violin, etc. (stringed instrument), an electric drum, etc. (percussion instrument), an electric trumpet, electric saxophone, etc. (wind instrument), a synthesizer, etc. (music instrument). Examples of the destination UE may include a network speaker also known as an IP speaker. The UE may be a flexible device that operates selectively as the source UE or destination UE, such as a smartphone, tablet, personal computer, laptop, etc. that comprises both of a microphone and speaker as well as a processor configured to generate an audio stream for output and play back an incoming audio stream. The flexible UE may switch between modes of operation as the source UE or destination UE automatically in response to a predetermined event or manually in response to a user selection. The UE may operate as both of the source UE and destination UE concurrently at a time for two-way communication in a full-duplex or half-duplex manner.

In some aspects of the present invention, the MEC service may be an edge-based local real-time video communication service between the UEs, which involves distribution of video stream generated by at least one UE (source UE) to other at least one UE (destination UE) over a local connection. The local real-time audio communication may be performed and managed under control of the MEC server. In connection with the local real-time video communication service, the Internet service may include a video file production service that involves production of a video file based on a video stream generated and distributed by the source UE in the local real-time video communication. Each source UE may be provided with a camera for capturing images based on which to generate and output a video stream for transmission. Each destination UE may be provided with a video output such as a display for output of video produced as a result of playback of a received video stream. Examples of the source UE may include a camera product. Examples of the destination UE may include a display product. The UE may be a flexible device that operates selectively as the source UE or destination UE, such as a smartphone, tablet, personal computer, laptop, etc. that comprises both of a camera and display as well as a processor configured to generate a video stream for transmission and play back an incoming video stream for output. The flexible UE may switch between modes of operation as the source UE or destination UE automatically in response to a predetermined event or manually in response to a user selection.

In some aspects of the present invention, the MEC service may be an edge-based local image or sound analysis service that involves analysis of an video stream or audio stream generated by at least one UE (source UE) capturing images or sound, to find or identify a target which meets an analysis rule associated with an image or sound. The local image/sound analysis service may also involve notifying at least one other UE (destination UE) of the result of the analysis over a local connection. The local image/sound analysis service may be performed under control of the MEC server. In connection with the local image/sound analysis service, the Internet service may include at least one of (a) an analysis rule update service that involves updating the analysis rule based on which the MEC server performs the local image/sound analysis and (b) an analysis history storage service that involves storing the history or record of the local analysis. Each source UE may be provided with at least one of (a) a camera for capturing images based on which to generate and output a video stream for transmission and (b) a microphone for capturing sound based on which to generate and output an audio stream for transmission. Each destination UE may be provided with an output on or through which to present the analysis result received from the MEC server. The analysis result may include a video stream, in which case the output may include a display on which to play back the video stream. The analysis result may include an audio stream, in which case the output may include a loudspeaker through which to play back the audio stream. Examples of the source UE may include a camera product, a microphone product, etc. The camera product and microphone product may be united or integrated into one, such as a surveillance camera with a built-in microphone. Examples of the destination UE may include a display product. The display product may be a smartphone, tablet, personal computer, laptop, etc. that comprises at least one of a display and loudspeaker for output of the analysis result. The UE may be a flexible device that operates selectively as the source UE or destination UE, such as a smartphone, tablet, personal computer, laptop, etc. that comprises both of (a) a camera or microphone for capture of images or sound and (b) an output such as a display and loudspeaker for output of the analysis result. The flexible UE may switch between modes of operation as the source UE or destination UE automatically in response to a predetermined event or manually in response to a user selection.

In some aspects of the present invention, the MEC service may be an edge-based local location analysis service that involves aggregating and analyzing location information indicative of locations of the respective UEs to detect and alert an event associated with their relative locations. The local location analysis service may be performed under control of the MEC server. In connection with the local location analysis service, the Internet service may include an event record storage service that involves storing the record, history, or log of the event detected as a result of the local location analysis. Each UE is provided with circuitry configured to periodically generate location information indicative of the current location or position of the UE. The circuitry may be one which is configured to generate location information using Global Positioning System (GPS) or other satellite-based positioning system generally referred to as Global Navigation Satellite System (GNSS); Indoor Positioning System (IPS) or other positioning system using WiFi access points, Bluetooth beacons, Radio Frequency Identification (RDID) readers and tags, magnetic field sensing, etc. Each UE 100 may also be provided with an output on or through which to present the result of the local location analysis, such as a display for visually presenting the analysis result. Examples of the UE may include a smartphone, tablet, laptop, GNSS tracking unit, or other portable electronic device carried by a user which includes a built-in circuit for locating the UE; and a vehicle such as a car, truck, bus, etc. which includes an on-board circuit for locating the vehicle.

In some aspects of the present invention, the MEC service may be an edge-based local media upload service that involves upload of a media stream such as a video stream, audio stream, etc. from at least one UE to the MEC server for storage of the media stream on the MEC server and/or Internet server. The local media upload service may be performed under control of the MEC server. In connection with the local media upload service, the Internet service may include at least one of (a) upload criteria transfer service that involves provision of the criteria for upload of the media stream and (b) media storage service that involves storing the media stream uploaded from the UE. The upload of a media stream may be initiated by the UE automatically in response to discovering and connecting to the MEC server. Alternatively, the upload of a media stream may be initiated by the UE conditionally when a media stream which meets the upload criteria is stored on the UE. Each UE may be provided with at least one of a video camera (a.k.a., camcorder) for capturing video and a microphone for capturing sound as well as a processor configured to generate a video stream based on the captured video and/or an audio stream based on the captured sound. Each UE may also be provided with a storage on which the generated video/audio stream is recorded or stored as a video/audio file. Each UE may also be provided with circuitry configured to periodically generate location information indicative of the location or position of the UE. The circuitry may be one which is configured to generate location information using a GPS or other satellite-based positioning system generally referred to as GNSS; IPS or other positioning system using WiFi access points, Bluetooth beacons, Radio Frequency Identification (RDID) readers and tags, magnetic field sensing, etc. The location information indicative of the current location of the UE may be associated with or tagged to the video/audio stream so as to identify where the video/audio stream was generated. The video/audio stream may also be timestamped so as to identify when the video/audio stream was generated. Examples of the UE may include a smartphone, tablet, laptop, or other portable electronic device carried by a user; and a vehicle such as a car, train, etc. The vehicle may include an on-board video camera and/or microphone that is equipped on the vehicle, which is arranged or positioned to capture video and/or sound at least one of (a) inside the compartment (e.g., cockpit) of the vehicle and (b) outside the vehicle (i.e., video and/or sound in the area surrounding the vehicle).

In some aspects of the present invention, the MEC service may be provided in a traffic system including vehicles and pedestrians for improving the quality such as efficiency, safety, etc. of the traffic. In the aspects, the MEC server may process data from the pedestrians supposed to walk on a sidewalk and vehicles supposed to travel on a roadway.

In some aspects of the present invention, the MEC service may be an edge-based local emergency notification service that involves detecting an emergency based on an alarm signal from a detector UE. The local emergency notification service may also involve notifying the emergency to at least one notifier UE by sending an audio/video stream of an audible/visual message to the notifier UE over a local connection. The local emergency notification service may be performed under control of the MEC server. In connection with the local emergency notification service, the Internet service may include at least one of (a) an audible/visual message upload service that involves uploading the audible/visual message on the MEC server and (b) an emergency notification history storage service that involves storing the history or record of the local emergency notification. Each detector UE may be provided with a sensing element to detect the emergency to trigger the alarm signal. Examples of the detector UE may include a smoke detector, heat detector, manual call point, pull station, etc. Each notifier UE may be provided with at least one of a speaker through which to play back the audio stream and a display on which to play back the video stream. Examples of the notifier UE may include a speaker product, digital signage product, smartphone, tablet, personal computer, laptop, etc.

BRIEF DESCRIPTION OF DRAWINGS

FIG. 5A schematically illustrates an example of a database (MEC database) listing one or more MEC servers, according to some embodiments.

FIG. 5B is a flowchart illustrating an example of a process for generating and updating the MEC database, according to some embodiments.

FIG. 5C is a flowchart illustrating an example of a process for updating the MEC database, according to some embodiments.

FIG. 6E schematically illustrates an example of the MEC database that includes the IS IDs each identifying an Internet server, according to some embodiments.

FIG. 6F is a flowchart illustrating an example of a modified process for discovery of a MEC server with reference to the MEC database stored locally on a UE, according to some embodiments.

FIG. 6G schematically illustrates an example of graphical user interface (GUI) displayed on a display of a UE in the process for discovery of a MEC server, according to some embodiments.

FIG. 10C schematically illustrates an example of a database on a MEC server for management of one or more local service groups, according to some embodiments.

FIG. 10D schematically illustrates an example of a GUI displayed on a display of a UE for login to a MEC server, according to some embodiments.

FIG. 10E schematically illustrates another example of a GUI displayed on a display of a UE for login to a MEC server through a barcode, according to some embodiments.

FIG. 11E schematically illustrates an example of a statistics record generated by an Internet server, according to some embodiments.

FIG. 11G is a flowchart illustrating an example of a process for fetch of media file information by a UE from a MEC server, according to some embodiments.

FIG. 11H is a flowchart illustrating an example of a process for fetch of media file information by a UE from an Internet server according to some embodiments.

FIG. 13Q schematically illustrates an example of a database for the management of the individually-generated video files illustrated in FIG. 13O, according to some embodiments.

FIG. 13R schematically illustrates an example of a database for the management of the merged video file illustrated in FIG. 13P, according to some embodiments.

FIG. 14J schematically illustrates an example of a database for the management of analysis results each of which is the result of a local video/sound analysis, according to some embodiments.

Figure 14A:
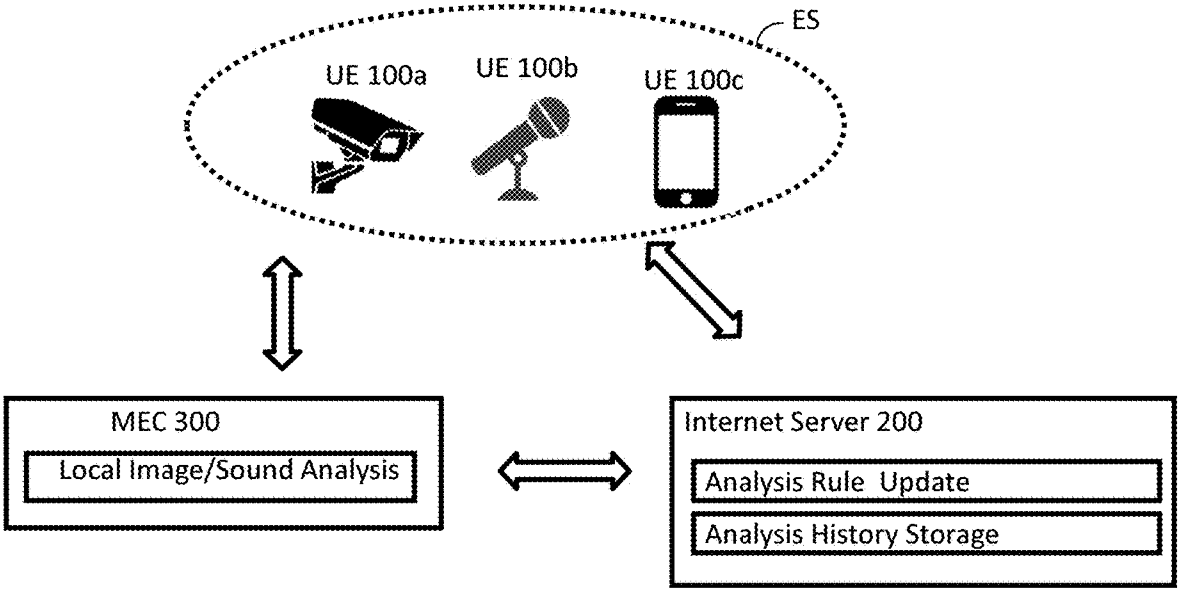
FIG. 14A schematically illustrates an example of a system for providing a MEC service (local image/sound analysis service) and an Internet service (analysis rule update service and analysis history storage service), according to some embodiments.
Figure 14B:
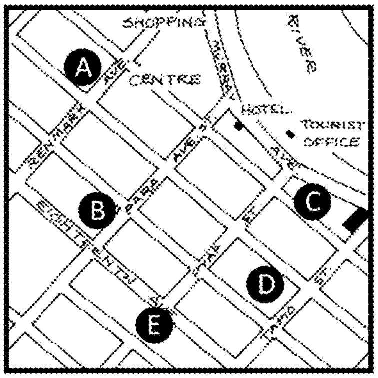
FIG. 14B schematically illustrates an example of a database for management of UEs in an edge site ES for a local image/sound analysis service, according to some embodiments.
Figure 14C:
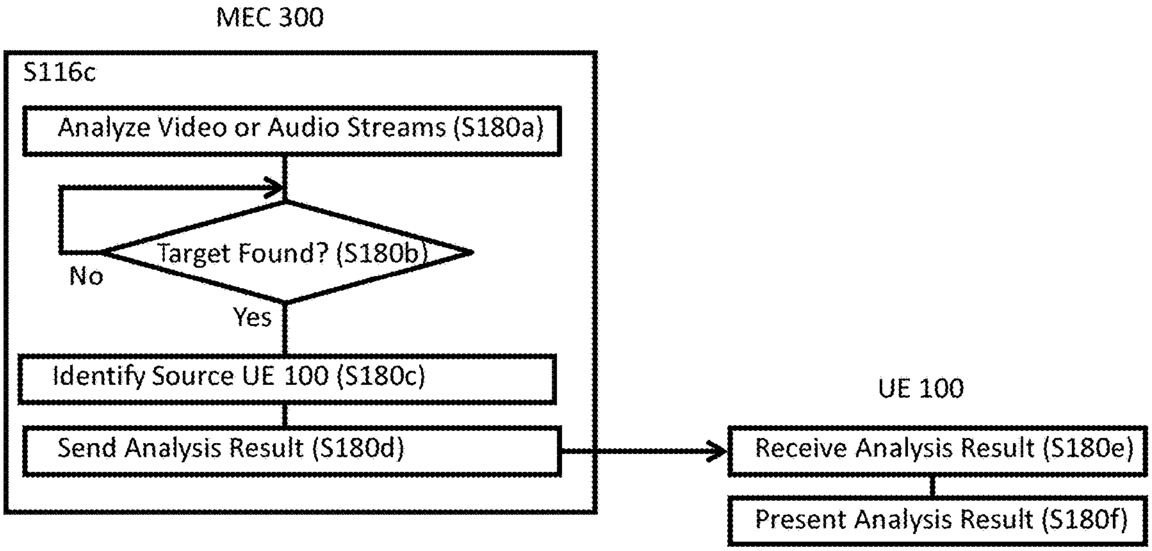
FIG. 14C is a flowchart illustrating an example of analysis of video or audio streams in a local image/sound analysis service, according to some embodiments.
Figure 14D:
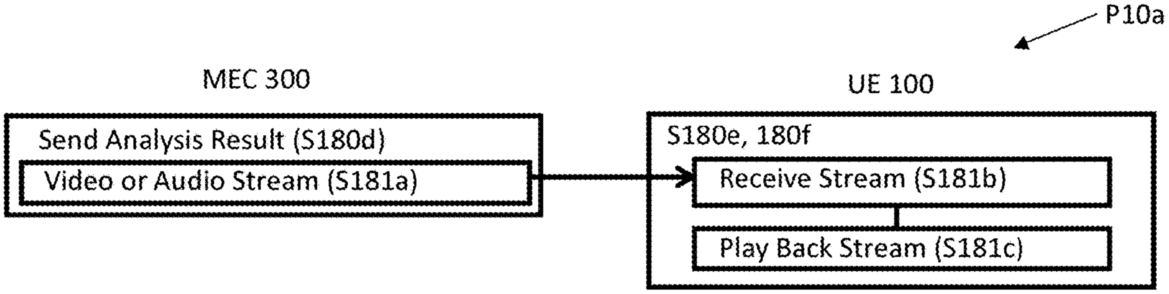
FIG. 14D is a flowchart illustrating an example of a process for playback of a video or audio stream for presentation of an analysis result, according to some embodiments.
Figure 14E:
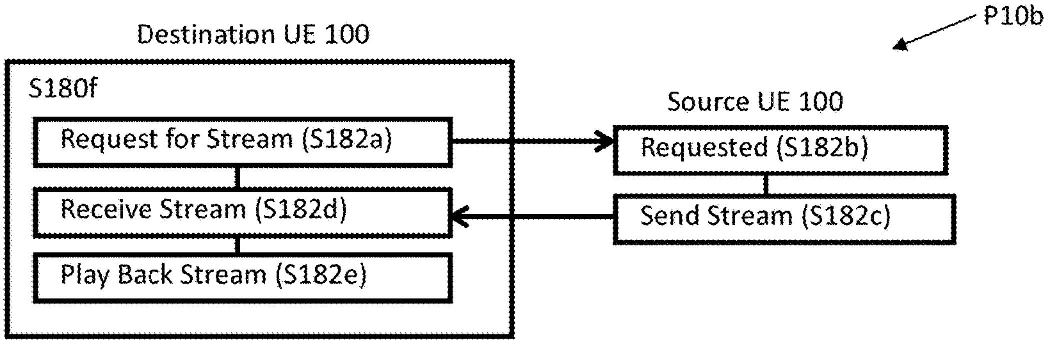
FIG. 14E is a flowchart illustrating another example of a process for playback of a video or audio stream for presentation of an analysis result, according to some embodiments.
Figure 14F:
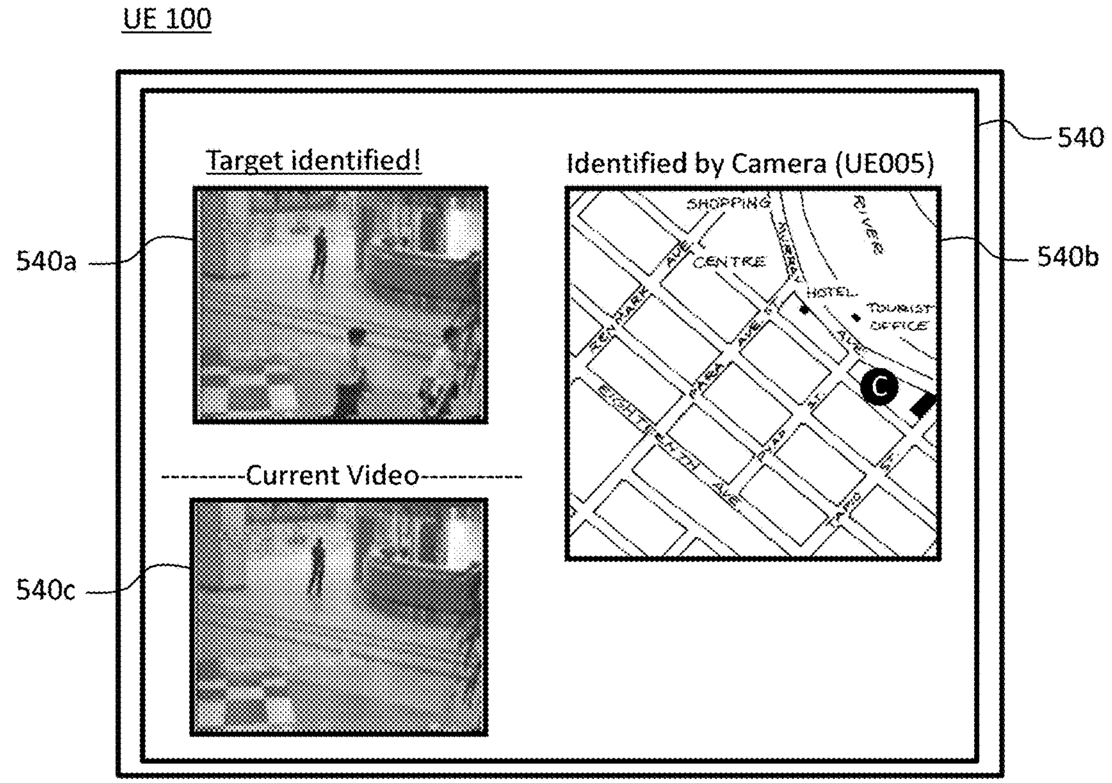
FIG. 14F schematically illustrates an example of a GUI for presentation of an analysis result, according to some embodiments.
Figure 14G:
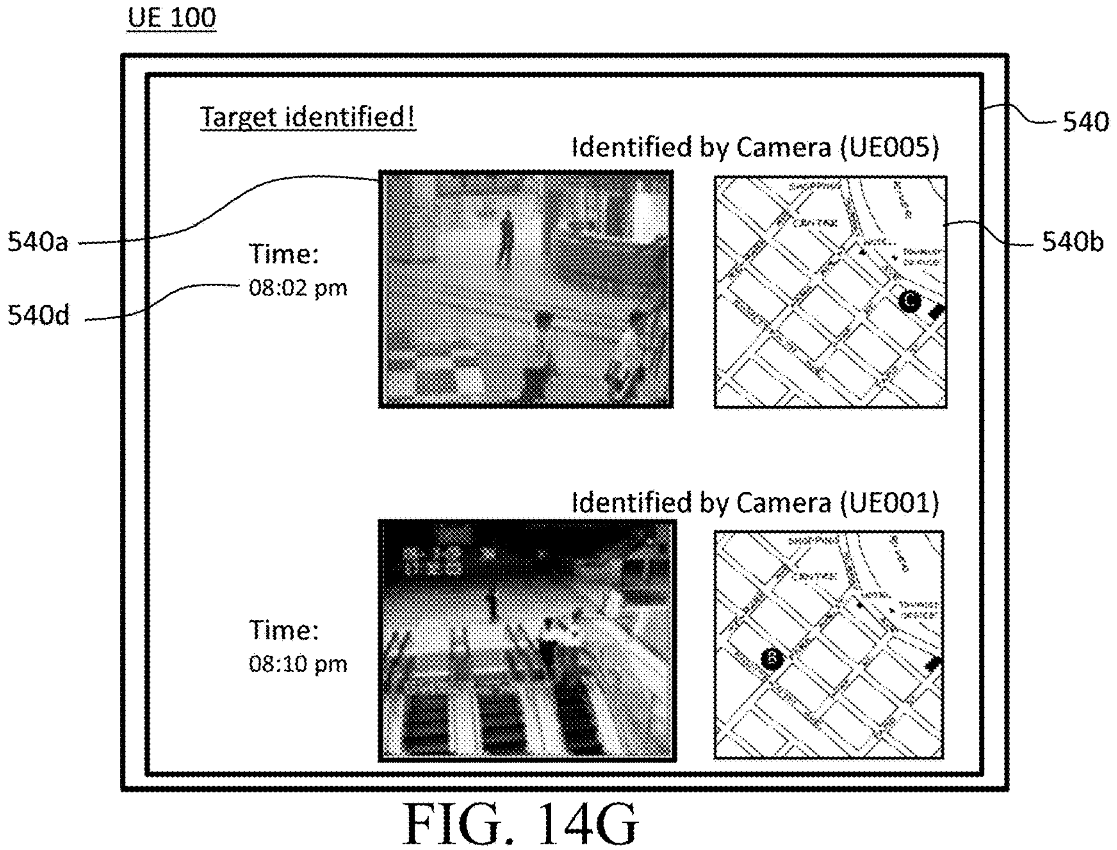
FIG. 14G schematically illustrates an example of a GUI for presentation of two or more analysis results in the chronological order, according to some embodiments.
Figure 14K:
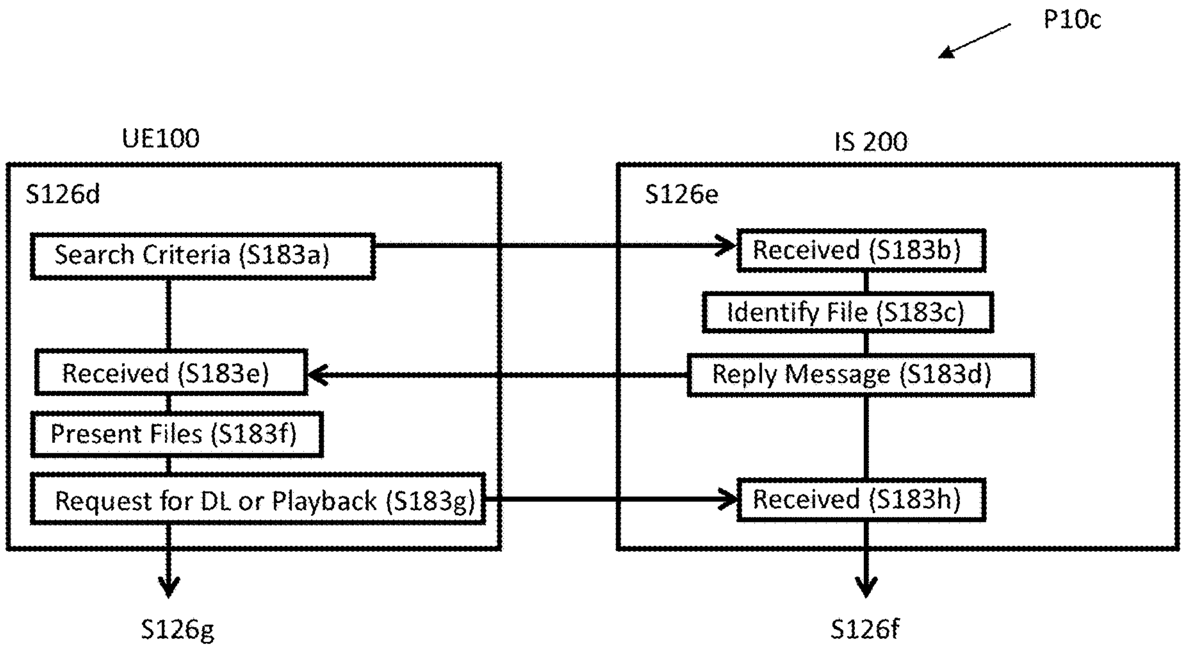
FIG. 14H schematically illustrates an example of a database for management of target images for a local video/sound analysis service, according to some embodiments.
FIG. 14I schematically illustrates an example of a database for management of analysis modules for a local video/sound analysis service, according to some embodiments.

FIG. 14K is a flowchart illustrating an example of a process for providing download or streaming of a video or audio file produced based on an analysis result of a local image/sound analysis, according to some embodiments.

Figure 14L:
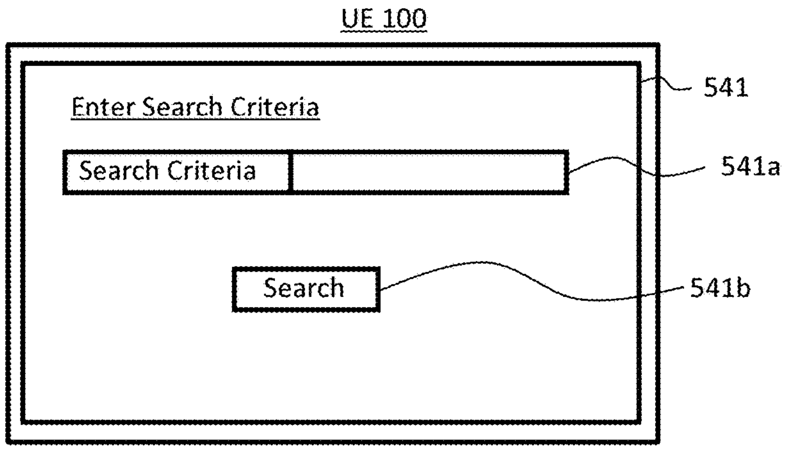

FIG. 14L schematically illustrates an example of a GUI for entry of a search criteria to identify a video or audio file for download or streaming, according to some embodiments.

Figure 14M:
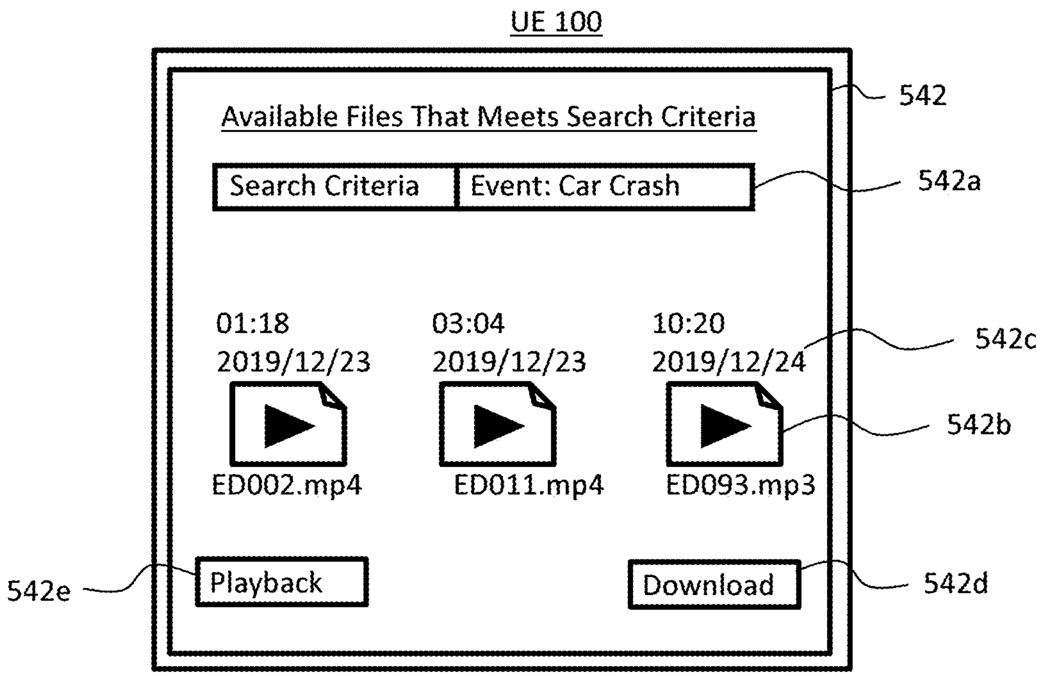

FIG. 14M schematically illustrates an example of a GUI for presenting one or more video or audio files for download or streaming, according to some embodiments.

Figure 14N:
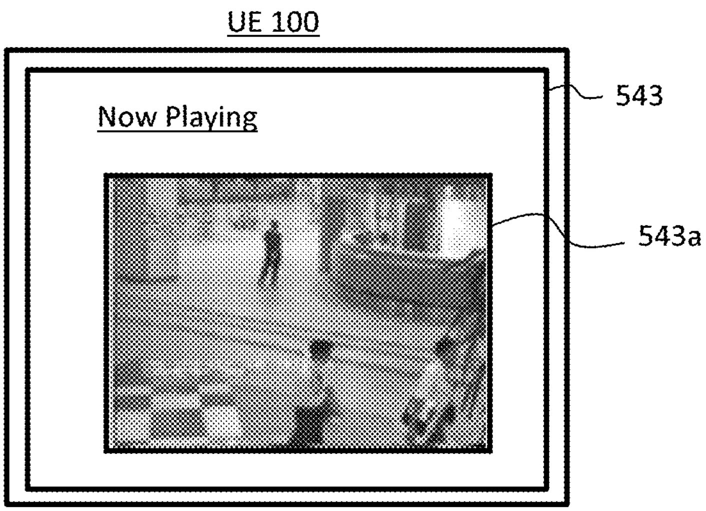

FIG. 14N schematically illustrates an example of a GUI for playback of a video or audio downloaded or streamed form a MEC server, according to some embodiments.

Figure 14O:
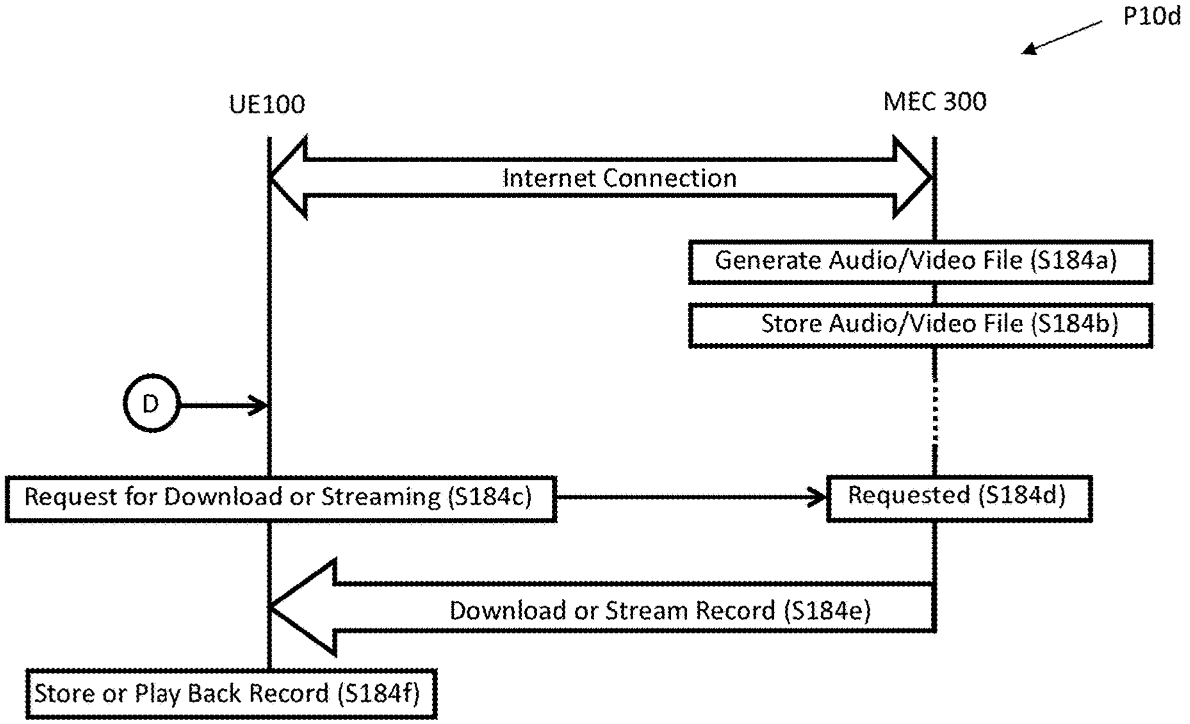

FIG. 14O is a flowchart illustrating an example of a process for provision of download or streaming of an audio/video file from a MEC server to a destination UE, according to some embodiments.

Figure 14P:
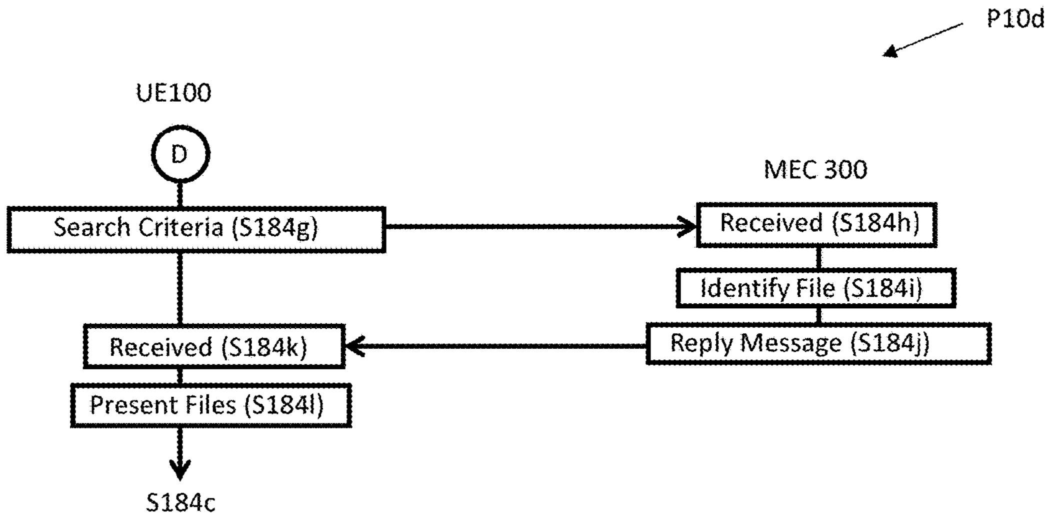

FIG. 14P is a flowchart illustrating an example of a process for provision of download or streaming of an audio/video file from a MEC server to a destination UE, according to some embodiments.

Figure 14Q:
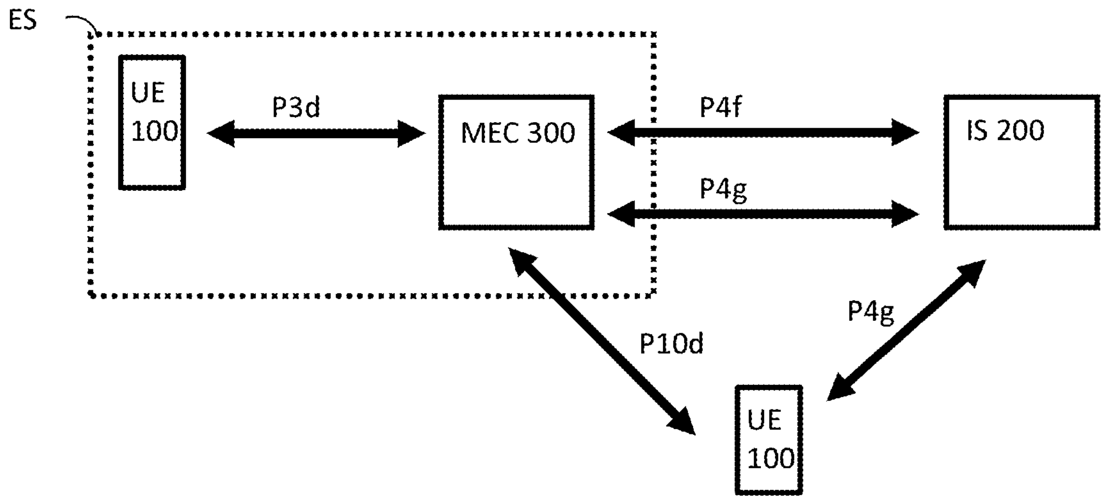

FIG. 14Q schematically illustrates a summary of complex communications in a local image/sound analysis system, according to some embodiments.

Figure 15A:
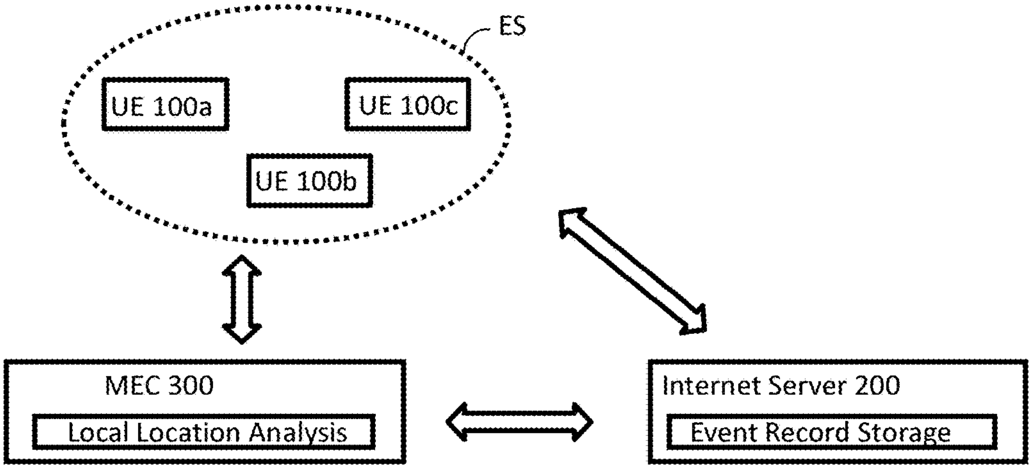

FIG. 15A schematically illustrates an example of a system for providing a MEC service (local location analysis service) and an Internet service (event record storage service), according to some embodiments.

Figure 15B:
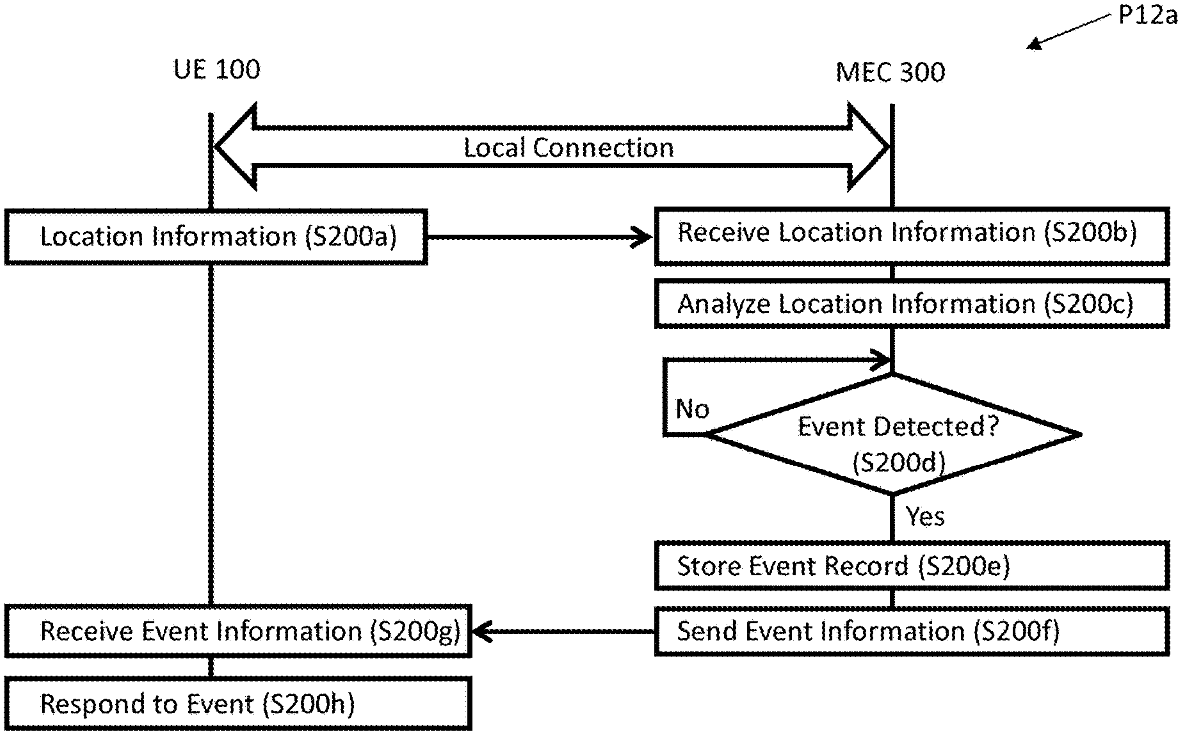

FIG. 15B is a flowchart illustrating an example of a process for an edge-based local analysis of the locations of UEs in an edge site, according to some embodiments.

Figures 15C, 15D:
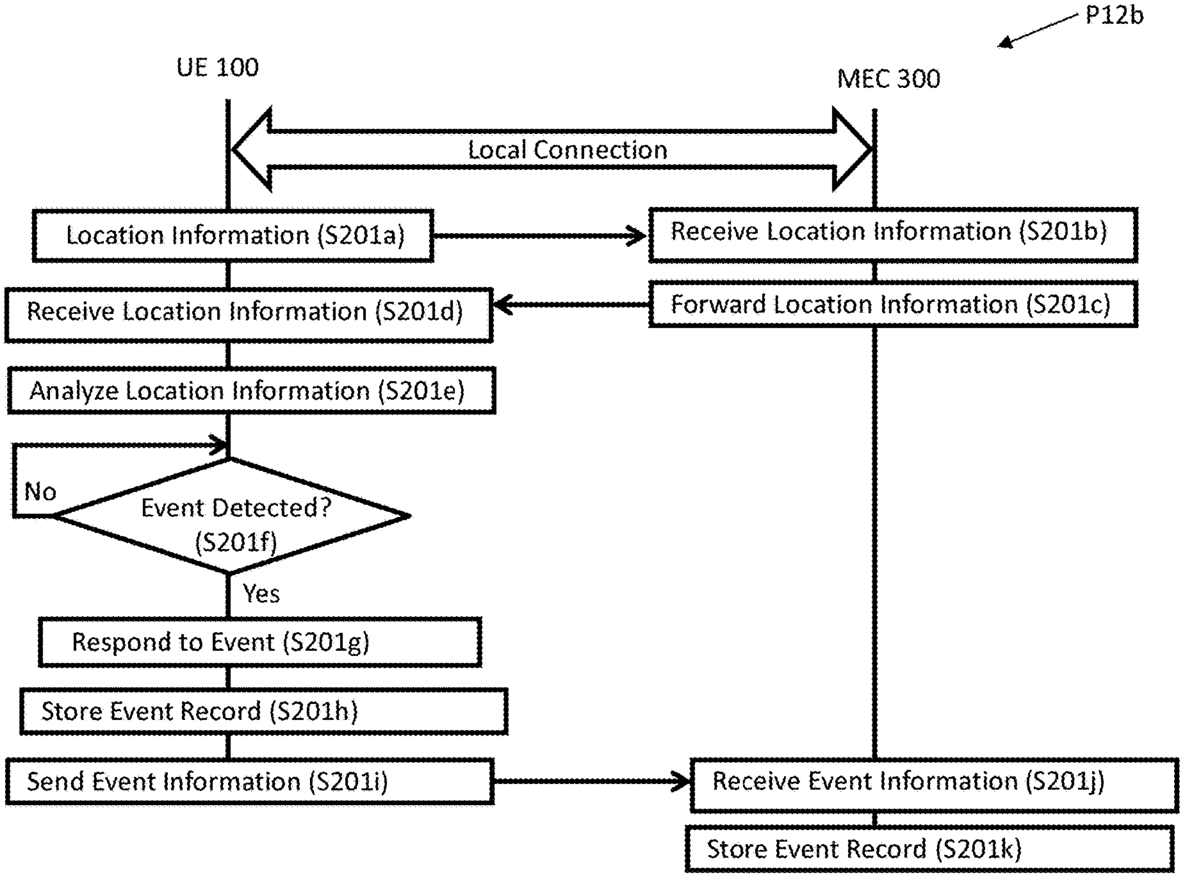

FIG. 15C is a flowchart illustrating another example of a process for an edge-based local analysis of the locations of UEs in an edge site, according to some embodiments.

FIG. 15D schematically illustrates an example of a database for management of the locations of UEs for a local location analysis, according to some embodiments.

Figure 15E:
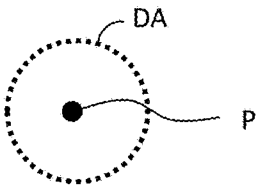

FIG. 15E schematically illustrates an example of a detection area used for a local location analysis, where the detection area is a circle, according to some embodiments.

Figure 15F:
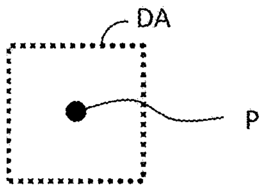

FIG. 15F schematically illustrates an example of a detection area used for a local location analysis, where the detection area is a polygon, according to some embodiments.

Figure 15G:
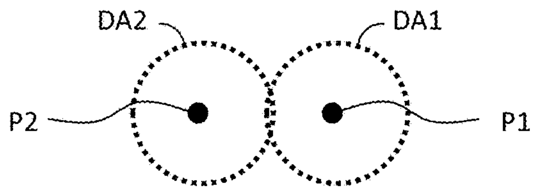

FIG. 15G schematically illustrates an exemplary situation where multiple circular detection areas overlap with one another indicting that UEs associated with the detection areas are in danger of collision, according to some embodiments.

Figure 15H:
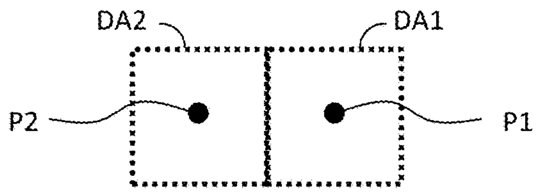

FIG. 15H schematically illustrates an exemplary situation where multiple polygonal detection areas overlap with one another indicting that UEs associated with the detection areas are in danger of collision, according to some embodiments.

Figure 15I:
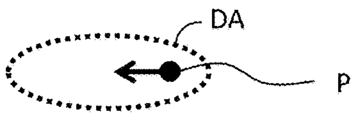

FIG. 15I schematically illustrates an example of an oval detection area, caused by the movement of a UE associated with the detection area to the left in the figure, according to some embodiments.

Figure 15J:
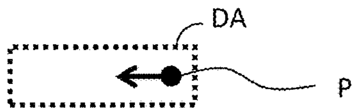

FIG. 15J schematically illustrates an example of an elongated rectangular detection area, caused by the movement of a UE associated with the detection area to the left in the figure, according to some embodiments.

Figure 15K:
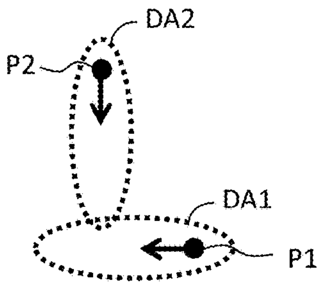

FIG. 15K schematically illustrates an exemplary situation where multiple oval detection areas overlap with one another indicating that UEs associated with the detection areas are in danger of collision, according to some embodiments.

Figure 15L:
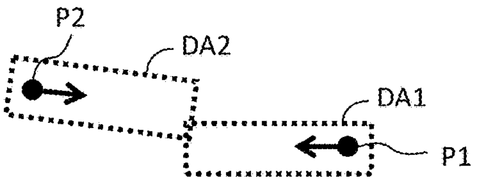

FIG. 15L schematically illustrates an exemplary situation where multiple elongated rectangular detection areas overlap with one another indicating that UEs associated with the detection areas are in danger of collision, according to some embodiments.

Figure 15M:
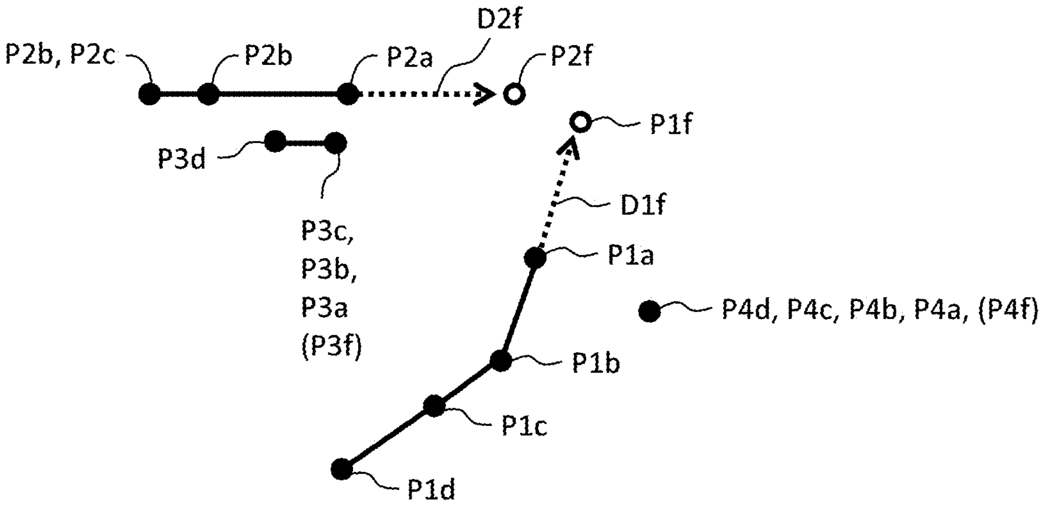

FIG. 15M schematically illustrates an exemplary situation where four movement paths associated with UEs respectively are identified in the chronological order, according to some embodiments.

Figure 15N:
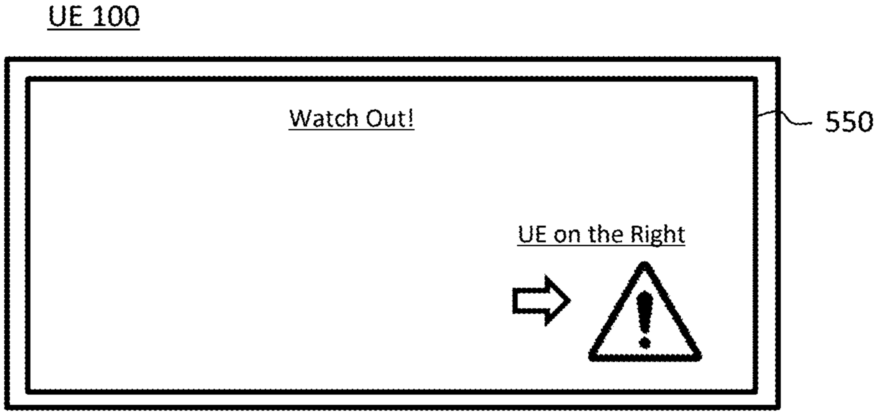

FIG. 15N schematically illustrates an example of a visual notification displayed on a UE, which indicates the position (right) of another UE with which the UE is in danger of colliding, relative to the UE 100, according to some embodiments.

FIG. 15O is a flowchart illustrating an example of a process for transmission of an event record as record of an event detected as a result of a local location analysis from a MEC server 300 to an Internet server 200, according to some embodiments.

FIG. 15P schematically illustrates an example of a record file listing event records, according to some embodiments.

FIG. 15Q is a flowchart illustrating an example of a process for provision of download or streaming of a record file from a MEC server to a UE, according to some embodiments.

Figure 15R:
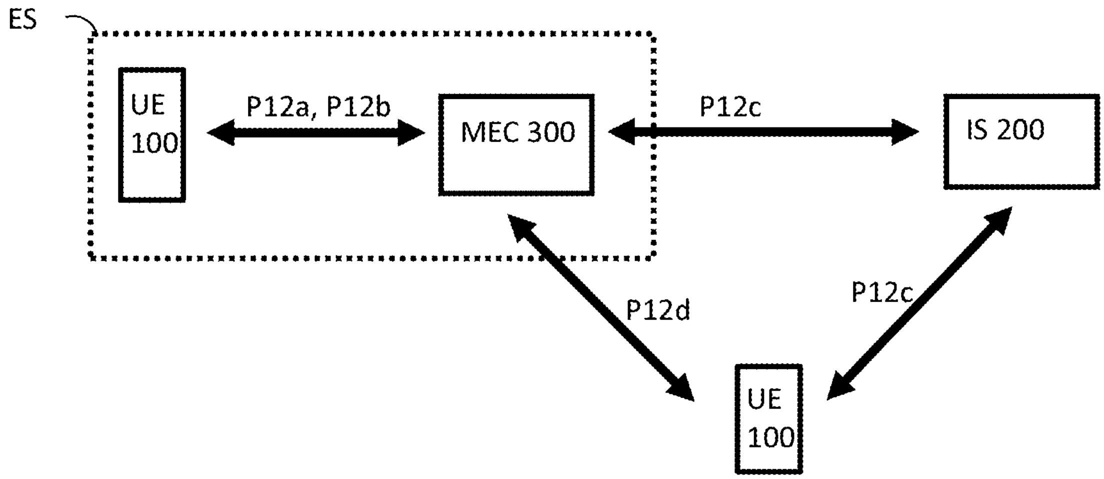

FIG. 15R schematically illustrates a summary of complex communications in a local location analysis system, according to some embodiments.

FIG. 16A schematically illustrates an example of a system for providing a MEC service (media upload service) and an Internet service (upload criteria transfer service, media storage service), according to some embodiments.

FIG. 16B schematically illustrates an example of a media stream composed of segments that is generated by and stored on a UE, according to some embodiments.

Figure 16C:
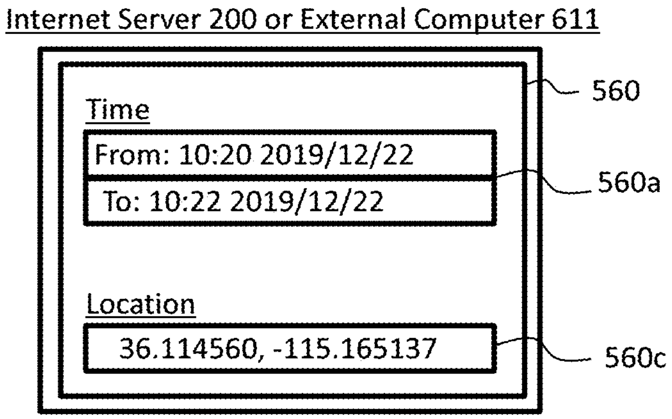

FIG. 16C schematically illustrates an example of a GUI through which to receive a user input to identify the time and location to create a upload criteria, according to some embodiments.

Figure 16D:
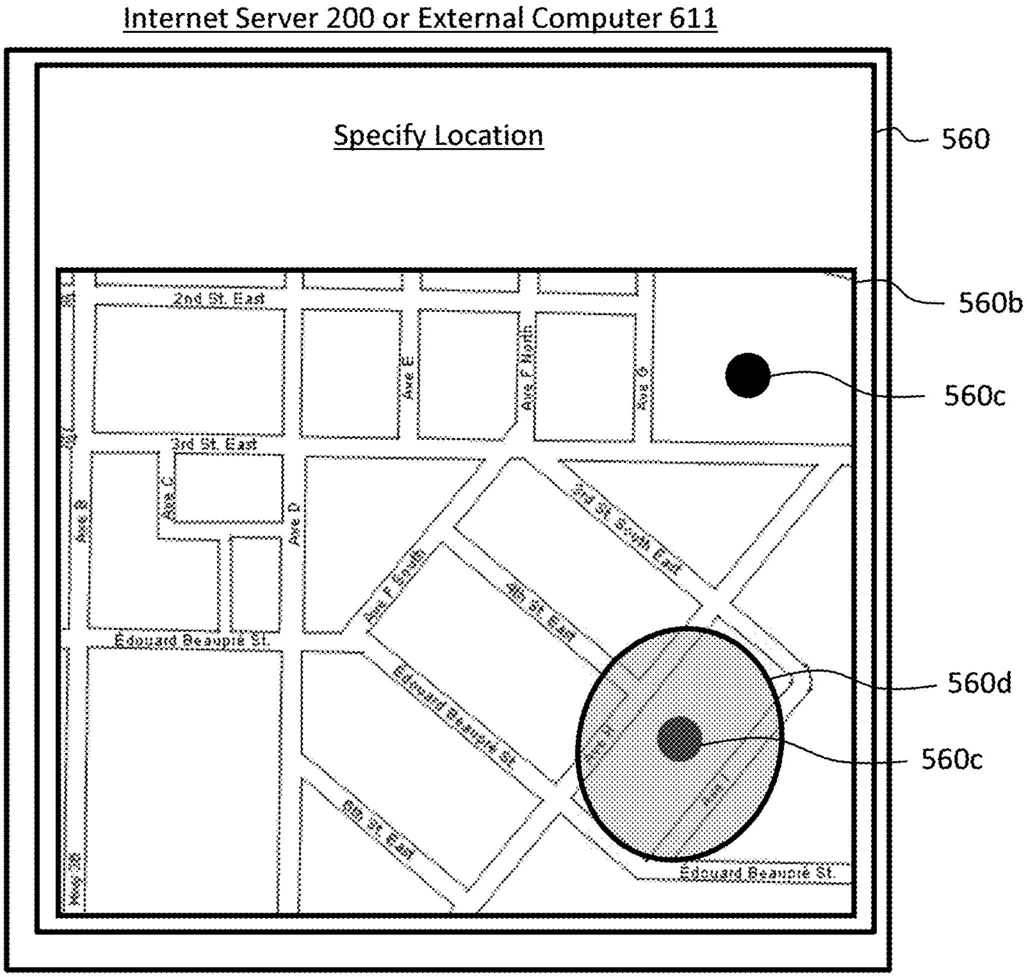

FIG. 16D schematically illustrates an example of a GUI through which to receive a user input to identify the location to create a upload criteria on a map, according to some embodiments.

FIG. 16E schematically illustrates an example of a upload criteria which includes information indicative of the time and location, according to some embodiments.

FIG. 16F is a flowchart illustrating an example of a process for an edge-based local media upload of a media content from a UE in an edge site to a MEC server, according to some embodiments.

FIG. 16G schematically illustrates an example of a media stream associated with the UE ID of a UE stored on a MEC server, according to some embodiments.

FIG. 16H is a flowchart illustrating an example of a process in further detail for conditional upload of a media stream, according to some embodiments.

FIG. 16I is a flowchart illustrating an example of a process in further detail for automatic upload of a media stream, according to some embodiments.

FIG. 16J schematically illustrates an example of a database that manages a connection record by listing each time during which a UE 100 is connected to a MEC server, according to some embodiments.

FIG. 16K schematically illustrates an example of an upload record in the form of a flag assigned to segments of a media file, according to some embodiments.

Figure 16L:

FIG. 16L schematically illustrates an example of an upload record assigned to each media file, when a media stream is stored as one or more media files, according to some embodiments.

Figure 16M:
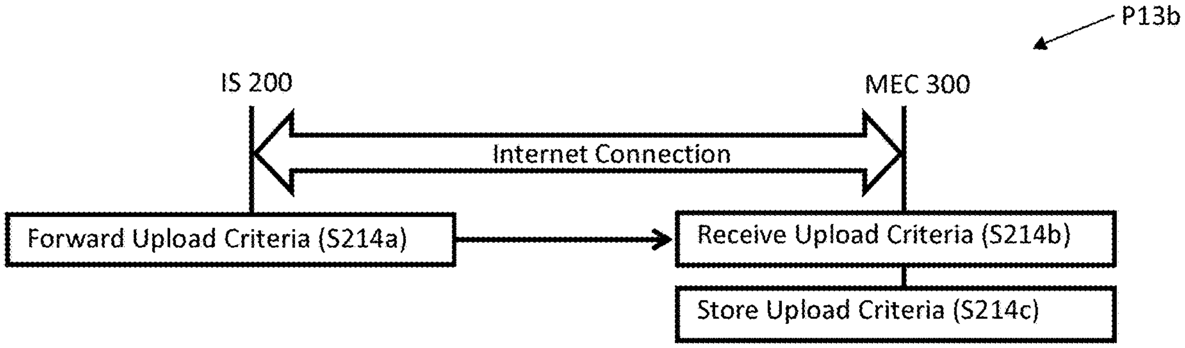

FIG. 16M is a flowchart illustrating an example of a process for transfer of an upload criteria from an Internet server to a MEC server, according to some embodiments.

Figure 16N:
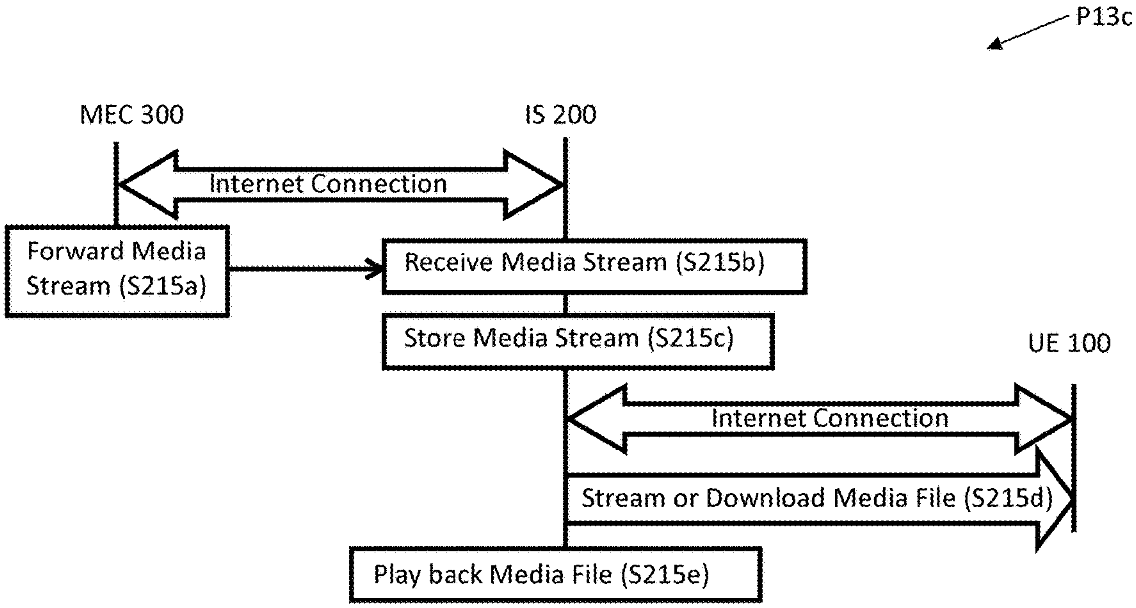

FIG. 16N is a flowchart illustrating an example of a process for transfer of a media stream from a MEC server to an Internet serve, according to some embodiments.

Figure 16O:

FIG. 16O schematically illustrates an example of a media stream associated with the MEC ID of a MEC server and UE ID of a UE, according to some embodiments.

Figure 16P:
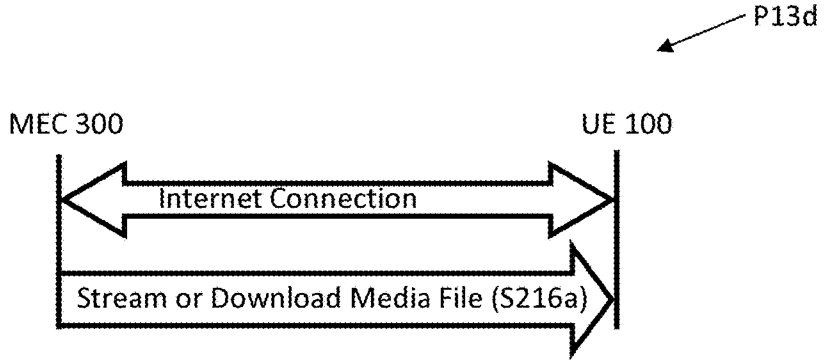

FIG. 16P is a flowchart illustrating an example of a process for provision of download or streaming of an uploaded media stream from a MEC server to a UE, according to some embodiments.

Figure 16Q:
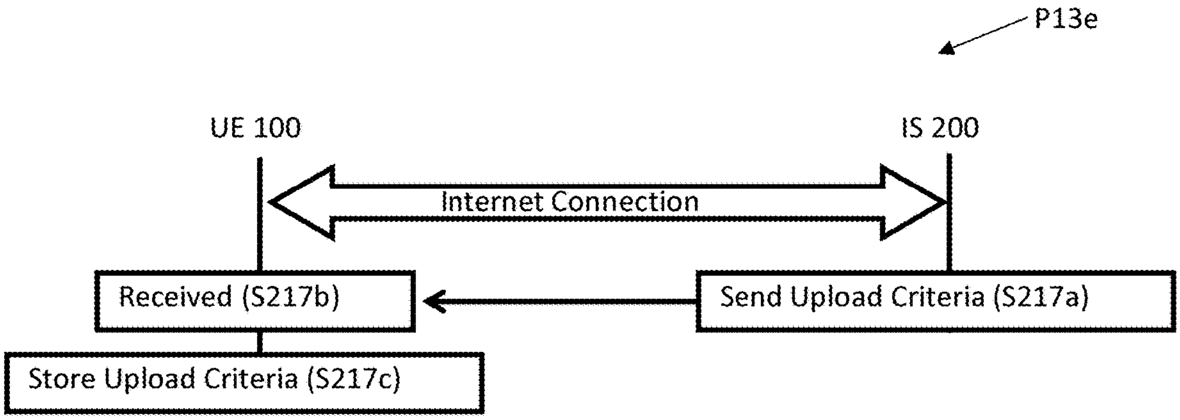

FIG. 16Q is a flowchart illustrating an example of a process for provision of an upload criteria from an Internet server to each UE, according to some embodiments.

Figure 16R:
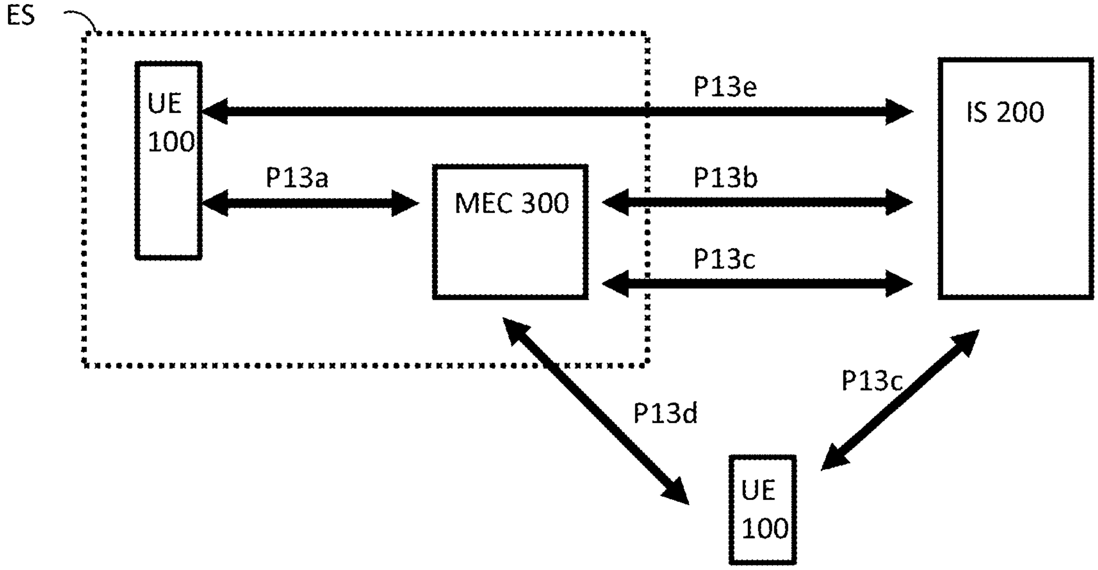

FIG. 16R schematically illustrates a summary of complex communications in a local media upload system, according to some embodiments.

Figure 17A:
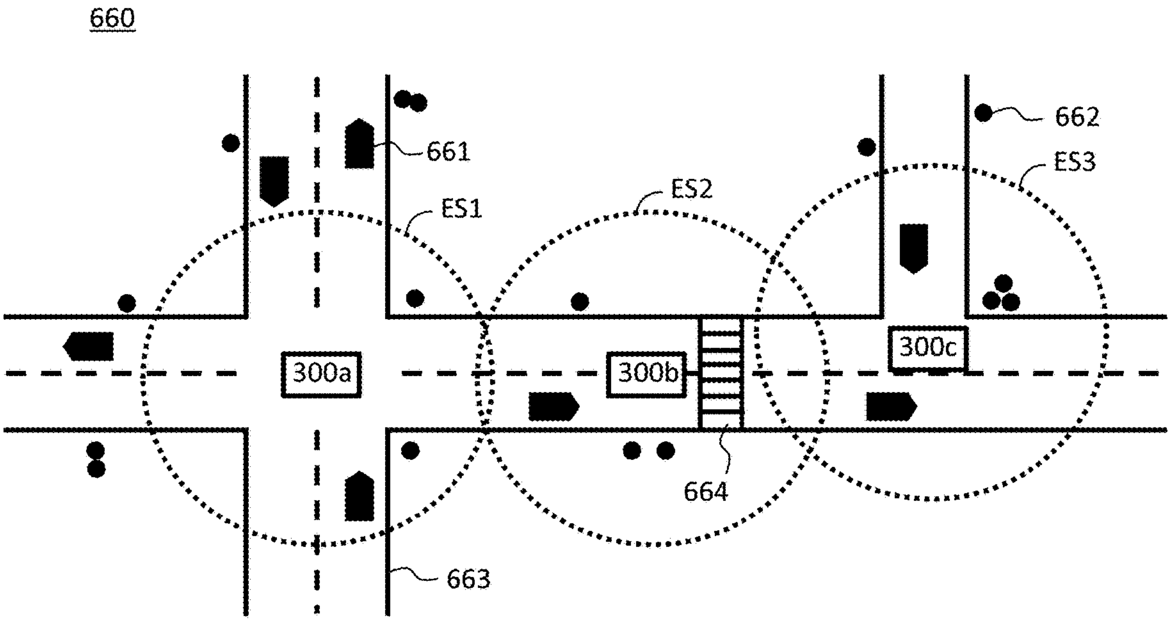

FIG. 17A schematically illustrates an example of a traffic system in which a MEC service is provided, according to some embodiments.

Figure 17B:
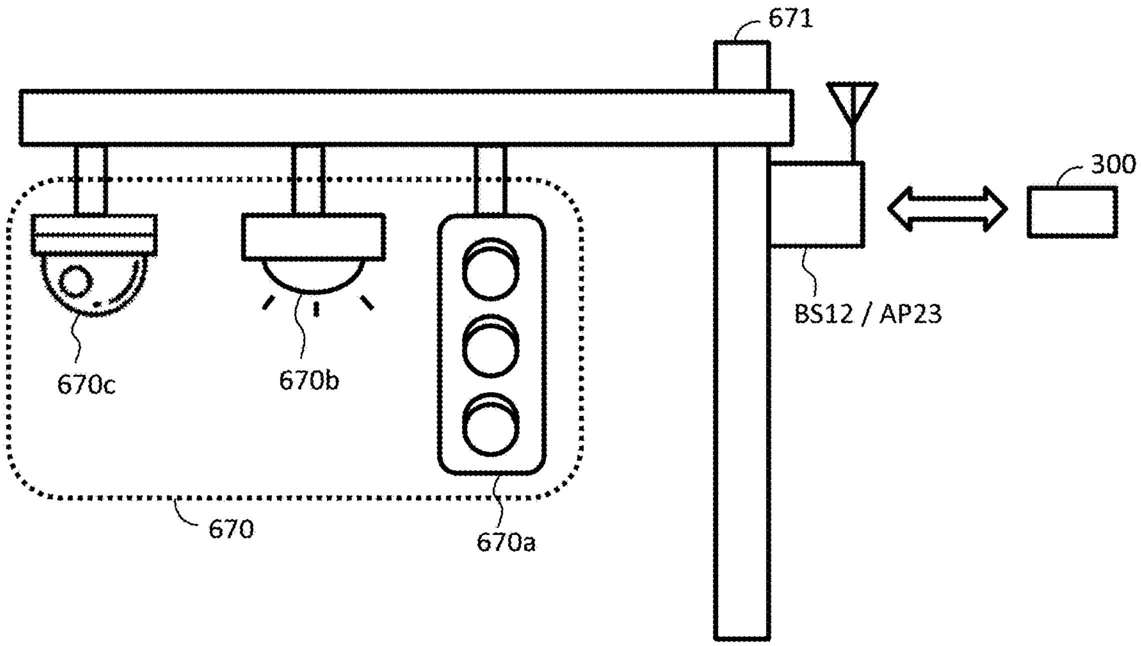

FIG. 17B schematically illustrates an example where a base station or access point is provided on a pole on which at least one facility of a traffic signal, street lamp, and outdoor surveillance camera is fixed, according to some embodiments.

Figure 17C:
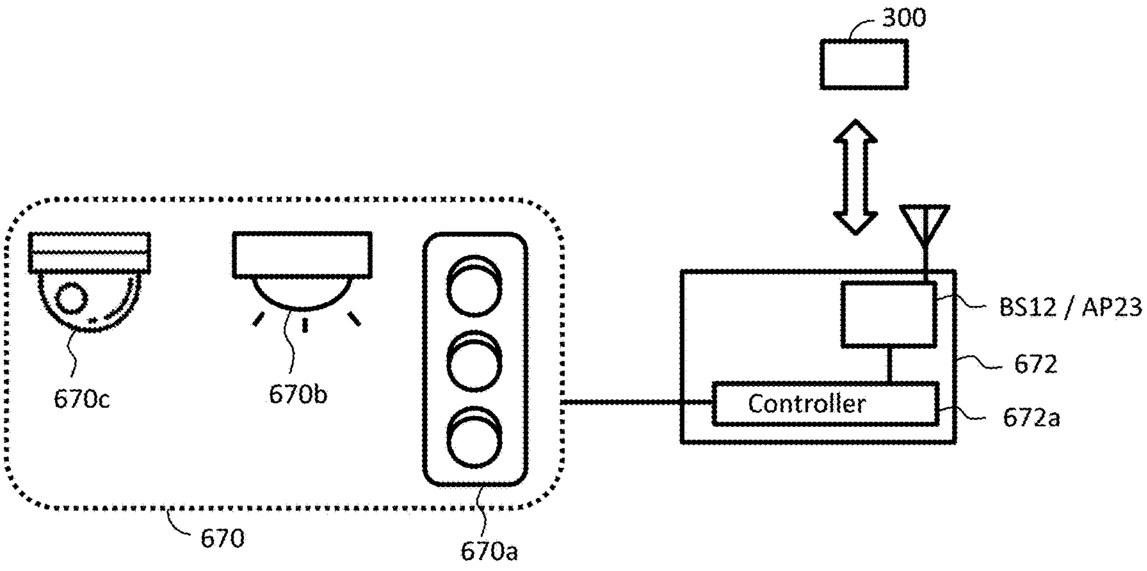

FIG. 17C schematically illustrates an example where a base station or access point is provided in a control cabinet together with a controller coupled to a traffic facility, according to some embodiments.

Figure 17D:
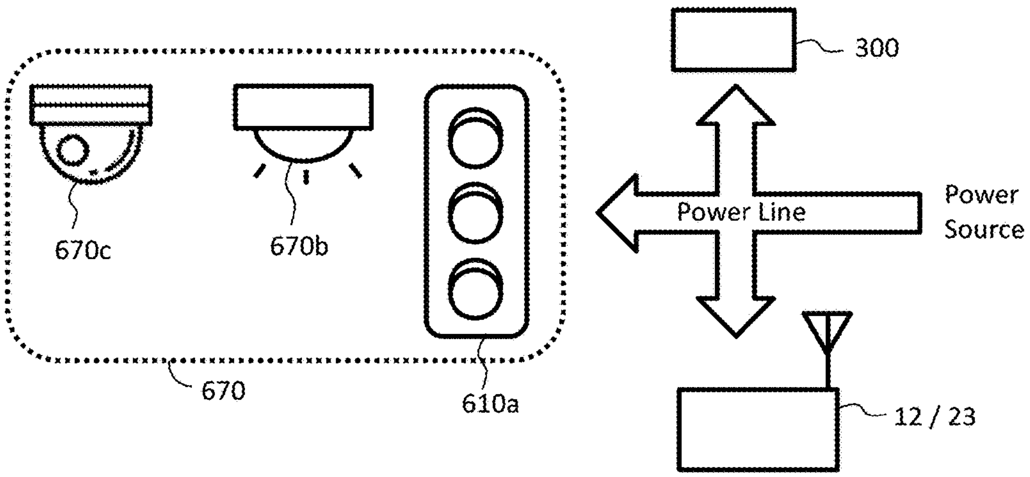

FIG. 17D schematically illustrates an example of power supply to a base station or access point collocated with a traffic facility, according to some embodiments.

FIG. 17E schematically illustrates an example of a database that lists a UE and attribute information associated with the UE, according to some embodiments.

FIG. 17F schematically illustrates an example a visual notification displayed on a vehicle UE which warns possible collision with a pedestrian, according to some embodiments.

FIG. 17G schematically illustrates an example of a visual notification displayed on a non-vehicle UE which warns possible collision with a vehicle, according to some embodiments.

Figure 17H:
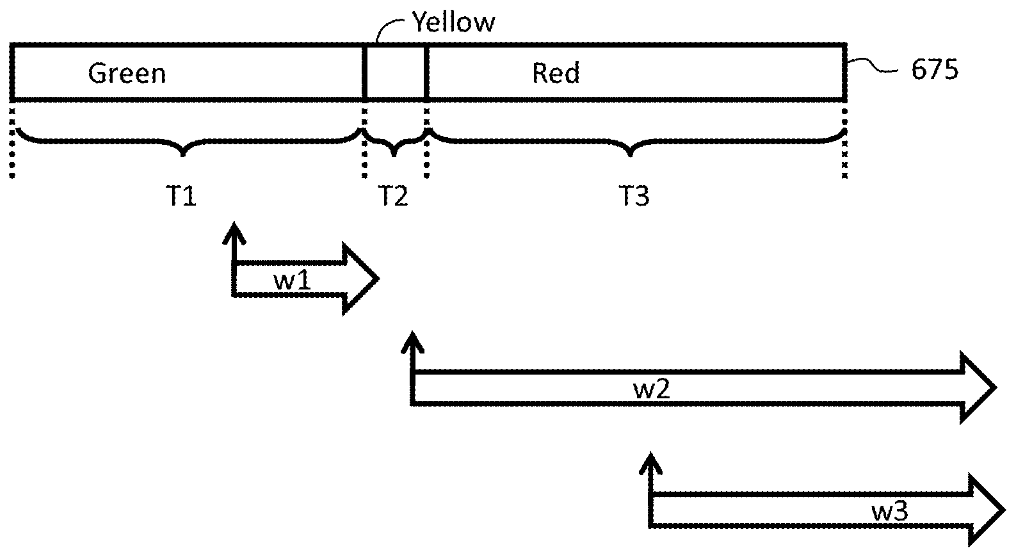

FIG. 17H schematically illustrates an example of a switching cycle based on which a vehicle UE controls upload of a media stream, according to some embodiments.

Figure 18A:
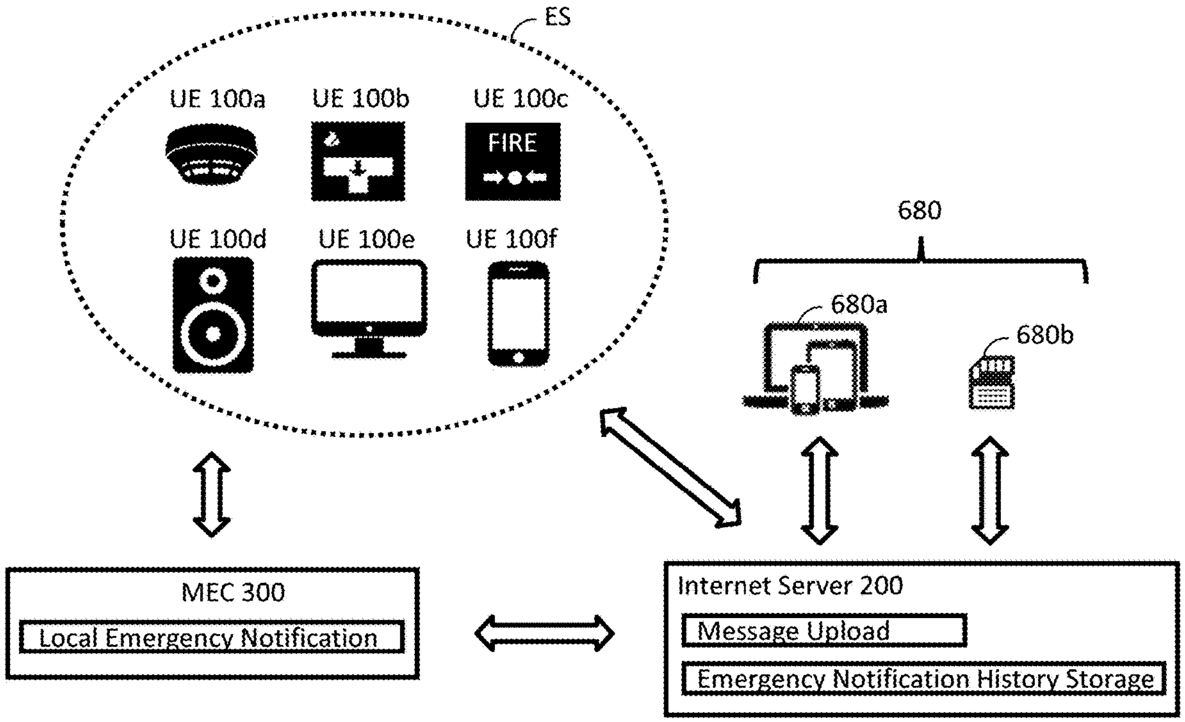

FIG. 18A schematically illustrates an example of a system for providing a MEC service (local emergency notification service) and an Internet service (message upload service and emergency notification history storage service), according to some embodiments.

Figure 18B:
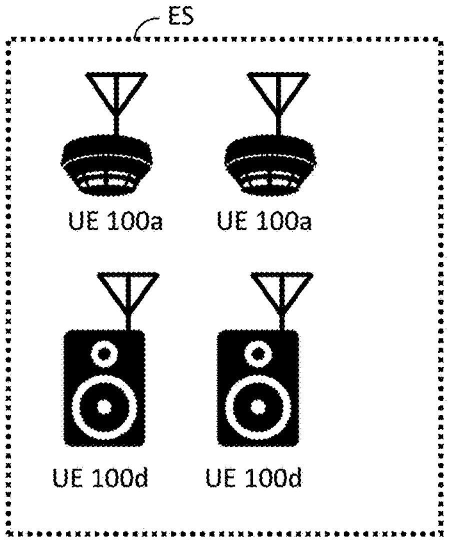

FIG. 18B schematically illustrates an example of implementation where each detector UE and each notifier UE communicate with a MEC server individually, according to some embodiments.

Figure 18C:
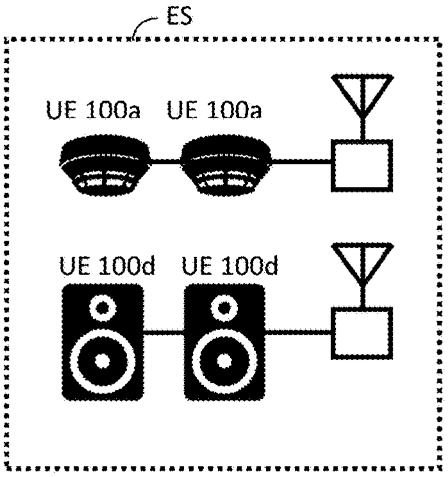

FIG. 18C schematically illustrates an example of implementation where one of two connected detector UEs operates as the representative detector UE while one of two connected notifier UEs operates as the representative notifier UE 100, according to some embodiments.

Figure 18D:
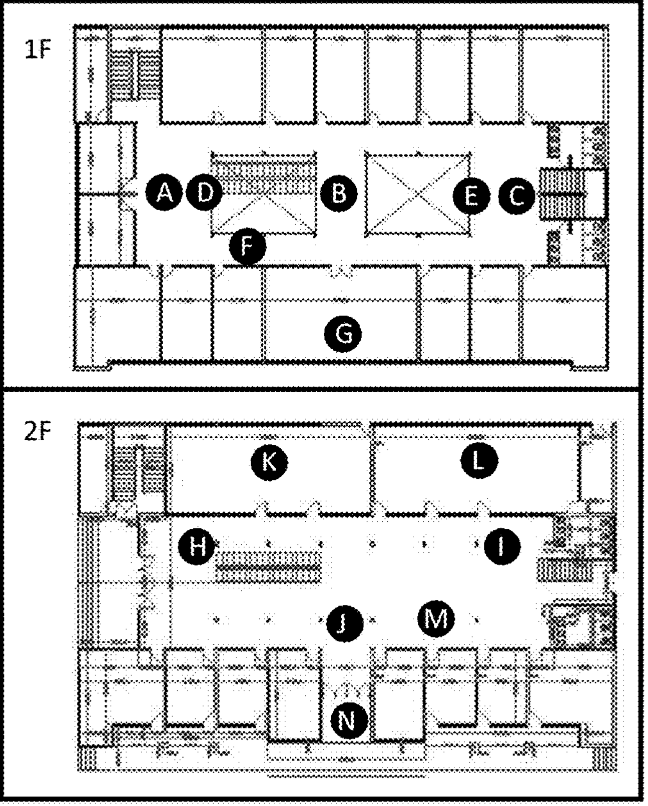

FIG. 18D schematically illustrates an example of a database for management of detector UEs and notifier UEs for a local emergency notification service, according to some embodiments.

Figure 18E:
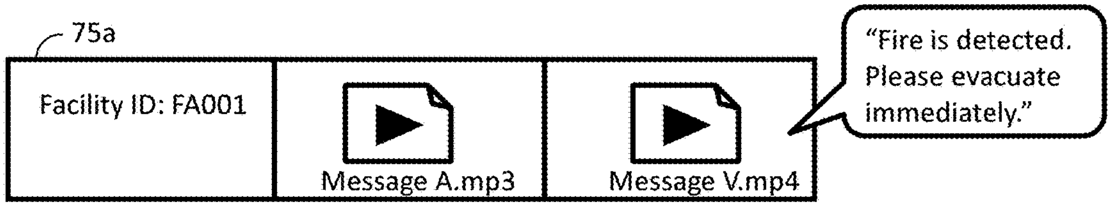

FIG. 18E schematically illustrates an example of an audible message and visual message associated with a facility in which a local emergency notification is provided, according to some embodiments.

Figure 18F:
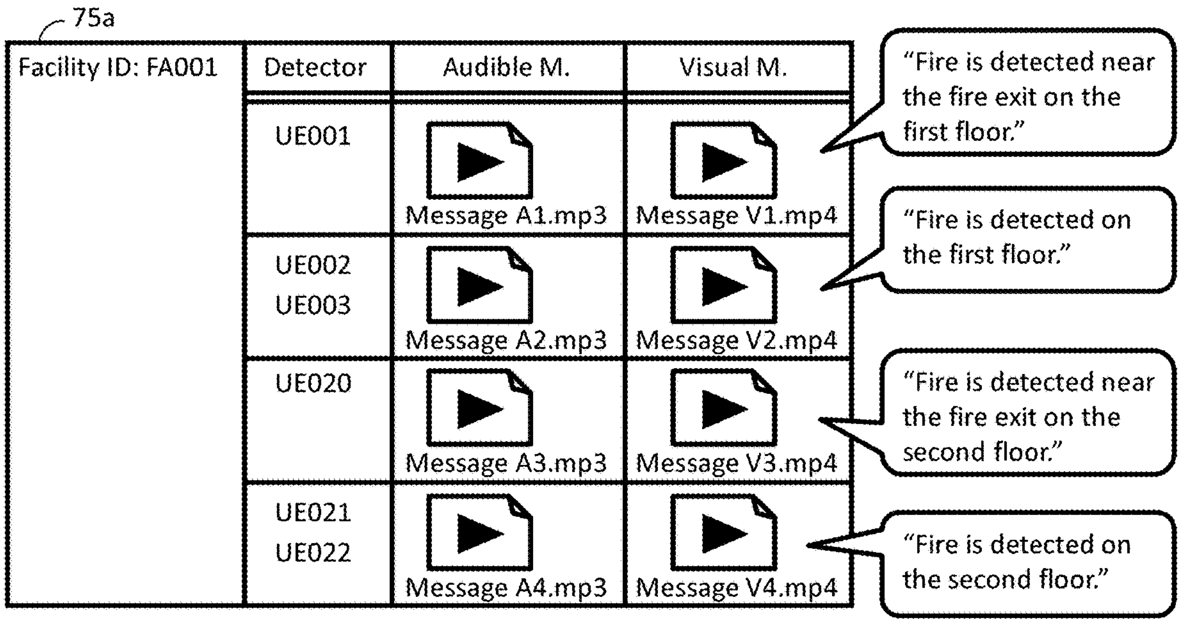

FIG. 18F schematically illustrates an example where different two or more audible/visual messages are associated with detector UEs under the same facility ID, according to some embodiments.

Figure 18G:
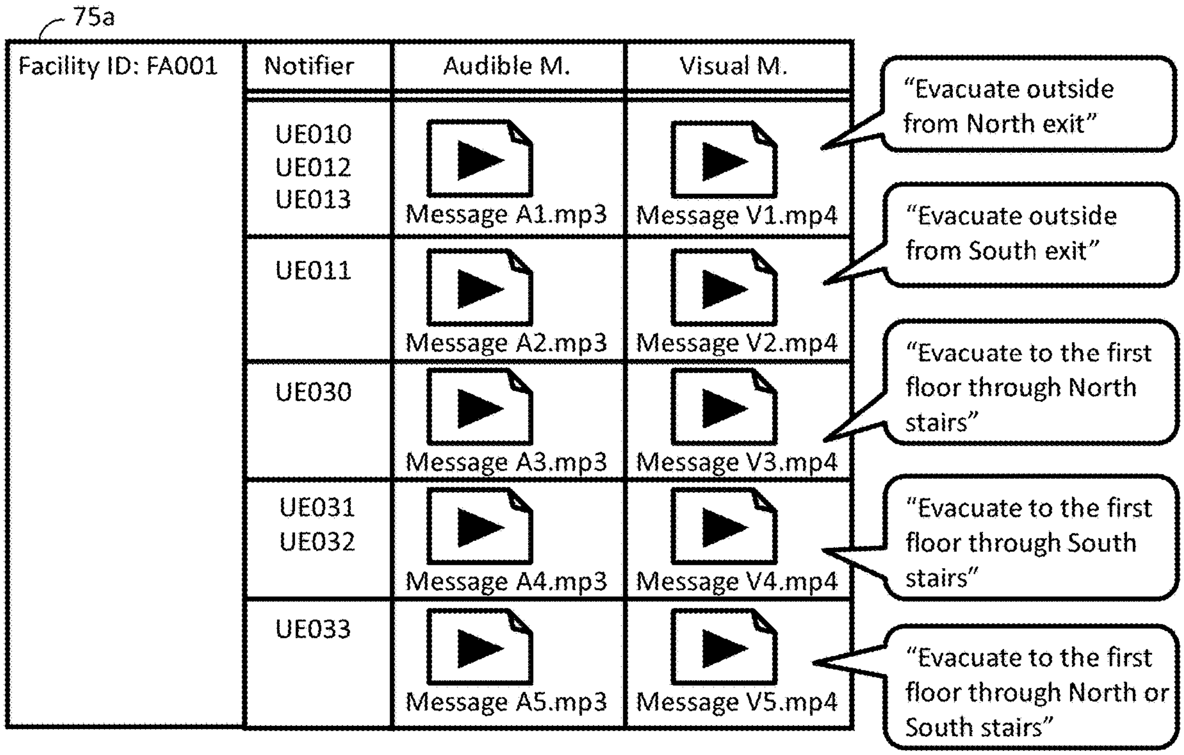

FIG. 18G schematically illustrates an example where different two or more audible/visual messages are associated with notifier UEs under the same facility ID, according to some embodiments.

Figure 18H:
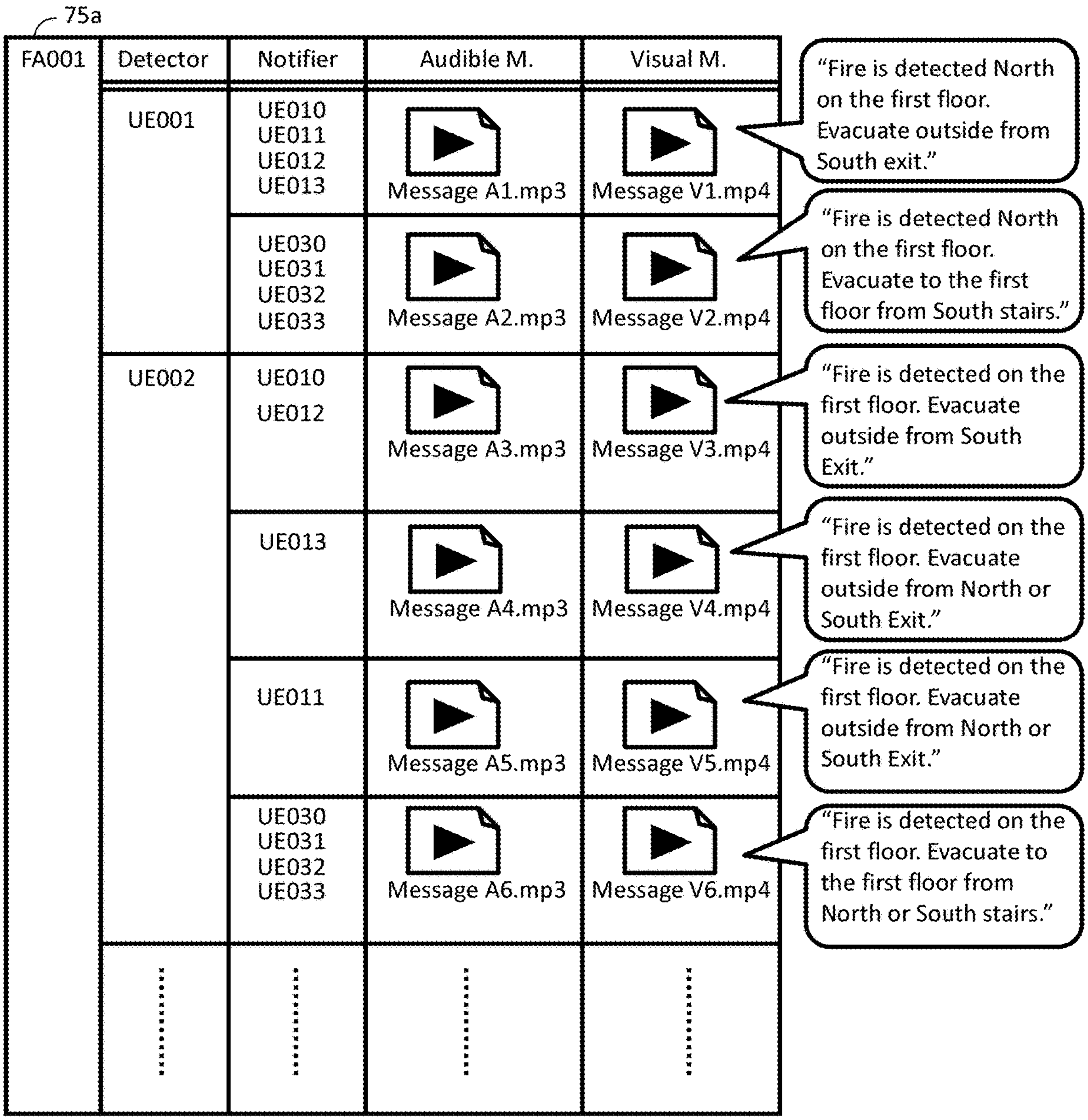

FIG. 18H schematically illustrates an example where different two or more audible/visual messages are associated with combinations of detector UEs and notifier UEs under the same facility ID for more targeted emergency notification, according to some embodiments.

Figure 18I:
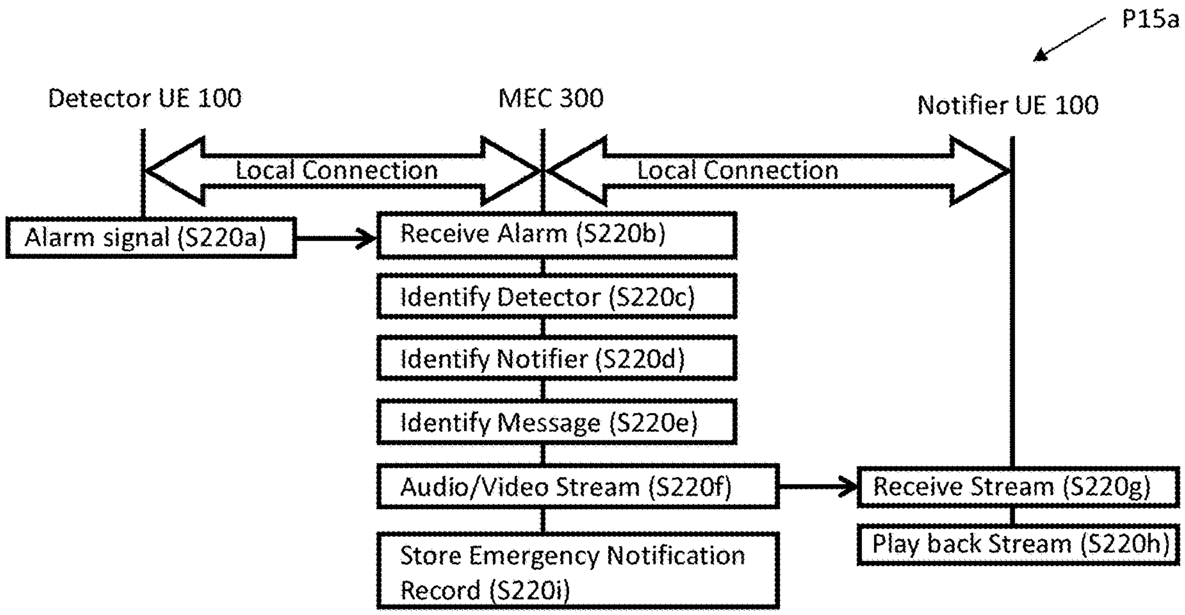

FIG. 18I is a flowchart illustrating an example of a process for a local emergency notification, according to some embodiments.

Figure 18J:
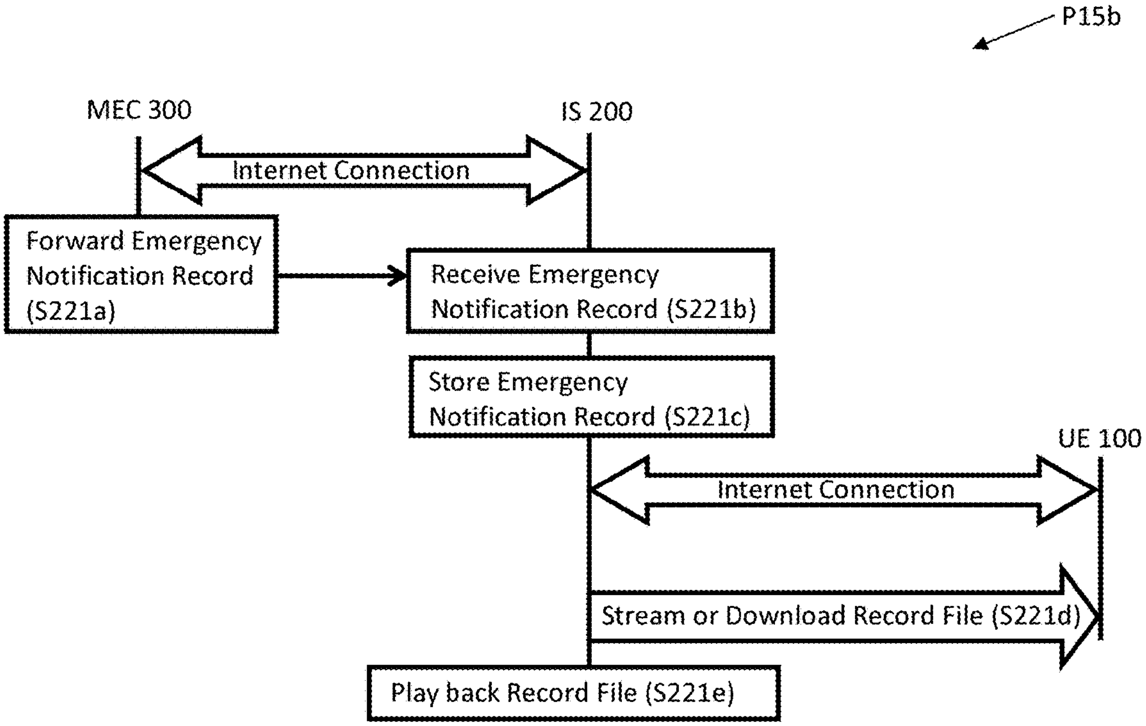

FIG. 18J is a flowchart illustrating an example of a process for transmission of an emergency notification record from a MEC server to an Internet server, according to some embodiments.

Figures 18K, 18L:
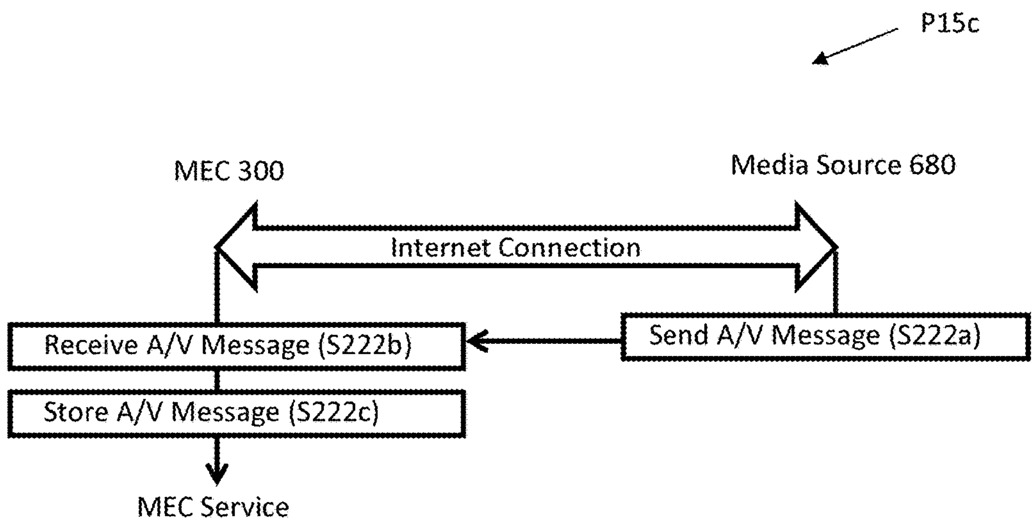

FIG. 18K schematically illustrates an example of a record file generated as record of a local emergency notification, according to some embodiments.

FIG. 18L is a flowchart illustrating an example of a process for upload of an audible/visual message from an external media source to a MEC server, according to some embodiments.

Figure 18M:
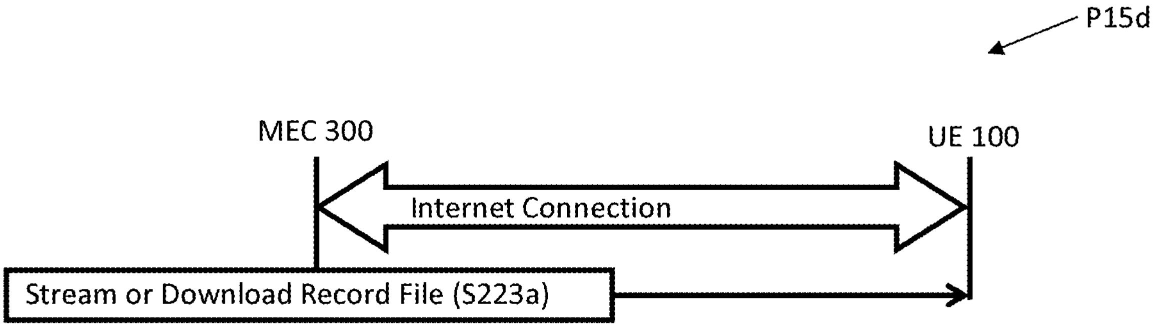

FIG. 18M is a flowchart illustrating an example of a process for provision of download or streaming of a record file from a MEC server to a UE, according to some embodiments.

Figure 18N:
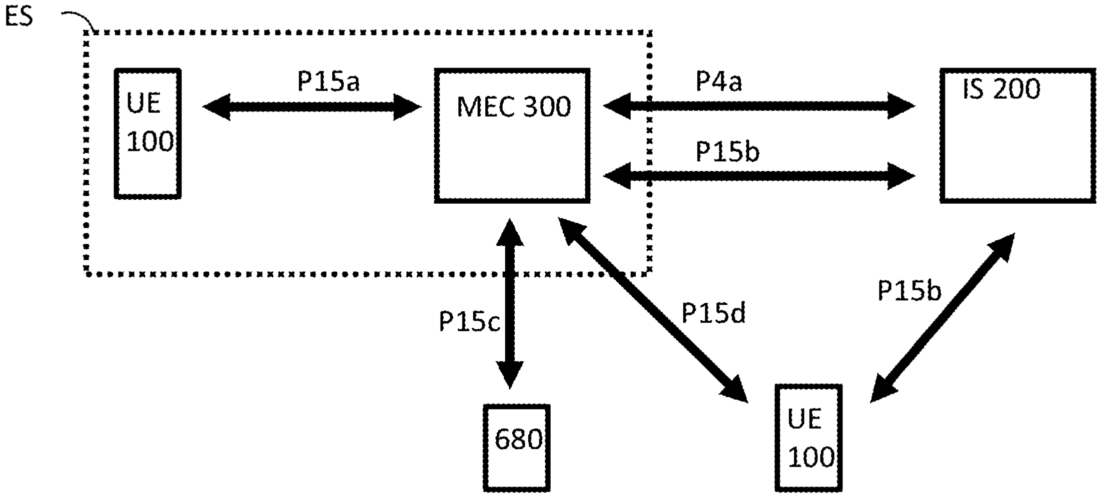

FIG. 18N schematically illustrates a summary of complex communications in a local emergency notification system, according to some embodiments.

Figure 19A:
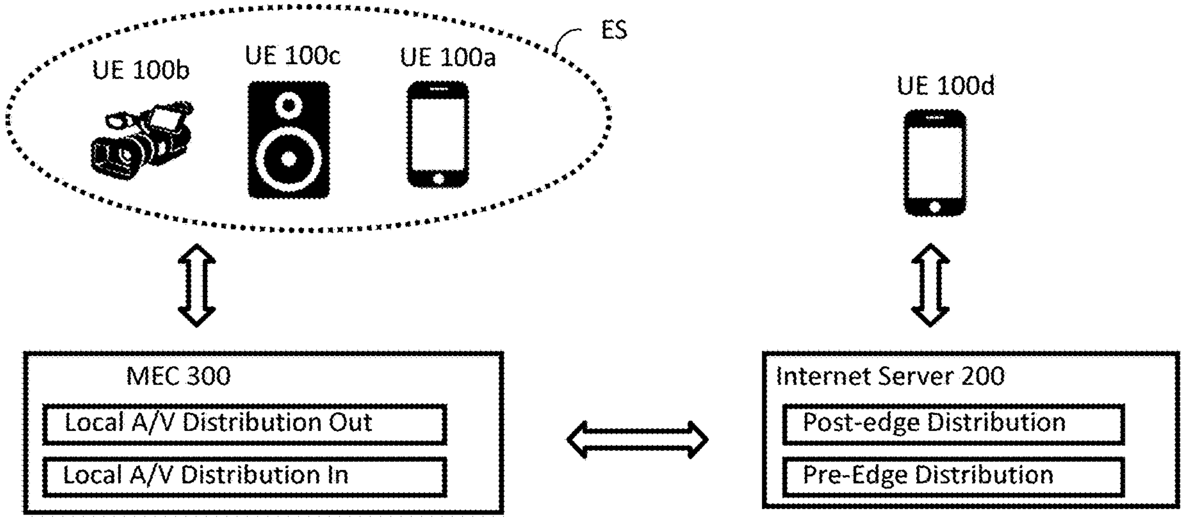

FIG. 19A schematically illustrates an example of a system for providing a MEC service (edge-based audio/video outbound distribution service, edge-based audio/video inbound distribution service) and an Internet service (post-edge audio/video distribution service, post-edge audio/video distribution service), according to some embodiments.

Figure 19C:
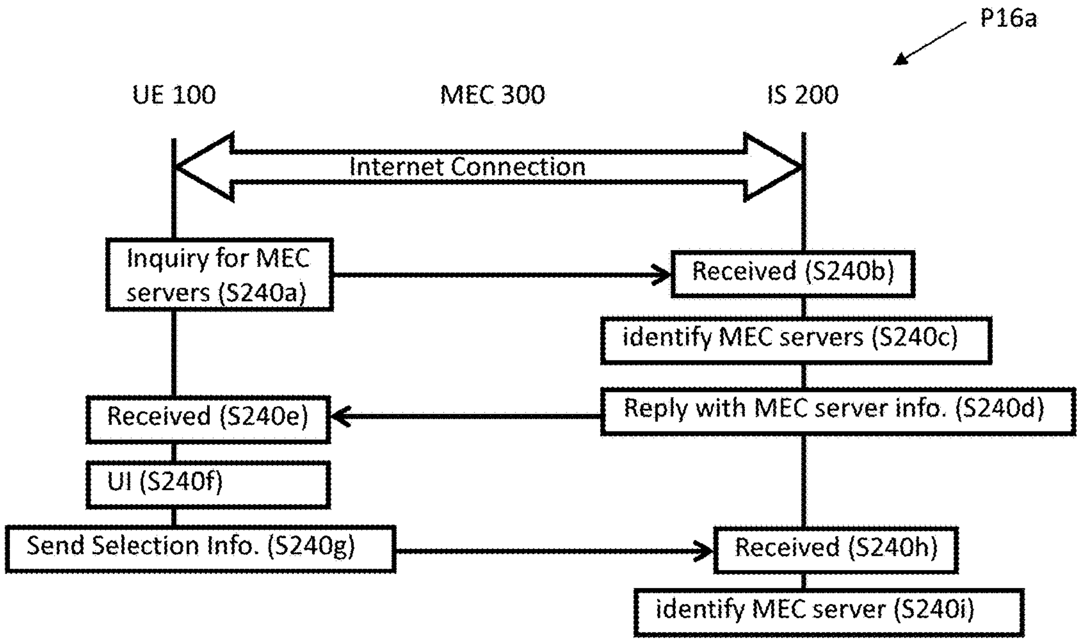
Figures 19B, 19H:
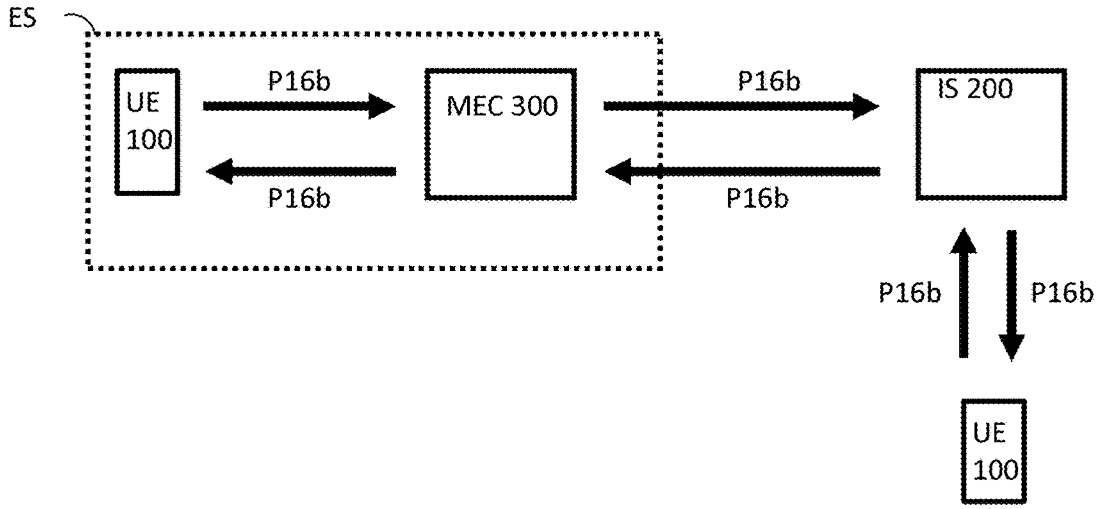

FIG. 19B schematically illustrates an example of a MEC database listing one or more MEC servers, according to some embodiments.

FIG. 19C is a flowchart illustrating an example of a process for establishing a communication between a MEC server and an external UE out of an edge site, according to some embodiments.

Figure 19D:
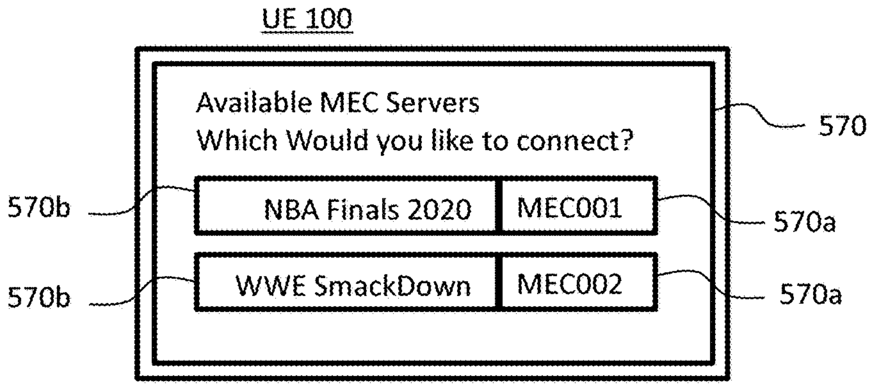

FIG. 19D schematically illustrates an example of a GUI displayed on a display of an external UE for a user selection of a MEC server, according to some embodiments.

Figure 19E:
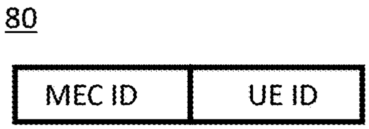

FIG. 19E schematically illustrates an example of a database that lists the UE ID of an external UE associated with the MEC ID of a selected MEC server, according to some embodiments.

Figure 19G:
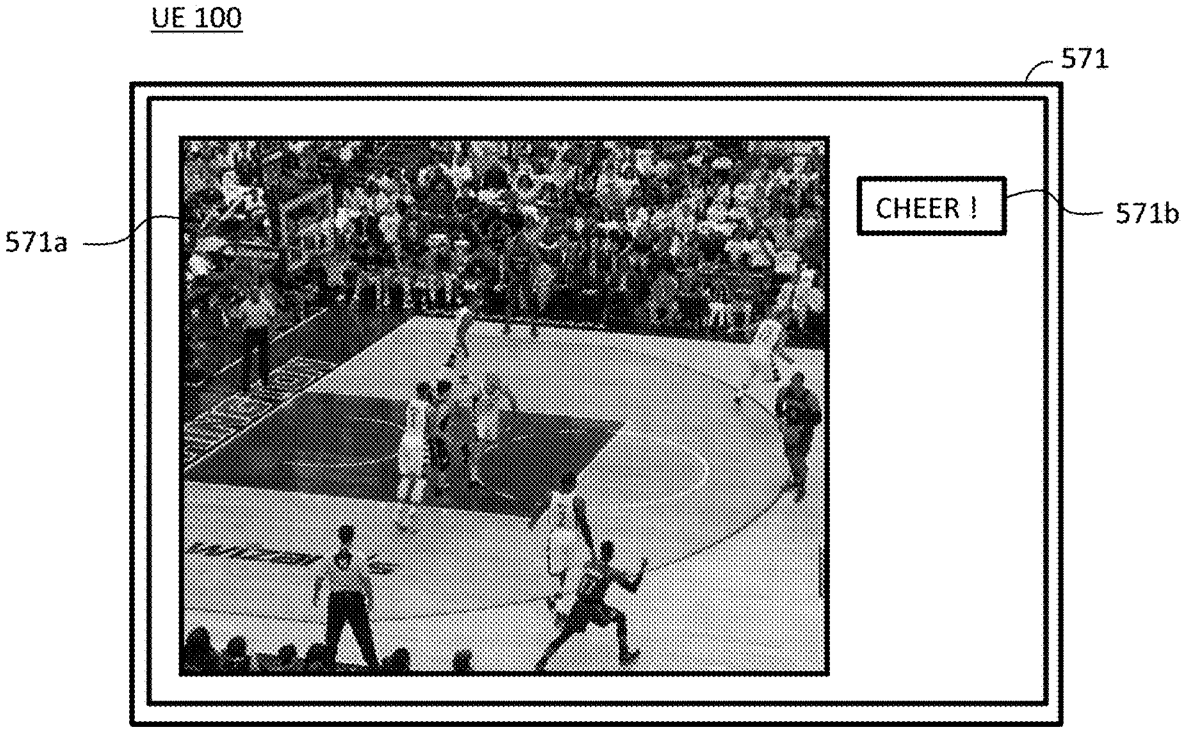
Figure 19F:
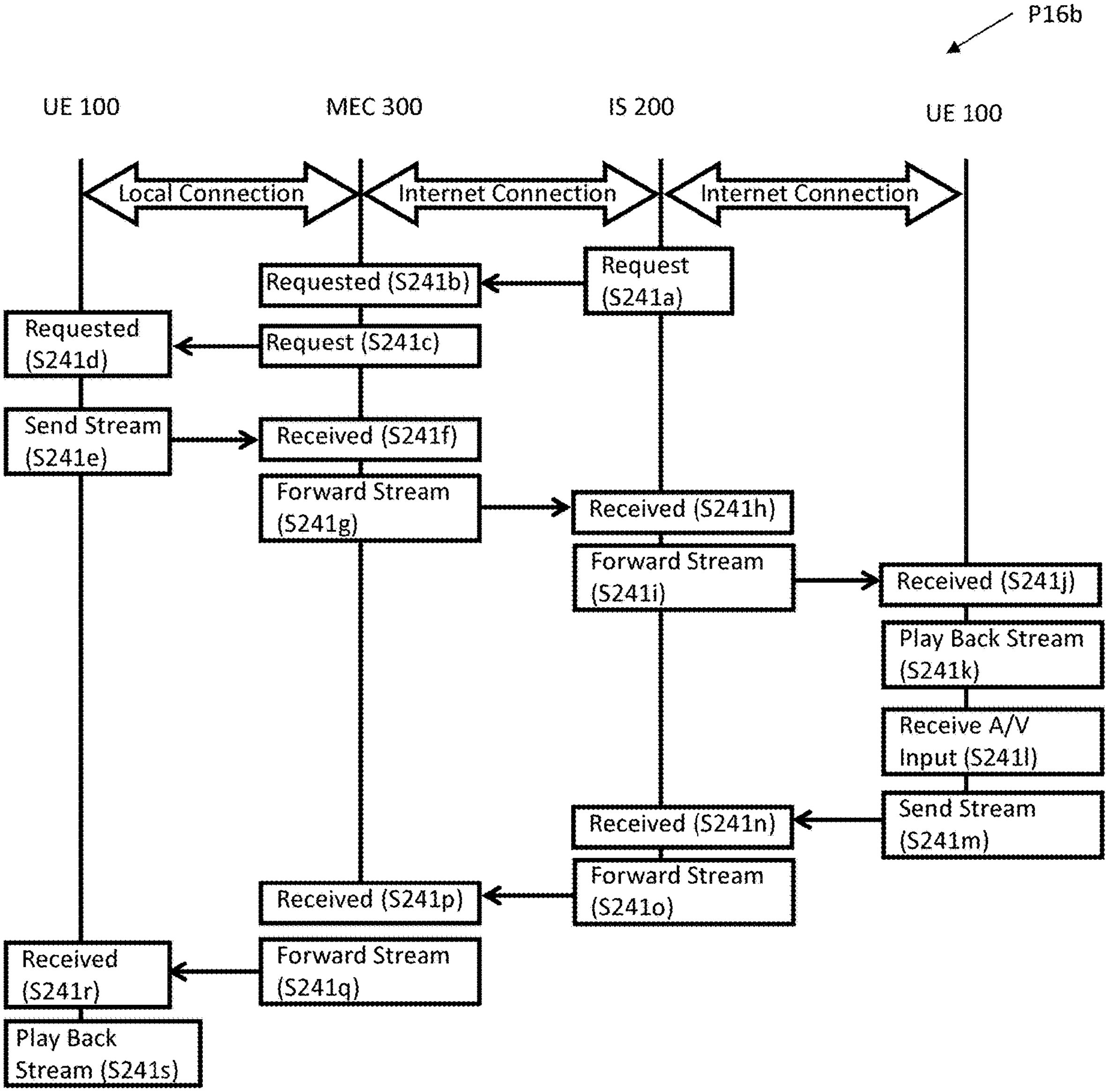

FIG. 19F is a flowchart illustrating an example of a process for provision of an MEC service and Internet service over a virtual connection between an external UE and a selected MEC server, according to some embodiments.

FIG. 19G schematically illustrates an example of a GUI displayed on an external UE for playback of an audio/video stream originating from an internal UE, according to some embodiments.

FIG. 19H schematically illustrates a summary of complex communications in a mutual media stream distribution system, according to some embodiments.

Figure 20A:
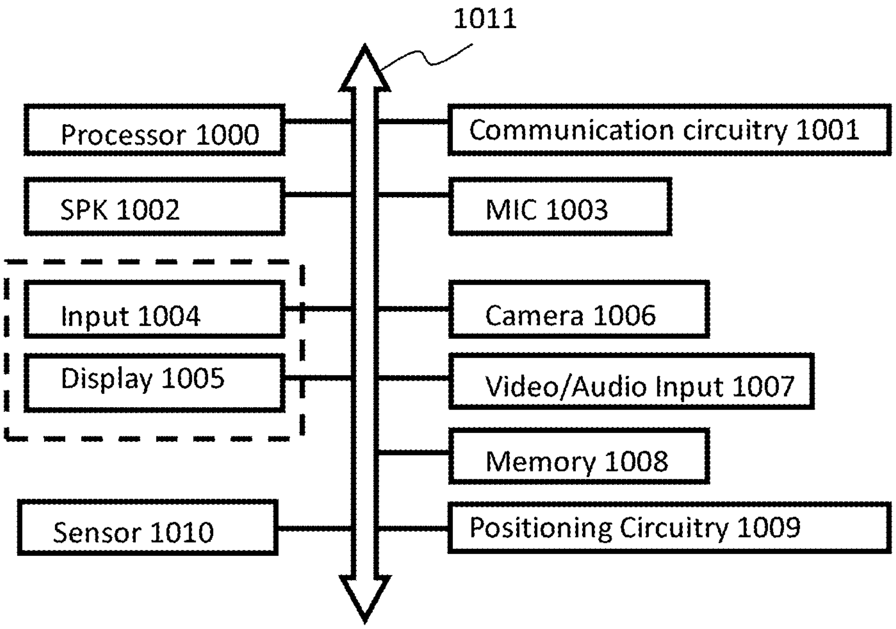

FIG. 20A is a block diagram illustrating an example of the structure of a UE, according to some embodiments.

Figure 20B:
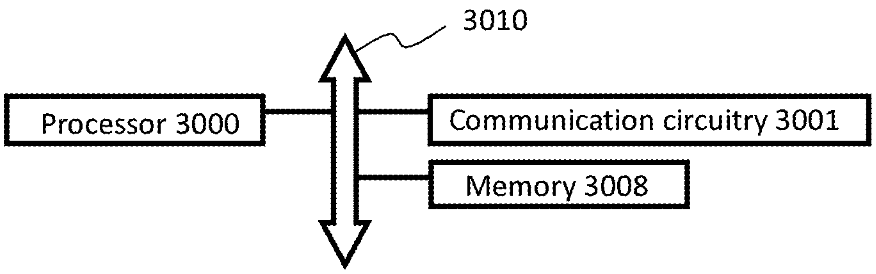

FIG. 20B is a block diagram illustrating an example of the structure of a MEC server, according to some embodiments.

Figure 20C:
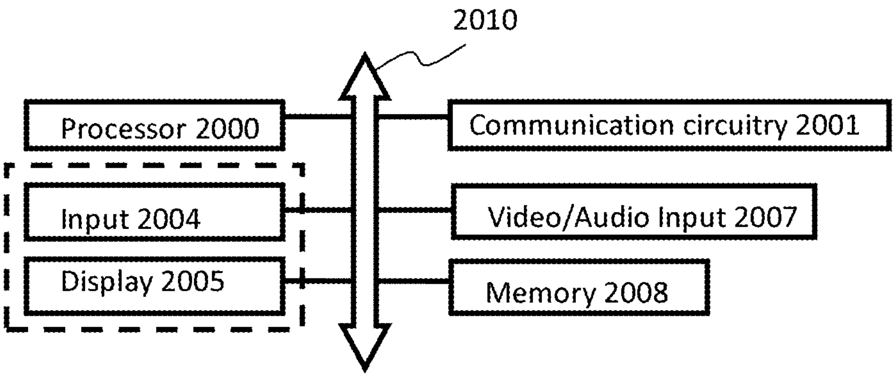

FIG. 20C is a block diagram illustrating an example of the structure of an Internet server, according to some embodiments.

DETAILED DESCRIPTION

System Overview

Embodiments are described herein with reference to the attached drawings. Embodiments are only for the purpose of describing exemplary implementations of the inventive concept defined by Claims, and therefore are not intended to limit in any way the scope of the claimed invention.

In some embodiments, a system may includes at least one mobile communication network which may be connected to the Internet. In the mobile network, at least one multi-access edge computing (MEC) server may be provided in a radio access network (RAN) and/or a core network (CN). The multi-access edge computing may also be referred to as mobile edge computing. The MEC server may run an app hosted thereon to provide a MEC service to user equipments (UEs) in a limited coverage associated with the RAN or CN in which the MEC server is deployed. Alternatively or additionally, the system may include at least one local area network (LAN) which may be connected to the Internet. A MEC server may be provided in the LAN. The MEC server may run an app hosted thereon to provide a MEC service to UEs in a limited coverage within the LAN. The MEC server may be associated with a particular Internet server accessible over the Internet that provides an Internet service. The Internet service may be associated with the MEC service. The MEC service and Internet service may be simultaneously or concurrently provided to UEs, or one of the services may be conditionally or selectively provided to the UEs at a time.

The Internet service provided by the Internet server may be delivery (e.g., streaming, downloading, etc.) of digital data such as audio streams and video streams over a downlink channel, delivery (e.g., streaming, uploading, etc.) of digital data such as audio streams and video streams over an uplink channel, processing of digital data received from the MEC server and/or UE, etc. The MEC service provided by the MEC server may also be delivery (e.g., streaming, downloading, etc.) of digital data such as audio streams and video streams over a downlink channel, delivery (e.g., streaming, uploading, etc.) of digital data such as audio streams and video streams over an uplink channel, processing of digital data received from the UE and/or Internet server, delivery of the processed digital data to the UE and/or Internet server, etc.

In the specification, a user equipment (UE) is generally a device designed to be used by an end-user in any form in the mobile network and/or LAN. The UE may be a mobile or portable device, or a fixed device installed or otherwise situated in a specific location. An example of such UE may include a cell phone, smartphone, tablet, laptop, personal computer (PC), personal digital assistant (PDA), smart watch, head mount display (HMD), display or monitor, loudspeaker, television set, smart TV, microphone, headphone, earphone, and other electronic devices, gadgets, appliances, etc. The UE may be referred to also as a terminal, mobile station, user device, node, endpoint, etc. The UE in the specification may include but is not limited to the "user equipment" defined in telecommunication standards or specifications such as IMT-Advance and IMT-2020.

Figure 1:
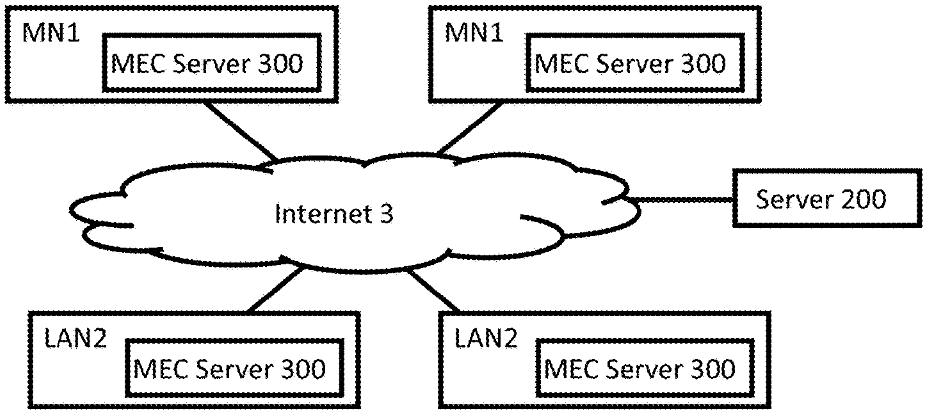
FIG. 1 schematically illustrates an example of a system for an edge-based local service and internet service associated with the edge-based local service, according to some embodiments.

FIG. 1 schematically illustrates an example of a system according to some embodiments. The system may include at least one mobile network 1, at least one local area network (LAN) 2, and the Internet 3. The mobile network 1 may be a radio network distributed over cells (radio coverage areas) for providing wireless communication between UEs, which may be referred to also as a cellular network. The mobile network 1 may be a radio network system pursuant to the third-generation (3G) mobile communication standard in compliance with International Mobile Telecommunications (IMT) 2000 specifications and associated 3rd Generation Partnership Project (3GPP) specifications; fourth-generation (4G) mobile communication standard in compliance with IMT-Advanced specifications and associated 3GPP specifications; fifth-generation (5G) mobile communication standard in compliance with IMT-2020 specifications and associated 3GPP specifications; and/or beyond. Each mobile network 1 may be run, managed, or operated by a specific carrier, namely, telecommunication service provider. Two or more mobile networks may be connected together through gateways provided in the respective networks. Each mobile network 1 may be connected to the Internet 3 through a gateway. The LAN 2 may be a computer network that interconnects computers (e.g., UEs) in the LAN 2. The LAN 2 may be established or formed in a limited area such as a residence, school, laboratory, university campus, and office building. The system may further include a MEC server computer 300 arranged in the mobile network 1 and/or in the LAN 2. The MEC server 300 in the mobile network 1 may have an app hosted thereon to provide the MEC service to the UEs over the mobile network 1 by executing the app. The MEC server 300 in the LAN 2 may have an app hosted thereon to provide the MEC service to the UEs over the LAN 2 by executing the app. They system may further include an Internet server computer 200 connected to the Internet 3 that is accessible from UEs in the mobile network 1 and LAN 2 over the Internet 3. The Internet server 200 may have an app hosted thereon to provide the Internet service to the UEs over the Internet 3 by executing the app.

Figure 2:
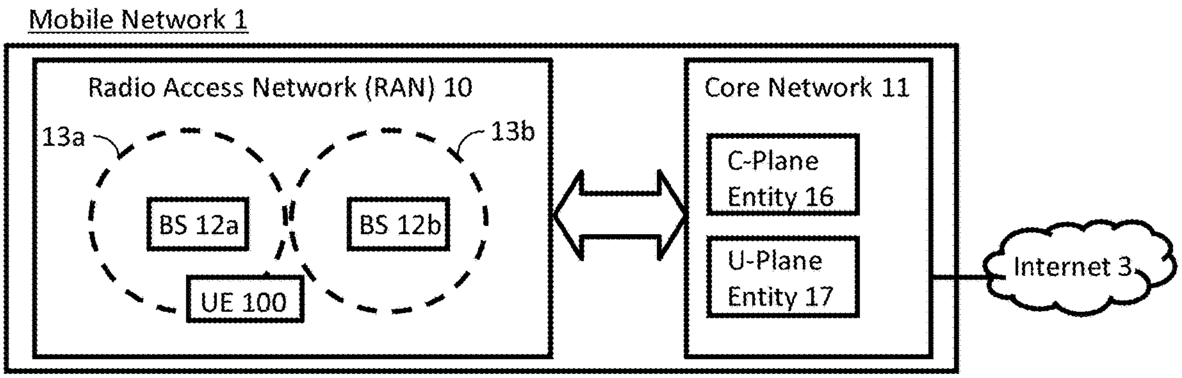
FIG. 2 schematically illustrates an example of a mobile network in the system, according to some embodiments.

FIG. 2 schematically illustrates an example of the mobile network 1 in more detail, according to some embodiments. As illustrated herein, the mobile network 1 may generally comprise a radio access network (RAN) 10 and a core network (CN) 11.

The RAN 10 is part of the mobile network 1 that enables the UEs 100 to wirelessly connect to the CN 11. The RAN 10 may comprise one or more base stations (BSes) 12 for providing radio (wireless) communications between the UEs 100 and CN 11. Each base station 12 may be a wireless communication station fixed in a given area on a land or a mobile base station in a form of a vehicle, etc. Each base station 12 may provide a specific wireless coverage area, namely, a specific cell within which the UEs 100 are able to wirelessly communicate with the corresponding base station 12. The base station or BS 12 may be referred to also as a base transceiver station (BTS), Node B, eNode B (eNB), gNode B (gNB), etc. depending on the standard or specifications on which the mobile network 1 relies. Each cell provided by the BS 12 may be a macro cell (macrocell), micro cell (microcell), pico cell (picocell), femto cell (femtocell), etc. depending on the intensity of radio or largeness of coverage the BS 12 provides. The RAN 10 may also include one or more radio network controllers (RNCs) situated between one or more BS 12 and CN 11 to manage and control communications between the BS 12 and CN 11. In an aspect of a Centralized RAN (C-RAN) architecture, the BS 12 may include a centralized station such as a Baseband Unit (BBU) and Central Unit (CU), and one or more distributed stations such as Remote Radio Heads (RRHs) and Distributed Units (DUs) that are connected to and controlled by the centralized station. The BS 12 may have a radio communication coverage area of the centralized station that corresponds to the cells provided by the associated (connected) distributed stations. The BS 12 may have a radio communication coverage of a particular distributed station that corresponds to a cell provided by itself. In the example illustrated in FIG. 2, two base stations 12*a* and 12*b* are shown providing coverage areas 13*a* and 13*b* respectively while one UE 100 residing in the coverage area 13*a* is shown, for illustrative purposes only.

The CN 11 is another part, especially a core part, of the mobile network 1 that provides a variety of services to the UEs 100 connected to the CN 11 through the RAN 10. Most importantly, the CN 11 is configured to manage mobility and communication sessions of the UEs 100 and route or direct data between the UEs 100 in the same RAN 10, between the UEs 100 in separate RANs 10, and between a UE 100 in the RAN 10 and an entity in the Internet 3. In general, the CN 11 may comprise a Control Plane (C-Plane) function 16 that is responsible for management of the UEs 100 and a User Plane (U-Plane) function 17 that is responsible for mainly routing or steering of user data transmitted from/to the UEs 100, which are functionally separated from one another. The management of the UEs 100 in the C-Plane function 16 may include management of mobility of the UEs 100 such as handover and location registration of the UEs 100, allocation of Internet Protocol (IP) addresses to the UEs 100, access authentication, etc. Data such as control messages used in the C-Plane function 16 may be referred to as C-Plane data. In the 4G mobile communication system where the RAN 10 and CN 11 are an evolved universal mobile telecommunications system terrestrial radio access network (E-UTRAN) and an evolved packet core (EPC), respectively, the C-Plane function 16 may be implemented by entities or nodes such as a Mobility Management Entity (MME) configured to manage mobility of the UEs 100; part of Packet Data Network Gateway (PGW) or PGW-C configured to allocate IP addresses to the UEs 100, serving as a gateway for communication with the Internet 3; etc. In the 5G mobile communication system, the C-Plane function 16 may be implemented by entities or nodes such as an Access and Mobility Management Function (AMF) configured to manage mobility of the UEs 100, a Session Management Function (SMF) configured to allocate IP addresses to the UEs 100 and manage communication sessions, etc. The user data processed in the U-Plane function 17 may include voice data (audio streams) for voice communication, video data (video streams) for video communication, etc., which may be referred to also as U-Plane data. In the 4G mobile communication system, the U-Plane function 17 may be implemented by entities or nodes such as part of the PGW or PGW-U configured to route IP packets, etc. In the 5G mobile communication system, the U-Plane function 17 may be implemented by entities or nodes such as a User Plane Function (UPF) configured to route IP packets. The CN 11 may include more various elements for management of communications of the UEs 100 such as a home location register (HLR) or home subscriber server (HSS) as a database for permanent subscriber information, a serving gateway (SGW) coupled to the PGW for routing and forwarding user data packets, etc.

Figure 3:
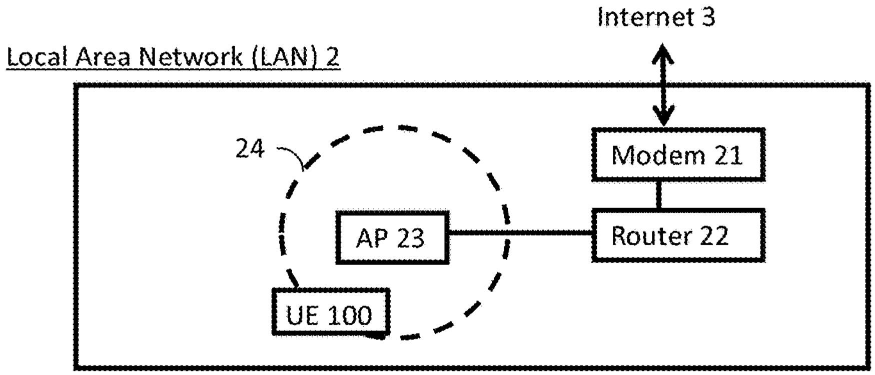
FIG. 3 schematically illustrates an example of a local area network (LAN) in the system, according to some embodiments.

FIG. 3 schematically illustrates an example of the local area network or LAN 2 in more detail, according to some embodiments. As illustrated herein, the LAN 2 may generally comprise a modem 21 for modulation and demodulation of digital data to provide data communication between the LAN 2 and the Internet 3. An example of the modem 21 may be a cable modem, digital subscriber line (DSL) modem, optical modem, etc. The LAN 2 may further comprise a router 22 that is configured to route or forward communication data between the UEs 100 in the LAN 2 and between a UE 100 in the LAN 2 and other endpoints in the Internet 3. The LAN 2 may further comprise an access point (AP) 23 that is configured to provide a wireless local area network (WLAN) communication having a corresponding limited wireless coverage area 24 within which the UEs 100 can perform WLAN communications. The WLAN communication may be one which is pursuant to IEEE 802.11 specifications also known as Wi-Fi, IEEE 802.15 specifications, wireless optical communication or visible light communication also known as Light Fidelity (Li-Fi), or other short-range or close-range wireless communication for local area networking. The AP 23 may be physically separate from the router 22, which is in communication with the router 22 over an Ethernet cable. Alternatively, the AP 23 may be integrated with the router 22 into a single unit, such as one that is called a Wi-Fi router.

(Deployment of MEC Server)

In some embodiments, there may be various options for arrangement or deployment of the MEC server computer 300 in the mobile network 1 and in the LAN 2. In the mobile network 1, the MEC server computer 300 may be deployed in the RAN 10 and/or CN 11 in various manners depending on demand for the MEC service the MEC server computer 300 provides, the standard or specifications on which the mobile network 1 relies, etc. In the LAN 2, the MEC server computer 300 may be deployed in a wired or wireless connection to the router 22 in the LAN 2, depending on demand for the MEC service the MEC server computer 300 provides, etc. FIGS. 4A through 4F illustratively depict respective examples of deployment of the MEC server 300 in the mobile network 1. FIGS. 4G and 4H illustratively depict respective examples of deployment of the MEC server 300 in the LAN 2. These examples are presented for illustrative purposes only without any intention to limit the manner of deployment. The coverage area or service area of the edge-based MEC service the MEC server 300 provides, in which the UE 100 is able to enjoy the MEC service, may depend on the location or site at which the MEC server 300 is deployed. In the specification, the coverage area of the MEC service may be referred to as an "edge site".

Figure 4A:
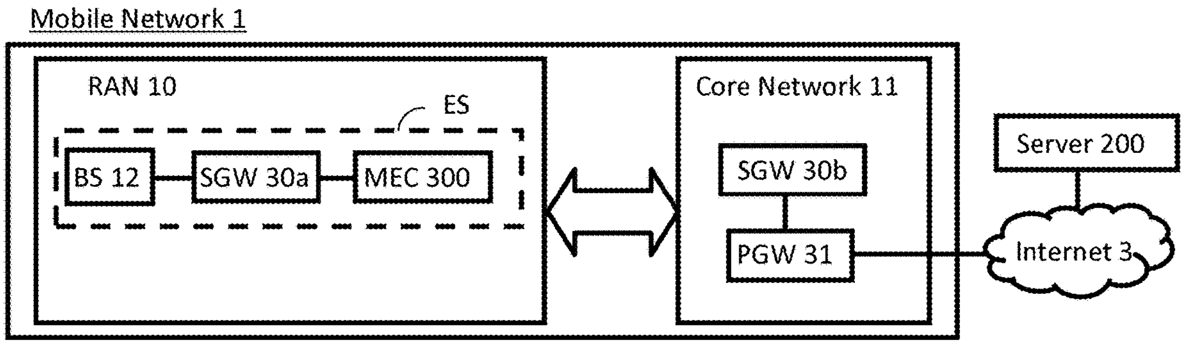
FIG. 4A schematically illustrates an example of deployment of a MEC server in a mobile network under the 4G mobile communication system, according to some embodiments.

FIG. 4A schematically illustrates an example of deployment of the MEC server 300 in the mobile network 1 in the 4G mobile communication system, according to some embodiments. In this example, a local SGW 30*a* may be so collocated as to be in communication with the BS 12 in the RAN 10, apart from a SGW 30*b* arranged in the CN 11. The MEC server 300 may be so collocated in the RAN 10 as to be in communication with the SGW 30*a*, forming an edge site ES associated with the BS 12. The SGW 30*a* and MEC server 300 may be arranged physically adjacent to the BS 12. The BS 12 may communicate with the SGW 30*a* via a S1-U interface defined by 3GPP specifications. The SGW 30*a* in the RAN 10 may communicate with the MEC server 300 via a SGi interface defined by the 3GPP specifications. The SGW 30*a* in the RAN 10 may communicate with the PGW 31 in the CN 11 via S5 and/or S8 interfaces defined by the 3GPP specifications. The SGW 30*a* may communicate with the MME in the CN 11 via a S11 interface defined by the 3GPP specifications. The PGW 31 may act as a gateway to the Internet 3 to provide the UEs 100 with an Internet communication with endpoints (e.g., server 200) over the Internet 3. In the example, the MEC server 300 may be accessible by the UE 100 residing in the edge site ES that corresponds to the coverage area of the BS 12 connected to the SGW 30*a* in communication with the MEC server 300.

Figure 4B:
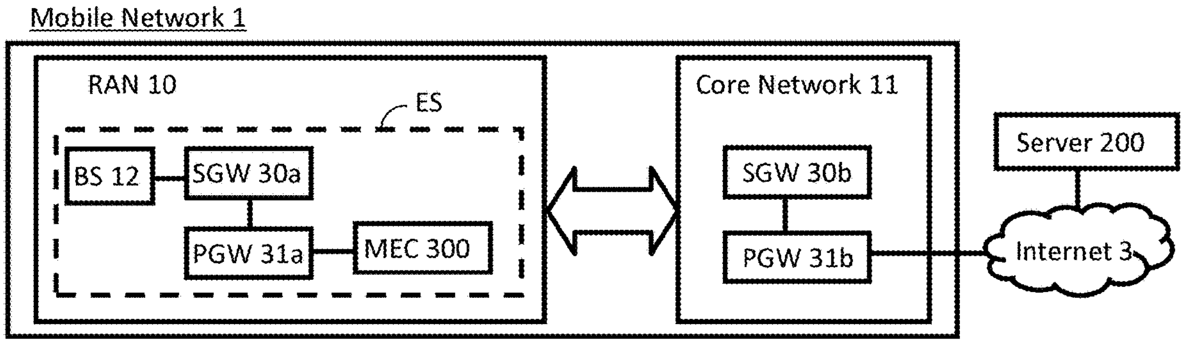
FIG. 4B schematically illustrates another example of deployment of a MEC server in a mobile network under the 4G mobile communication system, according to some embodiments.

FIG. 4B schematically illustrates another example of deployment of the MEC server 300 in the mobile network 1 in the 4G mobile communication system, according to some embodiments. In this example, a local SGW 30*a* and local PGW 31*a* may be so collocated in the RAN 10 as to be in communication with the BS 12, apart from a SGW 30*b* and PGW 31*b* arranged in the CN 11. The MEC server 300 may be so collocated in the RAN 10 as to be in communication with the PGW 31*a*, forming an edge site ES associated with the BS 12. The SGW 30*a*, PGW 31*a*, and MEC server 300 may be arranged physically adjacent to the BS 12. The BS 12 may communicate with the SGW 30*a* via the S1-U interface. The SGW 30*a* and PGW 31*a* may communicate with one another via the S5 and/or S8 interfaces in the RAN 10 just as the SGW 30*b* and PGW 31*b* may so communicate in the CN 11. The PGW 31*a* may communicate with the MEC server 300 via the SGi interface. The SGW 30*a* in the RAN 10 may communicate with the MME in the CN 11 via the S11 interface. The PGW 31*b* in the CN 11 and PGW 31*a* in the RAN 10 may act as a gateway to the Internet 3 to provide the UEs 100 with an Internet communication with endpoints (e.g., server 200) over the Internet 3. In the example, the MEC server 300 may be accessible by the UE 100 residing in the edge site ES that corresponds to the coverage area of the BS 12 connected to the SGW 30*a* in communication with the MEC server 300 via the PGW 31*a*.

Figure 4C:
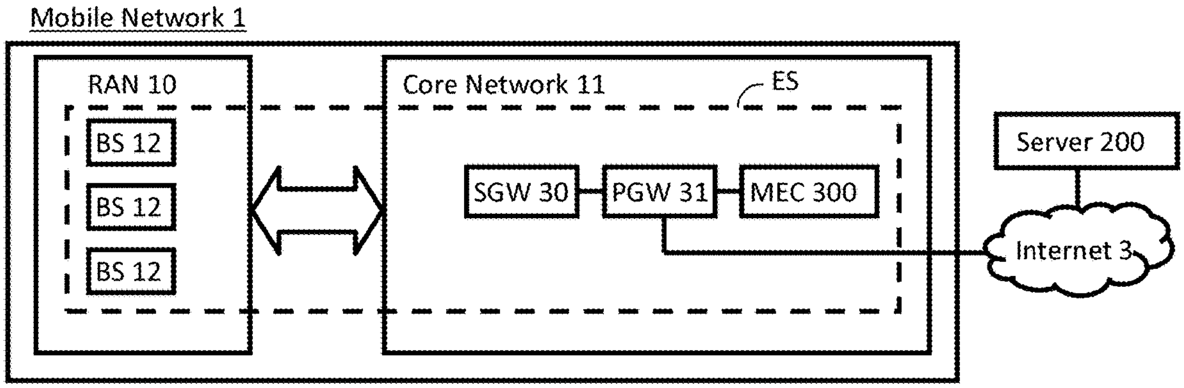
FIG. 4C schematically illustrates another example of deployment of a MEC server in a mobile network under the 4G mobile communication system, according to some embodiments.

FIG. 4C schematically illustrates yet another example of deployment of the MEC server 300 in the mobile network 1 in the 4G mobile communication system, according to some embodiments. In this example, the MEC server 300 may be collocated with a SGW 30 and PGW 31 in the CN 11 to be in communication with the PGW 31, forming an edge site ES. The MEC server 300 may be arranged physically adjacent to the SGW 30 and PGW 31. The SGW 30 and PGW 31 may communicate with one another via the S5 and/or S8 interfaces. The PGW 31 may communicate with the MEC server 300 via the SGi interface. The PGW 31 may act as a gateway to the Internet 3 to provide the UEs 100 with an Internet communication with endpoints (e.g., server 200) over the Internet 3. In the example, the MEC server 300 may be accessible by the UE 100 residing in the edge site ES that corresponds to the coverage area of a group of one or more BSes 12 connected to the CN 11 in which the MEC server 300 is deployed. In other words, in the example, the edge site ES may correspond to the total or sum of the respective coverage areas of the one or more BSes 12 (e.g., three BSes 12 illustrated in FIG. 4C) connected to the SGW 30 in communication with the MEC server 300 via the PGW 31 in the CN 11.

Figure 4D:
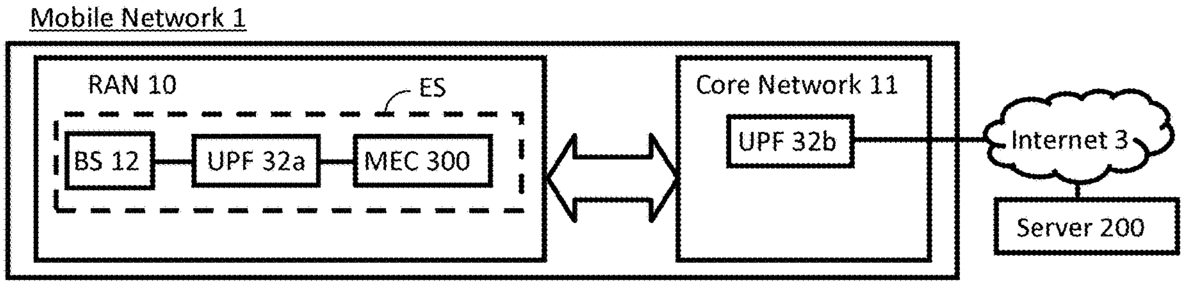
FIG. 4D schematically illustrates an example of deployment of a MEC server in a mobile network under the 5G mobile communication system, according to some embodiments.

FIG. 4D schematically illustrates an example of deployment of the MEC server 300 in the mobile network 1 in the 5G mobile communication system, according to some embodiments. In this example, a local UPF 32*a* may be so collocated in the RAN 10 as to be in communication with the BS 12, apart from a UPF 32*b* arranged in the CN 11. The MEC server 300 may be so collocated in the RAN 10 as to be in communication with the UPF 32*a*, forming an edge site ES associated with the BS 12. The UPF 32*a* and MEC server 300 may be arranged physically adjacent to the BS 12. The BS 12 may communicate with the UPF 32*a* via a N3 interface defined by 3GPP specifications. The UPF 32*a* may communicate with the MEC server 300 via a N6 interface defined by the 3GPP specifications. The UPF 32*a* in the RAN 10 may communicate with the SMF in the CN 11 via a N4 interface defined by the 3GPP specifications just as the UPF 32*b* may so communicate with the SMF within the CN 11. The UPF 32*b* in the CN 11 and UPF 32*a* in the RAN 10 may act as a gateway to the Internet 3 to provide the UEs 100 with an Internet communication with endpoints (e.g., server 200) over the Internet 3. In the example, the MEC server 300 may be accessible by the UE 100 residing in the edge site ES that corresponds to the coverage area of the BS 12 connected to the UPF 32*a* in communication with the MEC server 300.

Figure 4E:
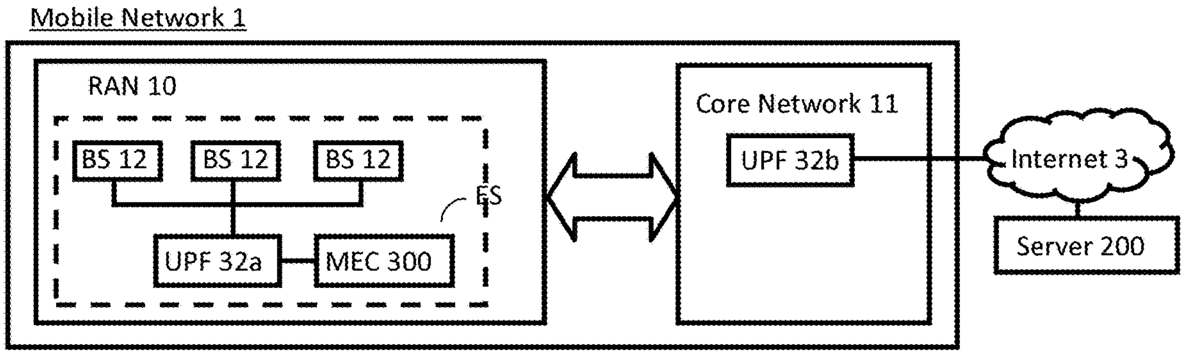
FIG. 4E schematically illustrates another example of deployment of a MEC server in a mobile network under the 5G mobile communication system, according to some embodiments.

FIG. 4E schematically illustrates another example of deployment of the MEC server 300 in the mobile network 1 in the 5G mobile communication system, according to some embodiments. In this example, a local UPF 32*a* may be so collocated in the RAN 10 as to be in communication with a group of BSes 12 (e.g., three BSes 12 illustrated in FIG. 4E), apart from a UPF 32*b* arranged in the CN 11. The MEC server 300 may be so collocated in the RAN 10 as to be in communication with the UPF 32*a*, forming an edge site ES associated with the group of BSes 12. The UPF 32*a* and MEC server 300 may be arranged physically adjacent to the group of BSes 12. The UPF 32*a* and MEC server 300 may be collocated with a network aggregation point between the CN 11 and the group of BSes 12. Each of the BSes 12 may communicate with the UPF 32*a* via the N3 interface. The UPF 32*a* may communicate with the MEC server 300 via the N6 interface. The UPF 32*a* in the RAN 10 may communicate with the SMF in the CN 11 via the N4 interface just as the UPF 32*b* may so communicate with the SMF within the CN 11. The UPF 32*b* in the CN 11 and UPF 32*a* in the RAN 10 may act as a gateway to the Internet 3 to provide the UEs 100 with an Internet communication with endpoints (e.g., server 200) over the Internet 3. In the example, the MEC server 300 may be accessible by the UE 100 residing in the edge site ES that corresponds to the coverage area of the group of the BSes 12, namely, the total or sum of the respective coverage areas of the BSes 12, connected to the UPF 32*a* in communication with the MEC server 300.

Figure 4F:
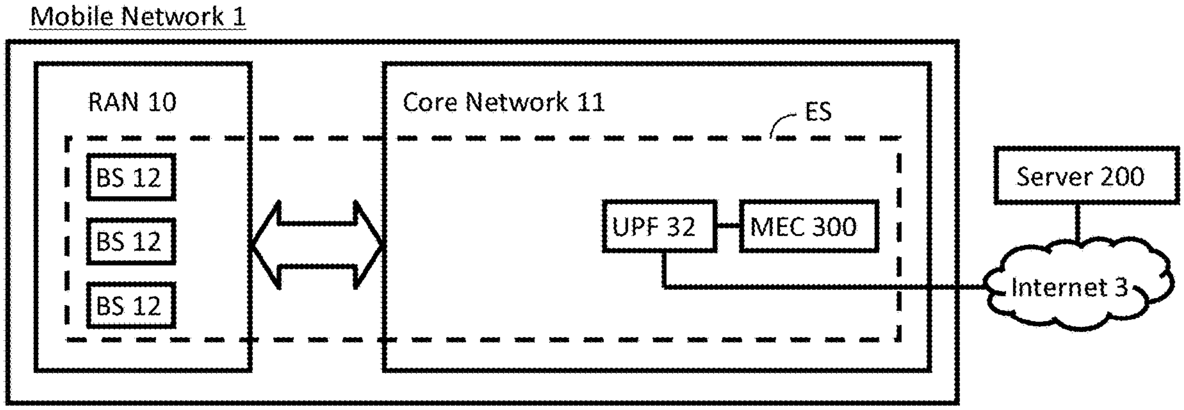
FIG. 4F schematically illustrates another example of deployment of a MEC server in a mobile network under the 5G mobile communication system, according to some embodiments.
Figure 4G:
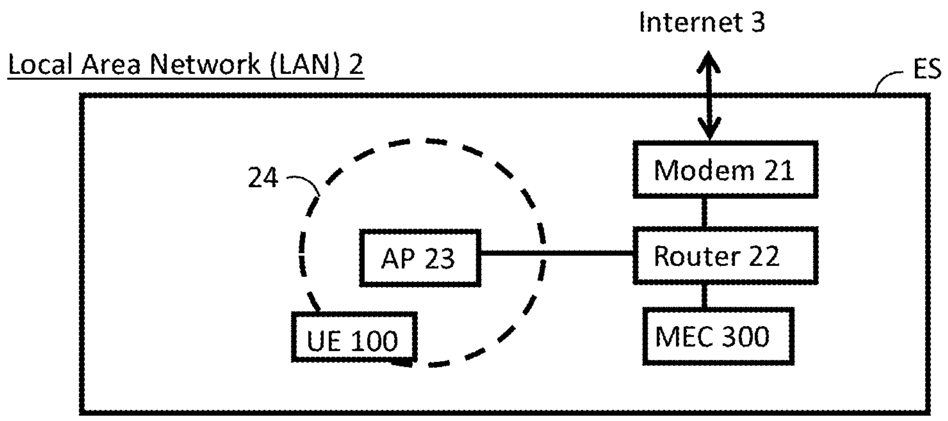
FIG. 4G schematically illustrates an example of deployment of a MEC server in a LAN, according to some embodiments.
Figure 4H:
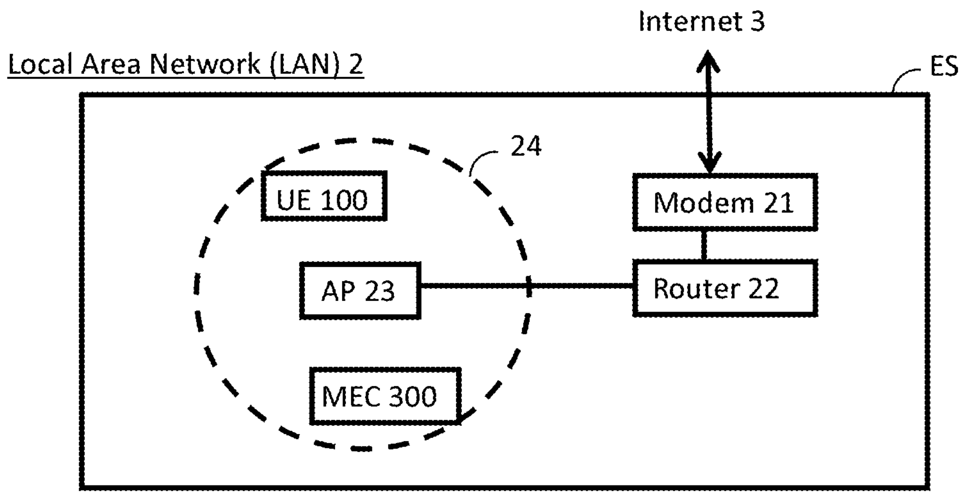
FIG. 4H schematically illustrates another example of deployment of a MEC server in a LAN, according to some embodiments.

FIG. 4F schematically illustrates yet another example of deployment of the MEC server 300 in the mobile network 1 in the 5G mobile communication system, according to some embodiments. In this example, the MEC server 300 may be collocated with a UPF 32 in the CN 11 to be in communication with the UPF 32, forming an edge site ES. The MEC server 300 may be arranged physically adjacent to the UPF 32. The UPF 32 may communicate with the MEC server 300 via the N6 interface. The UPF 32 may act as a gateway to the Internet 3 to provide the UEs 100 with an Internet communication with endpoints (e.g., server 200) over the Internet 3. In the example, the MEC server 300 may be accessible by the UE 100 residing in the edge site ES that corresponds to the coverage area of a group of one or more BSes 12 connected to the CN 11 in which the MEC server 300 is deployed. In other words, in the example, the edge site ES may corresponds to the total or sum of the respective coverage areas of the one or more BSes 12 (e.g., three BSes 12 illustrated in FIG. 4F) connected to the UPF 32*a* in communication with the MEC server 300.

The practical examples of deployment of the MEC server 300 in the mobile network 1 are discussed in, for example, an ETSI White Paper No. 24 entitled "MEC Deployments in 4G and Evolution Towards 5G" (ISBN No. 979-10-92620-18-4) and ETSI White Paper No. 28 entitled "MEC in 5G networks" (ISBN No. 979-10-92620-22-1) both published by the European Telecommunications Standards Institute (ETSI) accessible on the web at https://www.etsi.org/media-library/white-papers/, the contents of which are incorporated herein by reference in their entirety.

FIG. 4G schematically illustrates an example of deployment of the MEC server 300 in the LAN 2, according to some embodiments. In this example, the MEC server 300 may be connected directly to the router 22 in a wired manner via an Ethernet cable, forming an edge site ES that corresponds to the LAN 2. In the example, the MEC server 300 may be accessible by the UE 100 residing in the edge site that corresponds to the coverage area of the LAN 2, wirelessly via the AP 23 having the wireless coverage area 24.

FIG. 4H schematically illustrates another example of deployment of the MEC server 300 in the LAN 2, according to some embodiments. In this example, the MEC server 300 may be connected to the router 22 wirelessly through the AP 23 having the wireless coverage area 24, forming an edge site ES that corresponds to the LAN 2. The MEC server 300 may be a server computer specially deployed in the wireless coverage area 24 for provision of the MEC service, separate from the UE 100. Alternatively, a UE 100 specially selected for the MEC service, among other UEs 100, residing in the wireless coverage area 24 may function as the MEC sever 300. In the example, the MEC server 300 may be accessible by the UE 100 residing in the edge site that corresponds to the coverage area of the LAN 2, wirelessly via the AP 23 having the wireless area 24.

(Database for Management of MEC Server)

In some embodiments, a database may be provided that lists one or more MEC servers 300 deployed in the mobile network 1 and/or in the LAN 2. In the database, each of the one or more MEC servers 300 may be associated with the coverage area (service area) of the MEC server 300 and the identifier (MEC ID) of the MEC server 300 that uniquely identifies the MEC server 300. The database may be used by the UE 100 to discover available one or more MEC servers 300 on a basis of the current location of the UE 100 and the listed coverage areas of the MEC servers 300. The database may be stored on the UE 100 in such a way as to be accessible by an operating system (OS) and/or application program (app) running on the OS so that the OS and/or app may refer to the database. Alternatively or additionally, the database may be stored on the Internet server 200 so that the Internet server 200 can access and refer to the database.

FIG. 5A schematically illustrates an example of the database (MEC database 50) listing one or more MEC servers 300, according to some embodiments. As depicted herein, the database 50*a* may list MEC names 50*a* each of which represents the name of a corresponding MEC server 300. Each MEC name 50*a* may be associated with a MEC ID 50*b* that uniquely identifies a corresponding MEC server 300 represented by the MEC name 50*a*. The MEC ID 50*b* may be used to identify a corresponding MEC server 300 as a destination of data transmission for routing data to the MEC server 300 in the edge site ES. The MEC ID 50*b* may include a local or private Internet Protocol (IP) address allocated to the MEC 300 locally in the edge site ES. Each MEC name 50*a* may be associated with a coverage area (service area) 50*c* of a MEC service provided by a corresponding MEC server 300 represented by the MEC name 50*a*. The coverage area 50*c* may be indicative of one or more cell IDs (e.g., eNB ID in the 4G system or gNB ID in the 5G system) that respectively identify one or more BSes 12 of which coverage area corresponds to the coverage area of the MEC service. In other words, the coverage area 50*c* may be indicative of one or more cell IDs of one or more BSes 12 connected to the edge site ES to which the corresponding MEC server 300 belongs or one or more BSes 12 in the RAN 10 connected to the CN 11 in which the edge site ES is formed. Alternatively or in addition, the coverage area 50*c* may be indicative of a group of coordinates (e.g., geographical coordinates obtained by GNSS, coordinates obtained by IPS, etc.) locating the service area of the MEC service. In other words, the coverage area 50*c* may be indicative of a group of coordinates that locate the coverage are of one or more BSes 12 connected to the edge site ES to which the corresponding MEC server 300 belongs or one or more BSes 12 in the RAN 10 connected to the CN 11 in which the edge site ES is formed. Each coordinate may be represented by the latitude and longitude to identify the location horizontally. The altitude may also be added to each coordinate to identify the location both horizontally and vertically. Alternatively, the coverage area 50*c* may be indicative of the LAN 2 which corresponds to the edge site ES, such as the global IP address that uniquely identifies the router 22 in the LAN 2 and the service set identifier (SSID) that uniquely identifies the AP 23. Each MEC name 50*a* may also be associated with the status 50*d* of a corresponding MEC server 300 represented by the MEC name 50*a*. The status may include "Active" status indicative of that the MEC server 300 is currently in operation and "Inactive" status indicative of that the MEC server 300 is currently not in operation. In the active status, the MEC server 300 is in operation to provide the MEC service. In the inactive status, the MEC server 300 is turned off, under system maintenance, or otherwise not in operation for provision of the MEC service. In the example illustrated in FIG. 5A, the database 50 shows that: the MEC server 300 (MEC 001) identified by aaa.bbb.ccc.ddd has the MEC service coverage area represented by AAA, BBB, and CCC is now active; the MEC server 300 (MEC 002) identified by eee.fff.ggg.hhh has the MEC service coverage area represented by FFF is now inactive; and the MEC server 300 (MEC 003) identified by iii.jjj.kkk.lll has the MEC service coverage area represented by GGG and HHH is now active.

In some embodiments, the database 50 may be updated in response to a predetermined event. In an aspect, the database 50 may be updated in response to deployment and activation of a new MEC server 300. In another aspect, the database 50 may be updated in response to occurrence of update in at least part of the items on the database 50 (e.g., at least one of MEC name 50*a*, MEC ID 50*b*, Coverage area 50*c*, and Status 50*d* on the database 50).

(Generation and Update of Database 50)

In some embodiments, the database 50 may be generated and updated by the Internet server 200. The database 50 may be generated through registration of a MEC server 300 on the Internet server 200 by an operator of the MEC server 300. The database 50 may be updated through update of items (MEC name 50*a*, MEC ID 50*b*, Coverage Area 50*c*, Status 50*d*) in the database 50 by the operator. The Internet server 200 may receive generation and update of a MEC server 300 on the Internet server 200 manually by the operator. Alternatively, the Internet server 200 may receive a "push" notification or otherwise message from the MEC server 300 for the generation and update of the database 50.

FIG. 5B is a flowchart illustrating an example of a process P1*a* for generating and updating the database 50, according to some embodiments. In the embodiments, the database 50 may be stored on the Internet server 200, and generated and updated through a "push" notification from the MEC server 300 to the Internet server 200. According to the process P1*a*, the MEC server 300 may push a notification message as to the MEC server 300 to the Internet server 200 over the Internet 3 (S100*a*). At the step S100*a*, the MEC server 300 may issue the push notification message in response to newly deployment of the MEC server 300, for example, in response to the MEC server 300 being connected to the SGW 30*a*, PGW 31*a*, PGW 31, UPF 32*a*, UPF 32, or router 22 and being allocated the MEC ID. At the step S100*a*, the MEC server 300 may issue the push notification message in response to occurrence of the update on at least part of the items managed on the database 50. In response to reception of the notification message (S100*b*), the Internet server 200 may generate or update the database 50 thereon as indicated by the notification message (S100*c*).

FIG. 5C is a flowchart illustrating an example of a process P1*b* for updating the database 50, according to some embodiments. In the embodiments, the database 50 may be stored on the Internet server 200 and updated through polling from the Internet server 200 to the MEC server 300. According to the process P1*b*, the Internet server 200 may periodically (i.e., in response to every lapse of a predetermined time interval) issue a polling message to the MEC server 300 over the Internet 3 for check of any update in the items managed on the database 50 (S101*a*). In response to the polling message (S101*b*), the MEC server 300 may determine if there is any update in the items on the database 50 (S101*c*). In response to determining that there is no update (S101*c*: No), the MEC server 300 may issue a reply message to that effect to the Internet server 200 over the Internet 3 (S101*d*), in which case the Internet server 200 may not need to do any update job in response to the reply (S101*e*). In response to determining that there is an update (S101*c*: Yes), the MEC server 300 may issue a reply message indicative of the update to the Internet server 200 over the Internet 3 (S101*f*), in which case the Internet server 200 may update the database 50 as indicated by the reply message (S101*g*, S101*h*).

Figure 5D:
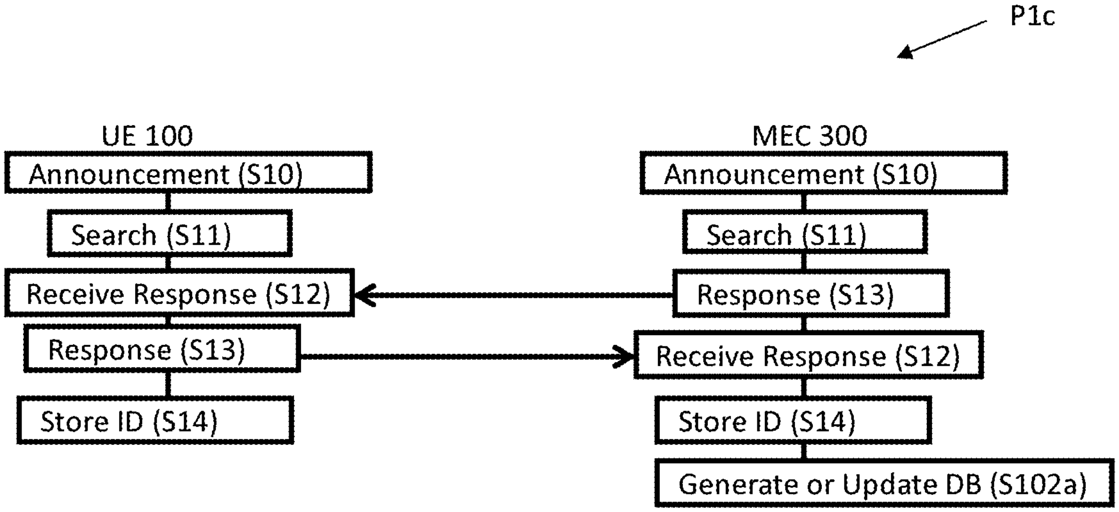
FIG. 5D is a flowchart illustrating an example of a typical discovery process for a user equipment (UE) to discover a MEC server over the LAN, according to some embodiments.

In some embodiments, in the LAN 2, the database 50 may be generated and updated by the UE 100 when the UE 100 discovers the MEC server 300 using a local area discovery process for discovery of devices in the LAN 2. The discovery process may include one which is in accordance with a known device/service discovery protocol such as: a Web Service Dynamic Discovery (WSD) approved by Organization for the Advancement of Structured Information Standards (OASIS); Domain Name System (DNS)-based Service Discovery (DSN-SD) such as multicast DNS (mDNS) published as RFC 6762, Simple Service Discovery Protocol (SSDP) used in Universal Plug And Play (UPnP), Service Discovery Protocol (SDP) used in Bluetooth; and the likes. FIG. 5D is a flowchart illustrating an example of a typical discovery process Plc for the UE 100 to discover the MEC server 300 over the LAN 2. As illustrated herein, typically, the discovery process Plc may include each of the UE 100 and MEC server 300: announcing (i.e., advertising or notifying) the presence of itself using a multicast message (S10); searching for devices of interest using a multicast message (S11); receiving a response message to the search from the other party using a unicast message, to acquire information associated with the other party (S12). The discovery process may also include each of the UE 100 and MEC server 300 sending a response message to the search initiated by the other party, the response message including information associated with itself (S13). The reception of the response message at the step S12 and the respondence at the step S13 allow for exchange of the information among the mutually discovered UE 100 and MEC server 300. The discovery process Plc may finish by the UE 100 and MEC server 300 mutually storing the acquired information on their respective memories (S14). The information exchanged at the steps S12 and S13 may include the UE identifier (UE ID) uniquely identifying the UE 100 on the UE part, and the MEC name 50*a*, MEC ID 50*b*, Coverage Area 50*c*, and Status 50*d* on the MEC part. The UE 100 may acquire the identifier, such as the global IP address of the router 22 and SSID of the AP 23, as the Coverage Area 50*c*. In response to discovering the MEC server 300 according to the discovery process Plc, the UE 100 may generate or update the database 50 on the UE 100 (S102*a*). At the step S102*a*, the UE 100 may update the database 50 in response to update of items in the database 50. Specifically, when the discovery process is performed periodically at predetermined time intervals, the UE 100 may update the database 50 when there is update in the items received currently at the step S12 compared to the items received previously at the step S12 (S102*a*).

(Connection to MEC Server 300)

In some embodiments, the UE 100 may discover and identify the MEC server 300 to connect to the MEC server 300 for enjoyment of the MEC service through check of the database 50.

Figure 6A:
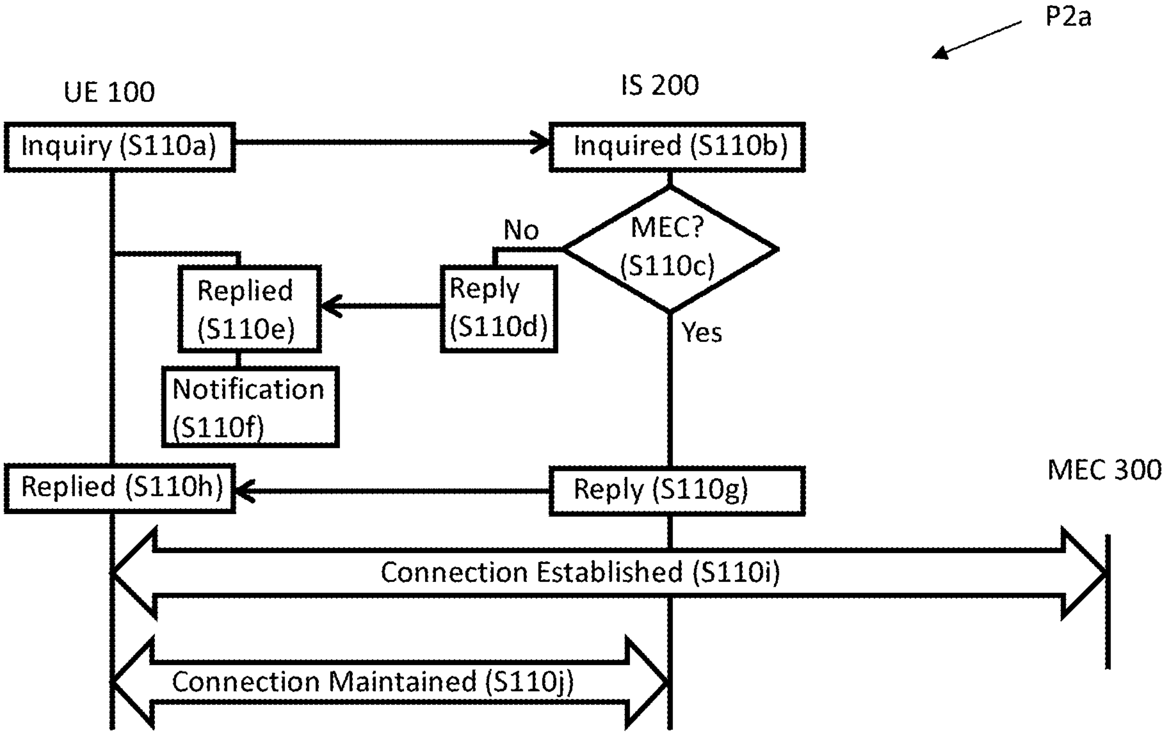
FIG. 6A is a flowchart illustrating an example of a process for discovery of a MEC server with reference to the MEC database stored on an Internet server, according to some embodiments.

FIG. 6A is a flowchart illustrating an example of a process P2*a* for discovery of the MEC server 300 with reference to the database 50 stored on the Internet server 200, according to some embodiments. In the embodiments, the database 50 may be generated and updated according to the process P1*a* or P1*b*. According to the process P2*a*, the UE 100 may issue an inquiry message as to the MEC server 300 to the Internet server 200 over the Internet 3 (S110*a*). In response to the inquiry message (S110*b*), the Internet server 200 may determine if there is at least one MEC server 300 available to the inquiring UE 100 with reference to the database 50 (S110*c*). In response to determining negatively that there is no available MEC server 300 found (S110*c*: No), the Internet server 200 may issue a negative notification message to that effect to the UE 100 over the Internet 3 (S110*d*). In response to the negative notification message (S110*e*), the UE 100 may provide a notification to the user as to the fact that no MEC server 300 is currently available (S110*f*). On the other hand, in response to determining that there is at least one available MEC server 300 found (S110*c*: Yes), the Internet server 200 may issue a positive notification message including information as to at least one discovered MEC server 300 to the UE 100 over the Internet 3 (S110*g*). In response to the positive notification message (S110*h*), the UE 100 may establish a local connection with the MEC server 300 (S110*i*). In parallel to the local connection, the UE 100 may maintain the Internet connection with the Internet server 200 through which the inquiry was issued at the step S110*a* (S110*j*).

Figure 6B:
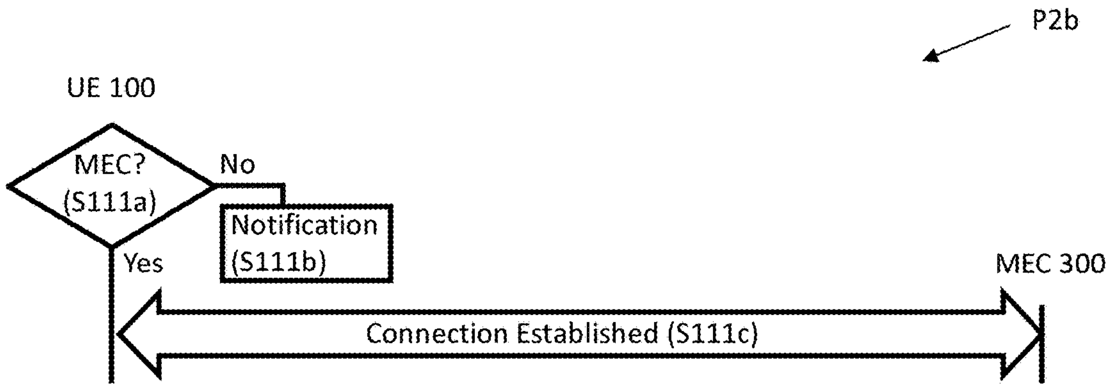
FIG. 6B is a flowchart illustrating an example of a process for discovery of a MEC server with reference to the MEC database stored locally on a UE, according to some embodiments.
Figure 6C:
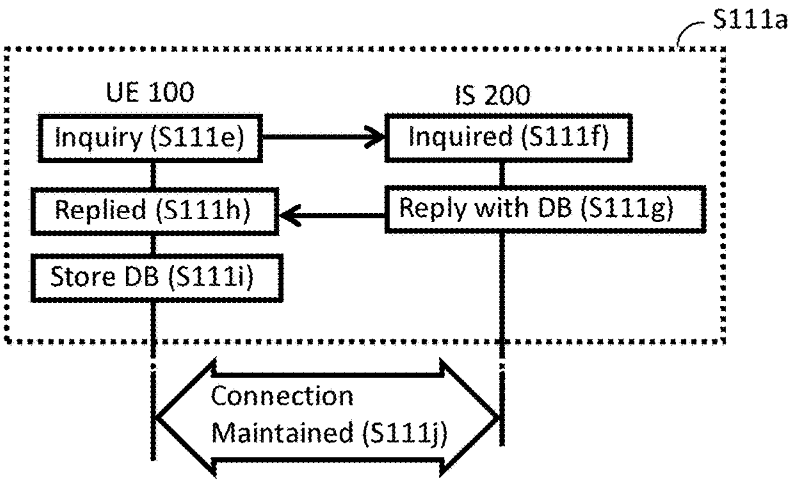
FIG. 6C schematically illustrates an example of a process for fetch and update of the MEC database, according to some embodiments.

FIG. 6B is a flowchart illustrating an example of a process P2*b* for discovery of the MEC server 300 with reference to the database 50 stored locally on the UE 100, according to some embodiments. In the embodiments, the database 50 may be stored locally on the UE 100 so that the UE 100 may check the database 50 locally for discovery of an available MEC server 300. According to the process P2*b*, the UE 100 may determine if there is at least one MEC server 300 available to the UE 100 with reference to the database 50 (S111*a*). When there is no available MEC server 300 found (S111*a*: No), the UE 100 may provide a notification to the user as to the fact that no MEC server 300 is currently available (S111*b*). On the other hand, when an available MEC server 300 is found (S111*a*: Yes), the UE 100 may establish a local connection with the MEC server 300 (S111*c*). The determination at the step S111*a* may include fetching or updating the database 50 on the UE 100, and performing the determination with reference to the database 50. FIG. 6C schematically illustrates an example of a process for the fetch and update of the database 50 at the step S111*a*. At the step S111*a*, the UE 100 may issue an inquiry message as to the database 50 to the Internet server 200 over the Internet 3 (S111*e*). In response to the inquiry (S111*f*), the Internet server 200 may issue a reply message with the database 50 to the UE 100 over the Internet 3 (S111*g*). In response to receipt of the reply message with the database 50 (S111*h*), the UE 100 may store the received database 50 on a memory of the UE 100 (S111*i*). In the aspect, the Internet connection with the Internet server 200 through which the inquiry was issued at the step S111*e*, may be maintained in parallel to the local connection with the MEC server 300 (S111*j*). At the step S111*e*, the inquiry message may include a request for the database 50, in which case the reply message by the Internet server 200 at the step S111*g* may include the entire information on the database 50, so that the UE 100 may store the entire information at the step S111*i*. On the other hand, at the step S111*e*, when the database 50 is already stored on the UE 100, the inquiry message may include an inquiry as to update of the database 50 on the Internet server 200 compared to the database 50 on the UE 100. In this case, the Internet server 200 may issue the reply message with updated information if there is any such update on the database 50 at the step S111*g*, so that the UE 100 may update the locally-stored database 50 using the received updated information at the step S111*i*.

For the inquiry at the steps S110*a* and S111*e*, the OS or app may include the identifier (e.g., IP address) that uniquely identifies the Internet server 200 on the Internet 3 to address the inquiry message to the Internet server 200 over the Internet 3.

At the step S110*a* in the process P2*a*, the inquiry message may include location information indicative of the current position or location of the UE 100, so that the Internet server 200 may perform the determination by comparing the current location of the UE 100 with the coverage areas 50*c* associated with the listed MEC servers 300 (S110*c*). The determination may be affirmative (S110*c*: Yes) when the Internet server 200 has found that the current location of the UE 100 matches any coverage area 50*c* thereby identifying a MEC server 300 associated with the found coverage area 50*c*. At the step S110*c*, the Internet server 200 may perform the determination by comparing the current location of the UE 100 with the coverage areas 50*c* associated with the listed MEC servers 300 of which status 50*d* is "active", ignoring inactive MEC servers 300.

At the step S111*a* in the process P2*b*, the determination may be performed by comparing the current location of the UE 100 with the coverage areas 50*c* associated with the listed MEC servers 300. The determination may be affirmative (S111*a*: Yes) when the UE 100 has found that the current location of the UE 100 matches any coverage area 50*c* thereby identifying a MEC server 300 associated with the found coverage area 50*c*. At the step S111*a*, the UE 100 may perform the determination by comparing the current location of the UE 100 with coverage areas 50*c* associated with the listed MEC servers 300 of which status is "active", ignoring inactive MEC servers 300.

An example of the location information may be the cell ID (e.g., eNB ID in the 4G system or gNB ID in the 5G system) of the BS 12 to which the UE 100 currently belongs, namely, the BS 12 in communication with the UE 100 that has the coverage area in which the UE 100 currently resides. In the aspect, one or more cell IDs identifying one or more BSes 12 of which coverage area corresponds to the coverage area of the MEC service, namely, one or more BSes 12 associated with the edge site ES in which the corresponding MEC server 300 resides, may be listed as the coverage area 50*c* for each MEC server 300 in the database 50. The determination may be affirmative (S110*c*, S111*a*: Yes) when the cell ID associated with the UE 100 matches a cell ID 50*c* and thus a MEC server 300 associated with the cell ID 50*c* is identified.

Another example of the location information may be the identifier of the LAN 2 to which the UE 100 currently belongs, such as the global IP address allocated to the router 22 and the SSID of the AP 23. In the aspect, the identifier identifying a LAN 2 corresponding to the edge site ES in which the corresponding MEC server 300 resides, such as the identifier of the router 22 or AP 23 connected to the corresponding MEC server 300 in the LAN 2, may be listed as the coverage area 50*c* for each MEC server 300 in the database 50. The determination may be affirmative (S110*c*, S111*a*: Yes) when the identifier of the LAN 2 associated with the UE 100 matches a LAN identifier 50*c* and thus a MEC server 300 associated with the LAN identifier 50*c* is identified.

Another example of the location information may be the geographical coordinate that identifies the current position or location of the UE 100. The geographical coordinate may be generated and obtained by a GNSS receiver provided in the UE 100. In the aspect, a set of geographical coordinates locating the service area of the MEC service, namely, a set of geographical coordinates that locate the coverage area of one or more BSes 12 associates with the edge site ES in which the corresponding MEC server 300 resides, may be listed as the coverage area 50*c* for each MEC server 300 in the database 50. The determination may be affirmative (S110*c*, S111*a*: Yes) when a set of geographical coordinates 50*c* contains the geographical coordinate associated with the UE 100 and thus a MEC server 300 associated with the geographical coordinates set 50*c* is identified.

The inquiry at the step S110*a* in the process P2*a* and the determination at the step S111*a* in the process P2*b* may be performed by the OS or app in the UE 100. The OS may be programmed to perform the inquiry or determination (S110*a*, S111*a*) every time in response to launch of the OS, and/or perform the inquiry or determination (S110*a*, S111*a*) periodically while the OS is running on the UE 100. In another example, the app may be programmed to perform the inquiry or determination (S110*a*, S111*a*) every time in response to launch of the app, and/or perform the inquiry or determination (S110*a*, S111*a*) periodically while the app is running on the OS on the UE 100. Alternatively, the OS or app may be programmed to perform the inquiry or determination (S110*a*, S111*a*) in response to connecting to the LAN 2. Yet alternatively, the OS or app may be programmed to perform the inquiry or determination (S110*a*, S111*a*) in response to registration or update of the location information of the UE 100 (e.g., the cell ID, the identifier of the LAN 2, the geographical coordinate, etc. associated with the UE 100 as discussed above), for example, when the UE 100 is turned on, the UE 100 has performed a handover from a BS 12 to another BS 12, the UE 100 has performed a handover from a LAN 2 to another LAN 2, etc.

At the step S110*g* in the process P2*a*, the reply message may include the MEC ID 50*b* associated with the MEC server 300 identified (discovered) at the step S110*c*. At the step S110*i*, the UE 100 may establish the local connection using the MEC ID 50*b* contained in the reply message received at the step S110*h*.

At the step S111*a* in the process P2*b*, the UE 100 may identify the MEC ID 50*b* associated with the discovered MEC server 300, so that the UE 100 may establish the local connection using the identified MEC ID 50*b* at the step S111*j*.

Figure 6D:
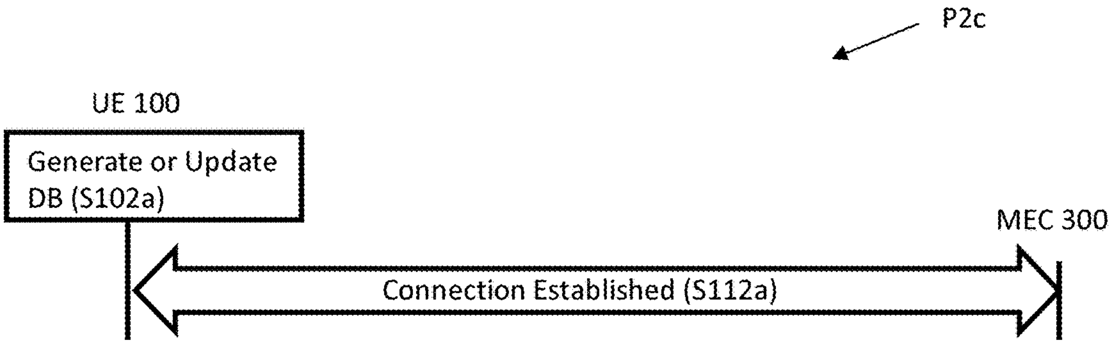
FIG. 6D is a flowchart illustrating another example of a process for discovery of a MEC server with reference to the MEC database stored locally on a UE, according to some embodiments.

FIG. 6D is a flowchart illustrating an example of a process P2*c* for discovery of the MEC server 300 with reference to the database 50 stored locally on the UE 100, according to some embodiments. In the embodiments, in response to discovering a MEC server 300 and generating or updating the database 50 at the step S102*a*, the UE 100 may establish a local connection with the discovered MEC server 300 (S112*a*). At the step S112*a*, the UE 100 may establish the local connection using the MEC ID 50*b* associated with the discovered MEC server 300. In the aspect, the database 50 may include the Internet Server ID (IS ID) 50*e* that uniquely identifies an Internet server 200 associated with the corresponding MEC server 300, for each MEC server 300. FIG. 6E schematically illustrates an example of a database 50 that includes the IS ID 50*e*, according to some embodiments. In the example shown in FIG. 6E, the MEC server 300 (MEC001) identified by the MEC ID (aaa.bbb.ccc.ddd) is associated with the Internet server 200 identified by AAA.BBB.CCC.DDD; the MEC server 300 (MEC002) identified by the MEC ID (eee.fff.ggg.hhh) is associated with the Internet server 200 identified by EEE.FFF.GGG.HHH; and the MEC server 300 (MEC003) identified by the MEC ID (iii.jjj.kkk.lll) is associated with the Internet server 200 identified by III.JJJ.KKK.LLL. The process P2*c* may be modified in order for the UE 100 to refer to the IS ID 50*e* in the database 50 to connect to the Internet server 200. FIG. 6F is a flowchart illustrating an example of a process P2*d* that is modification of the process P2*c*. According to the process P2*d*, in response to discovering a MEC server 300 and generating or updating the database 50, the UE 100 may refer to the IS ID 50*e* associated with the discovered MEC server 300 to identify an Internet server 200 associated with the discovered MEC server 300, and establish an Internet connection with the identified Internet server 200 (S112*b*) in parallel to the local connection with the discovered MEC server 300 (S112*a*). The Internet connection with the Internet server 200 (S112*b*) may be maintained during the local connection with the MEC server 300.

Figure 6H:
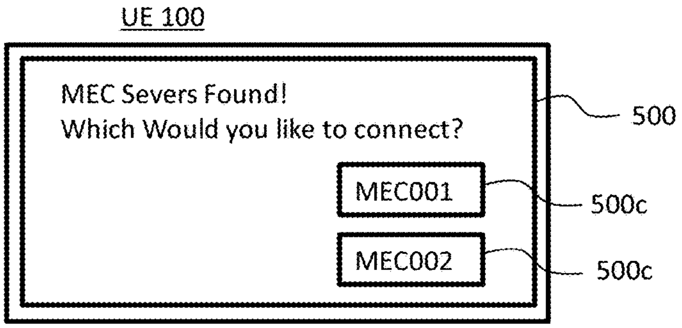
FIG. 6H schematically illustrates another example of a GUI displayed on a UE in the process for discovery of a MEC server, when two or more MEC servers have been discovered, according to some embodiments.

In an aspect, at the steps S110*i*, S111*c*, and S112*a*, the UE 100 may automatically establish the local connection without user intervention. In another aspect, at the steps S110*i*, S111*c*, and S112*a*, the UE 100 may provide a UI through which to receive a user selection to initiate the local connection with the discovered MEC server 300, so that the UE 100 may establish the local connection in response to the user selection through the UI. FIG. 6G schematically illustrates an example of graphical user interface (GUI) 500 displayed on a display of the UE 100 at the steps S110*i*, S111*c*, and S112*a*. The GUI 500 may include a notification message 500*a* for notifying the user of the discovered MEC server 300. The GUI 500 may further include a selectable GUI element 500*b* configured to be selected to connect to the discovered MEC server 300. The UE 100 may establish the local connection with the discovered MEC server 300 in response to a user selection of the GUI element 500*b*. FIG. 6H schematically illustrates another example of the GUI 500 displayed on the UE 100 when two or more MEC servers 300 have been discovered. The GUI 500 may include selectable GUI elements 500*c* each of which represents a discovered MEC server 300, allowing the user to select one of the GUI elements 500*c*. In response to a user selection of a GUI element 500*c*, the UE 100 may establish the local connection with a MEC server 300 associated with the selected GUI element 500*c*.

(MEC Service and Internet Service)

In some embodiments, when a local connection is established between the MEC server 300 and UE 100 (S110*i*, S111*c*, S112*a*), the MEC server 300 may provide a MEC service to the UE 100 over a local connection. On the other hand, the Internet server 200 may provide an Internet service associated with the MEC service to the UE 100 and/or MEC server 300 over an Internet connection.

Generally, aspects of the MEC service may involve distribution, analysis, or otherwise processing of digital data under control of the MEC server 300 over the local connection within the edge site ES. On the other hand, generally, aspects of the Internet service may involve management, control, distribution, analysis, or otherwise processing of digital data under control of the Internet server 200 in connection with the MEC service.

Figure 7A:
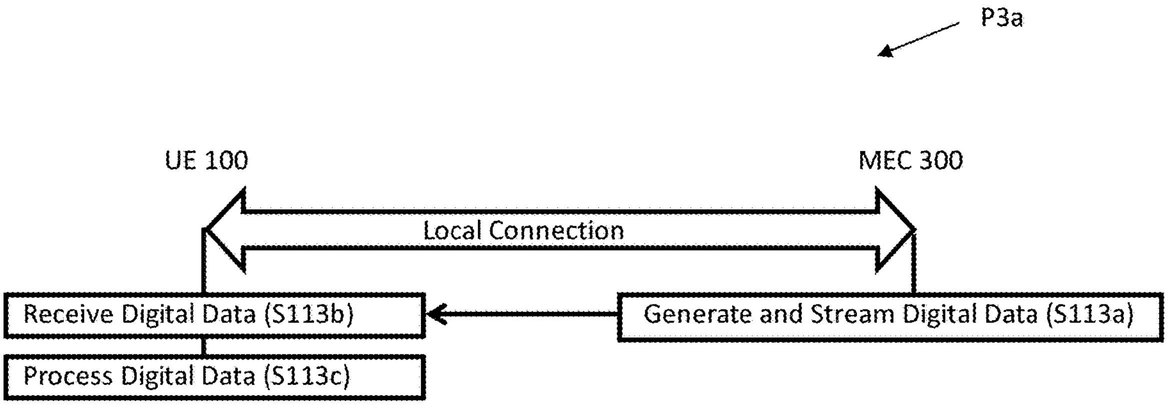
FIG. 7A is a flowchart illustrating an example of a process in a first aspect of a MEC service, according to some embodiments.

FIG. 7A is a flowchart illustrating an example of process P3*a* in an aspect of the MEC service, according to some embodiments. In the aspect, the MEC server 300 may be provided with a storage device on which source data is stored. The process P3*a* may be performed when a local connection is established between the MEC server 300 and UE 100. The MEC server 300 may control generation and transmission of first digital data based on the source data to the UE 100 over the local connection (S113*a*), allowing the UE 100 to receive the first digital data (S113*b*) and process the first digital data (S113*c*). For example, the source data may be a media file, a collection of media data composed in a prescribed format, such as an audio file and video file. The first digital data may be a data stream such as an audio/video stream generated based on the media file. At the step S113*c*, the UE 100 may play back the first data stream. The source file may be provided by an external device other than the MEC server 300, such as the Internet server 200, to be stored on the MEC server 300. At the step S113*a*, the first digital data may be streamed using a protocol for streaming or progressive download, such as Real-time Transport Protocol (RTP), so that the UE 100 may receive and instantly play back the streamed first digital data (S113*b*, S113*c*).

Figure 7B:
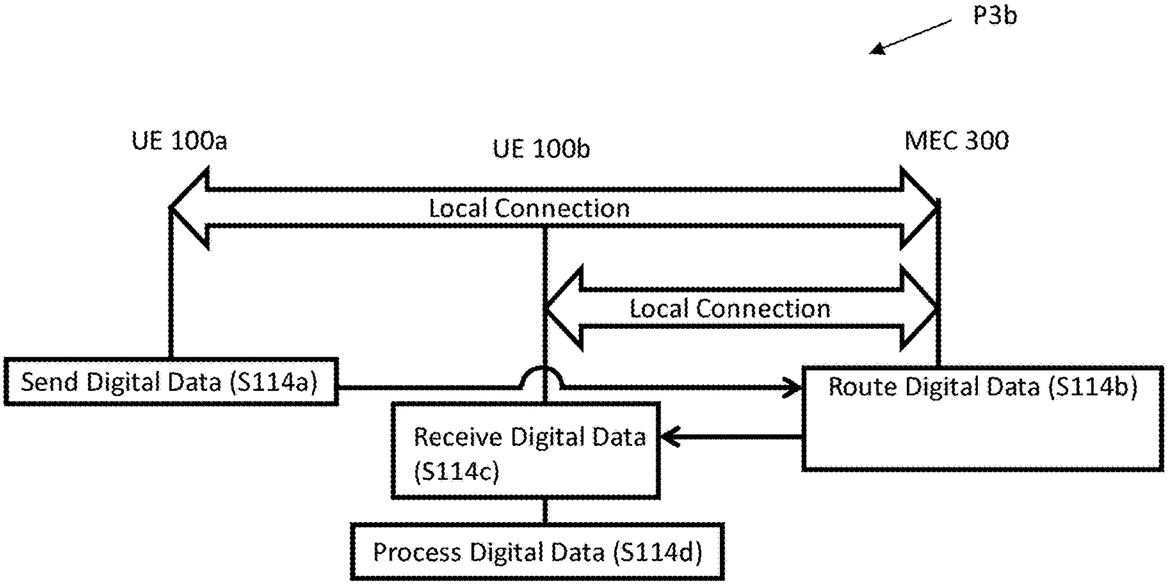
FIG. 7B is a flowchart illustrating an example of a process in a second aspect of a MEC service, according to some embodiments.

FIG. 7B is a flowchart illustrating an example of process P3*b* in an aspect of the MEC service, according to some embodiments. The process P3*b* may be performed when a local connection is established between the MEC server 300 and each of two or more UEs 100. In the aspect, at least one UE 100 in the edge site ES may generate first digital data for communication destined to another UE 100. The UE 100 may communicate the first digital data to the MEC server 300 over the local connection (S114*a*). The MEC server 300 may forward, route, or direct the received first digital data to another UE 100 over the local connection (S114*b*), allowing the receiving UE 100 to process the first digital data (S114*c*, S114*d*). As a result, two or more UEs 100 may communicate the first digital data with one another via the MEC server 300 over the local connections in the edge site ES. The first digital data may be a data stream such as an audio/video stream generated by the UE 100. At the step S114*d*, the UE

100 may play back the first digital data. At the steps S114*a* and S114*b*, the first digital data may be distributed and routed by means of streaming using a protocol for streaming or progressive download, such as RTP, so that the UE 100 may receive and instantly play back the streamed first digital data (S114*c*, S114*d*).

Figure 7C:
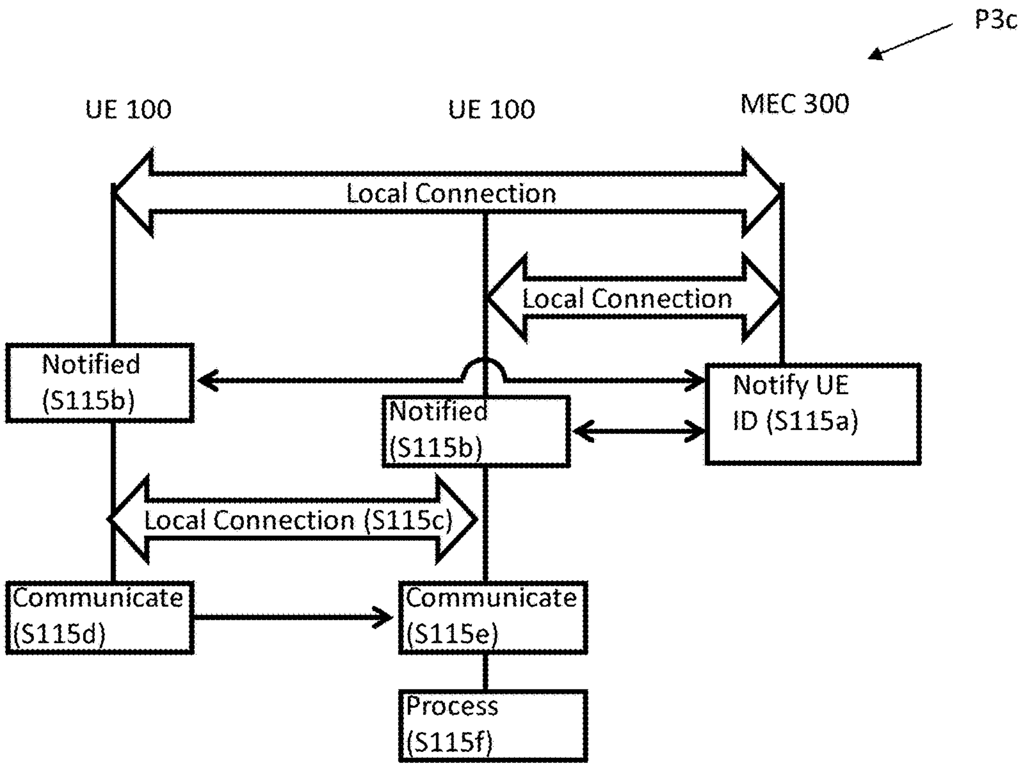
FIG. 7C is a flowchart illustrating an example of an process in a third first aspect of a MEC service, according to some embodiments.

FIG. 7C is a flowchart illustrating an example of process P3*c* in an aspect of the MEC service, according to some embodiments. The process P3*c* may be performed when a local connection is established between the MEC server 300 and each of two or more UEs 100. In the aspect, at least one UE 100 in the edge site ES may generate first digital data for a peer-to-peer (P2P) communication with another UE 100. The MEC server 300 may issue a notification message to each UE 100 as to the UE ID of another UE 100 over the local connection (S115*a*), so that each UE 100 may receive and hold therein the UE ID of another UE 100 (S115*b*). A UE ID is the identifier that identifies a specific UE 100 uniquely on the edge site ES, such as the local or private IP address allocated to the UE 100 in the edge site ES. The UE 100 may establish a local connection with another UE 100 with reference to the UE ID (S115*c*). The UE 100 may then communicate the first digital data to another UE 100 in a P2P manner over the established local connection (S115*d*), allowing the receiving UE 100 to process the first digital data (S115*e*, S115*f*). As a result, two or more UEs 100 may communicate the first digital data with one another in a P2P manner with the help of the MEC server 300 over the local connections in the edge site ES. The first digital data may be a data stream such as an audio/video stream generated by the UE 100. At the step S115*f*, the UE 100 may play back the first digital data. At the step S115*d*, the first digital data may be streamed by the sender UE 100 using a protocol for streaming or progressive download, such as RTP, so that the receiver UE 100 may instantly play back the streamed first digital data (S115*e*, S115*f*).

Figure 7D:
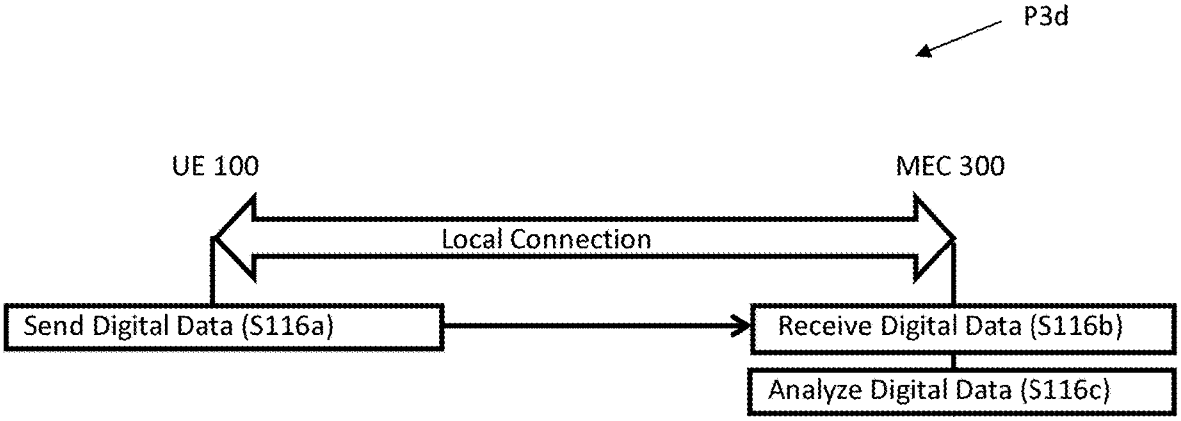
FIG. 7D is a flowchart illustrating an example of a process in a fourth aspect of a MEC service, according to some embodiments.

FIG. 7D is a flowchart illustrating an example of process P3*d* in an aspect of the MEC service, according to some embodiments. The process P3*d* may be performed when a local connection is established between the MEC server 300 and UE 100. In the aspect, at least one UE 100 in the edge site ES may generate first digital data that is a target of analysis by the MEC server 300 for a specific purpose. The first digital data may be a data stream such as an audio/video stream generated by the UE 100. The UE 100 may regularly or irregularly send the first digital data to the MEC server 300 over the local connection (S116*a*). In response to reception of the first digital data (S116*b*), the MEC server 300 may analyze the received first digital data to make a specific determination for the specific purpose (S116*c*). At the step S116*c*, the MEC server 300 may analyze the first digital data using an artificial intelligence (AI). At the step S116*a*, the first digital data may be streamed using a protocol for streaming or progressive download, such as RTP, so that the MEC server 300 may receive and instantly analyze the streamed first digital data (S116*b*, S116*c*).

Figure 8A:
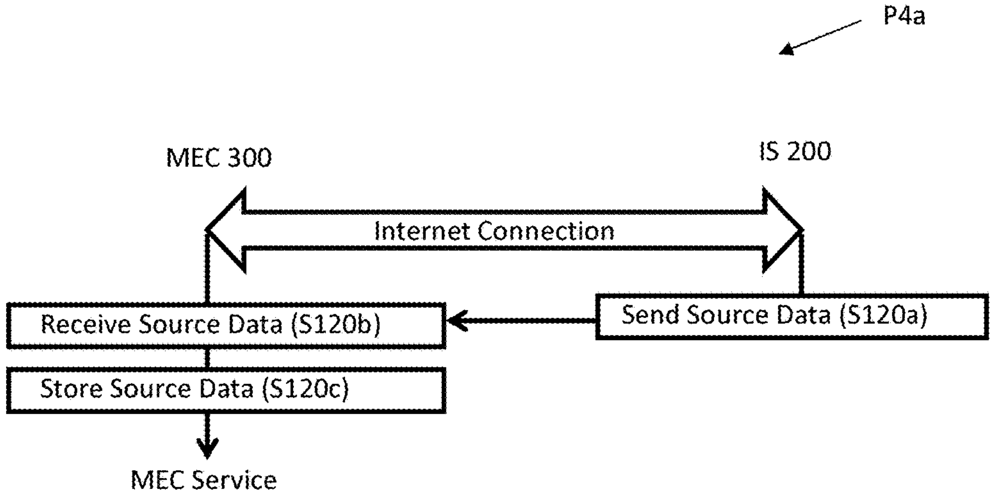
FIG. 8A is a flowchart illustrating an example of a process in a first aspect of an Internet service, according to some embodiments.

An aspect of the Internet service may involve causing the MEC server 300 to store thereon the source data over the Internet, in connection with the process P3*c*. FIG. 8A is a flowchart illustrating an example of process P4*a* in the aspect of the Internet service, according to some embodiments. The Internet server 200 may generate the source data or receive the source data from outside, e.g., from an external computing system connected to the Internet server 200. The Internet server 200 may be provided with storage on which the source data is stored. The process P4*a* may be performed when an Internet connection is established between the Internet server 200 and MEC server 300. The Internet server 200 may regularly or irregularly send the source data to the MEC server 300 over the Internet (S120*a*). The MEC server 300 may receive and store therein the source data (S120*b*, S120*c*), based on which the MEC server 300 may generate the first digital data according to the process P3*a*. The Internet server 200 may have a schedule for transmission of the source data, in which case the Internet server 200 may send the source data according to the schedule at the step S120*a*.

Figure 8B:
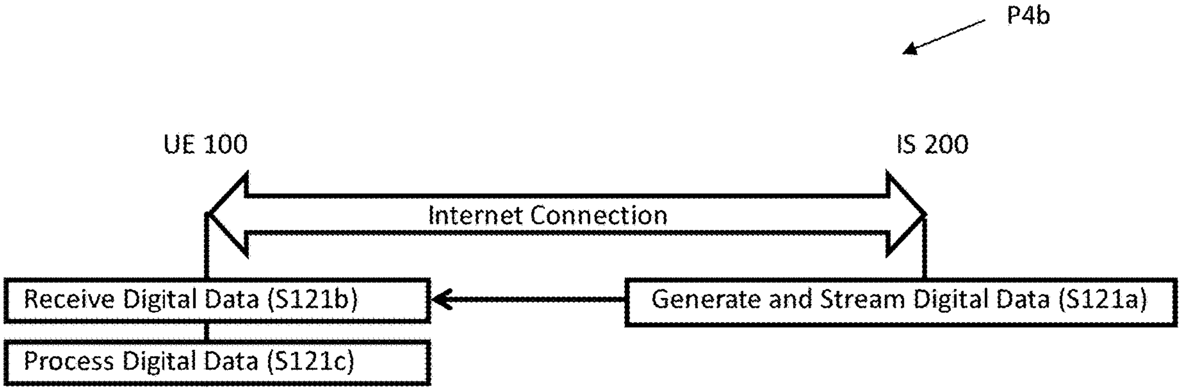
FIG. 8B is a flowchart illustrating an example of a process in a second aspect of an Internet service, according to some embodiments.

An aspect of the Internet service may involve the Internet server 200 storing an alternative source data that is alternative to the original source data resident on the MEC server 300 for distribution of second digital data based on the alternative source data over the Internet, in connection with the process P3*a*. FIG. 8B is a flowchart illustrating an example of process P4*b* in the aspect of the Internet service, according to some embodiments. In the aspect, the Internet server 200 may be provided with storage on which the alternative source data is stored. The process P4*b* may be performed when an Internet connection is established between the Internet server 200 and UE 100. The Internet server 200 may control generation and transmission of second digital data based on the alternative source data to the UE 100 over the Internet connection (S121*a*), allowing the UE 100 to receive the second digital data (S121*b*) and process the second digital data (S121*c*). The alternative source data may be one that is a copy or duplication of the original source data on the MEC server 300 with the same or different (e.g., lower or downgraded) quality. The alternative source data may be a downgraded version of the original source data which has been generated by down-converting the original source data in the quality such as the sampling rate, frame rate, bit depth, and bit rate. The alternative source data may be identified by the same identifier as the original source data; or may be identified by another identifier associated with the original source data's identifier, such as one (e.g., videoAAA-IS. mp4) with slight modification to the identifier of the original source data (e.g., videoAAA-MEC. mp4). When the original source data on the MEC server 300 is a media file (original media file), the alternative source data may be an alternative media file that has the substantially same content as the original media file. The second digital data may be a data stream such as an audio/video stream generated using the alternative media file. At the step S121*c*, the UE 100 may play back the second digital data. At the step S121*a*, the second digital data may be streamed using a protocol for streaming or progressive download, such as RTP, so that the UE 100 may receive and instantly play back the streamed second digital data (S121*b*, S121*c*). The alternative source file may be provided by an external device other than the Internet server 200, such as the MEC server 300, to be stored on the Internet server 200.

Figure 8C:
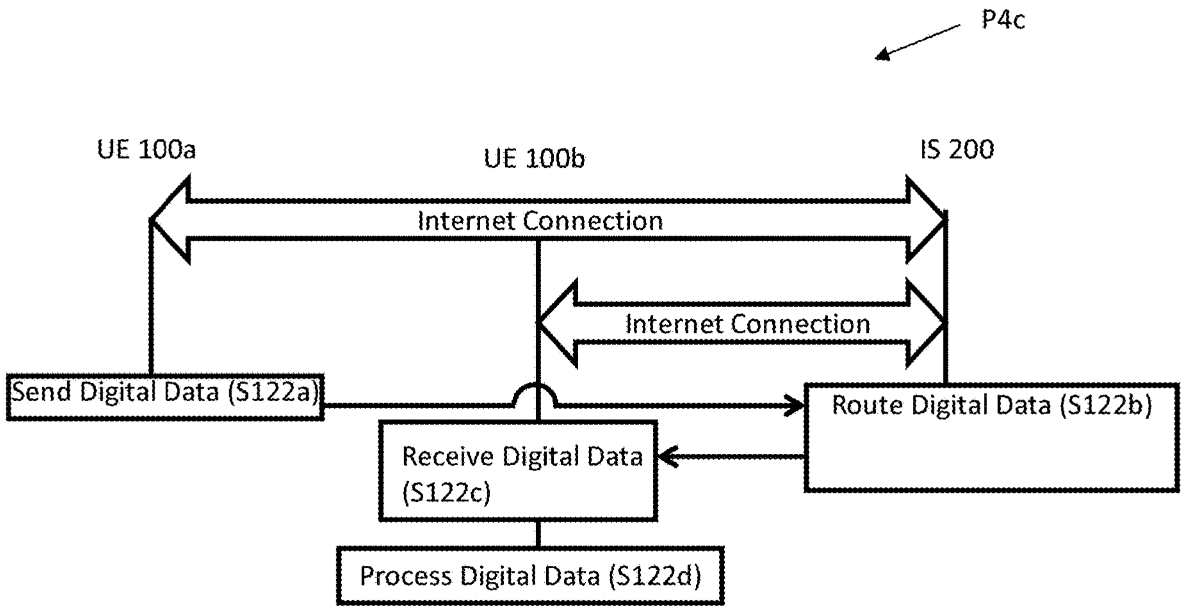
FIG. 8C is a flowchart illustrating an example of a process in a third aspect of an Internet service, according to some embodiments.

An aspect of the Internet service may involve communication of second digital data associated with the first digital data via the Internet server 200 over the Internet, in connection with the process P3*b*. In the aspect, at least one UE 100 may generate second digital data for communication destined to another UE 100. The second digital data may be a data stream such as an audio/video stream generated by the UE 100, just like the first digital data, with the different (e.g., lower or downgraded) quality than the first digital data. FIG. 8C is a flowchart illustrating an example of process P4*c* in the aspect of the Internet service, according to some embodiments. The process P4*c* may be performed when an Internet connection is established between the Internet server 200 and each of two or more UEs 100. The UE 100 may communicate the second digital data to the Internet server 200 over the Internet connection (S122*a*). The Internet server 200 may forward, route, or direct the received second digital data to another UE 100 over the Internet connection (S122*b*), allowing the receiving UE 100 to process the second digital data (S122*c*, S122*d*). As a result, two or more UEs 100 may communicate the second digital data with one another via the Internet server 200 over the Internet connections. At the step S122*d*, the UE 100 may play back the second digital data. At the steps S122*a* and S122*b*, the second digital data may be distributed and routed by means of streaming using a protocol for streaming or progressive download, such as RTP, so that the UE 100 may receive and instantly play back the streamed second digital data (S122).

Figure 8D:
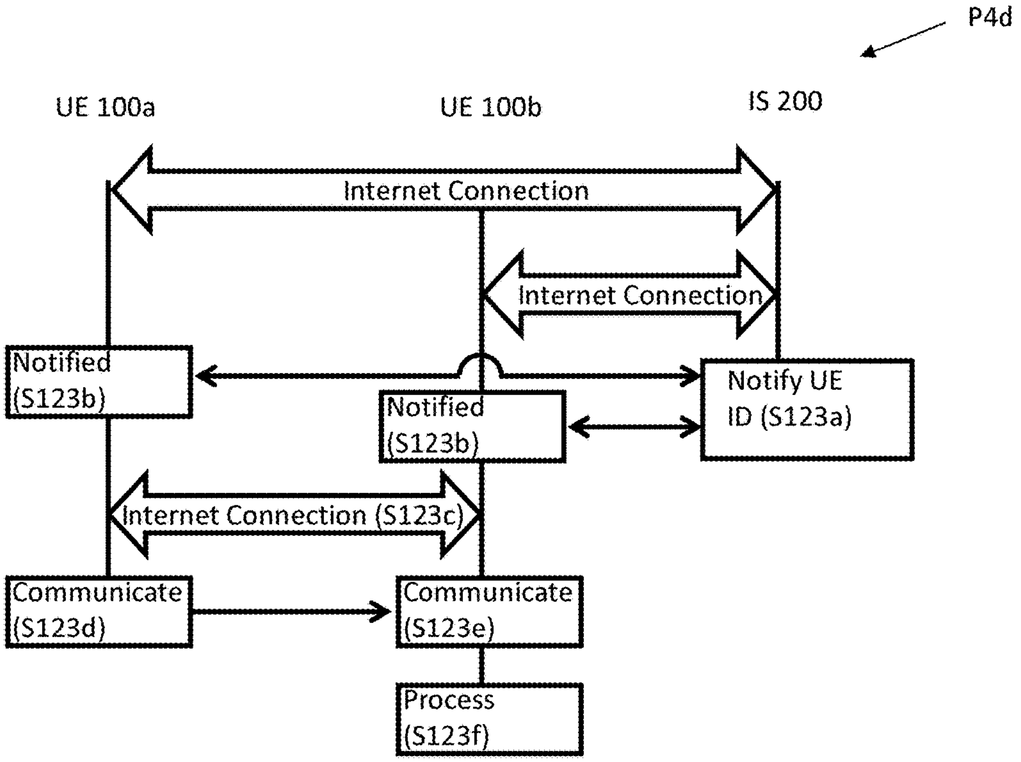
FIG. 8D is a flowchart illustrating an example of a process in a fourth aspect of an Internet service, according to some embodiments.

An aspect of the Internet service may involve communication of second digital data associated with the first digital data in a P2P manner with the help of the Internet server 200 over the Internet, in connection with the process P3*c*. In the aspect, at least one UE 100 may generate second digital data for communication destined to another UE 100. The second digital data may be a data stream such as an audio/video stream generated by the UE 100, just like the first digital data, with the different (e.g., lower or downgraded) quality than the first digital data. FIG. 8D is a flowchart illustrating an example of process P4*d* in the aspect of the Internet service, according to some embodiments. The process P4*d* may be performed when an Internet connection is established between the Internet server 200 and each of two or more UEs 100. The Internet server 200 may issue a notification message to each UE 100 as to the UE ID of another UE 100 over the Internet connection (S123*a*), so that each UE 100 may receive and hold therein the UE ID of another UE 100 (S123*b*). A UE ID is the identifier that identifies a specific UE 100 uniquely on the Internet, such as the global IP address allocated to the UE 100 on the Internet. The UE 100 may establish an Internet connection with another UE 100 with reference to the UE ID (S123*c*). The UE 100 may then communicate the second digital data to another UE 100 in a P2P manner over the established Internet connection (S123*d*), allowing the receiving UE 100 to process the second digital data (S123*e*, S123*f*). As a result, two or more UEs 100 may communicate the second digital data with one another in a P2P manner with the help of the Internet server 200 over the Internet connections. At the step S123*f*, the UE 100 may play back the second digital data. At the step S123*d*, the second digital data may be streamed by the sender UE 100 using a protocol for streaming or progressive download, such as RTP, so that the receiver UE 100 may instantly play back the streamed second digital data (S123*e*, S123*f*).

Figure 8E:
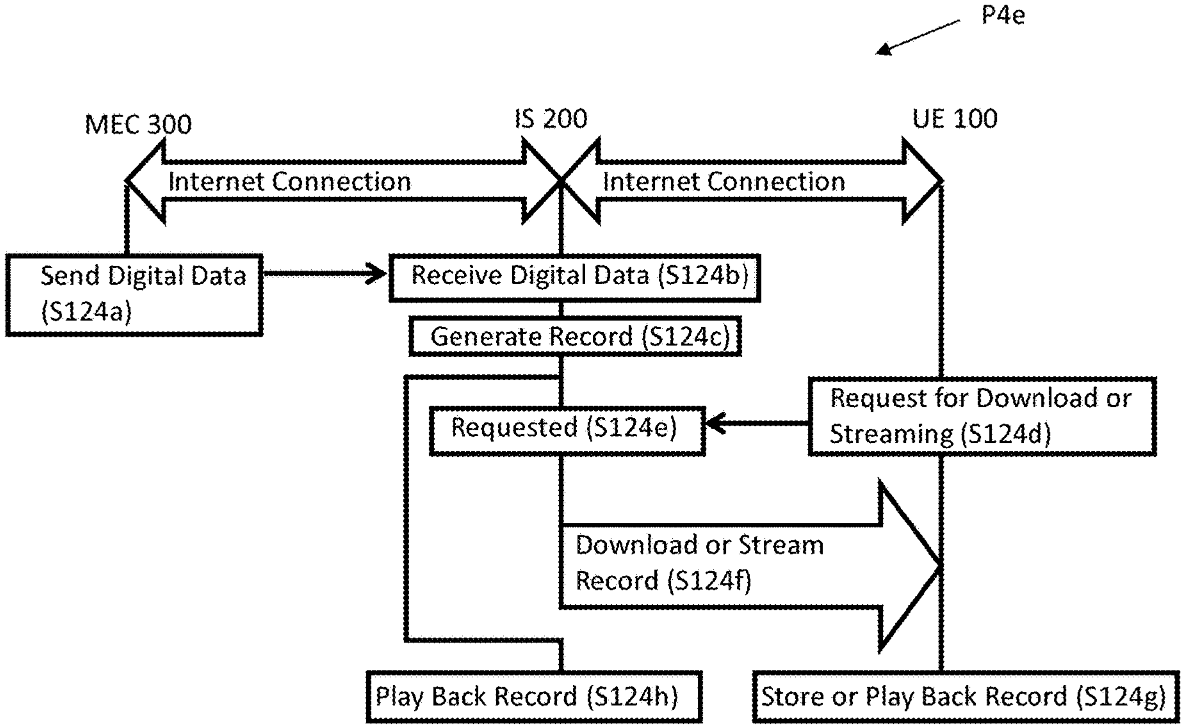
FIG. 8E is a flowchart illustrating an example of a process in a fifth aspect of an Internet service, according to some embodiments.

An aspect of the Internet service may involve the Internet server 200 storing a record of communication of the first digital data that has been performed in the edge site ES, in connection with the process P3*b*. FIG. 8E is a flowchart illustrating an example of process P4*e* in the aspect of the Internet service, according to some embodiments. The process P4*e* may be performed when a first Internet connection is established between the Internet server 200 and MEC server 300 and a second Internet connection is established between the Internet server 200 and UE 100. The MEC server 300 may regularly or irregularly generate and send third digital data associated with the forwarded first digital data, to the Internet server 200 over the Internet connection (S124*a*). The third digital data may be a copy or duplicate of the first digital data with the same or different (e.g., lower or downgraded) quality than the original first digital data. At the step S124*a*, the MEC server 300 may generate the third digital data in parallel to forwarding the first digital data according to the step S114*b*. The MEC server 300 may have a schedule (e.g., predetermined time every day) for generation and transmission of the third digital data, so that the MEC server 300 may generate and send the third digital data according to the schedule. The Internet server 200 may receive the third digital data (S124*b*), and generate and store therein a record of communication of the first digital data using the received third digital data (S124*c*). The record may be a media file generated by encoding a stream of the received third digital data. Once the record is created and stored on the Internet server 200, the Internet server 200 may provide download or streaming of the record to the UE 100 as per request by the UE 100. The UE 100 may issue a request for the record on the Internet server 200 to the Internet server 200 over the Internet connection (S124*d*). In response to the request (S124*e*), the Internet server 200 may provide download or streaming of the record to the UE 100 over the Internet 3 (S124*f*). The UE 100 may store therein the downloaded record for playback later or instantly play back the streamed record (S124*g*). Alternatively or in addition to the provision of download or streaming of the record at the step S124*f*, the Internet server 200 may provide play back f the record (S124*h*).

Figure 8F:
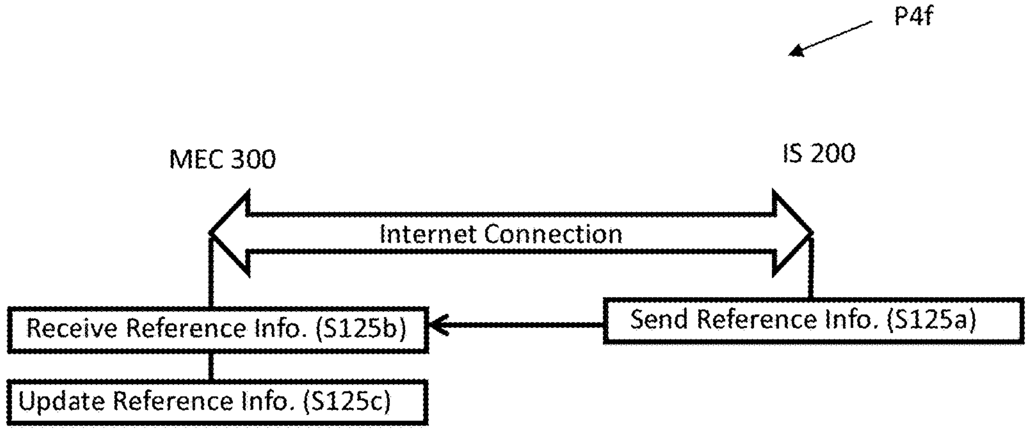
FIG. 8F is a flowchart illustrating an example of a process in a sixth aspect of an Internet service, according to some embodiments.

An aspect of the Internet service may involve provision of reference information based on which the MEC server 300 analyzes the first digital data at the step S116*c*, to the MEC server 300, in connection with the process P3*d*. In the aspect, the MEC server 300 may regularly or irregularly generate and store therein reference information for analysis of the first digital data by the MEC server 300 at the step S116*c*. For example, when the first digital data is a video stream, the analysis by the MEC server 300 may involve image recognition to identify something on video represented by the video stream, in which case the reference information may be one or more reference images with which the MEC server 300 compares the video represented by the video stream for the image recognition. FIG. 8F is a flowchart illustrating an example of process P4*f* in the aspect of the Internet service, according to some embodiments. The process P4*f* may be performed when an Internet connection is established between the Internet server 200 and MEC server 300. The Internet server 200 may regularly or irregularly send the reference information to the MEC server 300 over the Internet connection (S125*a*). In response to reception of the reference information (S125*b*), the MEC server 300 may store therein the reference information (S125*c*) which will be used by the MEC server 300 for the analysis at the step S116*c* in the process P3*d*. When old reference information received and stored previously by the MEC server 300 has been stored in the MEC server 300, the MEC server 300 may update the old reference information with the newly received reference information at the step S125*c*.

Figure 8G:
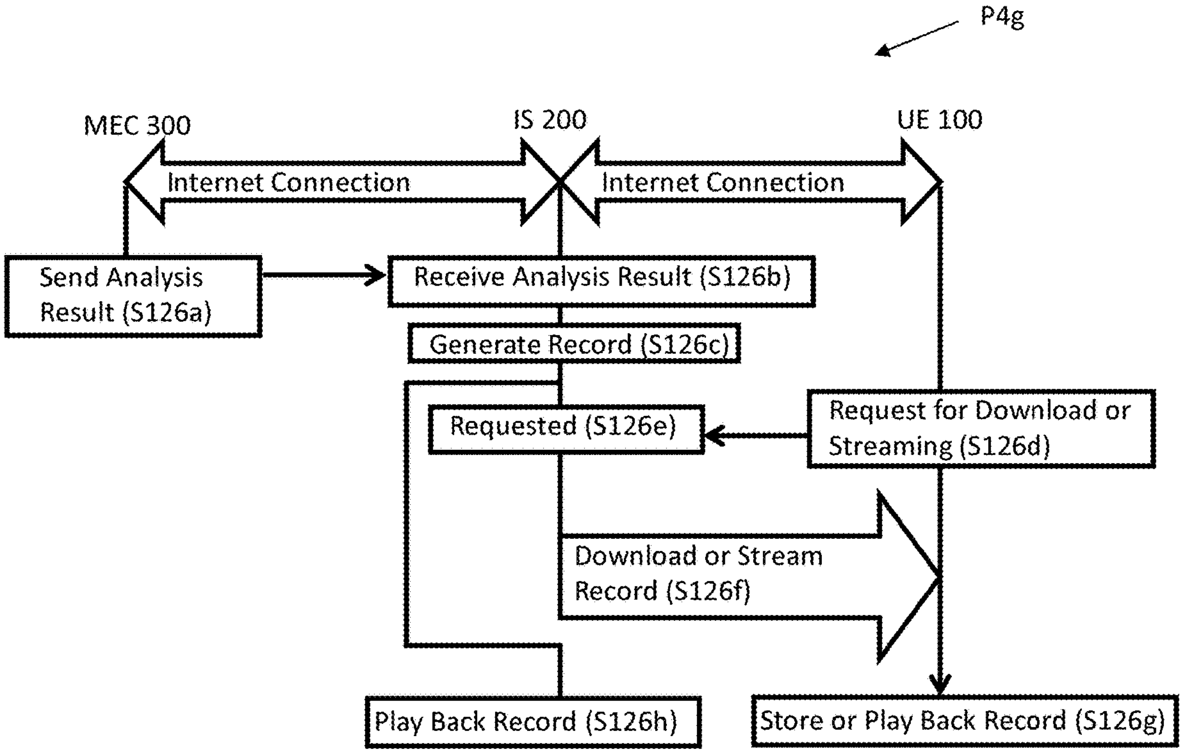
FIG. 8G is a flowchart illustrating an example of a process in a seventh aspect of an Internet service, according to some embodiments.

An aspect of the Internet service may involve the Internet server 200 storing the analysis result of the analysis by the MEC server 300 at the step S116*c*, in connection with the process P3*d*. FIG. 8G is a flowchart illustrating an example of process P4*g* in the aspect of the Internet service, according to some embodiments. The process P4*g* may be performed when a first Internet connection is established between the Internet server 200 and MEC server 300 and a second Internet connection is established between the Internet server 200 and UE 100. The MEC server 300 may regularly or irregularly send the analysis result generated at the step S116*c* to the Internet server 200 over the Internet connection (S126*a*). The MEC server 300 may have a schedule (e.g., predetermined time every day) for transmission of the analysis result, so that the MEC server 300 may send the analysis result according to the schedule. The Internet server 200 may receive the analysis result (S126*b*), and generate and store therein a record of the analysis result using the received analysis result (S126*c*). The record may be a list generated by organizing the analysis result. Once the record is created and stored on the Internet server 200, the Internet server 200 may provide download or streaming of the record to the UE 100 as per request by the UE 100. The UE 100 may issue a request for the record on the Internet server 200 to the Internet server 200 over the Internet connection (S126*d*). In response to the request (S126*e*), the Internet server 200 may provide download or streaming of the record to the UE 100 over the Internet 3 (S126*f*). The UE 100 may store therein the downloaded record for playback later or instantly play back the streamed record (S126*g*). Alternatively or in addition to the provision of download or streaming of the record at the step S126*f*, the Internet server 200 may provide play back f the record (S126*h*).

(Handover Between MEC 300 and IS 200)

In some embodiments, local communication under control of the MEC server 300 over a local connection and communication under control of the Internet server 200 over an Internet connection may be automatically switched between one another in response to a predetermined event. In an aspect, an ongoing local communication under control of the MEC server 300 in the edge site ES may be automatically handed over to a backup communication under control of the Internet server 200 over the Internet when the local communication is no longer available.

Figure 9A:
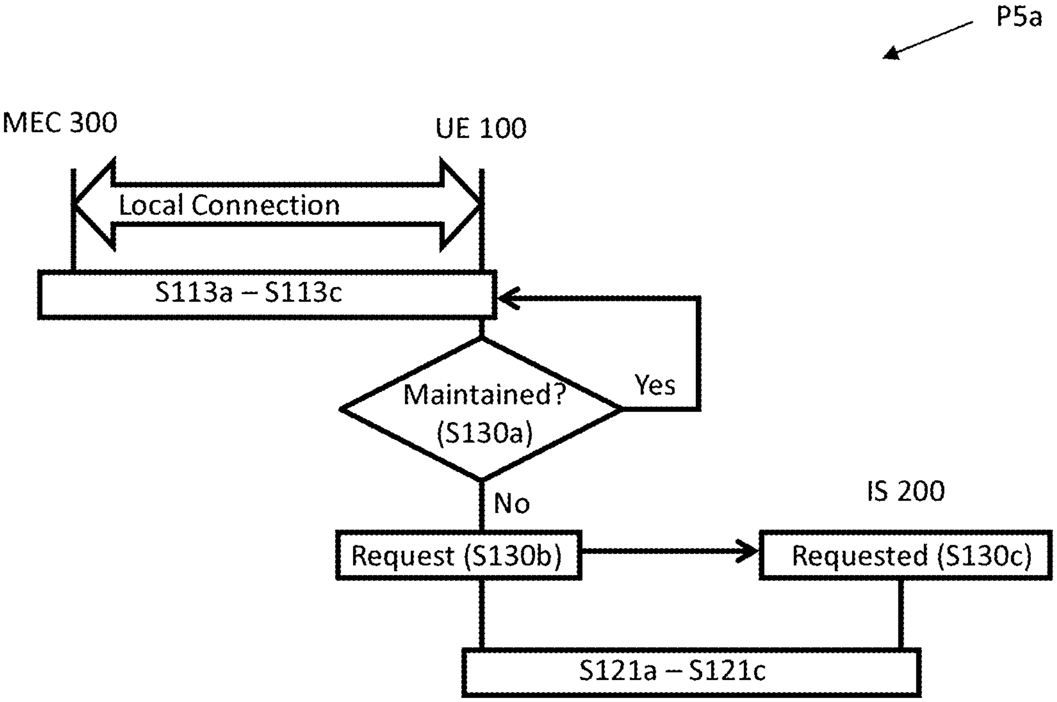
FIG. 9A is a flowchart illustrating an example of a process for handover from an edge-based local communication of first digital data to an Internet communication of second digital data, according to some embodiments.

FIG. 9A is a flowchart illustrating an example of process P5*a* for handover from a local communication of the first digital data in the process P3*a* to an Internet communication of the second digital data in the process P4*b*, according to some embodiments. In the aspect, when there occurs an event which disables or interrupts an ongoing local communication of the first digital data in the edge site ES, the process P5*a* may automatically initiate a backup communication of the second digital data over the Internet alternatively to the local communication. In the process P5*a*, while the UE 100 and MEC server 300 are in a local connection with one another for the communication of the first digital data (S113*a*-S113*c*), the UE 100 may continuously monitor the availability of the first digital data communication over the local connection to determine if the first digital data communication can be maintained (S130*a*). For example, at the step S130*a*, the UE 100 may monitor the local connection to determine if the local connection with the MEC server 300 is maintained. Disconnection from the MEC server 300, decline of connection quality below a predetermined threshold, etc. may invoke negative determination (S130*a*: No). In another example, the UE 100 may compare the current time with a planned schedule for outage or shutdown of the MEC server 300 to determine if the MEC server 300 is going to be unavailable soon. If the current time is near the scheduled time by predetermined difference (e.g., five minutes), the determination may be negative (S130*a*: No). In response to determining that the first digital data communication can no longer be available (S130*a*: No), the UE 100 may issue a request over the Internet 3 to the Internet server 200 associated with the MEC server 300 (e.g., the Internet server 200 to which the inquiry is issued at the step S110*a* or S111*e*, or the Internet server 200 identified by the IS ID 50*e* associated with the MEC server 300 in the process P2*c*) for a handover (S130*b*). At the step S130*b*, the UE 100 may issue the request over the Internet connection maintained at the step S110*j*, S111*j*, or S112*b*. Alternatively, at the step S130*b*, the UE 100 may newly establish an Internet connection with the Internet server 200 to issue the request over the Internet connection. In response to receipt of the request (S130*c*), the Internet server 200 may acknowledge the request, so that the communication of the second digital data may be initiated according to the steps S121*a*-S121*c*. The request at the step S130*b* may include the identifier of the original source data, so that the Internet server 200 may refer to the identifier to search and identify the alternative source data associated with the original source data, based on which the Internet server 200 may generate the second digital data at the step S121*a*. The processing of the first digital data, such as playback of the first digital data which is an audio/video stream, at the step S113*c* may be naturally interrupted or terminated in response to the unavailability of the first digital data communication, for example, when there has occurred disconnection of the local connection (S130*a*: No). If the processing of the first digital data at the step S113*c* is not naturally interrupted or terminated, the UE 100 may voluntarily terminate the processing of the first digital data at the step S113*c* in response to the issuance of the request at the step S130*b*. When the original source data is a media file from which the first digital data is generated as an audio/video stream for playback at the step S113*c* and the alternative source data is also a media file from which the second digital data is generated as an audio/video stream for playback at the step S121*c*, the request at the step S130*b* may include playback position information indicative of the playback position in the playback of the first digital data at or around the time of the issuance of the request at the step S130*b*, so that the Internet server 200 may initiate transmission of the second digital data (audio/video stream) at the playback position indicated by the playback position information. Thanks to this, the playback position in the playback of the first digital data that was in progress before the handover can be synchronized with the playback position in the playback of the second digital data that is initiated after the handover, thereby the playback of the first digital data can be seamlessly handed over to the playback of the second digital data.

Figure 9B:
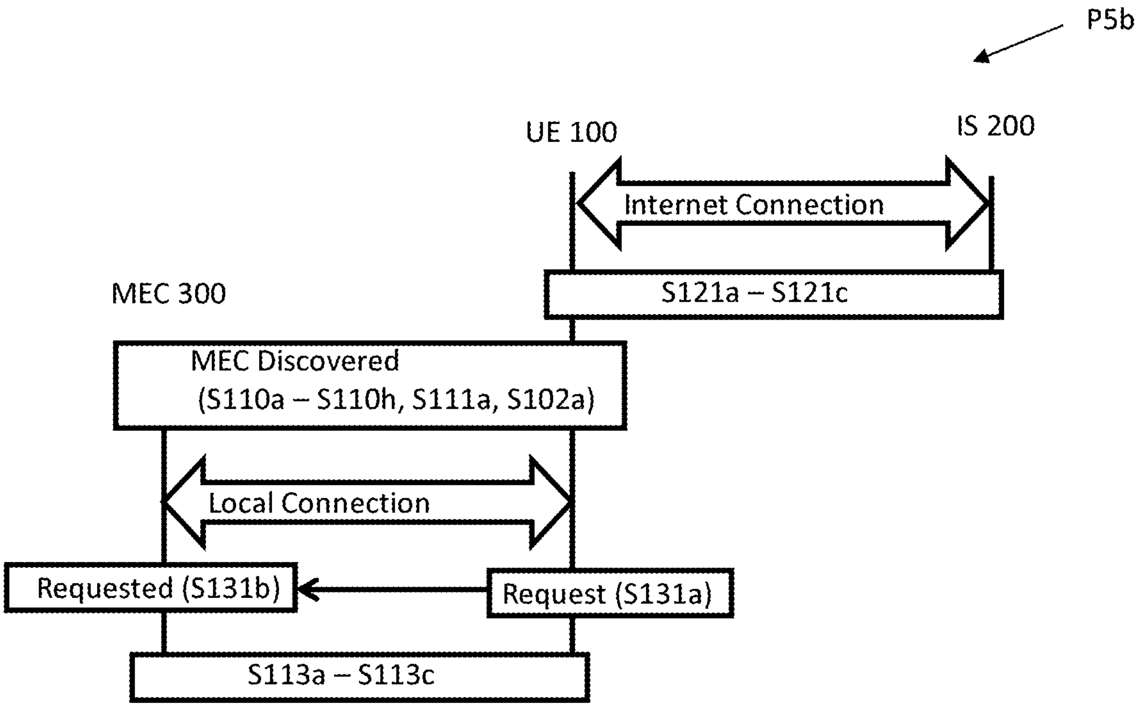
FIG. 9B is a flowchart illustrating an example of a process for handover from an Internet communication of second digital data to an edge-based local communication of first digital data, according to some embodiments.

FIG. 9B is a flowchart illustrating an example of process P5*b* for handover from an Internet communication of the second digital data in the process P4*b* to a local communication of the first digital data in the process P3*a*, according to some embodiments. In the aspect, when there occurs an event which enables or resumes the first digital data communication in the edge site ES, the process P5*b* may automatically initiate the first digital data communication over the local connection alternatively to the Internet communication. In the process P5*b*, while the UE 100 and Internet server 200 are in an Internet connection with one another for the communication of the second digital data (S121*a*-S121*c*), in response to discovering and identifying the MEC server 300 associated with the Internet server 200 (e.g., according to the steps S110*a*-S110*h*, S111*a*, or S102*a*) and establishing the local connection with the MEC server 300 (S110*i*, S111*c*, or S112*a*), the UE 100 may issue a request message to the MEC server 300 over the local connection for a handover (S131*a*). In response to receipt of the request message (S131*b*), the MEC server 300 may acknowledge the request, so that the communication of the first digital data may be initiated according to the steps S113*a*-S113*c*. The request at the step S131*a* may include the identifier of the alternative source data, so that the MEC server 300 may refer to the identifier to search and identify the original source data associated with the alternative source data, based on which the MEC server 300 may generate the first digital data at the step S113*c*. The UE 100 may voluntarily terminate the processing of the second digital data at the step S121*c* in response to the issuance of the request message at the step S131*a*. When the original source data is a media file from which the first digital data is generated as an audio/video stream for playback at the step S113*c* and the alternative source data is also a media file from which the second digital data is generated as an audio/video stream for playback at the step S121*c*, the request message at the step S131*a* may include playback position information indicative of the playback position in the playback of the second digital data at or around the time of the issuance of the request message at the step S131*a*, so that the MEC server 300 may initiate transmission of the first digital data (audio/video stream) at the playback position indicated by the playback position information. Thanks to this, the playback position in the playback of the second digital data that was in progress before the handover can be synchronized with the playback position in the playback of the first digital data that is initiated after the handover, thereby the playback of the first digital data can be seamlessly handed over to the playback of the second digital data.

Figure 9C:
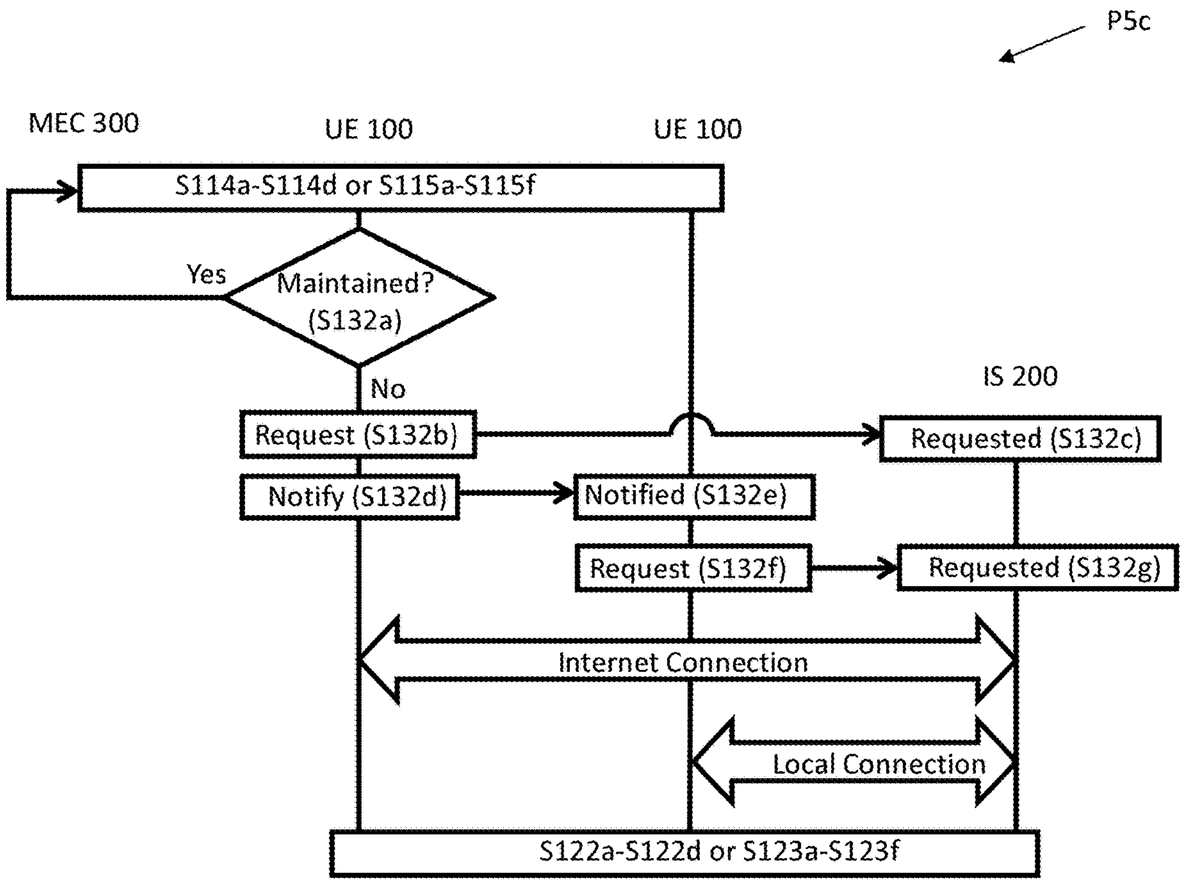
FIG. 9C is a flowchart illustrating an example of a process for handover from an edge-based local communication of first digital data via the MEC server to an Internet communication of second digital data, according to some embodiments.

FIG. 9C is a flowchart illustrating an example of process P5*c* for handover from a local communication of the first digital data via the MEC server 300 in the process P3*b* or in a P2P manner in the process P3*c* to an Internet communication of the second digital data in the process P4*c* or P4*d*, according to some embodiments. In the aspect, when there occurs an event which disables or interrupts an ongoing local communication of the first digital data in the edge site ES, the process P5*c* may automatically initiate a backup communication of the second digital data over the Internet alternatively to the local communication. In the process P5*c*, while the UE 100 and MEC server 300 are in a local connection with one another for the communication of the first digital data (S114*a*-S114*d* or S115*a*-S115*f*), the UE 100 may continuously monitor the availability of the first digital data communication over the local connection to determine if the first digital data communication can be maintained (S132*a*). For example, at the step S132*a*, the UE 100 may monitor the connection quality of the local connection to determine if the quality is good above a predetermined threshold. Decline of the connection quality below the predetermined threshold may invoke negative determination (S132*a*: No). In another example, the UE 100 may compare the current time with a planned schedule for outage or shutdown of the MEC server 300 to determine if the MEC server 300 is going to be unavailable soon. If the current time is near the scheduled time by predetermined difference (e.g., five minutes), the determination may be negative (S132*a*: No). In response to determining that the first digital data communication can no longer be available (S132*a*: No), the UE 100 may issue a request over the Internet 3 to the Internet server 200 associated with the MEC server 300 (e.g., the Internet server 200 to which the inquiry is issued at the step S110*a* or S111*e*, or the Internet server 200 identified by the IS ID 50*e* associated with the MEC server 300 in the process P2*c*) for a handover (S132*b*). At the step S132*b*, the UE 100 may issue the request over the Internet connection maintained at the step S110*j*, S111*j*, or S112*b*. Alternatively, at the step S132*b*, the UE 100 may newly establish an Internet connection with the Internet server 200 to issue the request over the Internet connection. In parallel to the issuance of the request at the step S132*b*, the UE 100 may issue a notification as to a handover to another UE 100 (S132*d*), causing said another UE 100 to respond to the notification (S132*e*) by issuing the request for the handover to the Internet server 200 (S132*f*) just as the UE 100 does at the step S132*b*. At the step S132*d*, the UE 100 may issue the notification to another UE 100 locally via the MEC server 300 over the local connection when the local connection is still alive between the MEC server 300 and the respective UEs 100 in the process P3*b* or P3*c*. At the step S132*d*, the UE 100 may issue the notification to another UE 100 directly in a P2P manner over the local connection when the local connection is still alive at least between the respective UEs 100 in the process P3*c*. At the step S132*d*, the UE 100 may issue the notification to another UE 100 over the Internet 3 when the UE 100 knows the identifier for identification on the Internet 3, such as the global IP address, allocated to said another UE 100, if none of local connections between the UE 100 and MEC and between the UE 100 and said another UE 100 is active. When the requests for the handover from both of the UEs 100 are received by the Internet server 200 (S132*c*, S132*g*), the communication of the second digital data in the process P4*c* or P4*d* may be initiated (S122*a*-S122*d* or S123*a*-S123*f*). Specifically, in the process P4*c*, in response to the requests from the UEs 100 (S132*c*, S132*g*), the Internet server 200 may notify the UEs 100 of successful handover to allow the UEs 100 to initiate generation and transmission of the second digital data, so that the Internet server 200 may initiate the routing of the second digital data over the Internet 3. In the process P4*d*, in response to the requests from the UEs 100 (S132*c*, S132*g*), the Internet server 200 may notify the UEs 100 of successful handover as well as notify each UE 100 of the identifier for identification on the Internet 3, such as the global IP address, allocated to another UE 100, so that the UEs 100 may initiate generation and transmission of the second digital data in a P2P manner over the Internet 3.

Figures 9D, 9E:
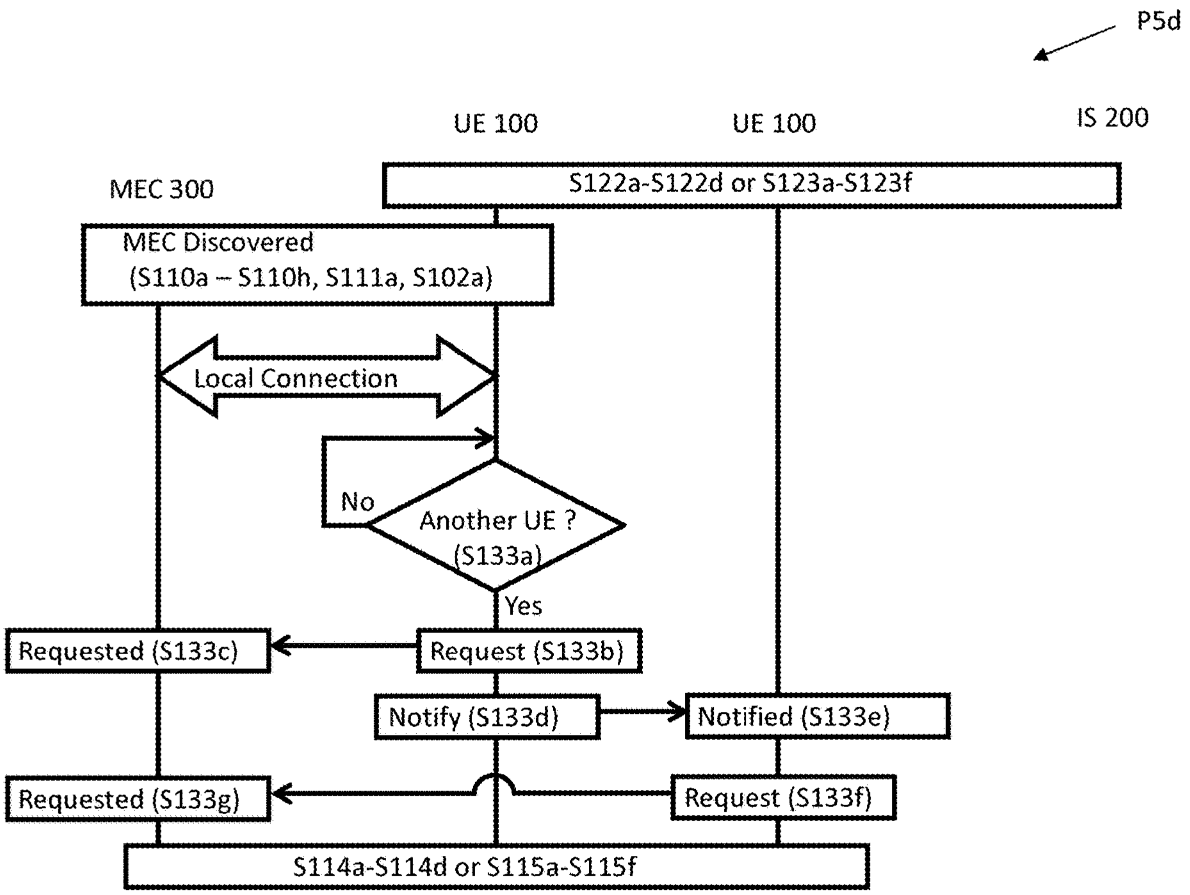
FIG. 9D is a flowchart illustrating an example of a process for handover from an Internet communication of second digital data to an edge-based local communication of first digital data, according to some embodiments.
FIG. 9E schematically illustrates an example of a database listing each discovered MEC server, according to some embodiments.

FIG. 9D is a flowchart illustrating an example of process P5*d* for handover from an Internet communication of the second digital data in the process P4*c* or P4*d* to a local communication of the first digital data in the process P3*b* or P3*c*, according to some embodiments. In the aspect, when there occurs an event which enables or resumes the first digital data communication in the edge site ES, the process P5*d* may automatically initiate the first digital data communication over the local connection alternatively to the Internet communication. In the process P5*d*, while the UE 100 and Internet server 200 are in an Internet connection with one another for the communication of the second digital data (S122*a*-S122*d* or S123*a*-S123*f*), in response to discovering and identifying the MEC server 300 associated with the Internet server 200 (e.g., according to the steps S110*a*-S110*h*, S111*a*, or S102*a*) and establishing the local connection with the MEC server 300 (S110*i*, S111*c*, or S112*a*), the UE 100 may determine if another UE 100, with which the UE 100 is communicating the second digital data in the process P4*c* or P4*d*, has also discovered and identified the same MEC server 300 (S133*a*). In an aspect, for the determination at the step S133*a*, each UE 100 may periodically exchange or share its status as to discovery of the MEC server 300 with another UE 100. In other words, each UE 100 may periodically or regularly issue a discovery status notification to another UE 100 as to the identifier (e.g., MEC ID 50*b*) of the MEC server 300 the UE 100 has discovered and identified, if any, while each UE 100 may also periodically or regularly receive a discovery status notification from said another UE 100 as to the identifier of the MEC server 300 said another UE 100 has discovered and identified, if any. The discovery status notifications may be mutually exchanged between the UEs 100 over the Internet 3. In this case, the UE 100 may store and regularly update therein the notified identifier of the MEC server 300 associated with said another UE 100 upon every receipt of the discovery status notification from said another UE 100, so that the UE 100 may determine if the stored identifier of the MEC server 300 associated with said another UE 100 matches the identifier of the MEC server 300 discovered by the UE 100 at the steps S110*a*-S110*h*, S111*a*, or S102*a* (S133*a*). The determination may be affirmative (S133*a*: Yes) when the identifiers match one another. In another aspect, the status as to discovery of the MEC server 300 may be managed by the Internet server 200, in which case each UE 100 may periodically issue a discovery status notification to the Internet server 200 as to its status of discovery of the MEC server 300 (i.e., the identifier such as MEC ID 50*b* of the MEC server 300 discovered by the UE 100, if any) over the Internet 3. In this case, the Internet server 200 may generate and regularly update therein a database listing the notified identifier of the MEC server 300 associated with each UE 100 upon every receipt of the discovery status notifications from the UEs 100. FIG. 9E schematically illustrates an example of a database 51 listing the notified identifier of the MEC server 300 associated with each UE 100, showing that: the UEs 100 identified by UE001 and UE002 have discovered the same MEC server 300 identified by MEC001 whereas the UE 100 identified by UE003 has not discovered any MEC server 300. The Internet server 200 may forward at least part of the database 51 to each UE 100 over the Internet 3, so that the UE 100 may store therein the forwarded database 51 to determine if the identifier of the MEC server 300 associated with said another UE 100 matches the identifier of the MEC server 300 discovered by the UE 100 at the steps S110*a* to S110*h*, S111*a*, or S102*a* with reference to the database 51 (S133*a*). In yet another aspect, at the step S133*a*, the UE 100 may issue an inquiry as to the status of discovery of the MEC server 300 to another UE 100, causing said another UE 100 to reply with the identifier of the MEC server 300 discovered by said another UE 100, so that the UE 100 may determine if the replied identifier of the MEC server 300 associated with said another UE 100 matches the identifier of the MEC server 300 discovered by the UE 100 at the steps S110*a* to S110*h*, S111*a*, or S102*a*. In response to determining that said another UE 100 has discovered the same MEC server 300 as the UE 100 (S133*a*: Yes), the UE 100 may issue a request to the discovered MEC server 300 for a handover over the local connection (S133*b*). In parallel to the issuance of the request at the step S133*b*, the UE 100 may issue a notification as to a handover to another UE 100 (S133*d*), causing said another UE 100 to respond to the notification (S133*e*) by issuing the request for the handover to the MEC server 300 over the local connection (S133*f*) just as the UE 100 does at the step S133*b*. At the step S133*d*, the UE 100 may issue the notification to another UE 100 via the Internet server 200 over the Internet 3, or directly in a P2P manner when the UE 100 knows the identifier for identification on the Internet 3, such as the global IP address, allocated to said another UE 100. When the requests for the handover from both of the UEs 100 are received by the MEC server 300 (S133*c*, S133*g*), the communication of the first digital data in the process P3*b* or P3*c* may be initiated (S114*a*-S114*d* or S115*a*-S115*f*). Specifically, in the process P3*b*, in response to the requests from the UEs 100 (S133*c*, S133*g*), the MEC server 300 may notify the UEs 100 of successful handover to allow the UEs 100 to initiate generation and transmission of the first digital data, so that the MEC server 300 may initiate the routing of the first digital data over the local connections. In the process P3*c*, in response to the requests from the UEs 100 (S133*c*, S133*g*), the MEC server 300 may notify the UEs 100 of successful handover as well as notify each UE 100 of the identifier for identification in the edge site ES, such as the local or private IP address, allocated to another UE 100, so that the UEs 100 may initiate generation and transmission of the first digital data in a P2P manner over the local connection.

(MEC Service for Group of UEs 100)

In some embodiments, the MEC service may involve formation of a local service group consisting of two or more UEs 100 as a group in which a common MEC service is provided to the UEs 100. The common MEC service may be provided equally to the UEs 100 participating in the local service group. In the local service group, the participating UEs 100 may be in communication with the same MEC server 300 to communicate with one another via the MEC server 300 over the local connections for enjoyment of the MEC service. The MEC server 300 may be in communication with the Internet server 200 which provides the Internet service associated with the MEC service, as discussed above.

Figure 10A:
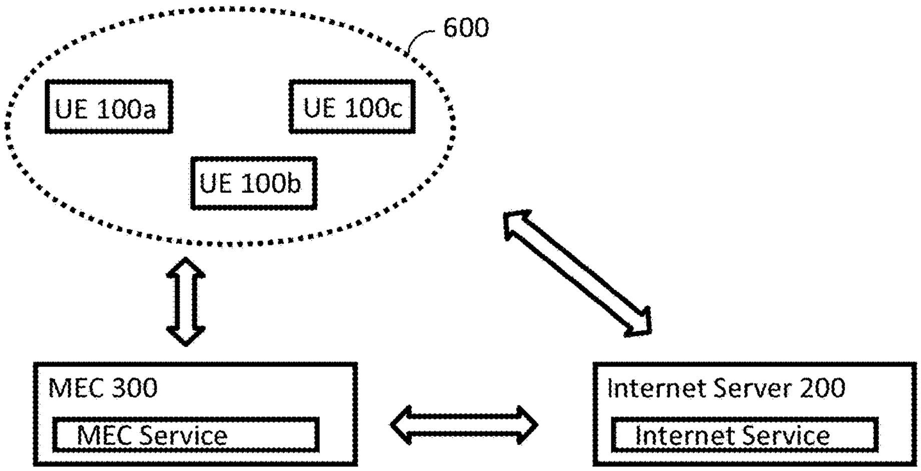
FIG. 10A schematically illustrates an example of a local service group associated with a MEC server for a MEC service, according to some embodiments.

FIG. 10A schematically illustrates an example of a local service group 600 associated with the MEC server 300 for the MEC service, according to some embodiments. The local service group 600 may consist of one or more participating UEs 100 (e.g., UE 100*a*, UE 100*b*, 100*c* in the example depicted in FIG. 10A). In an aspect, the local service group 600 may be formed by a provider of the MEC service (e.g., a business company operating the MEC service) preliminarily for access to the MEC service. In another aspect, the local service group 600 may be formed by users of the participating UEs 100 arbitrarily. For example, the local service group 600 may formed by: one of the UEs 100 (a host UE 100) first participating in the local service group 600 and inviting one or more other UEs 100 (guest UEs 100) to the hosted local service group 600; and then the guest UEs 100 participating in the local service group 600 as invited. At least one of an identification (ID) to identify the local service group 600 and a password required to gain access to the local service group 600 may be assigned to the local service group 600. The password herein is one that consists of a sequence of characters such as words, letters, and numbers, which may be referred to also as a passcode and personal identification number (PIN). The MEC server 300 may manage a plurality of local service groups 600, each of which is identified by a specific ID (local group ID) and/or password distinct from others, in which case the UEs 100 may participate in a specific local service group 600 by logging in to the MEC server 300 using the ID and/or password uniquely assigned to the local service group 600.

Figure 10B:
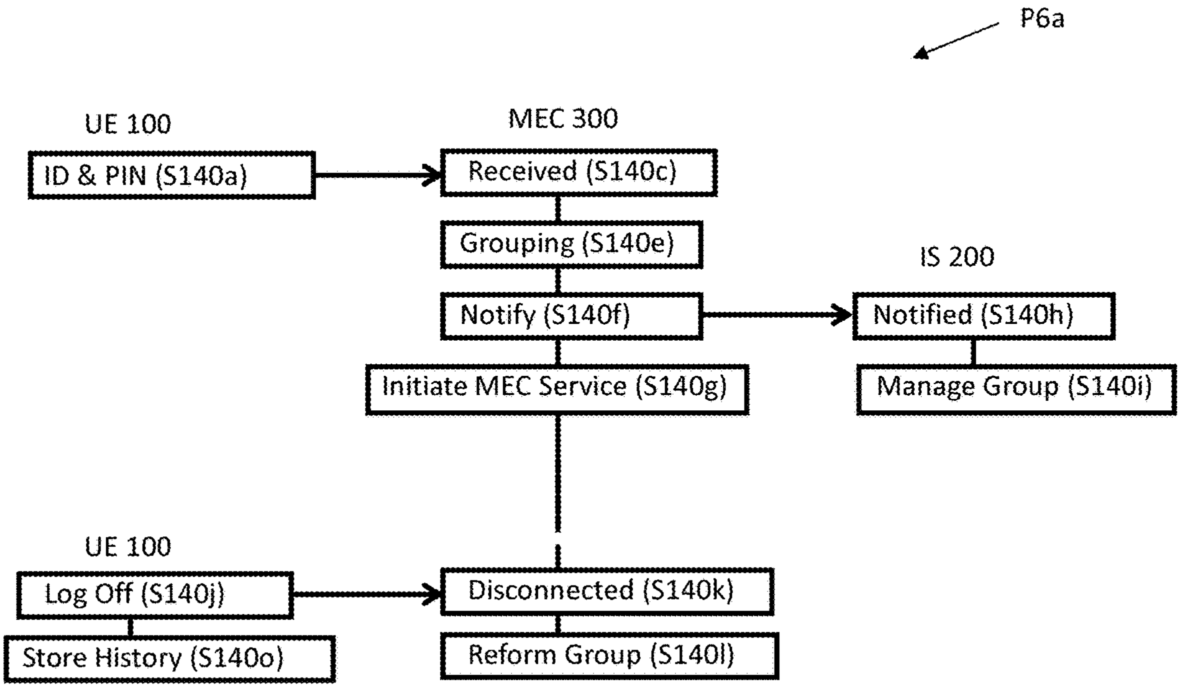
FIG. 10B is a flowchart illustrating an example of a process for forming a local service group, according to some embodiments.

FIG. 10B is a flowchart illustrating an example of a process Poa for forming the local service group 600, according to some embodiments. According to the process P6*a*, one or more UEs 100 which wish to enjoy a MEC service in a local service group 600 may login to the MEC server 300 using a common specific ID and/or password uniquely set for access to the local service group 600 over the local connections (S140*a*). In an aspect, the specific ID and/or password may be preliminarily assigned to the local service group 600 by the MEC server 300. In another aspect, a user of the UE 100 (e.g., host UE 100) may be allowed to set or assign a specific ID and/or password as he/she likes to the local service group 600, and share the ID and/or password with other UEs 100. In response to the login using the ID and/or password (S140*c*), the MEC server 300 may form the local service group 600 (S140*e*). The MEC server 300 may then issue a notification message to the associated Internet server 200 as to the formation of the local service group 600 over the Internet 3 (S140*f*), and initiate the MEC service to the participating UEs 100 (S140*g*). In response to the notification (S140*h*), the Internet server 200 may manage the local service group 600 provided by the MEC server 300 (S140*i*). After the formation of the local service group 600, the UE 100 may be allowed to log off the MEC server 300 to terminate the participation in the local service group 600 (S140*j*). In response to disconnection from a UE 100 as a result of the logoff (S140*k*), the MEC server 300 may reform the local service group 600 (S1401). In response to the logoff from the MEC server 300 to leave the local service group 600 at the step S140*j*, the UE 100 may automatically generate a record of participation in the local service group 600, including the local service group ID and/or password for the local service group 600 (i.e., the local service group ID and/or password inputted for login at the step S140*a*) (S1400). The UE 100 may store therein the participation history for every participation in a local service group 600, in which case the UE 100 may update the participation history with the generated record at the step S1400. The record may include a first date and time at which the UE 100 logged in to the MEC server 300 (S140*a*) and a second date and time at which the UE 100 logged off the MEC server 300 (S140*j*) as well as the local service group ID and/or password.

In an aspect, the MEC server 300 may manage one or more local service groups 600 on a database on the MEC server 300, in which case the MEC server 300 may register or update a local service group 600 on the database in the formation of the local service group 600 at the step S140*e* and reformation of the local service group 600 at the step S1401. FIG. 10C schematically illustrates an example of a database 52 on the MEC server 300 for management of one or more local service groups 600, according to some embodiments. For each local service group 600, the database 52 may list an ID (local service group ID) 52*a* for identifying a corresponding local service group 600, a password 52*b* associated with the ID 52*a*, and one or more participants 52*c* associated with the ID 52*a* that correspond to one or more UEs 100 currently participating in the corresponding local service group 600 identified by the associated ID 52*a*. Each participant 52*c* may be represented by the UE ID of the UE 100, as shown in FIG. 10C. Each UE 100 may send the UE ID of the UE 100 to the MEC server 300 along with at least one of the ID and password at the step S140*a*, so that the UE ID may be registered as a participant 52*c* on the database 52. In the example shown in FIG. 10C, the database 52 lists: a local service group 600 identified by the ID (LSG001) and accessible using the password (xxxyyy) with three UEs 100 (UE 001, UE 003, and UE 020) being registered as participants 52*c*; and a local service group 600 identified by the ID (LSG002) and accessible using the password (aaabbb) with two participants (UE 008, UE 010) being registered as participants 52. The formation of the local service group 600 at the step S140*e* may include adding or entering the UE ID of the UE 100 which has logged in using a given ID and/or password at the step S140*a*, as a participant 52*c* of a local service group 600 associated with said given ID and/or password on the database 52. The reformation of the local service group 600 at the step S1401 may include deleting the UE ID of the UE 100 which has logged off a local service group 600 at the step S140*j*, from a participant 52*c* of the local service group 600 on the database 52. The reformation of the local service group 600 at the step S1401 may include deleting or dismissing a local service group 600 itself from the database 52 in response to there being no participant 52*c* of the local service group 600 as a result of logoff from the MEC server 300 at the step S140*j*. Using the database 52, the MEC server 300 may form and manage two or more local service groups 600 concurrently, and thus can provide multiple MEC services individually to the respective participating UEs 100 in the local service groups 600 (e.g., a first MEC service to the UEs 001, 003, 020 in LSG001 group, and a second MEC service to the UEs 008, 010 in LSG002 group).

At the step S140*a*, each UE 100 may activate or provide a UI through which to receive a user input to log in to the MEC server 300. The user may be prompted to input an ID and/or password using an input device of the UE 100 through the UI, and the inputted ID and/or password may be sent to the MEC server 300 over the local connection. The UI may be generated by an app installed on the UE 100. The app may be a web browser, in which case the UE 100 may fetch a hypertext message describing the UI from the MEC server 300 and render the hypertext message to provide the UI (S140*a*). FIG. 10D schematically illustrates an example of a GUI 501 displayed on a display of the UE 100 for login at the step S140*a*. The GUI 501 may include an ID input field 501*a* in which to receive a user input of an ID using an input device of the UE 100, and a password input field 501*b* in which to receive a user input of a password using the input device of the UE 100. The GUI 501 may also include a selectable GUI element 501*c* that, when selected by the user using the input device of the UE 100, invokes transmission of the ID and/or password inputted in the ID input field 501*a* and/or password input field 501*b* for login to the MEC server 300.

At the step S140*a*, each UE 100 may send the ID and/or password for the local service group 600 through capture of a barcode on which the ID and/or password is encoded, using a camera of the UE 100. The barcode may be machine-readable representation of data (such as the ID and password) in which the data is encoded as, for example, an arrangement of bars and spaces between the bars. Examples of the barcode may include a linear barcode, matrix (2D) barcode such as a QR Code, etc. At the step S140*a*, the UE 100 may activate the camera and capture the barcode by the camera, decode the coded ID and/or password, and then send the obtained ID and/or password to the MEC server 300. The identification of the MEC server 300 on the Internet 3, such as the IP address allocated to the MEC server 300, may also be encoded in the barcode, in which case the UE 100 may decode the identification to send the ID and/or password to the MEC server 300 by addressing the ID and/or password to the obtained identification. The barcode may be generated and issued by the MEC server 300, and may be then displayed on a display coupled to the MEC server 300, printed out on paper by a printer coupled to the MEC server 300, an/or otherwise outputted for presentation to the user. FIG. 10E schematically illustrates another example of a GUI 501 displayed on a display of the UE 100 for login at the step S140*a*, for login through the barcode. The GUI 501 may include a preview window 501*d* that displays an image being currently captured by a camera of the UE 100 for preview, allowing the user to ensure that the image of the barcode is being properly focused by the camera. The GUI 501 may also include a selectable GUI element 501*e* that, when selected by the user using the input device of the UE 100, causes the UE 100 to shoot the barcode image by the camera and decode the barcode to obtain the encoded ID and/or password, and then to send the decoded ID and/or password for login to the MEC server 300.

Figure 10F:
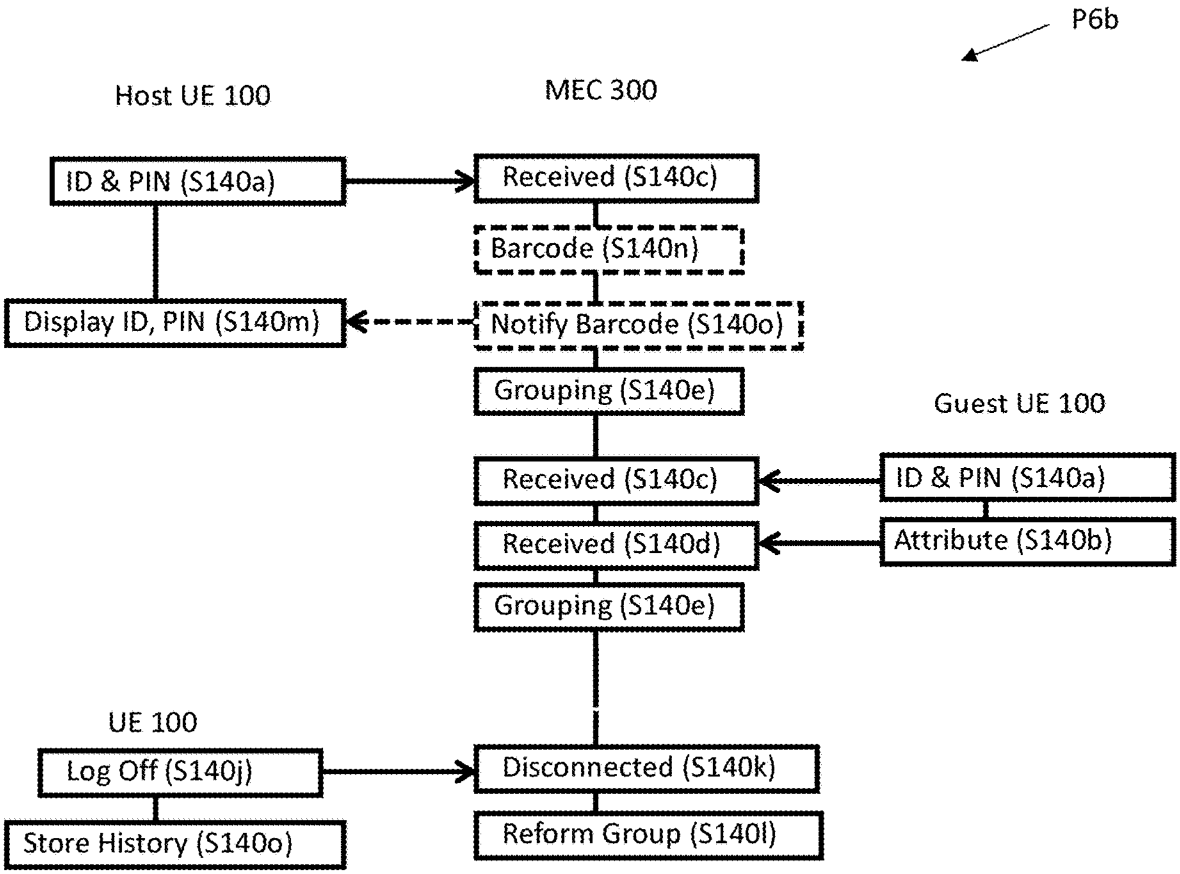
FIG. 10F is a flowchart illustrating an example of a process for formation of a local service group by a host UE and guest UEs, according to some embodiments.
Figure 10G:
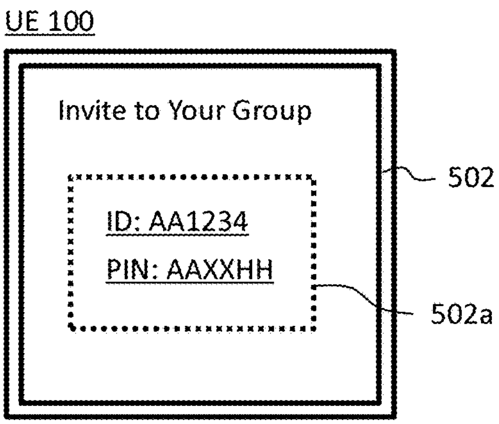
FIG. 10G schematically illustrates an example of a GUI displayed on a host UE to notify an ID and password required for access to a hosted local service group, according to some embodiments.
Figure 10H:
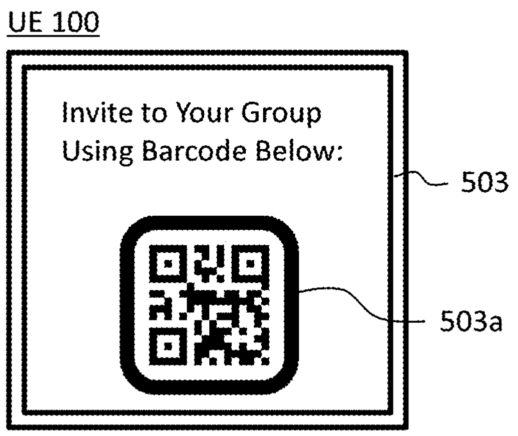
FIG. 10H schematically illustrates an example of a GUI displayed on a host UE to notify an ID and password required for access to hosted local service group through a barcode, according to some embodiments.

In an aspect, the participation of the one or more UEs 100 may be performed by: one of the UEs 100 (a host UE 100) first participating in the local service group 600 and inviting other UEs 100 (guest UEs 100); and then the guest UEs 100 subsequently participating the local service group 600. In the aspect, the UE 100 which has logged in to the MEC server 300 by newly entering a specific ID and/or password for participation into the local service group 600, for example, through the GUI 501 as shown in FIG. 10D or 10E at the step S140*a*, may act as the host UE 100. The host UE 100 may notify other one or more UEs 100 (guest UEs 100) of the ID and/or password for invitation to the hosted local service group 600, so the guest UEs 100 may participate in the local service group 600 by logging in to the MEC server 300 using the notified ID and/or password. At the step S140*e*, the MEC server 300 may update participants (i.e., participants 52*c* on the database 52) of the local service group 600 upon every login from the host UE 100 and guest UEs 100. FIG. 10F is a flowchart illustrating an example of a process P6*b* for formation of the local service group 600 by a host UE 100 and guest UEs 100, according to some embodiments. The process P6*b* may start by the host UE 100 logging in to the MEC server 300 using an ID and/or password for the local service group 600 (S140*a*). In the process P6*b*, after logging in to the MEC server 300, the host UE 100 may display the ID and/or password on a display of the host UE 100 in order to invite other UEs 100 (guest UEs 100) to the hosted local service group 600 (S140*m*). At the step S140*m*, the host UE 100 may provide a display of a notification 502 in which a text-based notification 502*a* is provided to notify the entered ID and/or password required for access to the local service group 600, as illustrated in FIG. 10G. Alternatively, at the step S140*m*, the host UE 100 may provide a display of a notification 503 in which a barcode 503*a* with the ID and/or password encoded thereon is provided, as illustrated in FIG. 10H. The barcode 503*a* may be generated by an app installed on the UE 100. The barcode 503*a* may be generated by simply copying or duplicating the barcode captured by the camera at the step S140*a*, for example, through the GUI 501 illustrated in FIG. 10E. Alternatively, the barcode 503*a* may be generated by the MEC server 300, in which case the MEC server 300 may generate the barcode 503*a* based on the ID and/or password received at the step S140*c* (S140*n*) and notify the barcode 503*a* to the host UE 100 over the local connection (S1400), so that the notification 503 may be provided using the barcode 503*a*. After the ID and/or password is displayed on the host UE 100 for invitation (S140*m*), the guest UEs 100 may be invited to the local service group 600 with reference to the ID and/or password displayed on the host UE 100. At the step S140*a*, each guest UE 100 may log in to the MEC server 300 using the ID and/or password by: receiving a user input of manually entering the ID and/or password presented in the text-based notification 502*a*, e.g., through the GUI 501 illustrated in FIG. 10D; or activating a camera of the guest UE 100 to capture the barcode 503*a*, and decode and send the ID and/or password, e.g., through the GUI 501 illustrated in FIG. 10E. In the process P6*b*, the participants 52*c* on the database 52 may be updated upon every login from the host UE 100 and guest UEs 100 (S140*e*).

Figure 10I:
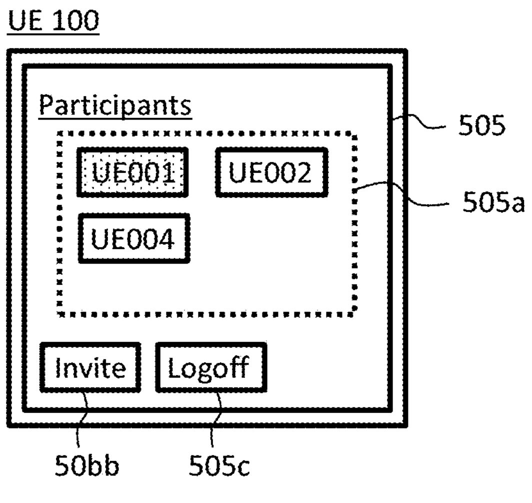
FIG. 10I schematically illustrates a GUI that is displayed when a local service group is established and a local communication is in progress in the local service group, according to some embodiments.

When a local service group 600 is established and communication among the participating UEs 100 is initiated, the UE 100 may activate a UI through which to notify the user of the participating UEs 100 in the local service group 600 and to invite other UEs 100 in the local service group 600. FIG. 10I schematically illustrates a GUI 505 that is displayed when a local service group 600 is established and a local communication is in progress in the local service group 600, according to some embodiments. The GUI 505 may include a participant window 505*a* that presents one or more participants (participating UEs 100) in the local service group 600. In the participant window 505*a*, icons representing respective participating UEs 100 may be displayed, preferably with the icon of the UE 100 itself being highlighted or otherwise displayed in a manner distinct from other participating UEs 100. In the example of FIG. 10I where the GUI 505 is displayed on the UE 100 identified by UE001, the highlighted icon representing UE001 is displayed along with other two icons representing other two participating UEs 100 (UE002, UE004) respectively in the participant window 505*a*. The GUI 505 may also include a selectable GUI element 505*b* to be selected to invite other UEs 100 to the communications in the local service group 600 at the step S140*m*. A user selection of the GUI element 505*b* may invoke the display of the GUI 502 or 503 (e.g., transition from GUI 505 to GUI 502 or 503) to present the local service group ID and/or password for invitation to the local service group 600. The GUI 505 may also include a selectable GUI element 505*c* to be selected to leave the local service group 600. A user selection of the GUI element 505*c* may invoke the logoff from the MEC server 300 to leave the local service group 600 at the step S140*j*.

In some embodiments, communication of the first digital data in the process P3*a* may be provided in the local service group 600. In the embodiments, a local service group 600 for distribution of the first digital data may be formed with a specific ID and/or password being set for participation in the local service group 600, so that the MEC server 300 may send the first digital data to participating UEs 100 in the local service group 600 (S113*a*).

In some embodiments, communication of the first digital data in the process P3*b* may be provided in the local service group 600. In the embodiments, a local service group 600 for communication of the UE-generated first digital data via the MEC server 300 may be formed with a specific ID and/or password being set for participation in the local service group 600, so that the MEC server 300 may route the first digital data generated by participating UEs 100 between the UEs 100 (S114*b*).

In some embodiments, communication of the first digital data in the process P3*c* may be provided in the local service group 600. In the embodiments, a local service group 600 for communication of the UE-generated first digital data in a P2P manner under control of the MEC server 300 may be formed with a specific ID and/or password being set for participation in the local service group 600, so that the MEC server 300 may notify participating UEs 100 of the respective UE IDs to make the UEs 100 communicate with one another in a P2P manner (S115*a*).

In some embodiments, communication of the first digital data in the process P3*d* may be provided in the local service group 600. In the embodiments, a local service group 600 for analysis of the UE-generated first digital data may be formed with a specific ID and/or password being set for participation in the local service group 600, so that the MEC server 300 may receive and analyze the first digital data originating from participating UEs 100 in the local service group 600.

(Audio/Video Distribution System)

In some embodiments, the MEC service may be an edge-based local media distribution service that involves distribution of an audio stream and/or video stream (audio/video stream) based on a first media file on the MEC server 300, with recipients of the audio/video stream being limited or restricted to UEs 100 in the edge site ES. The local media distribution service may be provided according to the process P3*a*. In connection with the local media distribution service, the Internet service may include at least one of (i) a media file delivery service that involves regularly or irregularly delivering the first media file to the MEC server 300; (ii) a and statistics recording service that involves recording of statistics such as audience measurement associated with the distribution of the audio/video stream; and (iii) a wide-area media distribution service that involves distribution of an audio/video stream based on a second media file alternatively to the local media distribution service, with recipients of the audio/video stream being widespread to UEs 100 in and out of the edge site ES as long as they are connected to the Internet. The media file delivery service may be provided according to the process P4*a*, the statistics recording service may be provided according to the process P4*e*, and the wide-area media distribution service may be provided according to the process P4*b*.

Figures 11A, 11B:
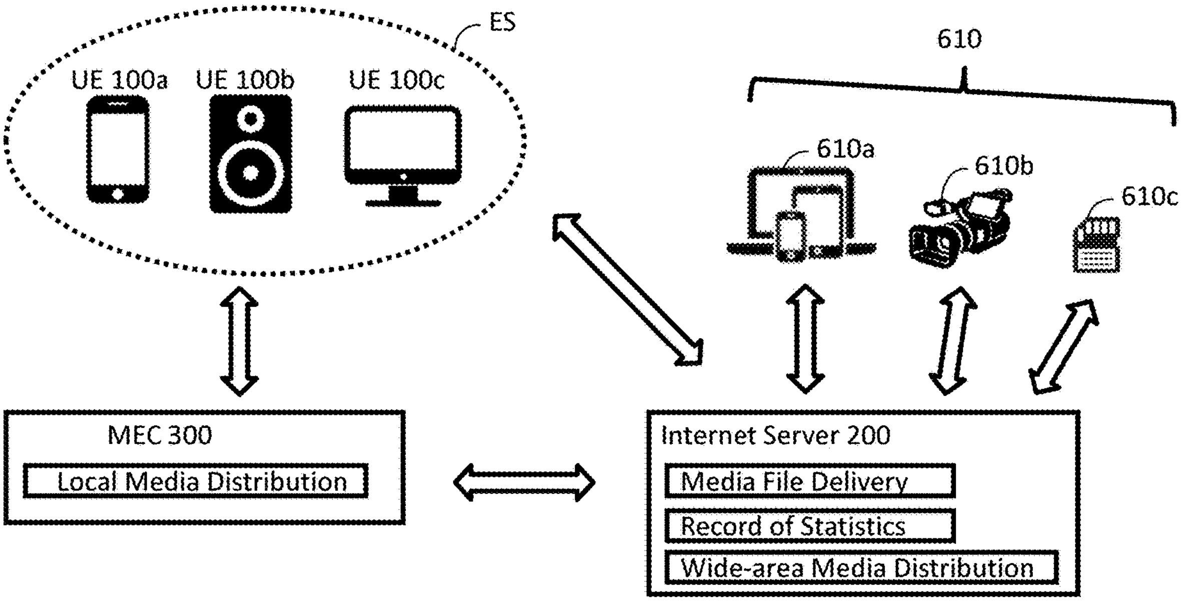
FIG. 11A schematically illustrates an example of a system for providing an MEC service (local media distribution service) and an Internet service (media file delivery service, statistics recording service, and/or wide-area media distribution service), according to some embodiments.
FIG. 11B schematically illustrates an example of a database for management of first media files in an Internet server, according to some embodiments.

FIG. 11A schematically illustrates an example of a system for providing the MEC service (local media distribution service) and the Internet service (media file delivery service, statistics recording service, and/or wide-area media distribution service), according to some embodiments. In the system, each UE 100 may be a media playback device of any kind that is operable to receive and play back the audio/video stream. An example of the UE 100 may be a smartphone, tablet, laptop, personal computer (PC), television set like a smart TV, or other gadget or electronic device comprising circuitry for playback of an audio and video stream with an audio output like a loudspeaker and a video output like a display, as illustrated as UE 100*a* in FIG. 11A. Another example of the UE 100 may be a network speaker also known as an IP speaker, or other gadget or electronic device comprising circuitry for playback of an audio stream only with an audio output like a loudspeaker, as illustrated as UE 100*b* in FIG. 11A. Yet another example of the UE 100 may be a display or monitor device, or other gadget or electronic device comprising circuitry for playback of a video stream only with a video output like a display, as illustrated as UE 100*c* in FIG. 11A. In the system, the first media file may be generated and stored therein by the Internet server 200, or may be uploaded to the Internet server 200 from an external media source 610 so that the Internet server 200 may store therein the received first media file, at least temporarily for delivery to the MEC server 300. An example of the external media source 610 may be a media production device that is an electronic device comprising software programmed to produce and store a media file, such as a smartphone, tablet, laptop, PC, a media capture device like a video camera for video capture and a voice recorder for audio capture, etc. (e.g., 610*a* and 610*b* illustrated in FIG. 11A). The media production device 610 may be connected to the Internet server 200 over the Internet, so that the media file produced by the media production device 610 may be uploaded to the Internet server 200 over the Internet 3. The media production device 610 may be connected to the Internet server 200 via a wired interface including a cable such as a Universal Serial Bus (USB) cable, so that the media file produced by the media production device 610 may be copied and transferred to the Internet server 200 through the wired interface. Another example of the external media source 610 may be removable storage on which the media file produced by the media production device 610 is stored, such as a hard disk drive (HDD), USB flash drive, flash memory card, etc. (e.g., 610*c* illustrated in FIG. 11A). The Internet server 200 may comprise an interface, such as a USB port and memory card slot, through which to accept connection with the removable storage 610, so that the media file stored on the removable storage 610 may be copied and transferred to the Internet server 200 through the interface. The external media source 610 may be operated by a media production entity that runs a business of producing media files.

In some embodiments, the first media file may be an audio/video file containing a streaming television program such as news and drama targeted to users of the UEs 100 within the coverage area(s) of one or more specific MEC servers 300, in which case the media production entity may be a television program producer (e.g., TV program production company) that produces and composes the television program into the first media file to then upload the first media file to the Internet server 200 using the external media source 610.

In some embodiments, the first media file may be an audio/video file containing an advertisement targeted to users of the UEs 100 within the coverage area(s) of one or more specific MEC servers 300, for example, for shops in the coverage area, in which case the media production entity may be an advertiser (e.g., advertisement production company) that produces and composes the advertisement into the first media file to then upload the first media file to the Internet server 200 using the external media source 610.

For the media file delivery service in the process P4*a*, the Internet server 200 may manage each first media file on a database where each first media file is associated with target information regarding one or more specific MEC servers 300 to which the first media file is targeted. FIG. 11B schematically illustrates an example of a database 53 for management of first media files in the Internet server 200, according to some embodiments. As illustrated herein, the database 53 may list each first media file 53*a* generated by the Internet server 200 or received (uploaded) from an external media source 610; a coverage area 53*b* associated with a corresponding first media file 53*a* that is indicative of one or more specific MEC servers 300 to which said corresponding first media file 53*a* is targeted; and a schedule 53*c* associated with a corresponding first media file 53*a* and a corresponding coverage area 53*b* that is indicative of when (e.g., time, date, month, year, etc.) said corresponding first media file 53*a* is scheduled to be distributed by the corresponding MEC server 300. Each coverage area 53*b* may be represented by the MEC ID of a MEC server 300, and/or the cell ID(s), geographical coordinates, etc. associated with the MEC ID just like the coverage area 50*c* on the database 50. In the example illustrated in FIG. 11B, the database 53 are listing: a first media file "Movie01.mp4" targeted to two MEC servers 300 identified by the MEC IDs "MEC001" and "MEC003" that is scheduled to be distributed (i) by the former MEC server 300 at 2:00 pm on Oct. 11, 2019 and (ii) by the latter MEC server 300 at 2:30 pm on Oct. 11, 2019; a first media file "Morning News.mp4" targeted to one MEC server 300 identified by the MEC ID "MEC002" that is scheduled to be distributed by the MEC server 300 at 06:30 am on Oct. 15, 2019; and a first media file "Drama01.mp4" targeted to one MEC server 300 identified by the MEC ID "MEC003" that is scheduled to be distributed by the MEC server 300 at 9:00 pm on Oct. 15, 2019.

The user may be invited to specify (i) one or more MEC servers 300 to which the user intends to target the first media file and (ii) a schedule for each specified MEC server 300 indicative of when the user intends to cause the MEC server 300 to distribute the first media file, through a user interface (UI). The Internet server 200 may generate and update the database 53 by entering (i) the specified at least one MEC server 300 as the coverage area 53*b* and (ii) the specified schedule as the schedule 53*d*. In an aspect, the UI may be provided by the external media source 610 (e.g., media production device 610*a*, 610*b*), in which case information indicative of the specified MEC server(s) 300 and schedule (s) may be sent to the Internet server 200 for generation and update of the database 53. In another aspect, the UI may be provided by the Internet server 200.

Figure 11C:
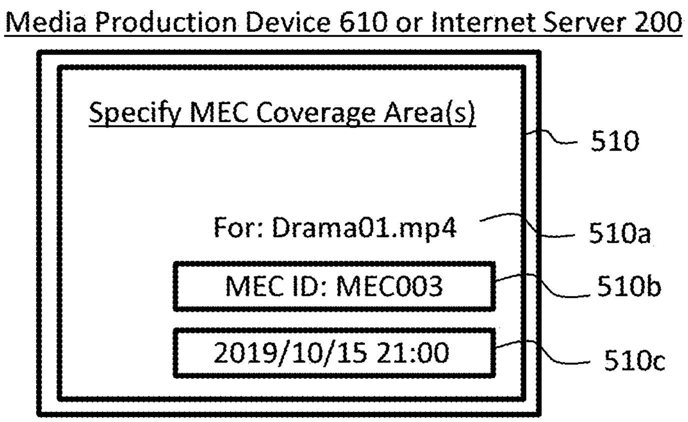
FIG. 11C schematically illustrates an example of a GUI for specifying a coverage area and schedule for distribution of a first media file, according to some embodiments.

FIG. 11C schematically illustrates an example of a GUI 510 for specifying the coverage area 53*b* and schedule 53*d*, according to some embodiments. In the example, the GUI 510 may include: a description field 510*a* that describes or identifies the first media file of which target is invited to specify on the GUI 510; a specification field 510*b* through which to receive specification of one or more MEC servers 300 to which the first media file described in the description field 510*a* is targeted; and a schedule input field 510*c* through which to receive specification of when each specified MEC server 300 should distribute the first media file. The description field 510*a* may display the identity of the first media file. The specification field 510*b* may be a text input field that allows the user to manually type the MEC ID of a MEC server 300 for specification. Alternatively, the specification field 510*b* may be a pulldown menu, etc. that preliminarily lists or presents selectable MEC IDs, allowing the user to manually select one or more of the listed MEC IDs for specification, in which case the specification field 510*b* may list the MEC IDs with reference to MEC ID information resident on the external media source 610 or Internet server 200 wherein the MEC ID information is indicative of the MEC ID(s) of one or more MEC servers 300 which are available for distribution of the first media file. The schedule input field 510*c* may be a text input filed that allows the user to manually text time, data, month, year, etc. as the schedule. The MEC ID(s) specified on the field 510*b* may be entered as the coverage area 53*b*, and the schedule specified on the field 510*c* may be entered as the schedule 53*d*, on the database 53.

Figure 11D:
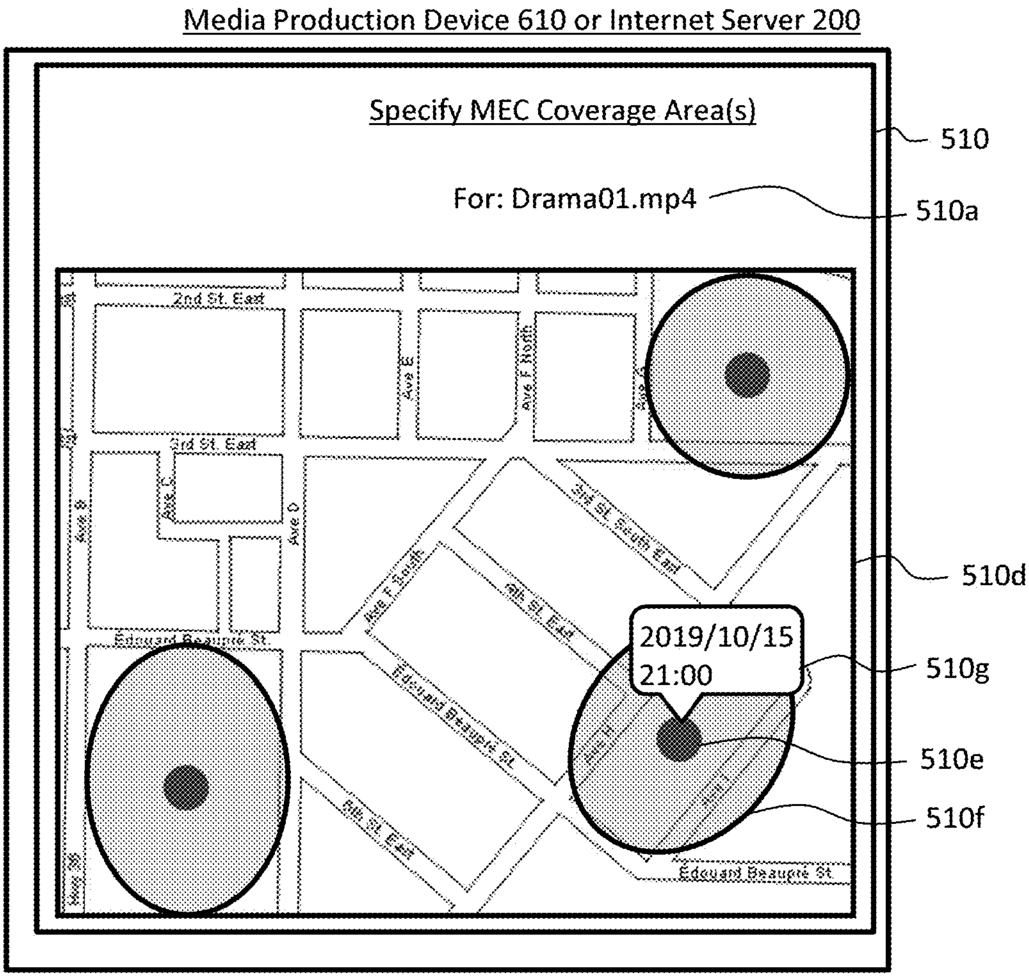
FIG. 11D schematically illustrates another example of a GUI for specifying a coverage area and schedule for distribution of a first media file, according to some embodiments.

FIG. 11D schematically illustrates another example of the GUI 510, according to some embodiments. In the example, the GUI 510 may include the description field 510*a* discussed above and a map field 510*d*. The map field 510*d* may display a map or graphical representation of a region in which the one or more available MEC servers 300 (available for distribution of the first media file) are resident, with icons 510*e* representing the respective MEC servers 300 being plotted on the map. In addition, area symbols 510*f* each of which is associated with a corresponding MEC server 300 and indicative of the coverage area of the corresponding MEC server 300 may be displayed along with the icons 510*e* of the respective MEC servers 300. The GUI 510 may allow the user to select one or more icons 510*e* to specify one or more MEC servers 300 as a target of distribution of the first media file. Each icon 510*e* may be associated with the MEC ID of a corresponding MEC server 300, so selection of an icon 510*e* may invoke specification of the MEC ID of the selected MEC server 300. The map icon 510*d* an area symbols 510*e* may be displayed with reference to the MEC ID information discussed above wherein the MEC ID information is also indicative of the respective locations and coverage areas of the one or more available MEC servers 300. In addition, a schedule input field 510*g* may be displayed in connection with each icon 510*e*, allowing the user to specify when a MEC server 300 identified by a corresponding icon 510*e* should distribute the first media file. The schedule input field 510*g* may be a text input filed that allows the user to manually text time, data, month, year, etc. as the schedule. The map field 510*d* may allow the user to select an icon 510*e* and then to specify a schedule for the MEC server 300 identified by the icon 510*e* through a schedule input field 510*g* in connection with the icon 510*e*. The MEC ID(s) of the MEC server(s) 300 specified by selection of icon(s) 510*e* may be entered as the coverage area 53*b*, and the schedule specified on the schedule input field 510*g* may be entered as the schedule 53*d*, on the database 53.

The Internet server 200 may send the first media file stored therein to one or more MEC servers 300 specified as a target of the first media file, with reference to the database 53 (S120*a*). In other words, the first media file may be addressed to one or more MEC IDs listed in the coverage are 53*b* associated with the first media file (S120*a*). In an aspect, along with the transmission of the first media file, the Internet server 200 may send to each targeted MEC server 300 schedule information indicative of the schedule specified for the MEC server 300, with reference to the database 53, causing the MEC server 300 to generate and send an audio/video stream to the UEs 100 according to the schedule. In the aspect, in the process P3*a*, each MEC server 300 may send the audio/video stream generated from the first media file according to the schedule indicated by the schedule information received from the Internet server 200 (S113*a*). In another aspect, the Internet server 200 may send the first media file to each targeted MEC server 300 at a time specified by the schedule for the MEC server 300 with reference to the database 53, causing the MEC server 300 to generate and send the audio/video stream to the UEs 100 soon in response to receipt of the first media file.

For the statistic recording service in the process P4*e*, the MEC server 300 may count the number of UEs 100 in its coverage area to which the MEC server 300 has distributed an audio/video stream based on a first media file, and generate and send a statistics information message for the first media file indicative of the counted number of the UEs 100 (viewers of the first media file) to the Internet server 200 (S124*a*). At the step S124*a*, the MEC server 300 may perform the counting of UEs 100 in a predetermined time period, e.g., during the time period corresponding to the duration of the first media file. At the step S124*a*, the MEC server 300 may count the number of UEs 100 to which the MEC server 300 has unicasted the audio/video stream based on the first media file in the predetermined time period. At the step S124*a*, the MEC server 300 may count the number of UEs 100 which has replied with positive acknowledgement to receipt of broadcast of the audio/video stream based on the first media file in the predetermined time period. In other words, the MEC server 300 may count the number of reply messages from the UEs 100 each of which is configured to issue a reply message in response to successful receipt of broadcast of the audio/video stream from the MEC server 300 in the predetermined time period. The counted number of UEs 100 may be compared with the total number of UEs 100 in the edge site ES into a statistics information message indicative of the audience measurement for the first media file. The statistics information message generated at the step S124*a* may include: the identify of the first media file; the result of the counted UEs 100 with a timestamp indicative of the predetermined time period during which the counting was performed; and the MEC ID of the MEC server 300 which has performed the counting of the UEs 100. The MEC server 300 may perform the counting of UEs 100 for every first media file when the MEC server 300 has received two or more different first media files from the Internet server 200.

The Internet server 200 may receive the statistics information message for each first media file from each MEC server 300 to which the first media file was targeted (S124*b*). The Internet server 200 may then generate and update a statistics record based on the statistics information message (S124*c*). FIG. 11E schematically illustrates an example of a statistics record 54 generated by the Internet server 200 at the step S124*c*, according to some embodiments. The statistics record 54 may be generated by the Internet server 200 organizing information in the statistics information messages. The statistics record 54 may list, for each received statistics message, a first media file 54*a* that corresponds to the identity of a first media file in the statistics information message; a coverage area 54*b* indicative of the MEC ID of a MEC server 300 in the statistics information message; and statistics 54*c* indicative of the result of counting in the statistics information message. In the example depicted in FIG. 11E, the statistics record 54 shows that: there were 50 units of UEs 100 as viewers of the first media file "Movie01.mp4" distributed by the MEC server identified by "MEC001" in the time period from 2:00 pm to 2:30 pm on Oct. 11, 2019; there were 30 units of UEs 100 as viewers of the first media file "Movie01.mp4" distributed by the MEC server 300 identified by "MEC003" in the time period from 2:30 pm to 3:00 pm on Oct. 11, 2019; there were 15 units of UEs 100 as viewers of the first media file "MorningNews.mp4" distributed by the MEC server 300 identified by "MEC002" in the time period from 6:30 am to 7:30 am on Oct. 15, 2019; and there were 80 units of UEs 100 as viewers of the first media file "Drama01.mp4" distributed by the MEC server 300 identified by "MEC003" in the time period from 9:00 pm to 11:00 pm on Oct. 15, 2019. The generated statistics record 54 may be stored in the Internet server 200. The Internet server 200 may then allow for download of the statistics record 54 to the UE 100 as per request by the UE 100 (S124*d*-S124*g*). At the step S124*h*, the Internet server 200 may display the statistics record 54 on a display of the Internet server 200 (S124*h*).

For the wide-area media distribution service in the process P4*b*, the Internet server 200 may generate and store therein a second media file based on the first media file received from the external media source 610, in order to then generate an audio/video stream from the second media file for transmission to the MEC server 300 (S121*a*). In an aspect, the second media file may be generated by copying or duplicating the first media file with substantially the same quality (e.g., the sampling rate, frame rate, bit depth, bit rate, etc.), in which case the second media file is substantially identical to the first media file. In another aspect, the second media file may be generated by copying or duplicating the first media file with substantially lower quality, namely, by downgrading the first media file, in which case the second media file is a downgraded version of the first media file. In the process P4*b*, the Internet server 200 may generate an audio/video stream from the second media file, and send the audio/video stream to the UE 100 (S121*a*).

In some embodiments, the distribution of the audio/video stream based on the first media file by the MEC server 300 and the distribution of the audio/video stream based on the second media file by the Internet server 200 may be switched between one another according to the handover process P5*a* or P5*b*.

In some embodiments, the distribution of the audio/video stream based on the first media file by the MEC server 300 (hereinafter referred to as "MEC distribution") and the distribution of the audio/video stream based on the second media file by the Internet server 200 (hereinafter referred to as "Internet distribution") may be switched between one another in response to a user selection by a user of the UE 100. In the embodiments, the UE 100 may provide a UI that prompts the user to selectively invoke one of the MEC server distribution and Internet server distribution.

Figure 11F:
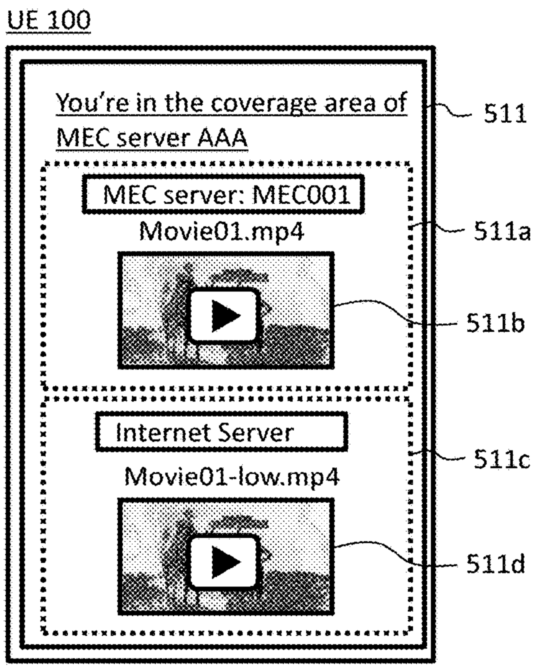
FIG. 11F schematically illustrates an example of a GUI that is displayed on a UE before the UE starts reception of distribution of an audio/video stream of a first media file, according to some embodiments.

FIG. 11F schematically illustrates an example of a GUI 511 that is displayed on the UE 100 when the UE 100 has not yet received distribution of an audio/video stream, namely, before the UE 100 starts reception of the distribution, according to some embodiments. The GUI 511 may include a MEC distribution information field 511*a* and Internet distribution information field 511*c*. The MEC distribution information field 511*a* may present a first media file resident on the MEC server 300 in a selectable manner, while the Internet distribution information field 511*c* may present a second media file resident on the Internet server 200 in a selectable form. The MEC distribution information field 511*a* may display the identity (e.g., MEC ID) of a MEC server 300 which is in communication with the UE 100, the identity (e.g., title) of the first media file resident on the MEC server 300, and a selectable GUI element 511*b* such as an icon and thumbnail of the first media file. The Internet distribution information field 511*c* may display the identity (e.g., IS ID) of an Internet server 200 which is in communication with the UE 100, the identity (e.g., title) of the second media file resident on the Internet server 200, and a selectable GUI element 511*d* such as an icon and thumbnail of the second media file. For example, the MEC distribution information filed 511*a* may present a first media file resident on a MEC server 300 which has been discovered and connected to the UE 100 over a local connection according to the process P2*a*, P2*b*, P2*c*, or P2*d*. For generation of the MEC distribution information field 511*a*, the UE 100 may issue a request message to the MEC server 300 for media file information related to the first media file (e.g., the title of the first media file, icon or thumbnail of the first media file, etc.), and then present the selectable GUI element 511*b* with reference to the media file information that is sent from the MEC server 300 in reply to the request message. This flow can be seen as the steps S150*a* to S150*e* in a process P7*a* in FIG. 11G, where the MEC server 300 may be configured to issue a reply message with the media file information in reply to the request message from the UE 100. Similarly, for generation of the Internet distribution information field 511*c*, the UE 100 may issue a request message to the Internet server 200 for media file information related to the second media file (e.g., the title of the second media file, icon or thumbnail of the second media file, etc.), and then present the selectable GUI element 511*d* with reference to the media file information that is sent from the Internet server 200 in reply to the request message. This flow can be seen as the steps S151*a* to S151*e* in a process P7*b* in FIG. 11H, where the Internet server 200 may be configured to issue a reply message with the media file information in reply to the request message from the UE 100. When no MEC server 300 is discovered because, for example, the UE 100 is out of the coverage area of any available MEC server 300 (out of any edge site ES), the MEC distribution field 511*a* may be void or empty, namely, may not be displayed on the GUI 511 because there would be no available first media file. Through the GUI 511, a user selection of the GUI element 511*b* may invoke a MEC distribution of the first media file by issuing a request to the MEC server 300 for initiation of distribution of the first media file, causing the MEC server 300 to generate and send an audio/video stream based on the first media file to the UE 100 (S113*a*). On the other hand, a user selection of the GUI element 511*d* may invoke an Internet distribution of the second media file by issuing a request to the Internet server 200 for initiation of distribution of the second media file, causing the Internet server 200 to generate and send an audio/video stream based on the second media file to the UE 100 (S121*a*).

Figure 11I:
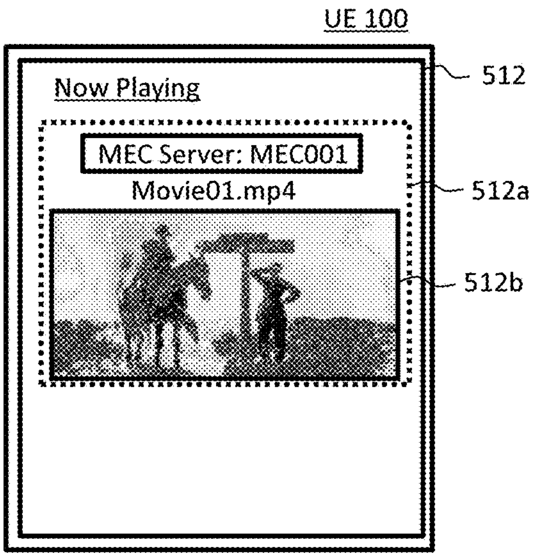
FIG. 11I schematically illustrates an example of a GUI that is displayed on a UE when the UE, in communication with a MEC server, is playing back an audio/video stream based on a first media file, according to some embodiments.
Figure 11J:
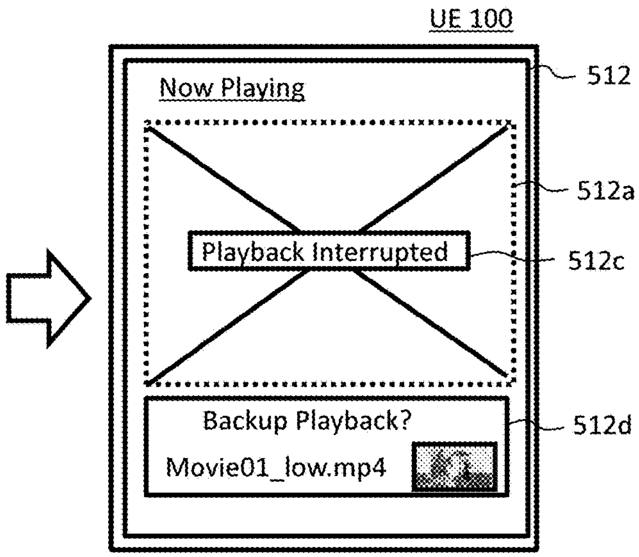
FIG. 11J schematically illustrates an example of a GUI that is displayed on a UE when playback of an audio/video stream based on a first media file is interrupted, according to some embodiments.

FIGS. 11I and 11J schematically illustrate an example of a GUI 512 that is displayed on the UE 100 when the UE 100 is playing back an audio/video stream based on the first media file in communication with the MEC server 300, according to some embodiments. The GUI 512 may include a playback field 512*a* in which an ongoing playback 512*b* of the audio/video stream based on the first media file is provided. In response to the playback 512*b* being determined to be no longer available, e.g., as a result of the determination at the step 130*a* (S130*a*: No) in the process P5*a*, the GUI 512 may provide a notification 512*c* that notifies unavailability of the playback of the audio/video stream which was in progress. As well as the provision of the notification 512*c*, the GUI 512 may provide a notification 512*d* that notifies availability of playback based on the second media file through the Internet distribution as a backup for the first media file through the disabled MEC distribution. The notification 512*d* may present information (e.g., the identity of the Internet server 200, title of the second media file, icon or thumbnail of the second media file, etc.) related to the second media file, e.g., with reference to the media file information obtained in the process P7*b*. The notification 512*d* may be displayed in a selectable form, allowing the user to select the notification 512*d* to invoke an Internet distribution of the second media file as a backup for the interrupted MEC distribution of the first media file.

Figure 11K:
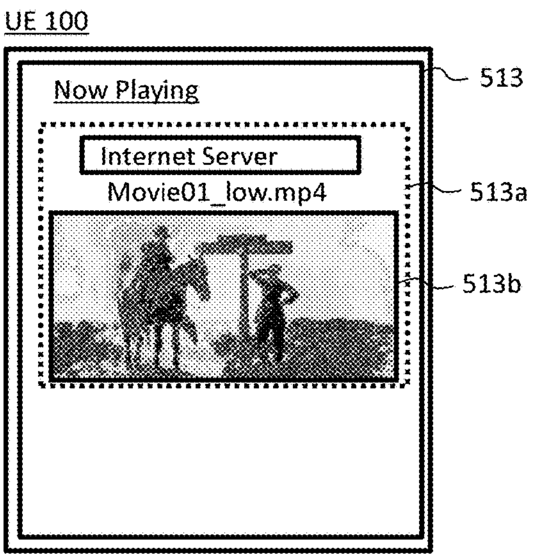
FIG. 11K schematically illustrates an example of a GUI that is displayed on a UE when the UE, in communication with an Internet server, is playing back an audio/video stream based on a second media file, according to some embodiments.
Figure 11L:
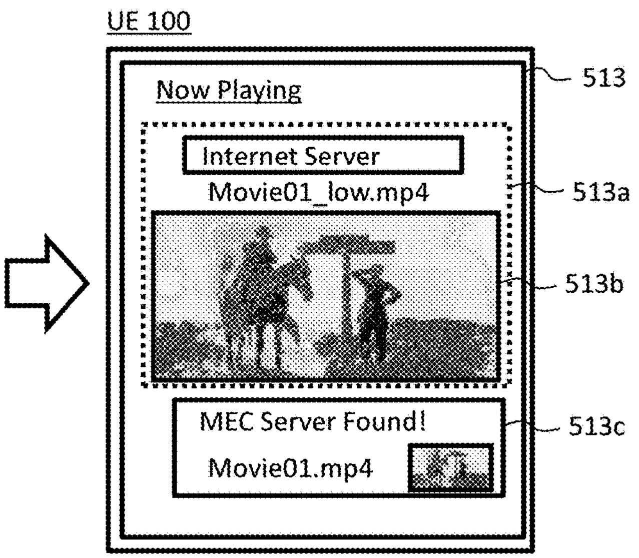
FIG. 11L schematically illustrates an example of a GUI that is displayed on a UE when playback of a second media file is ready, according to some embodiments.

FIGS. 11K and 11L schematically illustrate an example of a GUI 513 that is displayed on the UE 100 when the UE 100 is playing back an audio/video stream based on the second media file in communication with the Internet server 200, according to some embodiments. The GUI 513 may include a playback field 513*a* in which an ongoing playback 513*b* of the audio/video stream based on the second media file is provided. In response to discovery of a MEC server 300 storing the first media file associated with the second media file (e.g., one of the MEC servers 300 listed on the database 50), e.g., according to the steps S110*a*-S110*h*, S111*a*, or S102*a* as discussed above, the GUI 513 may provide a notification 513*c* that notifies availability of playback based on the first media file through the MEC distribution instead of the second media file through the Internet distribution. The notification 513*c* may present information (e.g., the identity of the MEC server 300, title of the first media file, icon or thumbnail of the first media file, etc.) related to the first media file, e.g., with reference to the media file information obtained in the process P7*a*. The notification 513*c* may be displayed in a selectable form, allowing the user to select the notification 513*c* to invoke a MEC distribution of the first media file instead of the Internet distribution of the second media file. The selection of the notification 513*c* may invoke termination of the ongoing Internet distribution of the second media file by issuing a request to the Internet server 200 for termination of distribution of the second media file, causing the Internet server 200 to terminate the generation and transmission of an audio/video stream based on the second media file to the UE 100.

Figure 11M:
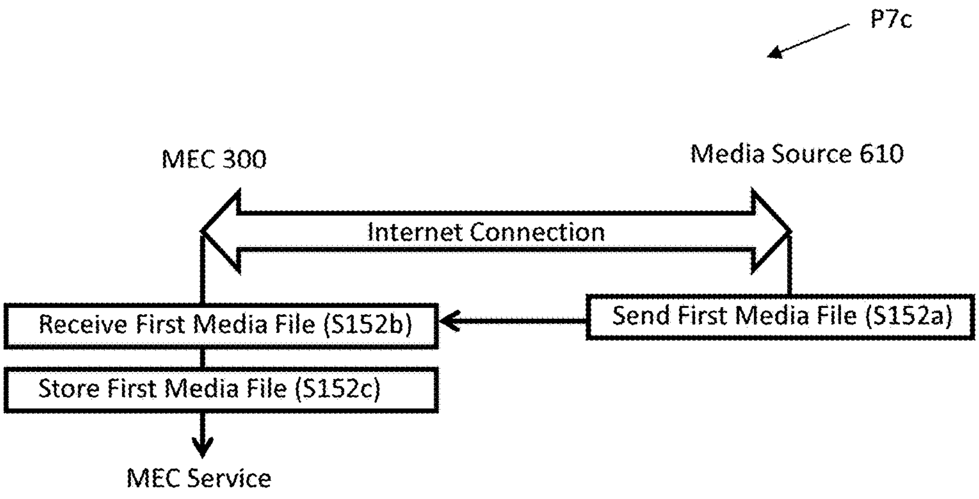
FIG. 11M is a flowchart illustrating an example of a process for upload of a first media file from an external media source to a MEC server, according to some embodiments.

In some modifications to the embodiments, the media file delivery service discussed above may be provided directly between the MEC server 300 and external media source 610 over the Internet 3, instead of between the MEC server 300 and Internet server 200 according to the process P4*a*. In the modified embodiments, the MEC server 300 may be accessible by the external media source 610 over the Internet 3 using the global IP address allocated to the MEC server 300, just as it is accessible by the Internet server 200 according to the process P4*a*, so that the external media source 610 may upload the first media file to the MEC server 300 over the Internet 3. In the modified embodiments, the external media source 610 may generate and store therein the database 53, as illustrated in FIG. 11B, that lists each first media file generated by the external media source 610 with the target information associated with the first media file. The external media source 610 may generate and update the database 53 by entering the specified at least one MEC server 300 (coverage area 53*b*) and the schedule (53*c*) on the database 53 in response to a user input of such items through a UI such as the GUI discussed above with reference to FIGS. 11C and 11D. FIG. 11M is a flowchart illustrating an example of a process P7*c* for upload of the first media file from the external media source 610 to the MEC server 300, according to some modified embodiments. In the modified embodiments, the external media source 610 may send the first media file stored therein to one or more MEC servers 300 specified as a target of the first media file, with reference to the database 53 (S152*a*). In response to receipt of the first media file (S152*b*), the MEC server 300 may store therein the received first media file (S152*c*) based on which to distribute the audio/video stream according to the edge-based local media distribution service. In an aspect, along with the transmission of the first media file, the external media source 610 may send to each targeted MEC server 300 schedule information indicative of the schedule specified for the MEC server 300, with reference to the database 53, causing the MEC server 300 to generate and send an audio/video stream to the UEs 100 according to the schedule. In the process P3*a*, each MEC server 300 may send the audio/video stream generated from the first media file according to the schedule indicated by the schedule information received from the external media source 610 (S113*a*). In another aspect, the external media source 610 may send the first media file to each targeted MEC server 300 at the time specified by the schedule for the MEC server 300 with reference to the database 53, causing the MEC server 300 to generate and send the audio/video stream to the UEs 100 soon in response to receipt of the first media file.

Figure 11N:
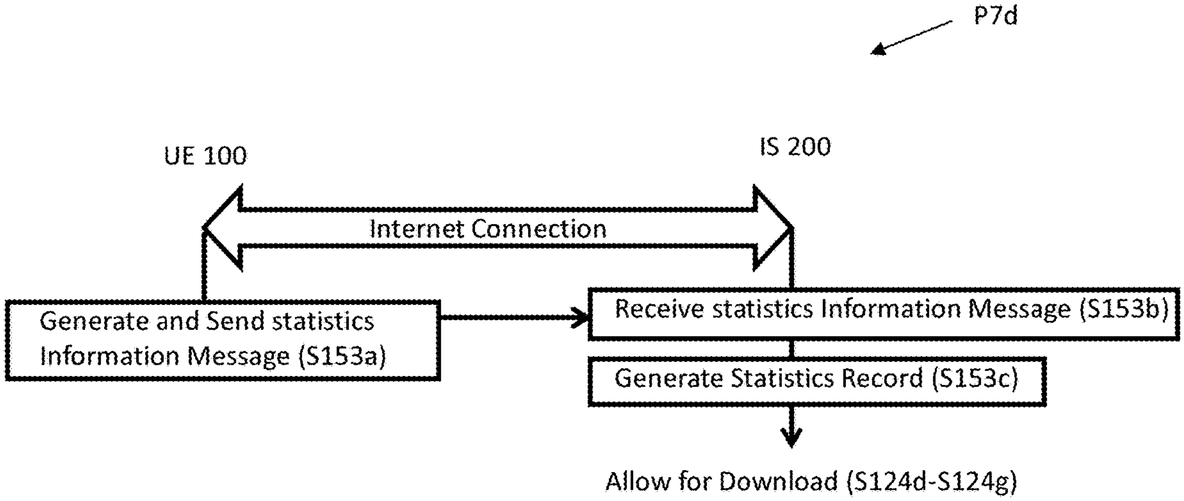
FIG. 11N is a flowchart illustrating an example of a process for a statistics recoding service between a UE and an Internet server, according to some embodiments.

In some modifications to the embodiments, the statistics recording service discussed above may be provided directly between each UE 100 and the Internet server 200 over the Internet 3, instead of between the MEC server 300 and Internet server 200 according to the process P4*e*. In the modified embodiments, each UE 100 may generate a statistics information message indicative of the first media file which the UE 100 has received and played back, and send the statistics information message to the Internet server 200 over the Internet 3, so that the Internet server 200 may store therein the statistics information message issued by each UE 100 as record, instead of the statistics information message issued by the MEC server 300 in the process P4*e* discussed above. FIG. 11N is a flowchart illustrating an example of a process P7*d* for the statistics recoding service, according to some modified embodiments. In the modified embodiments, each UE 100 may generate a statistics information message indicative of a record, log, or history of the reception and playback of the first media file at the step S113*c* in the process P3*a*, and send the statistics information message to the Internet server 200 over the Internet 3 (S153*a*). Each UE 100 may generate and send the statistics information message in response to and in parallel to playback of the first media file at the step S113*c* in the process P3*a*. More specifically, the UE 100 may generate and send the statistics information message in response to initiation of the playback of the first media file, in response to completion of the playback of the first media file, in the course of the playback of the first media file, etc. The statistics information message may include: the identity of the first media file which the UE 100 has played back; the MEC ID of the MEC server 300 from which the UE 100 received the first media file, indicative of what edge site ES the UE 100 belongs to; and the timestamp indicative of time at which the statistics information message was generated. According to the process P7*d*, in response to receipt of the statistics information messages from the UEs 100 (S513*b*), the Internet server 200 may generate and update a statistics record based on the statistics information messages (S153*c*). The Internet server 200 may generate the statistics record by organizing and listing the items (i.e., the identity of the first media file, MEC ID of the MEC server 300, and timestamp) of each statistics information message into the statistics record. In an aspect, the Internet server 200 may count the number of the received statistics information messages into audience measurement for the first media files, compared with the total number of UEs 100 in the edge sites ES formed by MEC servers 300 connected to the Internet server 200. The audience measurement may be listed per first media file with reference to the identities of the first media files in the statistics information messages. The statistics record 54 discussed above is also an example of the statistics record generated in the modified embodiments, where the statistics 54*c* is indicative of the audience measurement based on the counted number of the received statistics information messages that is associated with each first media file 54*a*. The generated statistics record 54 may be stored in the Internet server 200. The Internet server 200 may then allow for download of the statistics record 54 to the UE 100 as per request by the UE 100, just as it does according to the steps S124*d*-S124*g* in the process P4*e*.

Figure 11O:
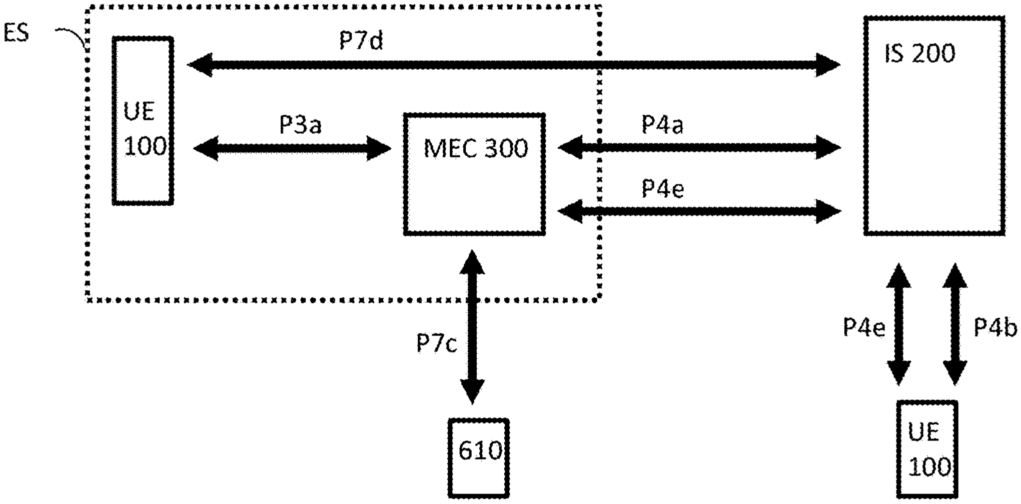
FIG. 11O schematically illustrates a summary of complex communications in a local media distribution system, according to some embodiments.

The summary of the audio/video distribution system according to the embodiments discussed above is described blow with reference to FIG. 11O. The first media file may be uploaded on the MEC server 300 from the external media source 610 in the process P7*c* or from the Internet server 200 in the process P4*a*. The first media file may be streamed from the MEC server 300 to the UE 100 in the edge site ES in the process P3*a*. In parallel to the streaming of the first media file in the process P3*a*, the statistics information associated with the streaming of the first media file may be generated and sent from the MEC sever 300 to the Internet server 300 in the process P4*e* so that the statistics information may be stored on the Internet server 200 to be downloadable by the UE 100 in the process P4*e*. In parallel to playback of the streamed first media file in the process P3*a*, the statistics information associated with the playback of the first media file may be generated and sent from the UE 100 to the Internet server 200 in the process P7*d* so that the statistics information may be stored on the Internet server 200 to be downloadable by the UE 100 in the process P4*e*. The streaming of the first media file under control of the MEC server 300 in the process P3*a* may be handed over to and from streaming of the second media file under control of the Internet server 200 in the process P4*b*. Advantageously, the streaming of the first media file localized to a limited area with the need for low latency may be offloaded on the MEC server 300. Advantageously, the streaming of the second media file, alternative to the first media file, may be initiated seamlessly by the Internet server 200 to the UE 100 when the UE 100 is out of the range of the first media file streaming, so that the user of the UE 100 can continue to enjoy playback of the alternative media file (e.g., the same video title encoded with lower video quality) after the user goes out of the edge site ES. Advantageously, the streaming of the first media file, superior to the second media file, may be initiated seamlessly by the MEC server 300 to the UE 100 when the UE 100 comes in the range of the first media file streaming. Advantageously, the statistics on the audience of the offloaded edge-based streaming may be aggregated on the Internet server 200 in parallel to the offloaded streaming.

(UE-to-UE Real-Time Audio Communication System)

In some embodiments, the MEC service may be an edge-based local real-time audio communication service between the UEs 100 that involves distribution of an audio stream generated by at least one UE 100 (source UE 100) to other at least one UE 100 (destination UE 100) in the edge site ES over a local connection. The local real-time audio communication may be performed under control of the MEC server 300 in the edge site ES according to the process P3*b* or P3*c*. In connection with the local real-time audio communication service, the Internet service may include at least one of (i) a wide-area real-time audio communication service that involves distribution of an audio stream generated by at least one source UE 100 to at least one destination UE 100 over the Internet 3 under control of the Internet server 200, alternatively to the local real-time audio communication service; and (ii) a communication recording service that involves recording of local communications performed between the UEs 100 in the local real-time audio communication. The wide-area real-time audio communication service may be performed according to the process P4*c* or P4*d*. The communication recording service may be performed according to the process P4*e*.

Figures 12A, 12B, 12C:
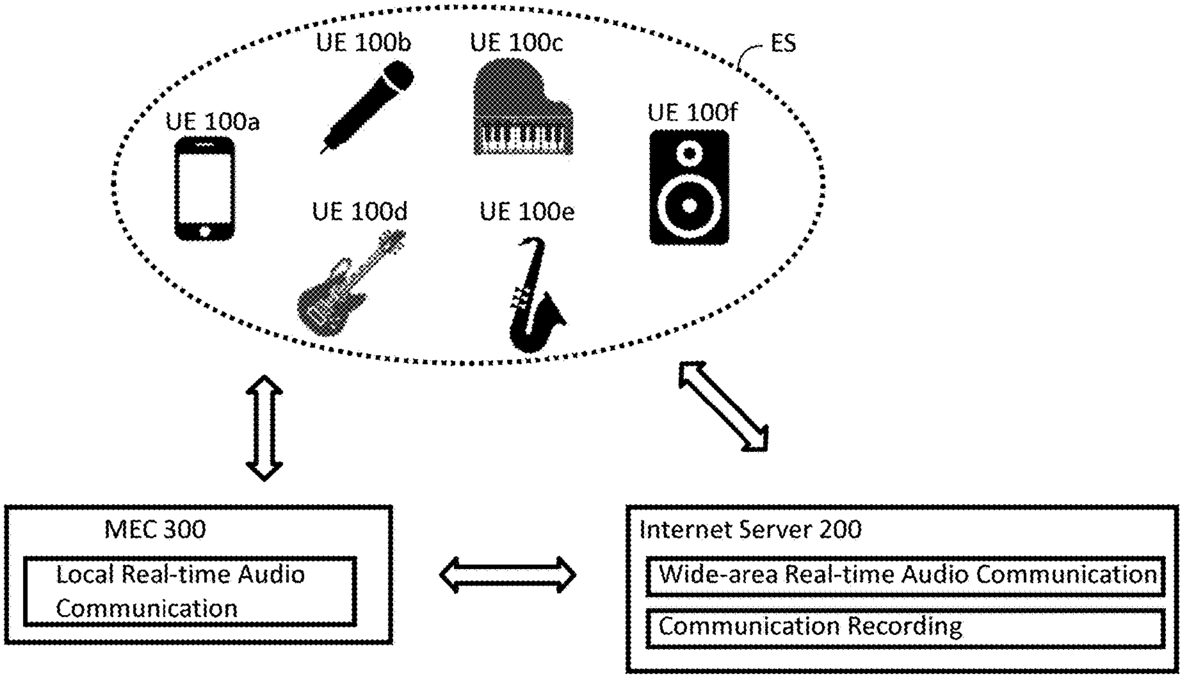
FIG. 12A schematically illustrates an example of a system for providing a MEC service (local real-time audio communication service) and an Internet service (wide-area real-time audio communication service and/or communication recording service), according to some embodiments.
FIG. 12B schematically illustrates an example of a database for management of UEs for a local real-time audio communication service, according to some embodiments.
FIG. 12C schematically illustrates another example of a database for management of UEs for a local real-time audio communication service, according to some embodiments.

FIG. 12A schematically illustrates an example of a system for providing the MEC service (local real-time audio communication service) and the Internet service (wide-area real-time audio communication service and/or communication recording service), according to some embodiments. In the system, each UE 100 may be configured to operate as at least one of a source UE 100 and destination UE 100. The source UE 100 may be defined herein to be a UE 100 operative as a source of an audio stream, which generates and outputs an audio stream for transmission at the step S114*a* in the process P3*b* or at the step S115*d* in the process P3*c*. On the other hand, the destination UE 100 may be defined herein to be a UE 100 operative as a destination of the audio stream, which receives and plays back the audio stream originating from the source UE 100. Each UE 100 may be a dedicated source UE 100 that is preliminarily configured or designed to be operative as the source UE 100, not the destination UE 100. Each UE 100 may be a dedicated destination UE 100 that is preliminarily configured or designed to be operative as the destination UE 100, not the source UE 100. Each UE 100 may be a flexible source/destination UE 100 that can be flexibly or selectively operative as one of the source UE 100 and destination UE 100 according to a predetermined condition.

An example of the dedicated source UE 100 may be a wireless microphone product (a.k.a., radio microphone product) that comprises a microphone element through which to collect or pick up sound into an audio signal and a processor configured to generate an audio stream based on the audio signal. The wireless microphone product 100 may be of a handheld type where the components are housed in a housing which is designed to be compact and easy to hold in hand, for example, in a cylindrical shape. The wireless microphone product 100 may be of a lavalier type where the microphone element is provided with a clip outside a housing which houses the other components, for hands-free operation. Another example of the dedicated source UE 100 may be a musical instrument that comprises a sound production assembly designed to produce sound acoustically, a pickup or transducer configured to produce an audio signal from the sound, and a processor configured to generate an audio stream based on the audio signal. For example, the musical instrument 100 may be an electric stringed instrument such as an electric guitar, electric piano, electric violin, etc. that comprises strings operated by a user (player) to produce sound by vibration of the strings, and the pickup configured to transduce the vibration into an audio signal. For example, the musical instrument 100 may be an electric percussion instrument such as an electric drum that comprises a surface to be struck by a user (player) with his/her hand(s) or a beater to produce sound by vibration of the struck surface, and the pickup configured to transduce the vibration into an audio signal. For example, the musical instrument 100 may be an electric wind instrument such as an electric trumpet, electric saxophone, etc. that comprises a resonator such as a tubular resonator in which air is blown by a user (player) through a mouthpiece to produce sound by vibration of the air, and the pickup configured to transduce the vibration into an audio signal. For example, the music instrument 100 may be an electronic music instrument such as a synthesizer that comprises an oscillator or sound tone generator configured to electronically produce an audio signal for desired sound directly without using the pickup or transducer.

An example of the dedicated destination UE 100 may be a network speaker also known as an IP speaker that comprises a processor configured to play back an incoming audio stream into an audio signal and a loudspeaker configured to receive the audio signal to output corresponding sound.

An example of the flexible source/destination UE 100 may be a computing device for personal use, industrial use, educational use, etc. such as a smartphone, tablet, personal computer, laptop, etc. that comprises both of a microphone and speaker as well as a processor configured to: (a) generate an audio stream based on sound collected through the microphone for transmission when the flexible source/destination UE 100 is in operation as the source UE 100, and to (b) play back an incoming audio stream originating from the source UE 100 for output of sound through the speaker when the flexible source/destination UE 100 is in operation as the destination UE 100. The flexible source/destination UE 100 may switch between a first mode of operation where the UE 100 operates as the source UE 100 and a second mode of operation where the UE 100 operates as the destination UE 100 manually in response to a user input on a UI or automatically in response to a predetermined event associated with the UE 100. Alternatively, the flexible source/destination UE 100 may operate as both of the source UE 100 and destination UE 100 concurrently at a time to (a) generate and transmit an audio stream destined to another flexible source/destination UE 100 and (b) receive and play back an audio stream from said another flexible source/destination UE 100 for two-way communication among the flexible source/destination UEs 100 in a full-duplex or half-duplex manner.

In the example illustrated in FIG. 12A, the system includes smartphone 100*a* as a flexible source/destination UE 100*a*, wireless microphone product 100*b* as a dedicated source UE 100, electric piano 100*c* as a dedicated source UE 100, electric guitar 100*d* as a dedicated source UE 100, electric saxophone 100*e* as a dedicated source UE 100, and a loudspeaker product 100*f* as a dedicated destination UE 100.

In some embodiments, each UE 100 may store therein attribute information indicative of its attribute of being one of the source UE 100 and destination UE 100. The dedicated source UE 100 specially designed to act as a source of audio stream may have invariable attribute information indicative of being a source UE 100. The dedicated destination UE 100 specially designed to act as a destination of the audio stream may have invariable attribute information indicative of being a destination UE 100. On the other hand, the flexible source/destination UE 100 may have variable attribute information indicative of being a source UE 100 or destination UE 100 depending on whether the UE 100 is set to be the source UE 100 or destination UE 100. Alternatively, the flexible source/destination UE 100 may have attribute information indicative of being both of the source UE 100 and destination UE 100. In the embodiments, each UE 100 may issue a notification message to the MEC server 300 to notify the attribute information with the identity (e.g., UE ID) of the UE 100, so that the MEC server 300 may identify each UE 100 in the edge site ES as one or both of the source UE 100 and destination UE 100 for management of the UEs 100 in the edge site ES. Each UE 100 may send the UE ID of the UE 100 with the attribute information automatically in response to discovering and connecting to the MEC server 300, e.g., according to the process P2*a*, P2*b*, P2*c*, or P2*d*. The MEC server 300 may generate and update a database for the management of the UEs 100 in response to the notified attribute information from the UEs 100. FIGS. 12B and 12C schematically illustrate respective examples of a database 55 for management of UEs 100 in the edge site ES, according to some embodiments. The database 55 may list at least one participant 55*a* each of which is indicative of a UE 100 as a participant in a local communication under control of the MEC server 300, and an attribute 55*b* associated with a corresponding UE 100 (participant 55*a*) that is indicative of one or both of the source UE and destination UE with reference to the attribute information received form the corresponding UE 100. The participant 55*a* may be represented by the UE ID of the corresponding UE 100. In the example illustrated in FIG. 12B, the database 55 lists two source UEs 100 identified by UE001 and UE020 respectively and one destination UE 100 identified by UE003. In the example illustrated in FIG. 12C, the database 55 lists two flexible source/destination UEs 100 identified by UE007 and UE008 each of which operates as both of the source UE and destination UE. In the process P3*b*, the MEC server 300 may identify a source UE 100 and destination UE 100 with reference to the database 55, to route an audio stream from the source UE 100 to the destination UE 100 (S114*b*).

In some embodiments, the MEC server 300 may be configured to function as an audio mixer to mix, blend, or combine multiple audio streams individually originating from two or more source UEs 100 together into a combined audio stream, and route the combined audio stream to the destination UE 100 (S114*b*). When there are two or more destination UEs 100 in the edge site ES, the MEC server 300 may route the audio stream to the destination UEs 100 by, for example, unicasting the audio stream to each destination UE 100 one by one or broadcasting the audio stream to the destination UEs 100 at a time (S114*b*).

For the wide-area real-time audio communication service in the process P4*c*, the Internet server 200 may route an audio stream originating from a source UE 100 to a destination UE 100 over the Internet 3 (S122*b*). For the wide-area real-time audio communication service in the process P4*d*, the Internet server 200 may notify the UE IDs to the source UE 100 and destination UE 100 (S123*a*), causing the source UE 100 and destination UE 100 to communicate with one another in a P2P manner.

In some embodiments, the local real-time audio communication service by the MEC server 300 and the wide-area real-time audio communication service by the Internet server 200 may be switched between one another in response to the handover according to the process P5*c* or P5*d*.

For the communication recording service in the process P4*e*, the Internet server 200 may generate and store therein one or more records of communication performed locally between the UEs 100 in the edge site ES over the local connections (S124*c*), and then allow a UE 100 to download or streaming of the stored record from the Internet server 200 over the Internet 3 (S124*d*-S124*g*).

For the communication recording service, in the process P4*e*, the MEC server 300 may generate at least one record file by recording the original audio streams which have been routed by the MEC server 300 among the UEs 100 according to the step S114*b*, and then regularly or irregularly send the record file to the Internet server 200 over the Internet 3 (S124*a*). At the step S124*a*, the MEC server 300 may continuously record the audio streams originating from at least one source UE 100 destined to at least one destination UE 100 during the local communication, into a single record file. At the step S124*a*, the MEC server 300 may encode or convert the audio streams in chronological order to make a file in a predetermined format with a predetermined quality (e.g., the sampling rate, frame rate, bit depth, bit rate, etc.). The record file may be an audio file formatted in mp3 format defined by Moving Picture Experts Group (MPEG). The MEC server 300 may initiate creation of a record file in response to a predetermined first event and finalize the creation in response to a predetermined second event, thereby generating the record file, automatically at least in part.

In an aspect, generation of a record file may be automatically synchronized with communication among fixed or constant participating UEs 100. In this aspect, the MEC server 300 may initiate creation of a record file in response to initiation of communication among given UEs 100 and finalize the creation in response to termination of the ongoing communication among said given UEs 100. Entry of UEs 100 as participants 55*a* on the database 55 may be construed as being initiation of communication among the entered UEs 100. Removal of the UEs 100 from participants 55*a* on the database 55 (e.g., due to exit or departure of the UEs 100 from the communication) may be construed as being termination of the ongoing communication which was in progress among the UEs 100. Also, change of participants 55*a* on the database 55, such as (a) increase of participants 55 due to new entry or participation of a UE 100 in the communication and (b) decrease of participants 55 due to exit or departure of a UE 100 from the communication, may be construed as being termination of the ongoing communication and initiation of a new communication. So, the MEC server 300 may generate separate record files each of which is generated newly every time a communication is initiated and terminated. In generating a record file, the MEC server 300 may generate participant information indicative of participants 55*a* (participating UEs 100) in the ongoing communication associated with the record file, with reference to the database 55. Each record file may therefore be associated with the participant information indicative of participating UEs 100 in the communication of which audio streams have been recorded into a corresponding record file. The participant information may be packaged with a corresponding record file.

Figures 12D, 12E:
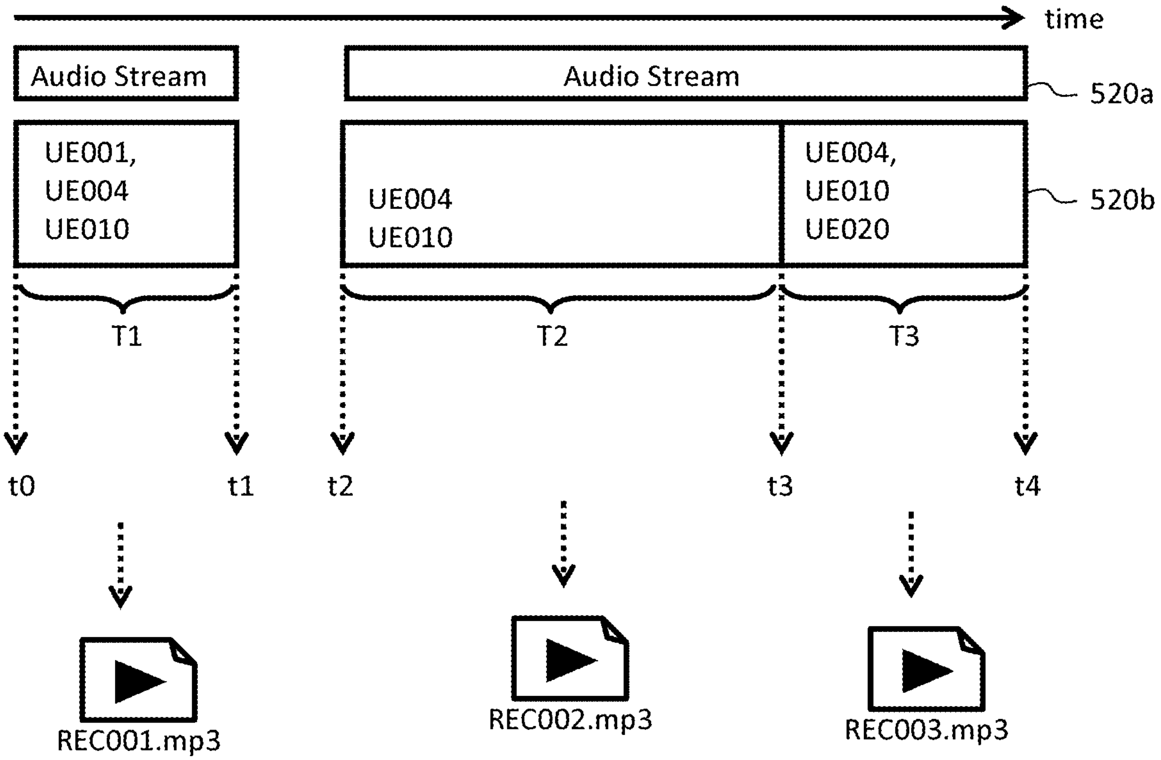
FIG. 12D schematically illustrates an example of generation of record files as record of a local real-time audio communication, according to some embodiments.
FIG. 12E schematically illustrates an example of a database for management of record files as record of a local-real-time audio communication, according to some embodiments.

FIG. 12D schematically illustrates an example of generation of record files, according to some embodiments. FIG. 12D illustrates an example where communication among three UEs 100 (UE001, UE004, UE010) is initiated at the time t0 and then terminated at the time t1 in response to exit of all of the UEs 100 from the communication; after a time interval, communication among two UEs 100 (UE004, UE010) is initiated at the time t2 and then terminated at the time t3 in response to participation of a new UE 100 (UE020) in the ongoing communication; and then communication among three UEs 100 (UE004, UE010, UE020) is initiated at the time t3 until the time t4. In the example, the MEC server 300 may generate a first record file (e.g., REC001.mp3) with the duration T1 from the time t0 to the time t1 by recording the audio streams 520*a* in this period T1; generate a second record file (e.g., REC002.mp3) with the duration T2 from the time t2 to the time t3 by recording the audio streams 520*a* in this period T2; and then generate a third record file (e.g., REC003.mp3) with the duration T3 from the time t3 to the time t4 by recording the audio streams 520*a* in this period T3. Furthermore, the MEC server 300 may generate participant information 520*b* associated with the first record file, indicative of the participating UEs 100 (UE001, UE004, UE010) with reference to the database 55 in the time period T1; generate participant information 520*b* associated with the second record file, indicative of the participating UEs 100 (UE004, UE010) with reference to the database 55 in the time period T2; and then generate participant information 520*b* associated with the third record file, indicative of the participating UEs 100 (UE004, UE010, UE020) with reference to the database 55 in the time period T3.

At the step S124*a*, the MEC server 300 may store therein the generated record file temporally until the file is transmitted to the Internet server 200. The MEC server 300 may delete the temporally-stored record file upon completion of transmission of the record file directed to the Internet server 200 (S124*a*).

At the step S124*a*, the MEC server 300 may regularly or irregularly send the generated record file to the Internet server 200 over the Internet 3 (S124*a*). In an aspect, the MEC server 300 may send a record file automatically upon generation of the record file. In the example of FIG. 12D, the first record file (REC001.mp3) may be sent at the time t1, the second record file (REC002.mp3) may be sent at the time t3, and the third record file (REC003.mp3) may be sent at the time t4. In another aspect, the MEC server 300 may send the record file at predetermined time (e.g., 1:00 am every day, on the hour every hour, etc.) according to a predetermined schedule. In yet another aspect, the MEC server 300 may send the record file at a time during the time period when the MEC server 300 is in an "idle" state where the MEC server 300 is not performing generation of another record file. For example, the MEC server 300 may be in the idle state when there is no participating UE 100 connected to the MEC server 300 (i.e., there is no participant 55*a* on the database 55) and thus there is no communication of recordable audio streams, just like in the time period from the time t1 to the time t2 in the example of FIG. 12D. The MEC server 300 may send the participant information along with the associated record file (S124*a*).

The Internet server 200 may receive the record file along with the participant information from the MEC server 300 over the Internet 3 (S124$b$), and store therein the record file (S124$c$). At the step S124$c$, the Internet server 200 may organize and store received record files on a database for management of the record files. On the database, each record file may be associated with participating UEs 100 indicated by the participant information. FIG. 12E schematically illustrates an example of a database 56 for management of record files, according to some embodiments. The database 56 may list each received record file 56$a$; participants 56$b$ associated with a corresponding record file that are indicative of participating UEs 100 in the recorded communication, which may be identified with reference to the above-mentioned participant information; and duration 56$c$ associated with a corresponding record file that is indicative of the duration of the recorded communication. On the illustrative database 56 in FIG. 12E, the first record file 56$a$ (REC001.mp3) is associated with the three participants 56$b$ (UE001, UE004, UE010) and with the 30 minute duration 56$c$ which continues from 9:00 am (t0) to 9:30 am (t1) on Dec. 10, 2019; the second record file 56$a$ (REC002. mp3) is associated with the two participants 56$b$ (UE004, UE010) and with the 60 minutes duration 56$c$ which continues from 9:40 am (t2) to 10:40 am (t3) on Dec. 10, 2019; and the third record file 56$a$ (REC003.mp3) is associated with the three participants 56$b$ (UE004, UE010, UE020) and with the 35 minute duration 56$c$ which continues from 10:40 am (t3) to 11:15 am (t4) on Dec. 10, 2019.

The Internet server 200 may then provide download or streaming of the record file to the UE 100 over the Internet 3 according to the process P4$e$ (S124$d$-S124$g$). The Internet server 200 may respond to a record file request message from a UE 100 for download or streaming of a record file (S124$d$, S124$e$) by identifying and reading out the requested record file from the database 56 and sending it to the UE 100 for download or streaming over the Internet 3 (S124$f$). At the step S124$h$, the Internet server 200 may play back a record file selected using an input device of the Internet server 200, through a loudspeaker of the Internet server 200 (S124$h$).

In an aspect of the record file request at the step S124$d$, the UE 100 may prompt the user to manually enter or specify search criteria such as time (e.g., 10:00 am on November 25) and identity of a UE 100 (e.g., UE ID of the user's UE 100 or another user's UE 100) through a UI, so that the record file request message issued at the step S124$d$ may include search criteria information indicative of the entered search criteria. In this case, the Internet server 200 may refer to the search criteria information to identify a record file 56$a$ which meets the search criteria, and (a) send the identified record file to the UE 100 for download or (b) stream the identified record file to the UE 100 for instant play back (S124$f$). For example, when the search criteria includes time, the Internet server 200 may identify a record file 56$a$ which is associated with the duration 56$c$ in which the specified time is present. For example, when the search criteria includes the identity of a UE 100, the Internet server 200 may identify a record file 56$a$ which is associated with the specified identity as one of participants 56$b$.

In another aspect of the record file request at the step S124$d$, the UE 100 may automatically generate search criteria including the identity (e.g., UE ID) of the requester UE 100 to automatically send the record file request message including search criteria information indicative of the search criteria, so that the Internet server 200 may identify a record file 56$a$ which is associated with the identity indicated by the search criteria information as one of participants 56$b$.

Figure 12F:
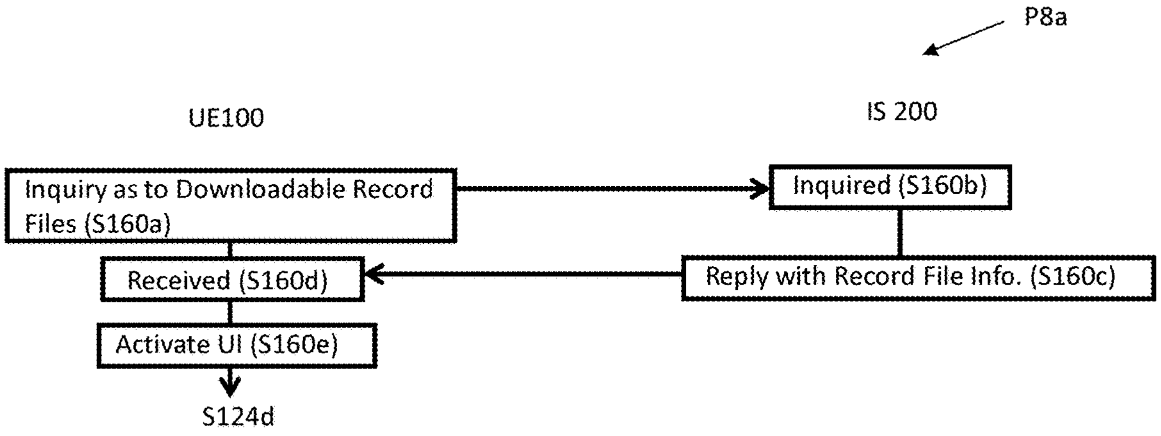
FIG. 12F is a flowchart illustrating an example of a process for activating a user interface (UI) on a UE for a local real-time audio communication, according to some embodiments.
Figure 12G:
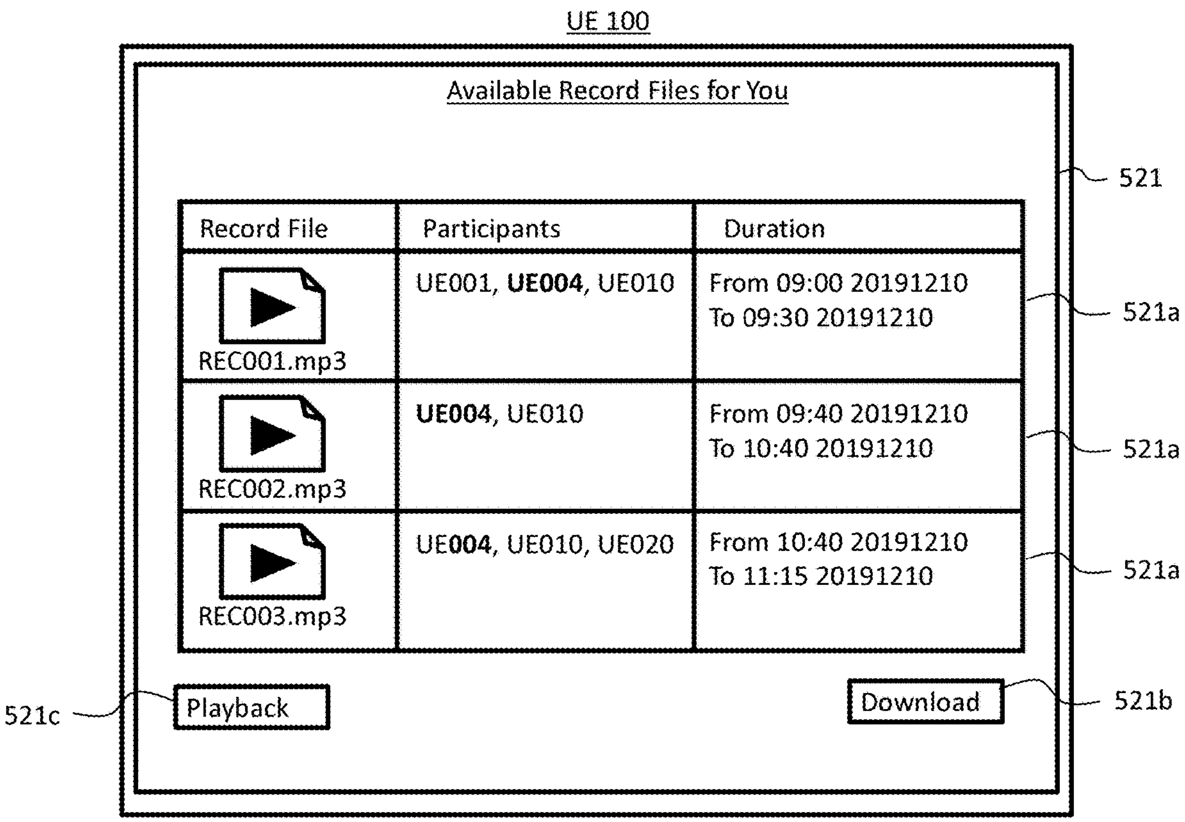
FIG. 12G schematically illustrates an example of a GUI displayed on a UE for playback or download of a record file as record of a local real-time audio communication, according to some embodiments.

In yet another aspect of the record file request at the step S124$d$, the UE 100 may present one or more available record files on a UI through which to receive a user selection of a record file to issue the record file request message for download or streaming of the selected record file. FIG. 12F is a flowchart illustrating an example of process P8$a$ for the activation of the UI, according to some embodiments. In the aspect, in activating or displaying the UI on the UE 100, the UE 100 may issue an inquiry message to the Internet server 200 as to available record files, namely, record files which the UE 100 is allowed to download or receive streaming of (S160$a$). In response to the inquiry message (S160$b$), the Internet server 200 may identify one or more record files 56$a$ on the database 56 which are available (downloadable or playable) to the inquirer UE 100 to generate a reply message with record file information indicative of the identified record files, and then send the reply message to the UE 100 (S160$c$). In response to the reply message (S160$d$), the UE 100 may activate the UI that presents the one or more available record files for selection with reference to the record file information (S160$e$). At the step S160$a$, the inquiry message may include the identity (e.g., UE ID) of the inquirer UE 100, in which case the Internet server 200 may identify one or more record files 56$a$ which are associated with the identity as one of participants 56$b$ on the database 56 at the step S160$c$. FIG. 12G schematically illustrates an example of a GUI 521 displayed on the UE 100 according to the process P8$a$, according to some embodiments. The GUI 521 may include presentation of one or more selectable icons 521$a$ associated with respective one or more available record files indicated by the received record file information. FIG. 12G illustrates an example where GUI 521 is displayed on the UE 100 identified by UE004 with reference to the record file information generated by the Internet server 200 in reply to the inquiry message that includes UE004, and so the GUI 521 is presenting three icons 521$a$ for record files "REC001.mp3", "REC002.mp3", and "REC003.mp3" associated with UE004 (highlighted), namely, available to the UE004. A user selection of one of the icons 521$a$ may invoke selection of a corresponding record file for download or streaming. The GUI 507 may also include a selectable GUI element 521$b$ for request for download and a selectable GUI element 521$c$ for request for streaming. A user selection of the GUI element 521$b$ may invoke issuance of the record file request message for download of the selected record file, causing the Internet server 200 to send the selected record file to the UE 100 in order for the UE 100 to download and store therein the record file (S124$d$-S124$g$). On the other hand, a user selection of the GUI element 521$c$ may invoke issuance of the record file request message for streaming of the selected record file, causing the Internet server 200 to stream the selected record file to the UE 100 in order for the UE 100 to instantly play back the streamed record file (S124$d$-S124$g$).

In some embodiments, the local real-time audio communication service (MEC service) may be provided to UEs 100 in a local service group formed according to the process P6$a$ or P6$b$ as discussed above. In the embodiments, the attribute information may be sent by the UE 100 to the MEC server 300 along with transmission of the local service group ID and/or password (S140$a$), so that the database 52 and database 55 may be concurrently generated and stored on the MEC server 300. The participants 55$a$ on the database 55 are consistent with the participants 52$c$ on the database 52, and therefore the databases 55 and 52 maybe integrated or united into a single database. In the embodiments, a local real-time communication is provided among UEs 100 belonging to the same local service group. At the step S114*b*, the MEC server 300 may route audio streams originating from at least one source UE 100 to at least one destination UE 100 in the same local service group for closed local communication between the UEs 100 in the same local service group. Similarly, at the step S115*a*, the MEC server 300 may notify the UE ID of at least one destination UE 100 to at least one source UE 100 in the same local service group, and vice versa, for closed local peer-to-peer communication between the UEs 100 in the same local service group. In the embodiments, the communication recording service (Internet service) involves recording of local communications performed between the UEs 100 per local service group. Namely, in the communication recording service, the Internet server 200 may record audio streams communicated among UEs 100 in the same local service group into a record file, so as to store therein and manage separate record files for local communications performed in different local service groups. At the step S124*a*, the MEC server 300 may continuously record the audio streams communicated in a local service group while the local service group is formed. The recording of the audio streams may be automatically synchronized with formation of the local service group. In the embodiments, the MEC server 300 may generate local service group (LSG) information associated with each record file, which is indicative of the local service group within which audio streams communicated has been recorded into the record file. The MEC server 300 may send the LSG information along with the record file and participant information (S124*a*). Specifically, the LSG information may indicate the local service group ID 52*a* and password 52*b* with reference to the database 52. The participants 52*c* on the database 52 are consistent with the participants 55*a* on the database 55, and therefore the participant information may be generated with reference the participants 52*c* instead of the participants 55*a*, in the embodiments. The Internet server 200 may store therein and manage the received record file associated with the local service group with reference to the LSG information, on the database 56 (S124*c*). In the embodiments, in an aspect, the UE 100 may prompt the user to enter the identify of a local service group to request for a record file associated with the local service group, so that the download/streaming request message includes search criteria information indicative of the entered local service group identity (S124*d*). The identity of a local service group may include the local service group ID and password of the local service group. In the aspect, the Internet server 200 may identify a record file which is associated with the local service group indicated by the search criteria information, to provide download or streaming of the identified record file by the UE 100 (S124*f*). Specifically, the Internet server 200 may identify a record file associated with the local service group ID and/or password which are indicated by the search criteria information.

Figures 12H, 12I, 12J:
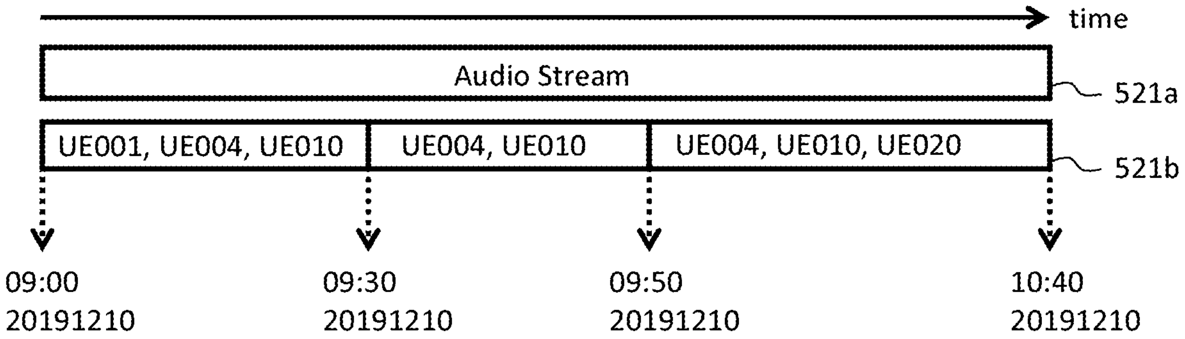
FIG. 12H schematically illustrates an exemplary situation where UEs participating in a local real-time audio communication change during the ongoing local real-time audio communication, according to some embodiments.
FIG. 12I schematically illustrates an example of a database for management of a record file as record of a local real-time audio communication associated with the local service group in which the local-real-time audio communication has been performed, according to some embodiments.
FIG. 12J schematically illustrates an example of a database for management of record files as record of a local real-time audio communication associated with the local service group in which the local-real-time audio communication has been performed, according to some embodiments.

In an aspect, at the step S124*a*, the MEC server 300 may initiate creation of a record file for a local service group in response to formation of the local service group, and finalize the creation in response to dismissal of the local service group (i.e., deletion of the local service group as a result of logoff of all of the UEs 100 from the local service group). In the aspect, the MEC server 300 may generate a single record file for communication in a local service group while the local service group is established, without regard to any increase or decrease of participating UEs 100 in the local service group. In the aspect, the Internet server 200 may store the record file associated with successive participating UEs 100 with reference to the participant information, on the database 56. Assume an illustrative situation where: a local service group (LSG002) had been formed by three UEs 100 (UE001, UE004, UE010) logging in to the local service group (LSG002) for them to start communication of recordable audio streams at 9:00 am on Dec. 10, 2019; one UE 100 (UE001) of them had left (logged off from) the local service group (LSG002) at 9:30 am on Dec. 10, 2019; one UE 100 (UE020) newly participated in (logged in to) the local service group (LSG002) at 9:50 am on Dec. 10, 2019; and then finally the local service group (LSG002) was dismissed by every UE 100 (UE004, UE010, UE020) logging off from the local service group (LSG002) at 10:40 am on Dec. 10, 2019, as illustrated in FIG. 12H. In this situation, the MEC server 300 may initiate creation of a record file associated with the local service group LSG002 at 9:00 am, and finalize the creation at 10:40 am into a single record file (REC001.mp3), without regard to changes of participating UEs 100 at 9:30 and 9:50 (S124*a*). On the database 56, the record file (REC001.mp3) 56*a* may be associated with the local service group (LSG002) 56*d*, password 56*e* set for LSG002, duration 56*c* from the time of formation of LSG002 to the time of dismissal of LSG002, and successive participants 56*b* (UE001, UE004, UE010, UE020) with reference to the participant information received in the duration 56*c*, as illustrated in FIG. 12I.

In another aspect, at the step S124*a*, the MEC server 300 may finalize creation of a record file for a local service group in response to change (increase or decrease) of participating UEs 100 as a result of login of a new UE 100 into the local service group or logoff of a UE 100 from the local service group (S124*a*). In the aspect, separate record files may be generated for communication in a single local service group, each of which is newly generated in response to change of participating UEs 100 in the local service group. Assume the illustrative situation of FIG. 12H again. In this situation, the MEC server 300 may initiate creation of a record file associated with the local service group LSG002 at 9:00 am and finalize the creation at 9:30 into a first record file (REC001.mp3). Then, the MEC server 300 may initiate creation of another record file associated with LSG002 at 9:30 am and finalize the creation at 9:50 into a second record file (REC002.mp3). Finally, the MEC server 300 may initiate creation of yet another record file associated with LSG002 at 9:50 am and finalize the creation at 10:40 into a third record file (REC003.mp3). On the database 56, the separately-generated record files (REC001.mp3, REC002.mp3, REC003.mp3) 56*a* may be associated with the local service group (LSG002) 56*d*, password 56*e* set for LSG002, their respective durations 56*c* each of which has fixed or constant participating UEs 100, and their respective participants 56*b* with reference to the participant information received in the respective durations 56*c*, as illustrated in FIG. 12J.

Figure 12K:
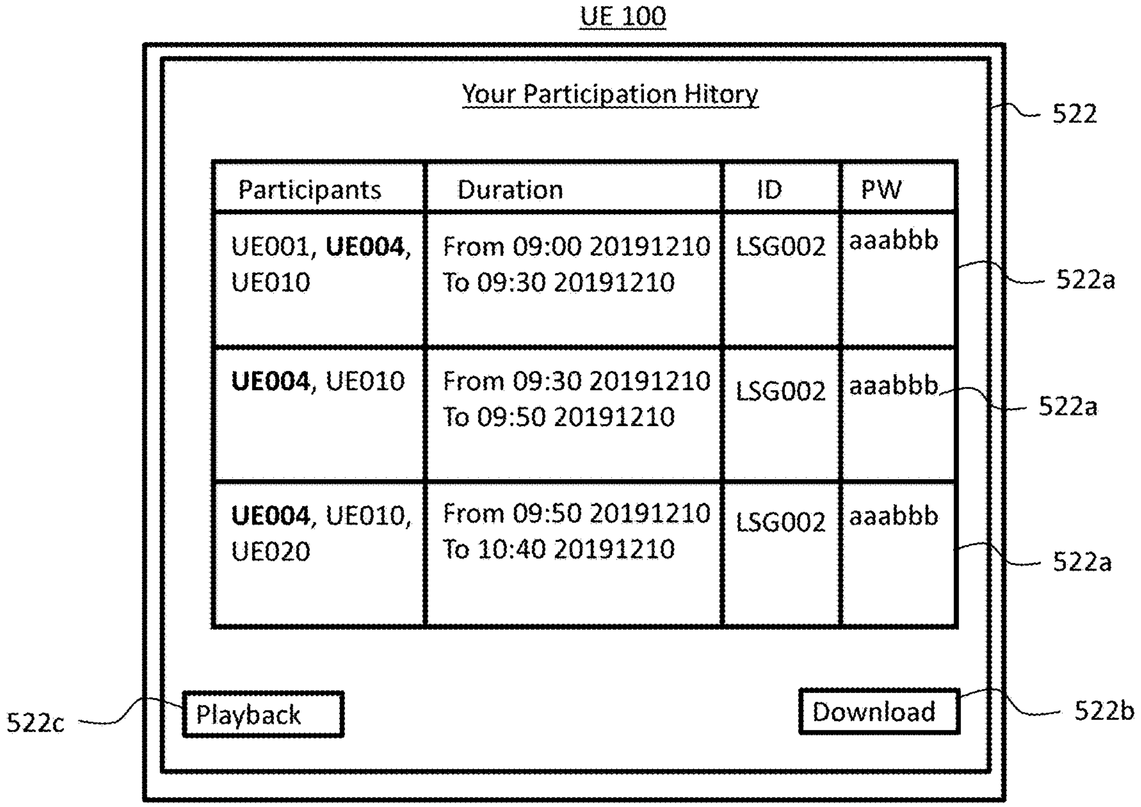
FIG. 12K schematically illustrates an example of a GUI displayed on a UE for playback or download of a record file as record of a local real-time audio communication, according to some embodiments.

In the embodiments, in an aspect of the record file request at the step S124*d*, the UE 100 may present the participation history generated as record of participation in local service group(s) 600 at the step S1400, on a UI through which to receive a user selection of a participation record to issue the record file request message for download or streaming of a record file associated with the selected participation record. FIG. 12K schematically illustrates an example of a GUI 522 for presentation of the participation history, according to some embodiments. The GUI 522 may include presentation of one or more participation records 522*a* of the participation history in a selectable form, allowing the user to select one of the participation records 522*a*. FIG. 12K illustrates an example where the GUI 522 is presenting three participation records 522*a* associated with the UE 100 identified by UE004 with reference to the participation history stored thereon. A user selection of one of the participation records 522*a* may invoke selection of a corresponding record file for download or streaming. The GUI 522 may also include a selectable GUI element 522*b* for request for download and a selectable GUI element 522*c* for request for streaming. A user selection of the GUI element 522*b* may invoke issuance of the record file request message for download of a record file associated with the selected participation record, causing the Internet server 200 to send the corresponding record file to the UE 100 in order for the UE 100 to download and store therein the record file (S124*d*-S124*g*). On the other hand, a user selection of the GUI element 522*c* may invoke issuance of the record file request message for streaming of a record file associated with the selected participation record, causing the Internet server 200 to stream the corresponding record file to the UE 100 in order for the UE 100 to instantly play back the record file (S124*d*-S124*g*). The record file request message may include search criteria information indicative of the selected participation record, such as the local service group ID and password of the local service group, participants, and duration indicated by the selected participation record (S124*d*), so that the Internet server 200 may identify a record file associated with the local service group ID, password, participants, and/or duration indicated by the search criteria information for the download or streaming (S124*f*).

In some embodiments, the real-time audio communication service may be provision of a two-way audio communication system among the users of flexible source/destination UEs 100 (e.g., smartphone 100, tablet 100, etc.) in a full-duplex or half-duplex manner under control of the MEC server 300 or Internet server 200. In the two-way audio communication system, each UE 100 may be a flexible source/destination UE 100 that operates as both of the source UE 100 and destination UE 100, comprising both of a microphone for audio input and a loudspeaker for audio output. An audio stream generated based on sound provided through the audio input may be sent out by the UE 100 over a local connection (S114*a*, S115*d*) or over an Internet connection (S122*a*, S123*d*). An audio stream originating from another UE 100 may be received and played back by the UE 100 over a local connection (S114*d*, S115*f*) or over an Internet connection (S122*d*, S123*f*) for output of sound through the loudspeaker. An detailed implementation of the two-way audio communication system may be a system for voice call, voice chat, teleconference, etc. for talk, conversation, conference, etc. among the users, in which case the record file generated in the communication recording service (Internet service) may be a record or log of the talk, conversation, conference, etc. performed among the users of the UEs 100.

Figure 12L:
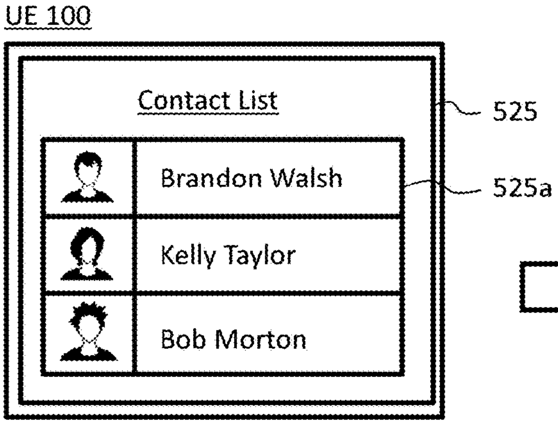
FIG. 12L schematically illustrates an example of a GUI associated with an address book or contact list that is displayed on a UE for making a call to a contact through initiation of one of a local real-time audio communication and wide-area real-time audio communication, according to some embodiments.
Figure 12M:
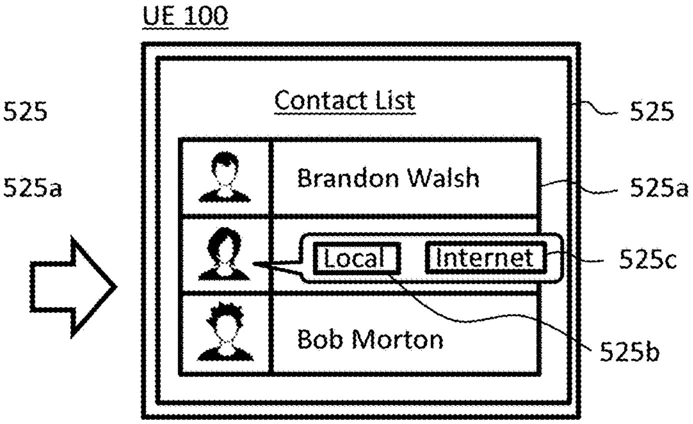
FIG. 12M schematically illustrates an example of a GUI associated with an address book or contact list that is displayed on a UE for making a call to a contact through initiation of one of a local real-time audio communication and wide-area real-time audio communication, according to some embodiments.
Figure 12N:
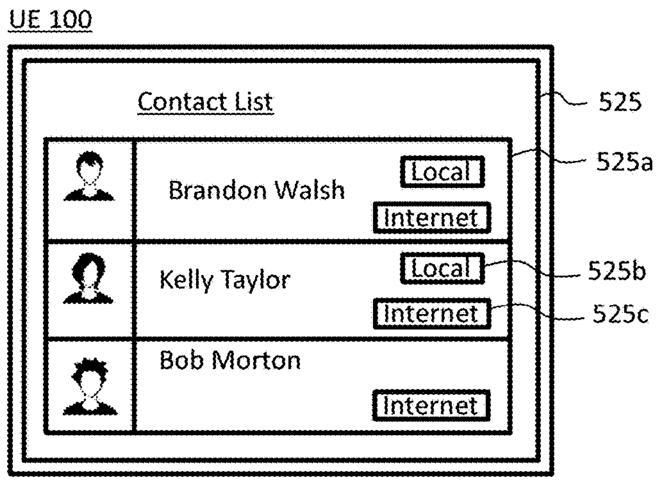
FIG. 12N schematically illustrates an example of a GUI associated with an address book or contact list that is displayed on a UE for making a call to a contact through initiation of one of a local real-time audio communication and wide-area real-time audio communication, according to some embodiments.

In the two-way audio communication, the local real-time audio communication service by the MEC server 300 and the wide-area real-time audio communication service by the Internet server 200 may be switched between one another in response to a user selection by a user of the UE 100 when the user calls his/her contact. In the embodiments, the UE 100 may provide a UI for calling that prompts the user to selectively invoke one of the local real-time audio communication and wide-area real-time audio communication. FIG. 12L schematically illustrates an example of a GUI 525 associated with an address book or contact list that is displayed on the UE 100 for making a call to a contact through initiation of one of the local real-time audio communication and wide-area real-time audio communication. The GUI 525 may include presentation of one or more contacts, e.g., persons or entities who or which the user has private or business connection with for communication, with reference to a contact list or address book stored on the UE 100. Contact information such as the name, contact picture, phone number, email address, etc. per contact may be organized in the contact list, so that each contact may be presented by use of a contact icon 525*a* indicative of the contact information associated with the contact, such as the contact picture and name of the contact as illustrated in FIG. 12L. In the example illustrated in FIG. 12L, three contacts (Brandon Walsh, Kelly Taylor, and Bob Morton) are presented in the GUI 525. The GUI 525 may prompt the user to selectively invoke one of the local real-time audio communication and wide-area real-time audio communication for calling by, for example, displaying separate icons 525*b* and 525*c* respectively associated with the local real-time audio communication and wide-area real-time audio communication for a user selection of one of the icons, as illustrated in FIGS. 12M and 12N. The icons 525*b* and 525*c* may be displayed for a selected contact in response to a user selection of the contact through the corresponding contact icon 525*a*, as illustrated in FIG. 12M. Alternatively, the icons 525*b* and 525*c* may be displayed for each contact in the contact list, as illustrated in FIG. 12N. A user selection of the icon 525*b* may cause the UE 100 to issue a request message to the MEC server 300 over a local connection for calling to a callee (the selected contact) via the local real-time audio communication, so that the MEC server 300 may respond to the request message by causing the caller UE 100 and callee UE 100 to communicate with one another over the local real-time audio communication (S114*a*-S114*d*, S115*a*-S115*f*). On the other hand, a user selection of the icon 525*c* may cause the UE 100 to issue a request message to the Internet server 200 over the Internet 3 for calling to the callee via the wide-area real-time audio communication, so that the Internet server 200 may respond to the request message by causing the caller UE 100 and callee UE 100 to communicate with one another over the wide-area real-time audio communication (S122*a*-S122*d*, S123*a*-S123*f*).

For the enjoyment of the local real-time audio communication service, it is necessary for both of the caller UE 100 and callee UE 100 to be in the edge site ES associated with the same MEC server 300, i.e., to have discovered and connected to the same MEC server 300 under control which the local real-time audio communication can be performed. Hence, the GUI 525 may allow the user to select the icon 525*b* for the local real-time audio communication only when it is determined that both of the caller UE 100 and callee UE 100 are connected to the same MEC server 300.

Figure 12O:
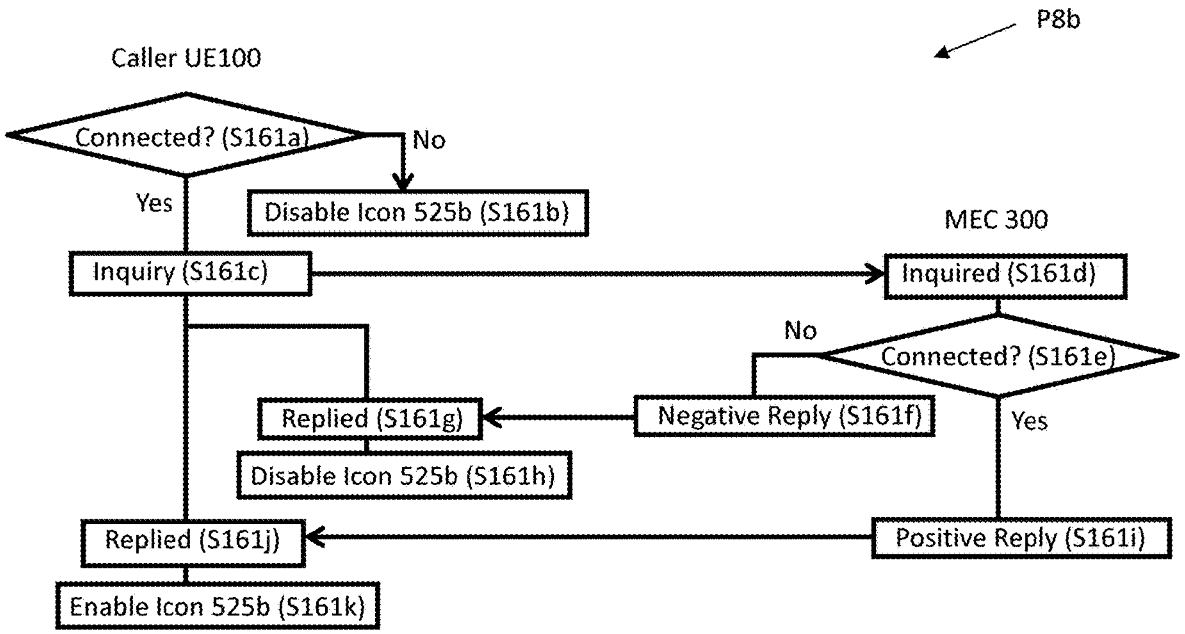
FIG. 12O is a flowchart illustrating an example of a process for conditionally prohibiting initiation of a local real-time audio communication, according to some embodiments.

In an aspect, a user selection of the icon 525*b* associated with a selected contact (callee UE 100) may be prohibited or prevented when it is determined that at least one of the caller UE 100 and callee UE 100 is not connected to the MEC server 300. FIG. 12O is a flowchart illustrating an example of a process P8*b* for the conditional prohibition of a user selection of the icon 525*b*, according to some embodiments. The process P8*b* may commence in response to a user selection of a contact through a corresponding contact icon 525*a*. In response to the user selection, the UE 100 (caller UE 100) may determine if the UE 100 itself is connected to a MEC server 300 (S161*a*). The determination at the step S161*a* may be affirmative when the UE 100 has discovered and connected with a MEC server 300 according to the process P2*a*, P2*b*, P2*c*, or P2*d*. Upon determining that the UE 100 is no connection with a MEC server 300 (S161*a*: No), the UE 100 may disable display of the icon 525*b*

(S161*b*). At the step S161*b*, the UE 100 may fail to display the icon 525*b*, with only the icon 525*c* being displayed in connection with the selected contact icon 525*a*. Upon determining that the caller UE 100 is connected to a MEC server 300 over a local connection (S161*a*: Yes), the UE 100 may then issue an inquiry message to the MEC server 300 over the local connection, to ask if the selected contact (callee UE 100) is connected to the MEC server 300 (S161*c*). The inquiry message issued at the step S161*c* may include the identifier of the selected contact (callee UE 100). In response to the inquiry message (S161*d*), the MEC server 300 may determine if the selected contact (caller UE 100) is connected to the MEC server 300 (S161*e*). At the step S161*e*, the MEC server 300 may determine if there is the UE ID of the callee UE 100 which matches the identifier of the selected contact in the database 55, in which case the determination at the step S161*e* may be affirmative if there is the UE ID of the callee UE 100 in the database 55. Upon determining that the callee UE 100 is not connected to the MEC server 300 over a local connection (S161*e*: No), the MEC server 300 may issue a negative reply message indicative of that the selected contact cannot communicate via the local real-time audio communication, to the caller UE 100 (S161*f*). In response to the negative reply message (S161*g*), the caller UE 100 may disable display of the icon 525*b* (S161*h*) just as it does at the step S161*b*. On the other hand, upon determining that the callee UE 100 is connected to the MEC server 300 (S161*e*: Yes), the MEC server 300 may issue a positive reply message indicative of that the selected contact can communicate via the local real-time audio communication, to the caller UE 100 (S161*i*). In response to the positive reply message (S161*j*), the UE 100 may enable display of the icon 525*b* with the icon 525*c* in connection with the selected contact icon 525*a* (S161*k*), as illustrated in FIG. 12M. In the example illustrated in FIG. 12M, the icon 525*b* is displayed in connection with the contact icon 525*a* for a contact "Kelly Taylor" in response to a user selection of the Kelly's contact icon 525*a*, since Kelly's UE 100 is determined to be connected to the MEC server 300.

Figure 12P:
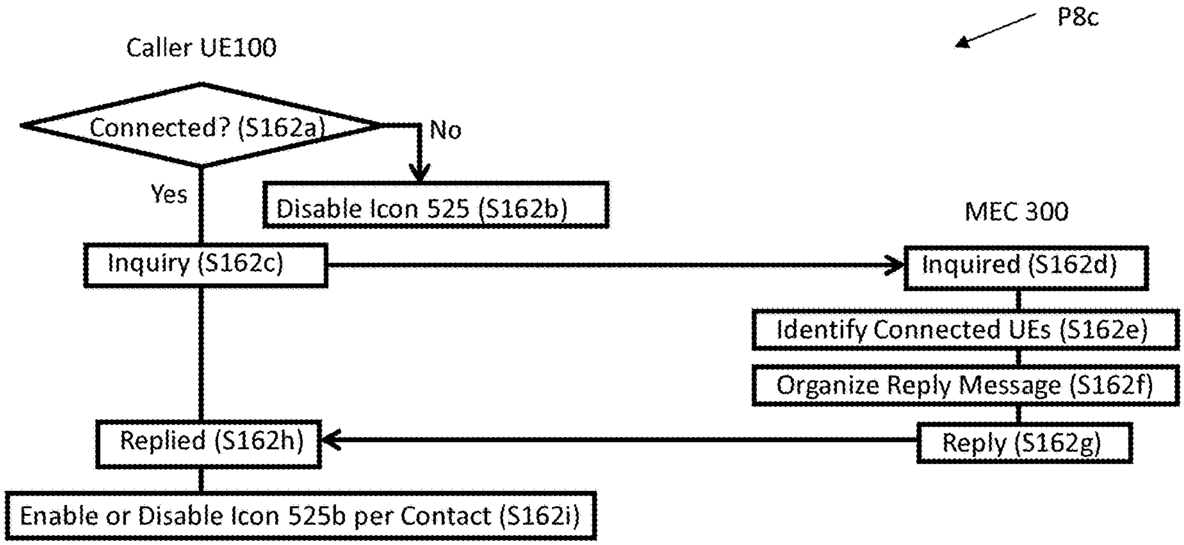
FIG. 12P is a flowchart illustrating an example of a process for conditionally allowing initiation of a local real-time audio communication, according to some embodiments.

In another aspect, the icon 525*b* may be conditionally displayed in connection with each contact icon 525*a* depending on whether a local real-time audio communication is available with a corresponding contact. FIG. 12P is a flowchart illustrating an example of a process P8*c* for the conditional display of the icon 525*b*, according to some embodiments. The process P8*c* may commence in launching and displaying the contact list. In the process P8*c*, the UE 100 (caller UE 100) may determine if the UE 100 itself is connected to a MEC server 300 (S162*a*), just as it does at the step S161*a* in the process P8*b*. Upon determining that the UE 100 is not connected to the MEC server 300 (S162*a*: No), the UE 100 may disable display of the icon 525*b* for every contact icon 525*a* (S162*b*), because the caller UE 100 could not make a call to any contact via a local real-time audio communication service. Upon determining that the UE 100 is connected to a MEC server 300 over a local connection (S162*a*: Yes), the UE 100 may issue an inquiry message to the MEC server 300 over the local connection, to ask if the contacts in the contact list are connected to the MEC server 300 (S162*c*). The inquiry message issued at the step S162*c* may include the identifiers of the respective contacts (potential callees). In response to the inquiry message (S162*d*), the MEC server 300 may identify one or more UEs 100 which are connected to the MEC server 300, e.g., with reference to the database 55 (S162*e*), and organize information indicative of the identified UEs 100 into a reply message (S162*f*). The reply message may include the identifier such as UE ID of each UE 100. The MEC server 300 may then issue the reply message to the UE 100 over the local connection (S162*g*). In response to the reply message (S162*h*), the UE 100 may enable or disable display of the icon 525*b* in connection with each contact icon 525*a* depending on whether a corresponding contact is indicated in the reply message, with reference to the reply message (S162*i*). At the step S162*i*, the icon 525*b* may be displayed in connection with a contact icon 525*a* for a contact which is indicated in the reply message, whereas the icon 525*b* may not be displayed in connection with a contact icon 525*a* for a contact which is not indicated in the reply message. In the example illustrated in FIG. 12N, the icon 525*b* is displayed in connection with contact icons 525*a* for two contacts "Brandon Walsh" and "Kelly Taylor" since the Brandon's UE 100 and Kelly's UE 100 are indicated as being a UE 100 connected to the MEC server 300 in the reply message, whereas the icon 525*b* is not displayed in connection with a contact icon 525*a* for one contact "Bob Morton" since Bob's UE 100 is not so indicated in the reply message.

The process P8*b* may be modified in that the UE 100 may automatically initiate a local real-time audio communication for making a call to the selected contact instead of displaying the icon 525*b*, in response to the positive reply message (S161*k*), and that on the other hand, the UE 100 may automatically initiate a wide-area real-time audio communication for making a call to the selected contact instead of displaying only the icon 525*c* without the icon 525*b*, in response to the native reply message (S161*b*, S161*h*). This modification may be proactive in advance to a potential user selection of the icon 525*b* or icon 525*c*.

The process P8*c* may be modified in that the steps S162*a* to S162*h* are performed regularly or periodically when the UE 100 is in operation, so that the reply message is stored on the UE 100 in preparation to launch of the contact list. In this modification, the enablement or disablement of the icon 525*b* per contact at the step S162*i* may be performed with reference to the stored reply message in response to launch and display of the contact list.

In some embodiments, the real-time audio communication service may be provision of a one-way audio communication system for communication of audio streams from at least one source UE 100 to at least one destination UE 100 under control of the MEC server 300 or Internet server 200. In the one-way audio communication system, each UE 100 may be set to be one of (a) the source UE 100 comprising an audio input such as a microphone and (b) the destination UE 100 comprising an audio output such as a loudspeaker. An audio stream generated based on sound provided through the audio input may be sent out by the source UE 100 over a local connection (S114*a*, S115*d*) or over an Internet connection (S122*a*, S123*d*). An audio stream originating from the source UE 100 may be received and played back by the destination UE 100 over a local connection (S114*d*, S115*f*) or over an Internet connection (S122*d*, S123*f*) for output of sound through the loudspeaker.

Figure 12Q:
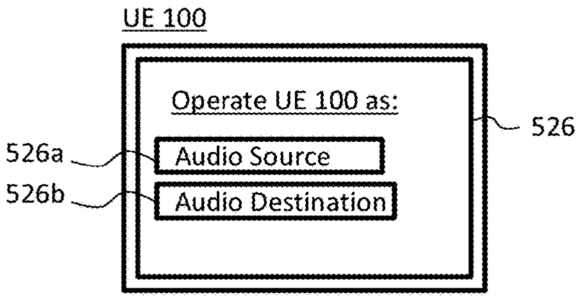
FIG. 12Q schematically illustrates an example of a GUI through which to receive a user selection to set a UE to be one of a source UE and destination UE, according to some embodiments.

When the UE 100 is a flexible source/destination UE 100 comprising both of the audio input and audio output, the UE 100 may be set to be one of the source UE 100 and destination UE 100 in response to a predetermined event associated with the UE 100. In an aspect, when the UE 100 is provided with an audio interface for audio input such as an audio jack that accepts an audio plug in compliance with Open Mobile Terminal Platform (OMTP), Cellular Telephone Industry Association (CTIA), or other standards, the UE 100 may automatically set itself (a) to be a source UE 100 in response to detecting such an audio input device as a microphone being in communication with (e.g., plugged in) the audio interface and/or (b) to be a destination UE 100 in response to deterring such an audio output device as a loudspeaker and headphone being in communication with (e.g., plugged in) the audio interface. In another aspect, the UE 100 may be set to be one of the source UE 100 and destination UE 100 in response to a user selection through a UI on the UE 100. FIG. 12Q schematically illustrates an example of GUI 526 through which to receive a user selection to set the UE 100 to be one of the source UE 100 and destination UE 100, according to some embodiments. The GUI 526 may be displayed on the UE 100 upon participating in a local communication to have the UE 100 registered in the database 55 prior to issuing the notification message to notify the attribute information. Specifically, the GUI 526 may be displayed on the UE 100 after discovering and connecting to the MEC server 300 according to the process P2*a*, P2*b*, P2*c*, or P2*d* before issuing the notification message to notify the attribute information. In a case where the local real-time audio communication is provided in a local service group 600, the GUI 526 may be displayed on the UE 100 upon the UE 100's login to the MEC server 300 for participation into the local service group 600 prior to issuing the notification message to notify the attribute information. The GUI 526 may include a selectable GUI element 526*a* to be selected to set the UE 100 to be a source UE 100 and a selectable GUI element 526*b* to be selected to set the UE 100 to be a destination UE 100. A user selection of the GUI element 526*a* may invoke setting the UE 100 to be a source UE 100 by setting the valuable attribute information to be indicative of a source UE 100, whereas a user selection of the GUI element 526*b* may invoke setting the UE 100 to be a destination UE 100 by setting the valuable attribute information to be indicative of a destination UE 100. Furthermore, the user selection of the GUI element 526*a* may deactivate or turn off the audio output of the UE 100 such as the loudspeaker along with activating or turning on the audio input such as the microphone, since the audio output is supposed to no longer be used while the UE 100 operates as the source UE 100. On the other hand, the user selection of the GUI element 526*b* may deactivate or turn off the audio input of the UE 100 such as the microphone along with activating and turning on the audio output such as the loudspeaker, since the audio input is supposed to no longer be used while the UE 100 operates as the destination UE 100. In the case where the local real-time audio communication is provided in a local service group 600, the GUI 526 may be integrated into the GUI 501 discussed above for login to the MEC server 300, in which case a single GUI for the login (501, 526) may include GUI elements (e.g., 501*a*, 501*b*, 501*c*, 501*d*, 501*e*) for entry of the ID and password along with the GUI elements 526*a* and 526*b*.

A detailed implementation of the one-way audio communication service may be provision of a wireless public address (PA) system or wireless microphone system for communication of audio streams from at least one source UE 100 with a microphone to at least one destination UE 100 with a loudspeaker. The source UE 100 may be a wireless microphone product as a dedicated source UE 100, or a flexible source/destination UE 100 such as a smartphone which is set to operate as the source UE 100. The destination UE 100 may be a wireless loudspeaker product as a dedicated UE 100, or a flexible source/destination UE 100 such as a smartphone which is set to operate as the destination UE 100. In the implementation, the record file generated in the communication recording service (S124*c*) may be a record or log of speech, announcement, etc. performed in the wireless PA system, e.g., as minutes of the speech, announcement, etc.

A detailed implementation of the one-way audio communication service may be provision of live sound reinforcement system, e.g., adapted for use in a recital, concert, session, orchestra, or other music performance environments, for communication of audio streams from at least one source UE 100 of a musician to at least one destination UE 100 with a loudspeaker. The source UE 100 may be one which is provided with a microphone for vocal performance, such as (a) a wireless microphone product as a dedicated source UE 100 and (b) a flexible source/destination UE 100 like a smartphone which is set to operate as the source UE 100. The source UE 100 may be one which is provided with a sound production assembly for instrumental performance, such as (a) an electric or electronic music instrument discussed above as a dedicated UE 100 and (b) a flexible source/destination UE 100 like a smartphone which is set to operate as the source UE 100. The destination UE 100 may be a wireless loudspeaker product as a dedicated UE 100, or a flexible source/destination UE 100 such as a smartphone which is set to operate as the destination UE 100. In the implementation, the record file generated in the communication recording service (S124*c*) may be a music file of music produced from the vocal performance and/or instrumental performance in the music performance environment.

Figure 12R:
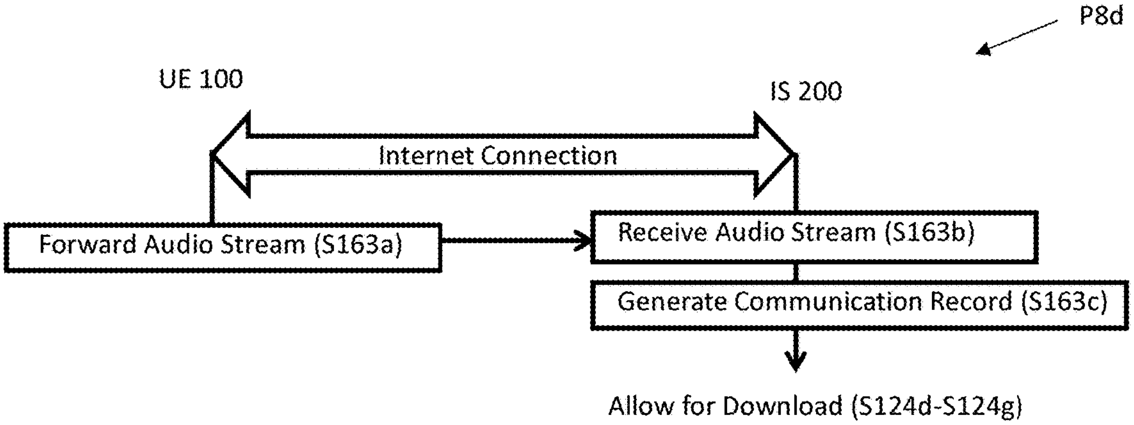
FIG. 12R is a flowchart illustrating an example of a process for a communication recording service between a UE and Internet server, according to some embodiments.

In some modifications to the embodiments, the communication recording service discussed above may be provided directly between each UE 100 and the Internet server 200 over the Internet 3, instead of between the MEC server 300 and Internet server 200 according to the process P4*e*. In the modified embodiments, each UE 100 may send the audio stream destined to the MEC server 300 also to the Internet server 200 over the Internet 3, in parallel to the transmission of the audio stream to the MEC server 300, so that the Internet server 200 may generate and store therein a communication record by recording and organizing received audio streams from respective UEs 100, instead of generating the communication record based on the record files created by the MEC server 300 in the process P4*e* discussed above. FIG. 12R is a flowchart illustrating an example of a process P8*d* for the communication recording service, according to some modified embodiments. In the modified embodiments, each UE 100 may send the audio stream destined to the MEC server 300 also to the Internet server 200 over the Internet 3, in parallel to the transmission of the audio stream to the MEC server 300 (S163*a*). The audio stream sent by each UE 100 at the step S163*a* may include local service group information indicative of the identity (local service group ID) of the local service group to which the UE 100 belongs. In response to receipt of the audio streams from respective UEs 100 (S163*b*), the Internet server 200 may create one or more record files by recording the audio streams received from the respective UEs 100 (S163*c*). At the step S163*c*, the Internet server 200 may make an individual record file by recording together the audio streams received from the respective UEs 100 belonging to the same local service group with reference to the local service group information, so that each of the separately created record files corresponds to a record of local communications performed between UEs 100 in a particular local service group distinctive from others. Each record file may be made in a predetermined format, such as mp3, as discussed above in the process P4*e*. The generation of a record file associated with a particular local service group may be automatically synchronized with communication among UEs 100 in the particular service group. For example, the Internet server 200 may initiate creation of a record file associated with a particular local service group in response to initiation of communication among the UEs 100 in the local service group, and finalize the creation of the record file in response to termination of the communication. The Internet server 200 may initiate creation of a record file associated with a particular local service group in response to login by the first UE 100 to the local service group, and finalize the creation of the record file in response to logoff by the last UE 100 from the particular local service group. The Internet server 200 may create individual record files associated with a particular local service group in response to change (i.e., increase or decrease) of UEs 100 participating in the local service group. A single record file may be created for local communication in a particular service group regardless of change (i.e., increase or decrease) of UEs 100 participating in the local service group, just as "REC001.mp3" illustrated in FIG. 12I. Alternatively, individual record files may be created in response to change of participating UEs 100, for local communication in a particular service group, just as "REC001.mp3", "REC002.mp3", and "REC003.mp3" illustrated in FIG. 12D or 12J. The Internet server 200 may then organize and list the created record files to generate the communication record on a database (S163*c*), just as the database 56 discussed above with reference to FIG. 12E, 12I, or 12J. The Internet server 200 may then provide download or streaming of a record file on the communication record to the UEs 100 over the Internet 3, as discussed above, according to the process P4*e* (S124*d*-S124*g*).

Figure 12S:
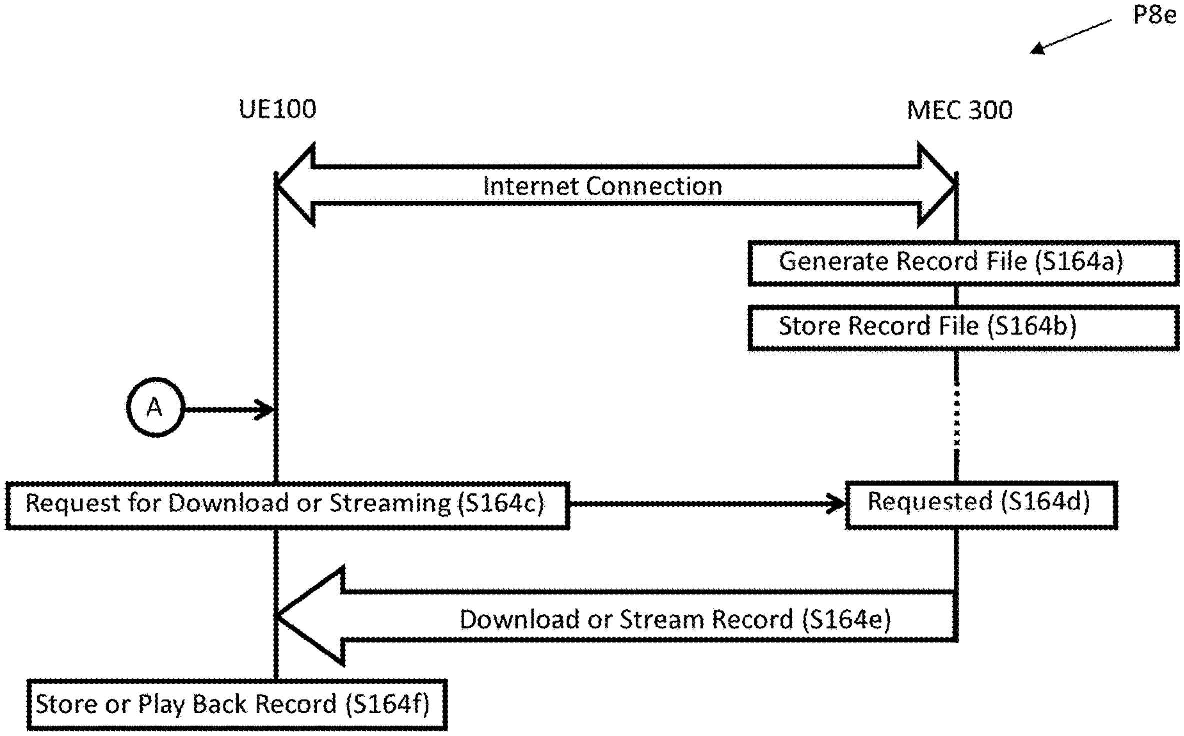
FIG. 12S is a flowchart illustrating an example of a process for provision of download or streaming of a record file from a MEC server to a UE, according to some embodiments.
Figure 12T:
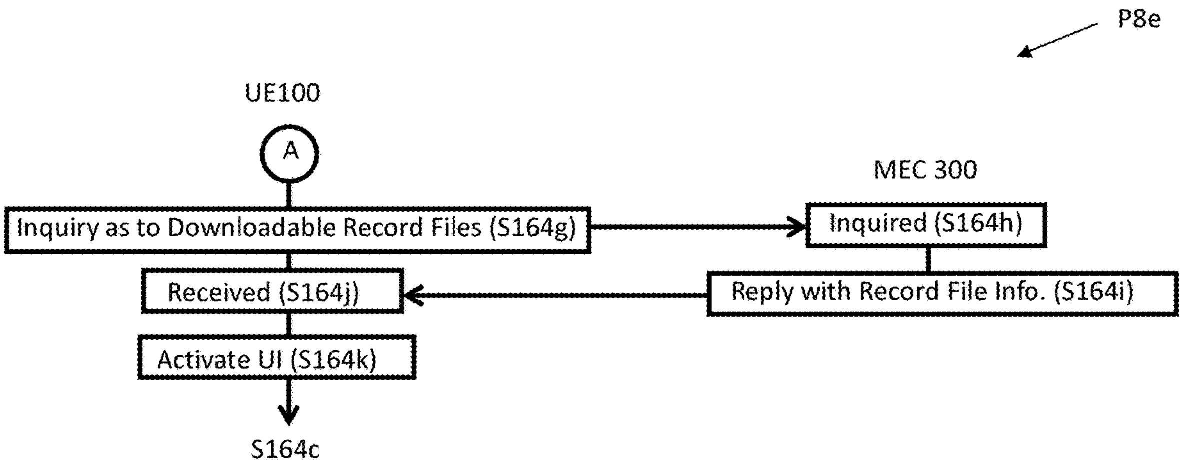
FIG. 12T is a flowchart illustrating an example of a process for provision of download or streaming of a record file from a MEC server to a UE, according to some embodiments.

In some modified embodiments, the MEC server 300 may provide download or streaming of record files stored therein to the UEs 100 over the Internet 3. In the modified embodiments, the MEC server 300 may be accessible by the UEs 100 over the Internet 3 using the global IP address allocated to the MEC server 300 even when the UE 100 is not in the edge site ES, just as the Internet server 200 is accessible by the UEs 100 over the Internet 3 for download or streaming of a record file according to the process P4*e*. In the modified embodiments, each record file associated with a particular local communication between UEs 100 that is generated by the MEC server 300 may be stored in the MEC server to be accessible by the UEs 100 for download or streaming to the UEs 100. FIGS. 12S and 12T are flowcharts illustrating an example of a process P8*e* for provision of download or streaming of a record file from the MEC server 300 to a UE 100, according to some modified embodiments. In the process P8*e*, the MEC server 300 may generate at least one record file by recording the original audio streams which have been routed by the MEC server 300 among the UEs 100 according to the step S114*b* (S164*a*), just as the MEC 300 does at the step S124*a* in the process P4*e*. The MEC server 300 may then store therein the record files as a communication record (S164*b*). At the step S164*b*, the MEC server 300 may organize and list the created record files to generate the communication record on a database, just as the database 56 discussed above with reference to FIG. 12E, 12I, or 12J. In the process P8*e*, the UE 100 may generate and send a record file request message for a record file stored in the MEC server 300 to the MEC server 300, just as it does to the Internet server 200 at the step S124*d* in the process P4*e* (S164*c*). In response to receipt of the file request message (S164*d*), the MEC server 300 may identify and read out the requested record file out of record files stored in the MEC server 300, and then provide download or streaming of the requested record file to the requesting UE 100 over the Internet 3 (S164*e*). The UE 100 may receive streaming of the record file for instant playback, or download and store therein the record file for later playback (S164*f*). In an aspect, the record file request issued at the step S164*c* may be based on a search criteria including time, the identity (UE ID) of a UE 100, etc. entered by a user of a UE 100 through a UI, just as an aspect of the record file request discussed above at the step S124*d* in the process P4*e*. In another aspect, the record file request issued at the step S164*c* may be based on a search criteria including the identity (UE ID) of the requesting UE 100, generated automatically by the requesting UE 100, just as another aspect of the record file request discussed above at the step S124*d* in the process P4*e*. In yet another aspect, the record file request issued at the step S164*c* may be based on a search criteria indicative of a user selection of a record file out of available record files presented by the MEC server 300, just as yet another aspect of the record file request discussed above at the step S124*d* in the process P4*e*. In said yet another aspect, the UE 100 may issue an inquiry message as to available record files to the MEC server 300 over the Internet 3 (S164*g*), just as it does at the step S160*a*, in reply to which the MEC server 300 may send back record file information indicative of one or more available record files (S164*h*, S164*i*), just as the Internet server 200 does at the steps 160*b* and 160*c*. The UE 100 may then activate a UI presenting the one or more available record files to prompt the user to select one of the presented record files (S164*j*, S164*k*), just as the it does at the steps S160*d* and S160*e*, so that the search criteria may be indicative of a particular record file selected through the UI.

In some modified embodiments, in the P4*e*, the MEC server 300 may forward the routed audio streams to the Internet server 200 at the step S124*a* instead of making an audio file (record file) to send the record file to the Internet server 200, so that the record file may be produced on the part of the Internet server 200 at the step S124*c*. In the modified embodiments, in parallel to routing audio streams at the step S114*b* in the process P3*b*, the MEC server 300 may forward the audio streams to the Internet server 200 over the Internet 3 (S124*a*). At the step S124*a*, the MEC server 300 may downgrade the routed audio streams in the quality (e.g., the sampling rate, frame rate, bit depth, bit rate, etc.) adapted for transmission over the Internet 3, and forward the downgraded audio streams to the Internet server 200 (S124*a*). Then, in response to receipt of the forwarded audio streams (S124*b*), the Internet server 200 may make a record file from the audio streams and store therein the record file (S124*c*) for playback, streaming, and/or download thereof (S124*d*-S124*h*). At the step S124*c*, the Internet server 200 may make the record file just as the MEC server 300 does at the step S124*a* discussed above with reference to FIGS. 12D, 12E, 12H, 12I, and 12J. The forwarded audio streams 520*a* may be associated with the participant information 520*b*, so that the Internet server 200 may produce the record files "REC001.mp3", "REC002.mp3", and "REC003.mp3" from the audio streams 520*a* as illustrated in FIG. 12E (S124*c*). The forwarded audio streams 521*a* may be associated with the participant information 521*b*, so that the Internet server 200 may produce the single record file "REC001.mp3" (as illustrated in FIG. 12I) or multiple record files "REC001.mp3", "REC002.mp3", and "REC003.mp3" (as illustrated in FIG. 12J) from the audio streams 521*a* (S124*c*). In the modified embodiments, the Internet server 200 may organize and store the produced record files on the database 56 for playback, streaming, and/or download thereof (S124*d*-S124*h*).

Figure 12U:
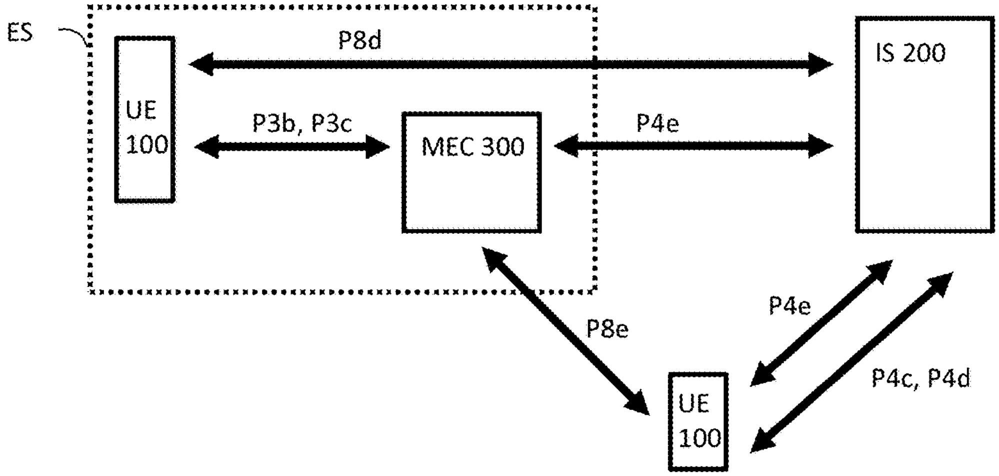
FIG. 12U schematically illustrates a summary of complex communications in a local real-time audio communication system, according to some embodiments.

The summary of the UE-to-UE real-time audio communication system according to the embodiments discussed above is described blow with reference to FIG. 12U. The audio streams may be routed between the UEs 100 in the edge site ES under control of the MEC server 300 in the process P3*b* or P3*c*. In parallel to the routing of the audio streams in the process P3*b* or P3*c*, the audio streams may be recorded into a record file in the process P4*e* or P8*e*, so that the record file stored om the Internet server 200 can be downloaded or streamed from the Internet server 200 to the UE 100 in the process P4*e* or the record file stored on the MEC server 300 can be downloaded or streamed from the MEC server 300 to the UE 100 in the process P8*e*. In parallel to the routing of the audio streams in the process P3*b* or P3*c*, the audio streams may be sent also to the Internet server 200 from the UEs 100 in the edge site ES in the process P8*d*, so that the audio streams may be received and recorded into a record file in the process P8*d* for download or streaming to the UE 100 in the process P4*e*. The routing of the audio streams under control of the MEC server 300 in the process P3*b* or P3*c* may be handed over to and from routing of the audio streams under control of the Internet server 200 in the process P4*c* or P4*d*. Advantageously, audio communication between the UEs 100 sensitive to latency may be offloaded on the MEC server 300 when the UEs 100 are in the edge site ES. Advantageously, the audio communication between the UEs 100 may be continued seamlessly via the Internet server 200, even with higher latency than the audio communication offloaded on the MEC server 300, when at least part of the UEs 100 go out of the edge site ES. Advantageously, the audio communication between the UEs 100 may be seamlessly offloaded on the MEC server 300, with lower latency than the audio communication via the Internet server 200, when the UEs 100 come in the edge site ES. Advantageously, a record of the edge-based offloaded audio communication between the UEs 100 in the edge site ES may be automatically generated to be accessible by the UEs 100 after the ongoing audio communication, in parallel to the audio communication.

(UE-to-UE Real-Time Video Communication System)

In some embodiments, the MEC service may be an edge-based local real-time video communication service between the UEs 100 that involves distribution of video stream generated by at least one UE 100 (source UE 100) to other at least one UE 100 (destination UE 100) in the edge site ES over a local connection. The local real-time video communication may be performed under control of the MEC server 300 in the edge site ES according to the process P3*b* or P3*c*. In connection with the local real-time video communication service, the Internet service may include a communication recording service that involves recording of local communications performed between the UEs 100 in the local real-time video communication. The communication recording service may be performed according to the process P4*e*.

Figure 13A:
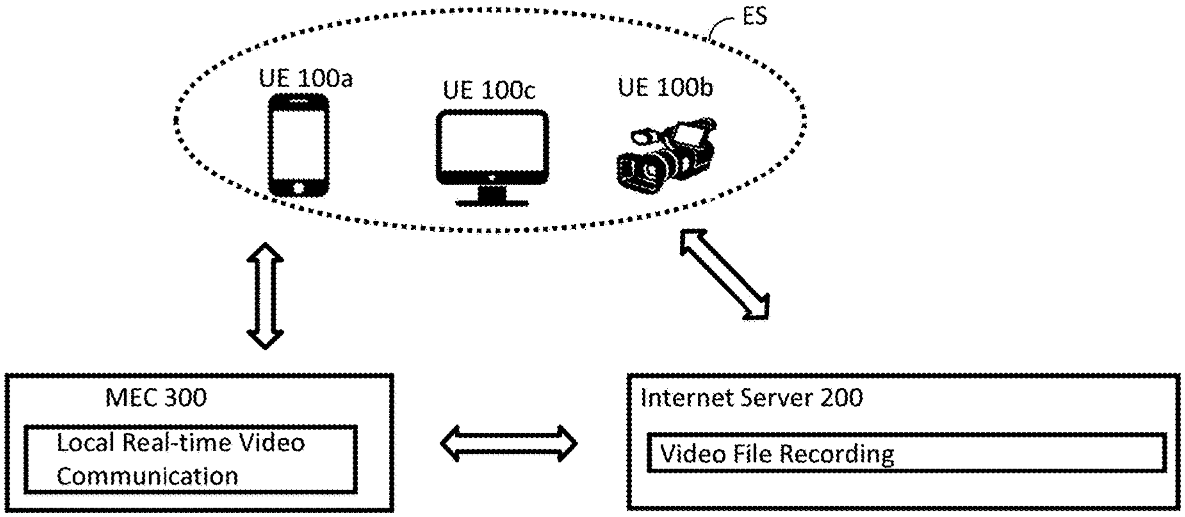
FIG. 13A schematically illustrates an example of a system for providing a MEC service (local real-time video communication service) and an Internet service (communication recording service), according to some embodiments.

FIG. 13A schematically illustrates an example of a system for providing the MEC service (local real-time video communication service) and the Internet service (communication recording service), according to some embodiments. The system may include at least one source UE 100 and at least one destination UE 100. The source UE 100 may be defined herein to be a UE 100 operative as a source of a video stream, whereas the destination UE 100 may be defined herein to be a UE 100 operative as a recipient of the video stream originating from the source UE 100. Each source UE 100 may be provided with a camera for capturing images based on which to generate and output a video stream for transmission at the step S114*a* in the process P3*b* or at the step S115*d* in the process P3*c*. Each destination UE 100 may be provided with a video output such as a display for output of video produced as a result of playback of the received video stream. Each UE 100 may be a dedicated source UE 100 that is preliminarily configured or designed to be operative as the source UE 100, not the destination UE 100. Each UE 100 may be a dedicated destination UE 100 that is preliminarily configured or designed to be operative as the destination UE 100, not the source UE 100. Each UE 100 may be a flexible source/destination UE 100 that can be flexibly or selective operative as one of the source UE 100 and destination UE 100 according to a predetermined condition.

An example of the dedicated source UE 100 may be a camera product that comprises a camera with which to take images into a video signal and a processor configured to generate a video stream based on the video signal. The camera product may be a fixed one which is installed on a given filming position, or may be a mobile or portable one which can be carried by a user over various filming positions. The camera product may be a surveillance camera or security camera for surveillance of people or other objects in the edge site ES. The camera product may be a broadcasting camera for broadcasting of an event such as a sports game, music concert, etc. performed in the edge site ES.

An example of the dedicated destination UE 100 may be a display product that is provided with a display on which video is displayed as a result of playback of a video stream originating from the source UE 100.

An example of the flexible source/destination UE 100 may be a computing device for personal use, industrial use, educational use, etc. such as a smartphone, tablet, personal computer, laptop, etc. that comprises both of a camera and display as well as a processor configured to: (a) generate a video stream based on moving images captured by the camera for transmission when the flexible source/destination UE 100 is in operation as the source UE 100, and to (b) play back an incoming video stream originating from the source UE 100 for output of video on the display when the flexible source/destination UE 100 is in operation as the destination UE 100. The flexible source/destination UE 100 may switch between a first mode of operation where the UE 100 operates as the source UE 100 and a second mode of operation where the UE 100 operates as the destination UE 100 manually in response to a user input on a UI or automatically in response to a predetermined event associated with the UE 100. For example, the UE 100 may switch between the first mode and second mode automatically depending on whether the camera of the UE 100 is in operation. Specifically, the UE 100 may set itself to operate as the source UE 100 in the first mode automatically in response to launching or activating the camera of the UE 100, whereas the UE 100 may set itself to operate as the destination UE 100 in the second mode automatically in response to terminating or deactivating the camera.

In the example illustrated in FIG. 13A, the system includes smartphone 100*a* as a flexible source/destination UE 100*a*, camera product 100*b* as a dedicated source UE 100, and a display product 100*c* as a dedicated destination UE 100.

In some embodiments, each UE 100 may store therein attribute information indicative of its attribute of being one of the source UE 100 and destination UE 100. The dedicated source UE 100 specially designed to act as a source of video stream may have invariable attribute information indicative of being a source UE 100. The dedicated destination UE 100 specially designed to act as a destination of the video stream may have invariable attribute information indicative of being a destination UE 100. In contrast, the flexible source/destination UE 100 may have variable attribute information indicative of being a source UE 100 or destination UE 100 depending on whether the UE 100 is set to be the source UE 100 or destination UE 100. In the embodiments, each UE 100 may issue a notification message to the MEC server 300 to notify the attribute information with the identity (e.g., UE ID) of the UE 100, so that the MEC server 300 may identify each UE 100 in the edge site ES as one of the source UE 100 and destination UE 100 for management of the UEs 100 in the edge site ES. Each UE 100 may send the UE ID of the UE 100 with the attribute information automatically in response to discovering and connecting to the MEC server 300, e.g., according to the process P2*a*, P2*b*, P2*c*, or P2*d*. Each flexible source/destination UE 100 may send the UE ID of the UE 100 with the attribute information automatically in response to every change between the source UE and destination UE. The MEC server 300 may generate and update a database for the management of the UEs 100 in response to the notified attribute information from the UEs 100.

Also, the MEC server 300 may manage the location or position of each source UE 100 with respect to an area corresponding to the edge site ES, on the database. Specifically, the MEC server 300 may store therein (a) a map for the area in the edge site ES where the source UE 100 may present (i.e., the area on which a fixed source UE 100 is installed or over which a mobile source UE 100 can be carried) and (b) location information indicative of the location relative to the area per source UE 100, so that the MEC server 300 may identify the location of each source UE 100 on the map. In an aspect, the MEC server 300 may prompt the user to plot the location of each source UE 100 on the map on a GUI to receive a user input of the plotting, so that the plotted location relative to the map may be stored per source UE 100 on the database. In another aspect, the map may include geographical information indicative of coordinates for positions in the area, and each source UE 100 may be provided with a positioning system such as a GNSS and IPS to identify the coordinates of itself, in which case each source UE 100 may send location information indicative of the identified coordinates of its location to the MEC server 300 so that the MEC server 300 may identify the location of each source UE 100 on the map. The source UE 100 may send the location information to the MEC server 300 at least once when the source UE 100 is turned on, for example, at least once upon the source UE 100 being turned on, upon request from the MEC server 300, or otherwise regularly or irregularly. The source UE 100, when it is a mobile source UE 100 subject to change of its location as time goes by, may send the location information periodically at predetermined intervals.

Figure 13B:
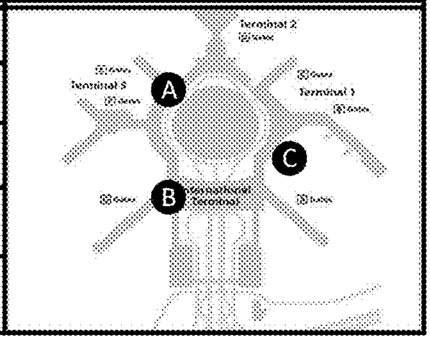
FIG. 13B schematically illustrates an example of a database for management of UEs in an edge site for a local real-time video communication service, according to some embodiments.

FIG. 13B schematically illustrates an example of a database 60 for management of UEs 100 in the edge site ES, according to some embodiments. The database 60, similar to the database 55 discussed above, may list at least one participant 60*a* each of which is indicative of a UE 100 as a participant in a local communication under control of the MEC server 300, and an attribute 60*b* associated with each UE 100 (participant 60*a*) that is indicative of one of the source UE and destination UE with reference to the attribute information received form the corresponding UE 100. The participant 60*a* may be represented by the UE ID of the corresponding UE 100. In addition, the database 60 may include a map 60*d* that is a map discussed above that corresponds to the area in the edge site ES where the listed source UEs 100 can be present, and list a location 60*c* associated with each source UE 100 that is indicative of the location of the corresponding source UE 100 on the map 60*d*. The location 60*c* may be listed with reference to the user's plotted location or the location information generated using a positioning system of the source UE 100. In the example illustrated in FIG. 13B, the database 60 lists three source UEs 100 identified by UE001, UE003, and UE007 respectively and two destination UEs 100 identified by UE0020 and UE030, wherein the locations of the source UEs 100 (UE001, UE003, UE007) are identified on the map 60*d* by means of symbols A, B, and C, respectively.

Figure 13C:
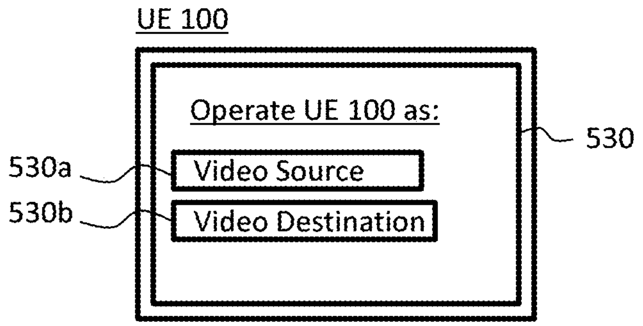
FIG. 13C schematically illustrates an example of a GUI through which to receive a user selection to set a UE 100 to be one of a source UE and destination UE, according to some embodiments.

FIG. 13C schematically illustrates an example of GUI 530 through which to receive a user selection to set the UE 100 to be one of the source UE 100 and destination UE 100, according to some embodiments. The GUI 530 may be displayed on the UE 100 upon participating in a local communication to have the UE 100 registered in the database 60 prior to issuing the notification message to notify the attribute information, just as the GUI 526 discussed above. Specifically, the GUI 530 may be displayed on the UE 100 after discovering and connecting to the MEC server 300 according to the process P2*a*, P2*b*, P2*c*, or P2*d* before issuing the notification message to notify the attribute information. In a case where the local real-time video communication is provided in a local service group 600, the GUI 530 may be displayed on the UE 100 upon the UE 100's login to the MEC server 300 for participation into the local service group 600 prior to issuing the notification message to notify the attribute information. The GUI 530 may include a selectable GUI element 530*a* to be selected to set the UE 100 to be a source UE 100 and a selectable GUI element 530*b* to be selected to set the UE 100 to be a destination UE 100. A user selection of the GUI element 530*a* may invoke setting the UE 100 to be a source UE 100 by setting the valuable attribute information to be indicative of a source UE 100, whereas a user selection of the GUI element 530*b* may invoke setting the UE 100 to be a destination UE 100 by setting the valuable attribute information to be indicative of a destination UE 100. Furthermore, the user selection of the GUI element 530*a* may deactivate or turn off the video output of the UE 100 such as the display along with activating or turning on the video input such as the camera, since the video output is supposed to no longer be used while the UE 100 operates as the source UE 100. On the other hand, the user selection of the GUI element 530*b* may deactivate or turn off the video input of the UE 100 such as the camera along with activating and turning on the video output such as the display, since the video input is supposed to no longer be used while the UE 100 operates as the destination UE 100. In the case where the local real-time video communication is provided in a local service group 600, the GUI 530 may be integrated into the GUI 501 discussed above for login to the MEC server 300, in which case a single GUI for the login (501, 530) may include GUI elements (e.g., 501*a*, 501*b*, 501*c*, 501*d*, 501*e*) for entry of the ID and password along with the GUI elements 530*a* and 530*b*.

Figure 13D:
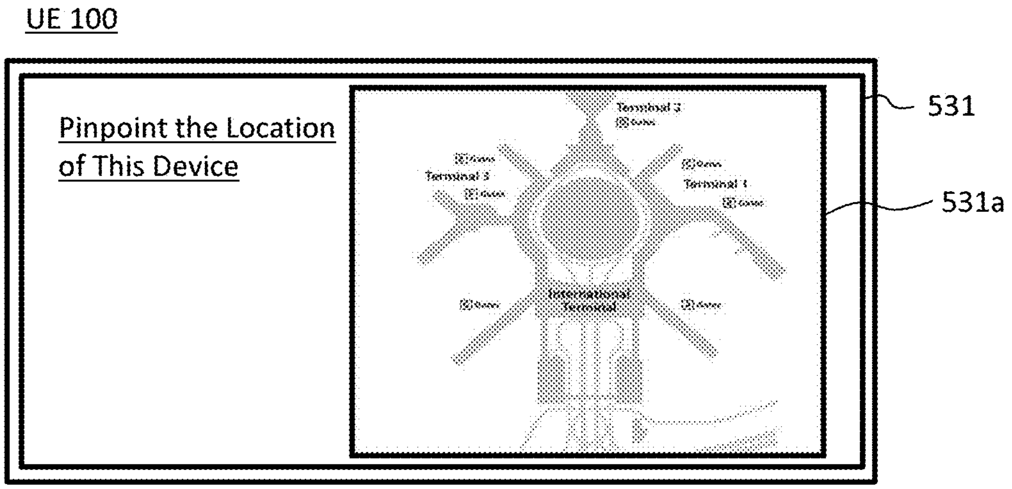
FIG. 13D schematically illustrates an example of GUI for prompting a user to plot the location of a source UE on a map, according to the embodiments.

FIG. 13D schematically illustrates an example of GUI 531 for prompting the user to plot the location of a source UE 100 on the map 60*d*, according to the embodiments. The GUI 531 may be displayed after or upon registration of the UE ID of the source UE 100 on the database 60. The GUI 531 may be displayed on the UE 100 upon participating in a local communication to have the UE 100 registered in the database 60. Specifically, the GUI 531 may be displayed on the UE 100 after discovering and connecting to the MEC server 300 according to the process P2*a*, P2*b*, P2*c*, or P2*d*. In a case where the local real-time video communication is provided in a local service group 600, the GUI 531 may be displayed on the UE 100 upon the UE 100's login to the MEC server 300 for participation into the local service group 600. The GUI 531 may include presentation of the map 60*d* (531*a*), allowing the user to pinpoint or plot a location or position of the UE 100 on the map 531*a* using an input device of the UE 100. Specifically, when the GUI 531 is displayed on a touch-sensitive display of the source UE 100, the GUI 531 may receive a user touch using the user's finger, stylus, etc. onto a location or position in the presented map 531*a* for plotting the location. When the UE 100 comprises a mouse as the input device, the GUI 531 may receive a user selection of a location or position in the presented map 531*a* by moving a mouse cursor to the location and clicking the mouse for plotting the location. The user input of plotting the location of the UE 100 on the map 531*a* may invoke transmission of the location information indicative of the plotted location to the MEC server 300. The GUI 531 may be integrated into the GUI 530 discussed above, in which case a single GUI (530, 531) may include GUI elements (e.g., 530*a*, 530*b*) for a user selection of the attribute of the source UE 100 along with the GUI elements 531*a*. In the process P3*b*, the MEC server 300 may identify a source UE 100 and destination UE 100 with reference to the database 60, to route a video stream from the source UE 100 to the destination UE 100 (S114*b*).

In some embodiments, the MEC server 300 may route multiple video streams concurrently receiving from two or more source UEs 100 to a destination UE 100 (S114*b*), causing the destination UE 100 to play back the multiple video streams for preview in small screens, allowing the UE 100 to select one of the video streams for full view in larger screens.

Figure 13E:
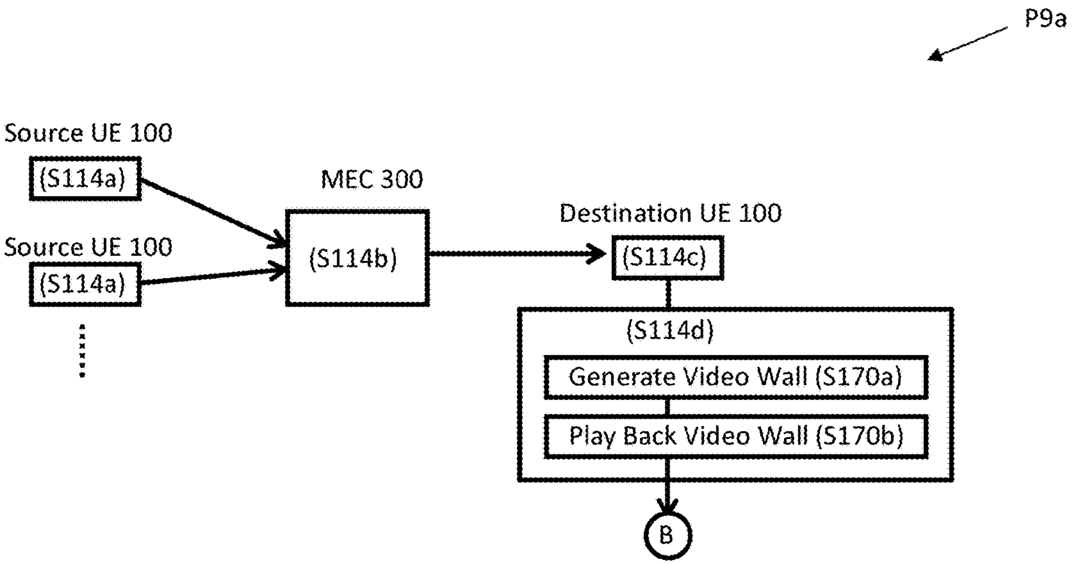
FIG. 13E is a flowchart illustrating an example of a process for routing of multiple video streams concurrently for preview in an aspect, according to some embodiments.

FIG. 13E is a flowchart illustrating an example of a process P9*a* for routing of multiple video streams concurrently for preview in an aspect, according to some embodiments. In the process P9*a*, the MEC server 300 may send the multiple video streams to the destination UE 100 concurrently (S114*b*). When there are two or more destination UEs 100 in the edge site ES, the MEC server 300 may send the video streams to the destination UEs 100 by, for example, unicasting the video streams to each destination UE 100 one by one or broadcasting the video streams to the destination UEs 100 at a time (S114*b*). In response to receipt of the multiple video streams (S114*c*), the destination UE 100 may play back the multiple video streams concurrently to generate a video wall (S170*a*). The video wall may be an arrangement of small video screens on which the UE 100 plays back respective video streams. Each video screen may have a first size. The first size may be a predetermined constant or fixed size, regardless of how many video screens are arranged in the video wall. Alternatively, in generating the video wall, the UE 100 may determine a first size for each video screen depending on the number of the video screens to be displayed (i.e., the number of the receiving video streams). For example, the size of the video wall may be a predetermined constant or fixed size, so that the first size may be so determined that the total size of the arranged video screens is substantially equal to the wall screen size. In the process P9*a*, each video stream sent by the MEC server 300 (S114*b*) may be associated with a video ID that uniquely identifies the identity of the corresponding video stream distinctively from other video streams, in order for the destination UE 100 to specify a video ID to identify the original source (i.e., source UE 100) of the video stream. For example, the video ID may be the UE ID of a source UE 100 which is the sender of the video stream, namely, a source UE 100 from which the video stream is originating from. The video IDs for the respective video streams may be sent to the destination UE 100 along with the video streams, so that the destination UE 100 may know the video IDs for the respective video streams associated with the respective video screens in the video wall.

Figure 13F:
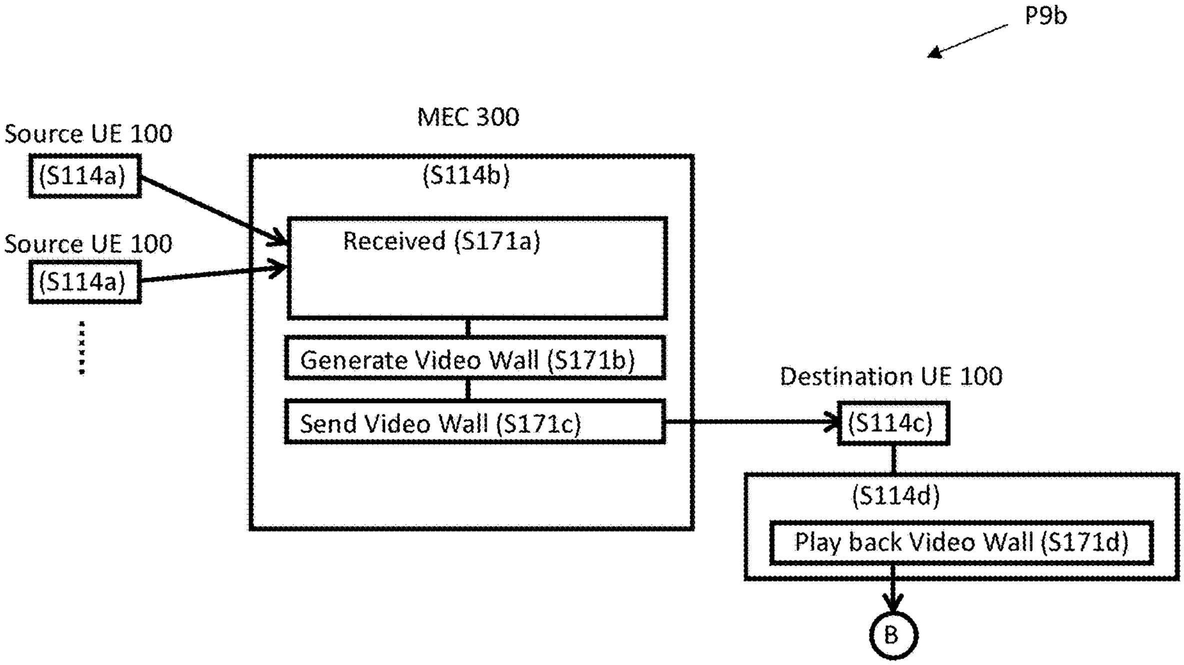
FIG. 13F is a flowchart illustrating an example of a process for routing of multiple video streams concurrently for preview in another aspect, according to some embodiments.

FIG. 13F is a flowchart illustrating an example of a process P9*b* for routing of multiple video streams concurrently for preview in another aspect, according to some embodiments. In the process P9*b*, the MEC server 300 may generate the video wall based on the multiple receiving video streams in place of the destination UE 100, and send a video stream of the video wall to the destination UE 100 so that the destination UE 100 may display the video wall. In the process P9*b*, in response to receipt of the multiple video streams (S171*a*), the MEC server 300 may organize and combine the multiple video streams into a single video stream of the video wall (S171*b*) to send the video stream to the destination UE 100 (S171*c*). Specifically, the MEC server 300 may decode the video streams (source video streams) to obtain corresponding respective videos, allocate the videos to video screens respectively each of which has the first size, arrange and combine the video screens into a video wall, and then generate a video stream (combined video stream) representing the video wall to send it to each destination UE 100 over a local connection (S171*b*, S171*c*). When there are two or more destination UEs 100 in the edge site ES, the MEC server 300 may send the video stream to the destination UEs 100 by, for example, unicasting the video stream to each destination UE 100 one by one or broadcasting the video stream to the destination UEs 100 at a time (S171*c*). The first size of each video screen in the video wall may be constant or fixed, or determined depending on the number of the source video streams, just as discussed above. In response to receipt of the combined video stream of the video wall (S114*c*), the destination UE 100 may play back the combined video stream to display the video wall (S171*d*). In the process P9*b*, in generating the video wall (S171*b*), each video screen in the video wall may be associated with the video ID that uniquely identifies the identity of the source video stream which has been decoded to obtain the video allocated to the video screen, distinctively from other video streams, in order for the destination UE 100 to specify a video ID to identify the original source (i.e., source UE 100) of the source video stream. As discussed above, the video ID may be the UE ID of a source UE 100 which is the sender of the source video stream, namely, a source UE 100 from which the source video stream is originating from. The video IDs for the respective source video streams may be sent to the destination UE 100 along with the combined video stream of the video wall, so that the destination UE 100 may know the video IDs for the respective source video streams associated with the respective video screens in the video wall.

The provision of the video wall according to the process P9*a* may be advantageous over the process P9*b* in that display of the video wall on the destination UE 100 (S170*b*, S171*d*) may be more responsive with lower delay or latency from transmission of the source video streams by source UEs 100 (S114*a*), but the destination UE 100 may need a processor of higher performance to process playback of the multiple source video streams concurrently. On the other hand, the provision of the video wall according to the process P9*b* may be advantageous over the process P9*a* in that a processor of lower performance may be enough on the part of the destination UE 100 since the destination UE 100 does not need to process playback of multiple source video streams concurrently, but there may be higher delay or latency from transmission of the source video streams (S114*a*) until display of the video wall on the destination UE 100 (S170*b*, S171*d*) since the MEC server 300 may need some time to generate the video stream of the video wall.

Figure 13G:
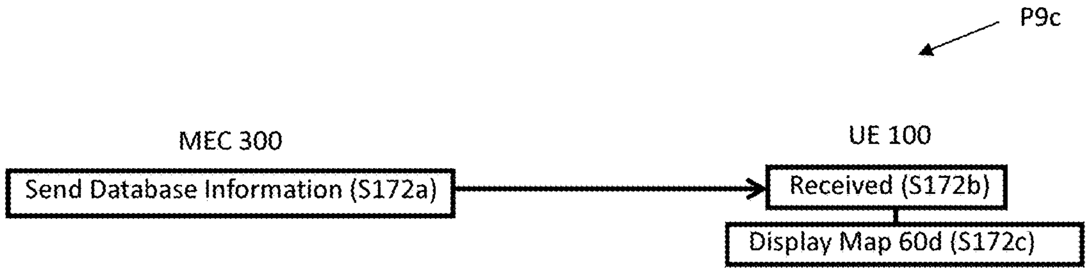
FIG. 13G is a flowchart illustrating an example of a process for provision of information on the database of FIG. 13B from a MEC server to a UE, according to some embodiments.

In some embodiments, in addition to or alternatively to the video wall, the MEC server 300 may provide information on the database 60 to the destination UE 100 for display of the map 60*d*, allowing the user to select a source UE 100 through the map 60*d*. FIG. 13G is a flowchart illustrating an example of a process P9*c* for provision of the information on the database 60. The MEC server 300 may generate and send database information indicative of the items 60*a*, 60*b* 60*c*, and 60*d* on the database 60, to the destination UE 100 over a local connection (S172*a*). At the step S172*a*, the MEC server 300 may send the database information along with or instead of the transmission of the multiple video streams (S114*b*) in the process P9*a* or transmission of the video stream of the video wall (S171*c*) in the process P9*b*. In response to receipt of the database information (S172*b*), the destination UE 100 may display the map 60*d* associated with the items 60*a*, 60*b*, and 60*c* with reference to the database information (S172*c*).

Figure 13H:
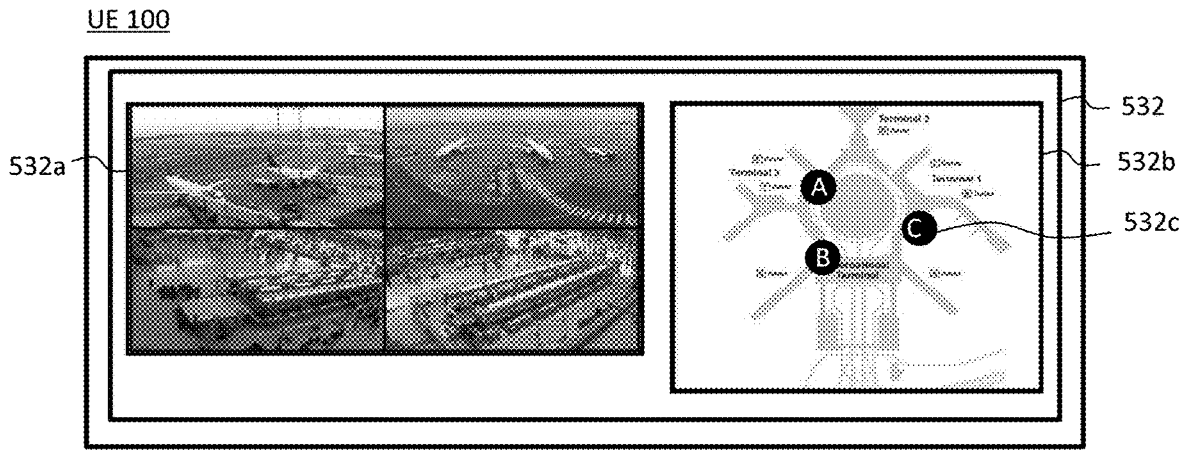
FIG. 13H schematically illustrates an example of display of a video wall and/or display of a map on a GUI on a destination UE, according to some embodiments.

FIG. 13H schematically illustrates an example of display of the video wall (S170*b*, S171*d*) and/or display of the map 60*d* (S172*c*) on a GUI 532 on the destination UE 100, according to some embodiments. The destination on UE 100 may display the GUI 532 in displaying the video wall (S170*b*, S171*d*) and/or in displaying the map 60*d* with reference to the database information (S172*c*). The GUI 532 may include a presentation of the video wall 532*a* with each video screen being presented in a selectable manner, allowing the user to select one of the video screens. In the example illustrated in FIG. 13H, the video wall has four video screens arranged in a 2-by-2 array, with each video screen having the first size. Each video screen is providing playback of an individual video stream. A user selection of a video screen may invoke playback of a video stream associated with the selected video screen for full view according to the process P3*b* or P3*c* by identifying the video ID or UE ID associated with the selected video screen. In addition or alternatively, the GUI 532 may include a presentation 532*b* of the map 60*d*. The map presentation 532*b* may include display of the map 60*d*, and icons 532*c* displayed over the map 60*d* that represent the location of the respective source UEs 100 indicated by the location 60*c*, with reference to the received database information. Each icon 532*c* may be displayed in a selectable manner, allowing the user to select one of the icons 532*c*. A user selection of an icon 532*c* may invoke playback of a video stream associated with the selected icon 532*c* for full view by identifying the video ID or UE ID associated with the selected icon 532*c*. When the destination UE 100 is receiving video streams from the respective source UEs 100 in the process P9*a*, the destination UE 100 may choose or derive the video stream received from the source UE 100 identified by the video ID or UE ID, out of the receiving video streams (S174*a*), and play back the chosen video stream on a full view screen with a second size which is substantially larger than the first size of video screens in the video wall (S174*b*) according to a process P9*d* illustrated in FIG. 13I. On the other hand, when the destination UE 100 is receiving the video stream of the video wall from the MEC server 300 in the process P9*b*, the destination UE 100 may fetch the video stream associated with the video ID or UE ID from the MEC server 300 according to the process P3*b* or directly from the source UE 100 in a P2P manner according to the process P3*c*, for playback of the video stream for full view. FIG. 13J is a flowchart illustrating an example of a process P9*e* for playback of the video stream for full view according to the process P3*b*. In the process P9*d*, the destination UE 100 may generate and send a request message for a video stream associated with the video ID or UE ID, to the MEC server 300 over a local connection (S175*a*). The request message may include the video ID or UE ID identified by the user selection of the video screen or icon 532. In response to receipt of the request message from the destination UE 100 (S175*b*), the MEC server 300 may chose or derive the video stream associated with the video ID or UE ID indicated by the request message, out of the receiving multiple video streams based on which the video wall has been created, and send the chosen video stream to the destination UE 100 over a local connection (S175*c*). In response to receipt of the video stream (S175*d*), the UE 100 may play back the received video stream on a full view screen with the second size substantially larger than the first size of video screens in the video wall (S175*e*). FIG. 13K is a flowchart illustrating an example of a process P9*f* for playback of the video stream for full view according to the process P3*c*. In the process P9*f*, the destination UE 100 may generate and send a request message for a video stream to the source UE 100 identified by the video ID or UE ID over a local connection (S176*a*). The request message may be addressed to the video ID or UE ID identified by the user selection of the video screen or icon 532. In response to receipt of the request message from the destination UE 100 (S176*b*), the source UE 100 may initiate transmission of the video stream of its own to the destination UE 100 in a P2P manner over a local connection (S176*c*). In response to receipt of the video stream directly from the source UE 100 (S176*d*), the destination UE 100 may play back the received video stream on a full view screen with the second size substantially larger than the first size of video screens in the video wall (S176*e*).

Figure 13L:
FIG. 13L schematically illustrates an example of presentation of playback of a selected video stream on a full view screen, according to some embodiments.
Figure 13I:
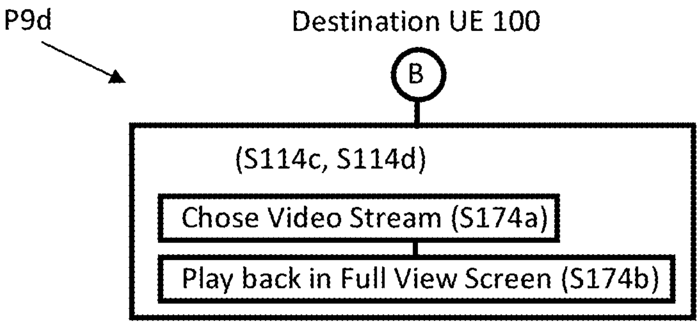
FIG. 13I is a flowchart illustrating an example of a process for playback of a selected video stream on a full view screen, according to some embodiments.
Figure 13J:
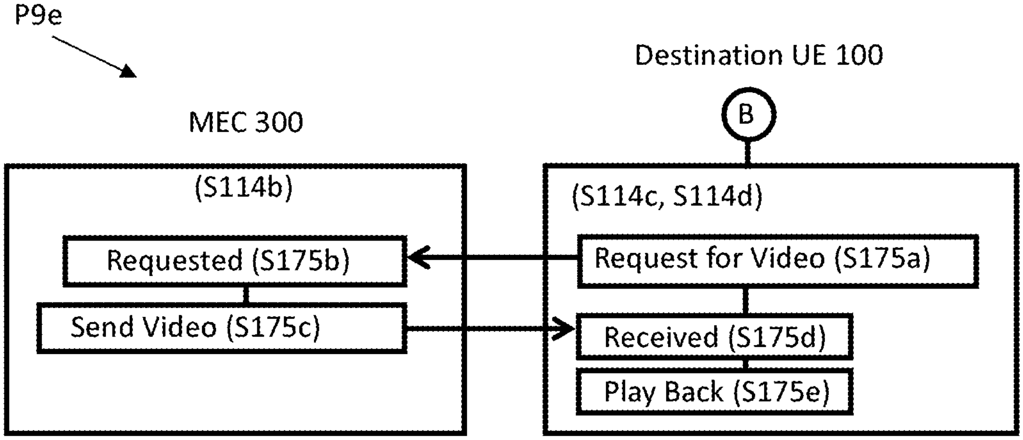
FIG. 13J is a flowchart illustrating an example of a process for playback of a selected video stream on a full view screen, according to some embodiments.
Figure 13K:
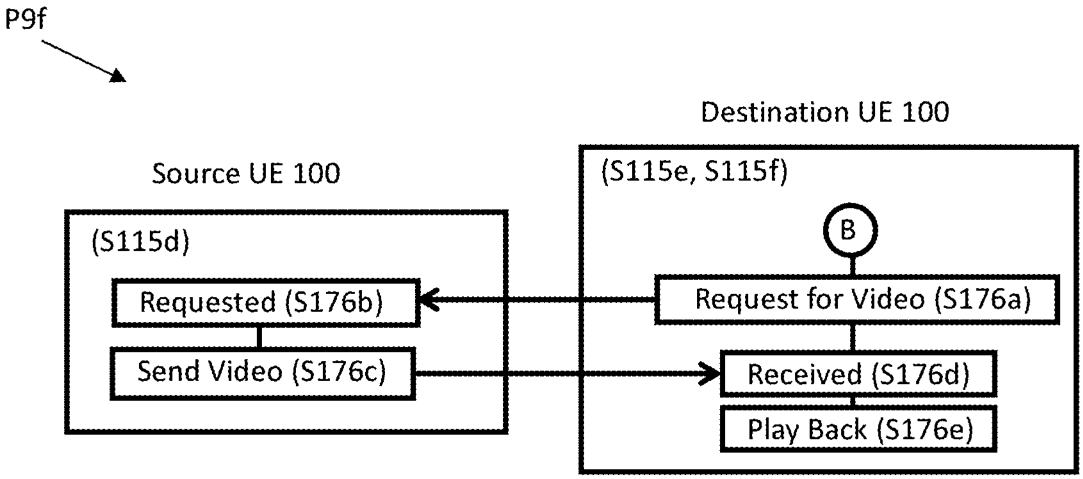
FIG. 13K is a flowchart illustrating an example of a process for playback of a selected video stream on a full view screen, according to some embodiments.
Figure 13M:
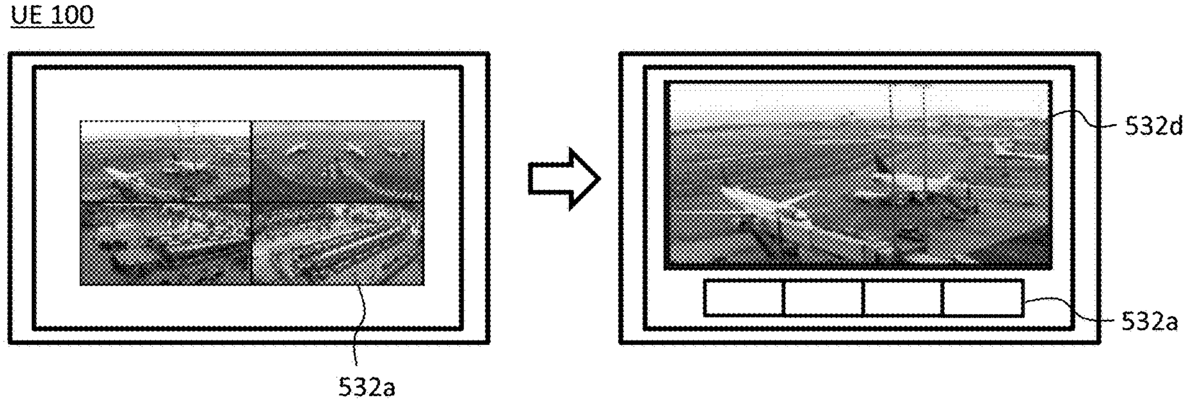
FIG. 13M schematically illustrates an example of rearrangement of a video wall to be displayed along with a full screen view, according to some embodiments.
Figure 13N:
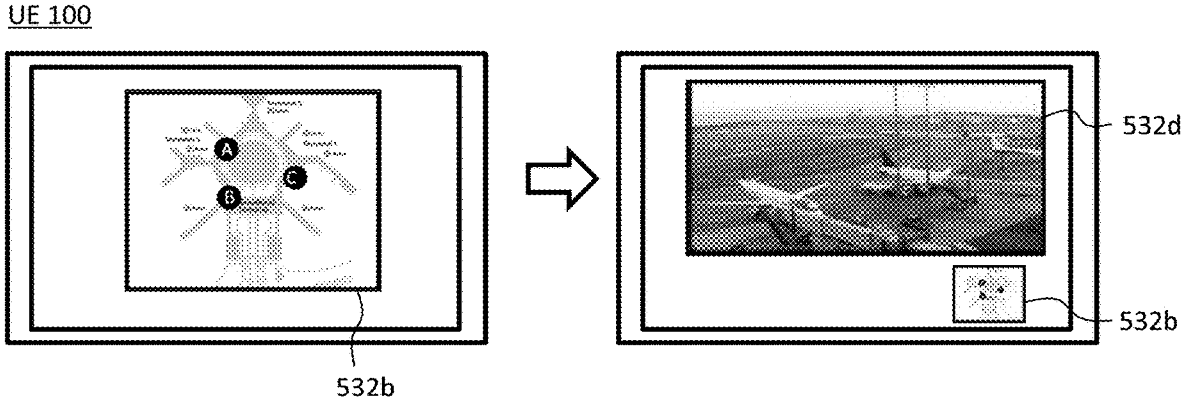
FIG. 13N schematically illustrates an example of rearrangement of a map to be displayed along with a full screen view, according to some embodiments.

FIG. 13L schematically illustrates an example of presentation of playback of a selected video stream on a full view screen, according to some embodiments. The full view screen 532*d* may appear on the GUI 532 with the second size substantially larger than the first size of each video screen in the video wall 532*a*. The full view screen 532*d* may appear over the wall screen 532*a* and/or map presentation 532*b*, or may appear outside the wall screen 532*a* and/or map presentation 532*b*. The second size may be a full-screen size that presents playback of the selected video stream solely, overriding the video wall 532*a* and/or map presentation 532*b*. The video wall 532*a* and/or map presentation 532*b* may so remain as to be displayed along with the full view screen 532*d*, allowing the user to select a video screen in the video wall 532*a* or icon 532*c* to select another video stream for full view in place of the current video stream of which playback is being presented on the full view screen 532*d*. In displaying the full screen view 532*d*, the video wall 532*a* may be restructured to have smaller video screens and re-arranged on the GUI 532 to be displayed along with the full screen view 532*d*, as illustrated in FIG. 13M. Similarly, in displaying the full screen view 532*d*, the map presentation 532*b* may be resized to be smaller than the original size and re-arranged on the GUI 532 to be displayed along with the full screen view 532*d*, as illustrated in FIG. 13N.

For the communication recording service (Internet service) in the process P4*e*, the Internet server 200 may generate and store therein records of communication performed locally between the UEs 100 in the edge site ES over the local connections (S124_c_), and then provide download or streaming of the stored records over the Internet 3 (S124_d_-S124_g_).

For the communication recording service, in the process P4_e_, the MEC server 300 may generate at least one video file by recording the video streams which have been received from the source UEs 100 at the step S114_b_ according to the process P9_a_ or P9_b_, and then regularly or irregularly send the video file to the Internet server 200 over the Internet 3 (S124_a_). At the step S124_a_, the MEC server 300 may continuously record the video stream originating from at least one source UE 100 during the local communication, into at least one video file. At the step S124_a_, the MEC server 300 may encode or convert the video stream in chronological order to make a file in a predetermined format with a predetermined quality (e.g., the sampling rate, frame rate, bit depth, bit rate, etc.). The video file may be one which is formatted in mp4 format defined by MPEG.

Figure 13O:
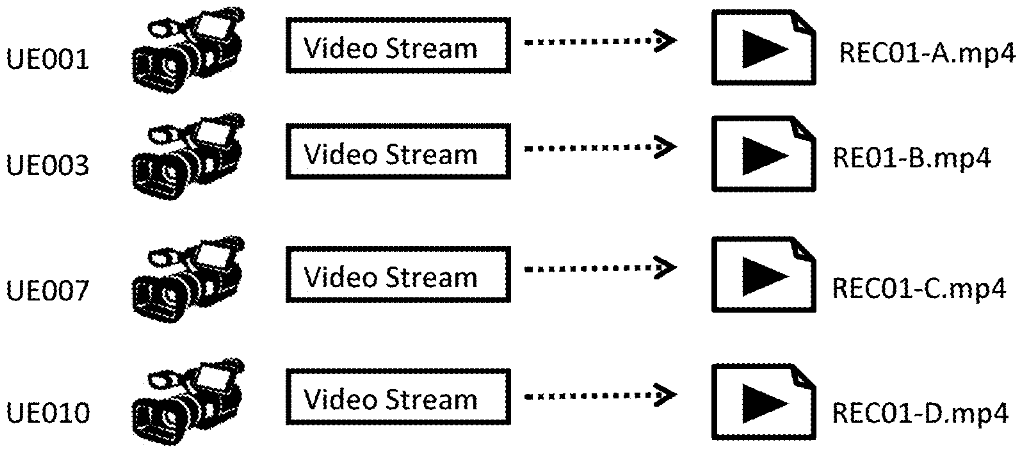
FIG. 13O schematically illustrates an example of generation of an individual video file per video stream, according to some embodiments.

In an aspect, the MEC server 300 may generate a single video file per video stream originating from a specific source UE 100 by recording the video streams from source UEs 100 individually or separately. In the aspect, in generating the video files, the MEC server 300 may assign a common maser video ID to the individually-generated video files to indicate that those video files having the common master video ID are record of video streams which were combined or merged into the video wall for playback at the step S170_b_ or S171_d_. The server 300 may also assign a specific subsidiary video ID to each of the individually-generated video files for identifying the video file from others under the common master video ID. Each video file may be uniquely named with the common master video ID and subsidiary ID in combination. Also, in generating each video file, the MEC server 300 may generate participant information indicative of (a) the source UE 100 which is the sender of the video stream based on which the video file is created and (b) at least one destination UE 100 to which the video stream is destined by the MEC server 300 at the step S114_b_. The database 60 may be referred to, to identify the source UE 100 and at least one destination UE 100 for the generation of the participant information. The participant information may be packaged with a corresponding video file. In the aspect, the MEC server 300 may initiate creation of the video files for a local service group 600 in response to formation of the local service group 600 by the source UEs 100 logging into the MEC server 300, and finalize the creation in response to dismissal of the local service group 600 by the source UEs 100 logging off from the local service group 600, in which case the duration of each video file may correspond to the period in which the corresponding source UE 100 is participating in the local service group 600 for transmission of a video stream. FIG. 13O schematically illustrates an example of generation of an individual video file per video stream, according to some embodiments, where video streams from four source UEs 100 identified by respective UE IDs (UE001, UE003, UE007, UE010) are recorded into separate four video files. In the example illustrated in FIG. 13O, a first video file (REC01-A.mp4)) that is record of the video stream originating from the source UE 100 (UE001) is named with the common master video ID (REC01) and subsidiary ID (A) in combination; a second video file (REC01-B.mp4) that is record of the video stream originating from the source UE 100 (UE003) is named with the common master video ID (RE01) and subsidiary ID (B) in combination; a third video file (REC01-C.mp4) that is record of the video stream originating from the source UE 100 (UE007) is named with the common master video ID (REC01) and subsidiary ID (C) in combination; and a fourth video file (REC01-D.mp4) that is record of the video stream originating from the source UE 100 (UE010) is named with the common master video ID (REC01) and subsidiary ID (D) in combination. In the example illustrated in FIG. 13O, the MEC server 300 may generate (a) participant information associated with the first video file (REC01-A.mp4), indicative of the UE ID of its source UE 100 (UE001) and the UE ID of each destination UE 100 with reference to the database 60; (b) participant information associated with the second video file (REC01-B.mp4), indicative of the UE ID of its source UE 100 (UE003) and the UE ID of each destination UE 100 with reference to the database 60; (c) participant information associated with the third video file (REC01-C.mp4), indicative of the UE ID of its source UE 100 (UE007) and the UE ID of each destination UE 100 with reference to the database 60; and (d) participant information associated with the fourth video file (REC01-D.mp4), indicative of the UE ID of its source UE 100 (UE010) and the UE ID of each destination UE 100 with reference to the database 60. The MEC server 300 may record video streams into the respective video files (S124_a_) in parallel to the delivery of the video streams (S114_b_) in the process P9_a_. The MEC server 300 may record video streams into the respective video files (S124_a_) in parallel to the generation and delivery of the video wall based on the video streams (S171_b_, S171_c_) in the process P9_b_. At the step S124_a_, per generated video fie, the MEC server 300 may store therein the video file temporally until the file is transmitted to the Internet server 200. The MEC server 300 may delete the temporally-stored video file upon completion of transmission of the video file to the Internet server 200 (S124_a_). At the step S124_a_, the MEC server 300 may regularly or irregularly send the generated video files to the Internet server 200 over the Internet 3 (S124_a_). In an aspect, the MEC server 300 may send each video file one by one automatically upon generation of the video file. In another aspect, the MEC server 300 may send the video files in a batch at predetermined time (e.g., 1:00 am every day, on the hour every hour, etc.) according to a predetermined schedule. In yet another aspect, the MEC server 300 may send the video files in a batch at a time during the time period when the MEC server 300 is in an "idle" state where the MEC server 300 is not performing generation of any video file. The MEC server 300 may send the participant information along with the associated video file (S124_a_).

Figure 13P:
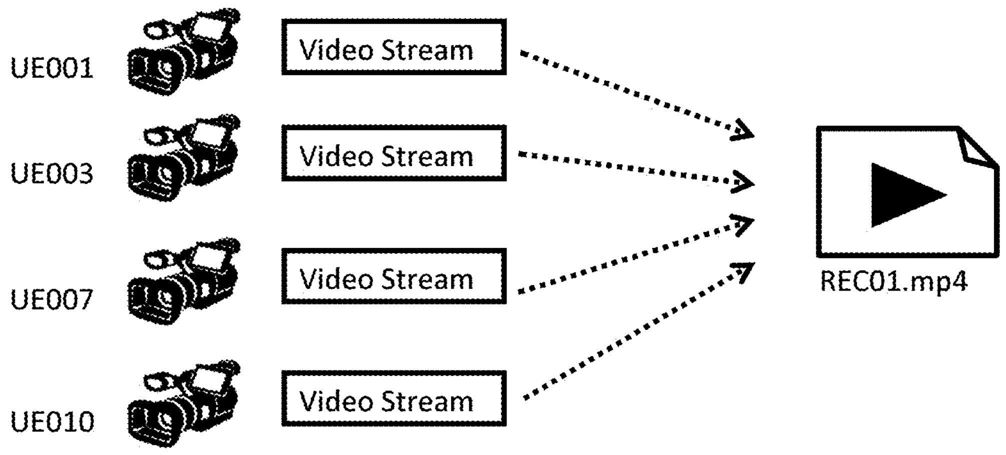
FIG. 13P schematically illustrates an example of generation of a single merged video file from video streams, according to some embodiments.

In another aspect, the MEC server 300 may combine or merge the video streams originating from the source UEs 100, into a single merged video file having stored therein multiple video scenes that correspond to the respective recorded video streams. Specifically, as an example, the MEC server 300 may generate a video wall just as discussed above (S171_b_) with the multiple video scenes obtained by decoding the video streams being arranged on the video wall, and create a video file of the video wall. In this example, the MEC server 300 may generate a video wall and create a video file of the video wall based on receiving video streams (S124_a_) in parallel to the delivery of the video streams (S114_b_) in the process P9_a_. In this example, the MEC server 300 may create a video file of a video wall (S124_a_) in parallel to the generation and delivery of the video wall (S171_b_, S171_c_) in the process P9_b_. As another example, the MEC server 300 may generate a single "multi-angle" or "multi-view" video file having stored therein the multiple video scenes in parallel to one another along the timeline of the video so that the video scenes can be switched from one to another by a user selection for display during playback. The multi-angle video file may be one which is encoded in a format capable of containing multiple video tracks parallelly, such as Matroska Video (MKV) and DVD-Video. In this example, the MEC server 300 may record video streams into a single multi-angle video file (S124*a*) in parallel to the delivery of the video streams (S114*b*) in the process P9*a*. In the example, the MEC server 300 may record video streams into a single multi-angle video file (S124*a*) in parallel to the generation and delivery of a video wall based on the video streams (S171*b*, S171*c*) in the process P9*b*. In the aspect, in generating the merged video file, the MEC server 300 may generate participant information indicative of (a) the source UEs 100 which are the senders of the video streams based on which the merged video file is created and (b) at least one destination UE 100 to which the merged video stream is destined by the MEC server 300 at the step S114*b*. The database 60 may be referred to, to identify the source UEs 100 and at least one destination UE 100 for the generation of the participant information. The participant information may be packaged with the merged video file. In the aspect, the MEC server 300 may initiate creation of a merged video file in response to a predetermined first event and finalize the creation in response to a predetermined second event, thereby generating the video file, automatically at least in part. For example, generation of a merged video file may be automatically synchronized with reception of video streams from fixed or constant source UEs 100 at the step S114*b*. More specifically, the MEC server 300 may initiate creation of a merged video file in response to initiation of reception of a video stream from a given source UE 100 and finalize the creation in response to termination of the ongoing reception of the video stream from the said given source UE 100. Entry of a source UE 100 as a participant 60*a* on the database 60 may invoke the initiation of reception of a video stream from the entered source UE 100. Removal of the source UE 100 from a participant 60*a* on the database 60 (e.g., due to exit or departure of the source UE 100 from the communication) may invoke the termination of the reception of the video stream from the departed source UE 100. So, the MEC server 300 may generate separate merged files each of which is generated newly every time there occurs change in the source UEs 100 from which the MEC server 300 receives video streams at the step S114*b*. FIG. 13P schematically illustrates an example of generation of a single merged video file from the video streams, according to some embodiments, where video streams from four source UEs 100 identified by respective UE IDs (UE001, UE003, UE007, UE010) are combined or merged into a single merged video file (REC01.mp4). In the example illustrated in FIG. 13P, the MEC server 300 may generate participant information associated with the merged video file (REC01.mp4), indicative of the UE IDs of its source UEs 100 (UE001, UE 003, UE007, UE010) and the UE ID of each destination UE 100 with reference to the database 60. The MEC server 300 may record video streams into a merged video file (S124*a*) in parallel to the delivery of the video streams (S114*b*) in the process P9*a*. The MEC server 300 may record video streams into a merged video file (S124*a*) in parallel to the generation and delivery of the video wall based on the video streams (S171*b*, S171*c*) in the process P9*b*. At the step S124*a*, the MEC server 300 may store therein the merged video file temporally until the file is transmitted to the Internet server 200. The MEC server 300 may delete the temporally-stored video file upon completion of transmission of the video file to the Internet server 200 (S124*a*). At the step S124*a*, the MEC server 300 may regularly or irregularly send the merged video file to the Internet server 200 over the Internet 3 (S124*a*). In an aspect, the MEC server 300 may send the merged video file automatically upon generation of the video file. In another aspect, the MEC server 300 may send the merged video file at predetermined time (e.g., 1:00 am every day, on the hour every hour, etc.) according to a predetermined schedule. In yet another aspect, the MEC server 300 may send the merged video file at a time during the time period when the MEC server 300 is in an "idle" state where the MEC server 300 is not performing generation of any video file. The MEC server 300 may send the participant information along with the merged video file (S124*a*).

The Internet server 200 may receive the video file(s), namely, the individually-generated video files (FIG. 13O) or merged video file (FIG. 13P) discussed above, along with the participant information from the MEC server 300 over the Internet 3 (S124*b*), and store therein the video file(s) (S124*c*). At the step S124*c*, the Internet server 200 may organize and store received video file(s) on a database for management of the video file(s). On the database, the video file(s) may be associated with source UEs 100 indicated by the participant information.

FIG. 13Q schematically illustrates an example of a database 62 for the management of the individually-generated video files illustrated in FIG. 13O, according to some embodiments. The database 62 may list the individually-generated video files 62*a*; source UE 62*b* indicative of the UE ID of the source UE 100 associated with a corresponding video file 62*a*; one or more destination UEs 62*c* indicative of the UE IDs of the respective destination UEs 100 associated with a corresponding video file 62*a*; and the mater video ID 62*d* assigned commonly to the video files 62*a*. The source UE 62*b* and destination UE 62*c* my be listed with reference to the participant information. In the example illustrated in FIG. 13Q, four video files (REC01-A. mp4, REC01-B.mp4, REC01-C.mp4, REC01-D.mp4) associated with the source UEs 100 (UE001, UE003, UE007, UE010) respectively are listed on the database 62 where the destination UEs 100 (UE020, UE030) are associated with each video file.

FIG. 13R schematically illustrates an example of a database 63 for the management of the merged video file illustrated in FIG. 13P, according to some embodiments. The database 63 may list the merged video file 63*a*; one or more source UEs 63*b* indicative of the UE IDs of the respective source UEs 100 associated with the video file 63*a*; and one or more destination UEs 63*c* indicative of the UE IDs of the respective destination UEs 100 associated with the video file 63*a*. The source UE 63*b* and destination UE 63*c* may be listed with reference to the participant information. In the example illustrated in FIG. 13R, the merged video file (REC01.mp4) associated with the source UEs 100 (UE001, UE003, UE007, UE010) are listed on the database 63 where the destination UE s100 (UE020, UE030) are associated with the video file.

Figure 13S:
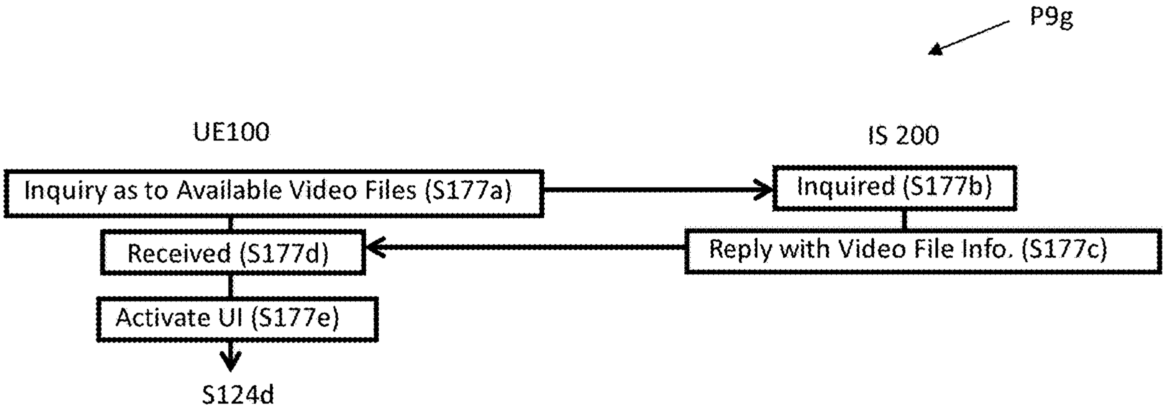
FIG. 13S is a flowchart illustrating an example of a process for activating a user interface (UI) for a user selection of a video file, according to some embodiments.

The Internet server 200 may then provide download or streaming of a video file managed on the database 62 or 63 to a destination UE 100 over the Internet 3 according to the process P4*e* (S124*d*-S124*g*). The Internet server 200 may respond to a video file request message from a destination UE 100 for download or streaming of a video file (S124*d*-S124*e*) by identifying and reading out the requested video file from the database 62 or 63 and sending it to the destination UE 100 for download or streaming over the Internet 3 (S124*f*). At the step S124*h*, the Internet server 200 may play back a video file selected using an input device of the Internet server 200, on a display of the Internet server 200 (S124*h*). The video file request message issued at the step S124*d* may be a request for a video file selected by a user out of the video files managed on the database 62 or 63. In the aspect, the destination UE 100 may present one or more available video files associated with the destination UE 100 managed on the database 62 or 63 on the Internet server 200, on a UI through which to receive a user selection of one of the presented video files, so as to issue the video request message for the selected video file over the Internet 3. FIG. 13S is a flowchart illustrating an example of a process P9*g* for activating the UI for a user selection of a video file, according to some embodiments. The process P9*g* may be performed by the UE 100 when the UE 100 is not in a local connection with the MEC server 300 for display of the GUI 532. In the process P9*g*, in activating or displaying the UI on the UE 100, the UE 100 may issue an inquiry message to the Internet server 200 as to available video files, namely, video files which the UE 100 is allowed to download or receive streaming of (S177*a*). The inquiry message may include the identity (e.g., UE ID) of the UE 100. In response to the inquiry message (S177*b*), the Internet server 200 may identify one or more video files 62*a* or 63*a* available to the inquirer UE 100, namely, one or more video files 62*a* or 63*a* which are associated with the inquirer UE 100, to generate a reply message with video file information indicative of the identified video files, and then send the reply message to the UE 100 (S177*c*). Specifically, at the step S177*c*, the Internet server 200 may identify one or more video files 62*a* or 63*a* for which the identity of the UE 100 indicated by the inquiry message is listed as a destination UE 62*c* or 63*c*. In other words, at the step S177*c*, the Internet server 200 may identify one or more video files 62*a* or 63*a* which are records of video streams ever destined to the inquirer UE 100. In response to the reply message (S177*d*), the UE 100 may activate the UI that presents the one or more available video files (i.e., video files associated with the UE 100 as a destination UE 62*c* or 63*c*) with reference to the video file information (S177*e*).

Figure 13T:
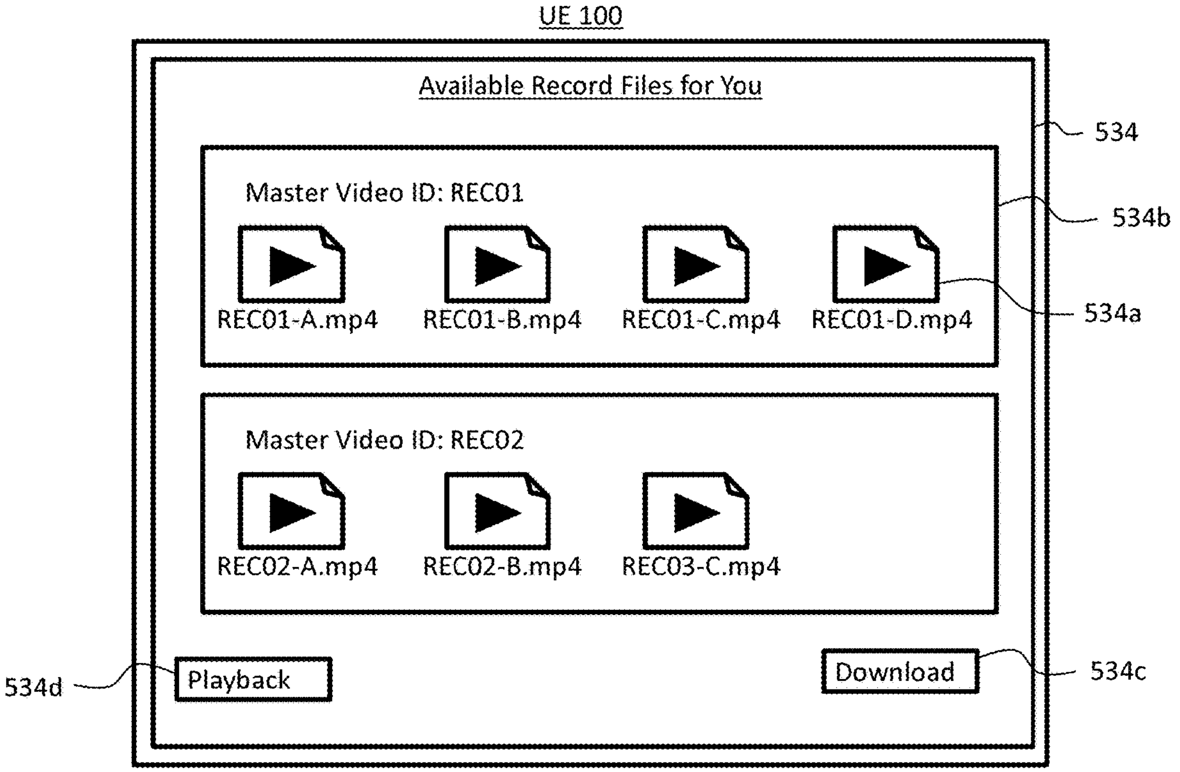
FIG. 13T schematically illustrates an example of a GUI displayed on a UE 100 in the process of FIG. 13S, according to some embodiments.

FIG. 13T schematically illustrates an example of a GUI 534 displayed on the UE 100 in the process P9*g*, according to some embodiments where one or more video files 62*a* are identified in the process P9*g*. The GUI 534 may include presentation of one or more selectable icons 534*a* associated with respective one or more available video files 62*a* indicated by the received video file information. In the GUI 534, video files associated with a specific common master video ID may be presented together distinctively from other video files associated with another common master video ID so that the user can select one of video files associated with a common master video ID easily and intuitively. Preferably, the video files associated with the common master video ID may be presented together in a specific compartment 534*b* separately from others, as illustrated in FIG. 13T. FIG. 13T illustrates an example where GUI 534 is displayed on the UE 100 identified by UE020 with reference to the video file information generated by the Internet server 200 in reply to the inquiry message that includes UE020. In the example, four video files "REC01-A.mp4", "REC01-B.mp4", "REC01-C.mp4", and "REC01-D.mp4" having a common master video ID "REC01" assigned thereto and being associated with UE020 in the destination UEs 62*c* are presented together in a compartment 534*b*, while three video files "REC02-A.mp4", "REC02-B.mp4", and "REC02-C.mp4" having a common master video ID "REC02" assigned thereto and being associated with UE020 in the destination UEs 62 are presented together in another compartment 534*b*. A user selection of one of the icons 534*a* may invoke selection of a corresponding video file for download or streaming. The GUI 534 may also include a selectable GUI element 534*c* for request for download and a selectable GUI element 534*d* for request for streaming. A user selection of the GUI element 534*c* may invoke issuance of the video file request message for download of the selected video file, causing the Internet server 200 to send the selected video file to the UE 100 in order for the UE 100 to download and store therein the video file (S124*d*-S124*g*). On the other hand, a user selection of the GUI element 534*d* may invoke issuance of the video file request message for streaming of the selected video file, causing the Internet server 200 to stream the selected video file to the UE 100 in order for the UE 100 to instantly play back the video file (S124*d*-S124*g*).

Figure 13U:
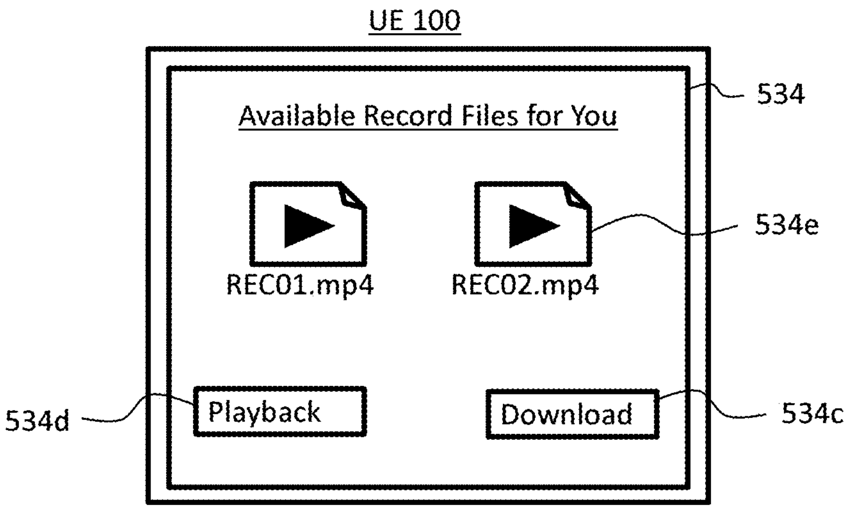
FIG. 13U schematically illustrates another example of a GUI displayed on a UE in the process of FIG. 13S, according to some embodiments.

FIG. 13U schematically illustrates another example of the GUI 534 displayed on the UE 100 in the process P9*g*, according to some embodiments where one or more video files 63*a* are identified in the process P9*g*. The GUI 534 may include presentation of one or more selectable icons 534*e* associated with respective one or more available video files 63*a* indicated by the received video file information. FIG. 13U illustrates an example where GUI 534 is displayed on the UE 100 identified by UE020 with reference to the video file information generated by the Internet server 200 in reply to the inquiry message that includes UE020. In the example, two video files "REC01.mp4" and "REC02.mp4" both associated with UE020 in the destination UEs 63*c* are presented on the GUI 534. A user selection of one of the icons 534*e* may invoke selection of a corresponding video file for download or streaming. The GUI 534 may also include the selectable GUI elements 534*c* for request for download and the selectable GUI element 534*d* for request for streaming, as discussed above.

Figure 13V:
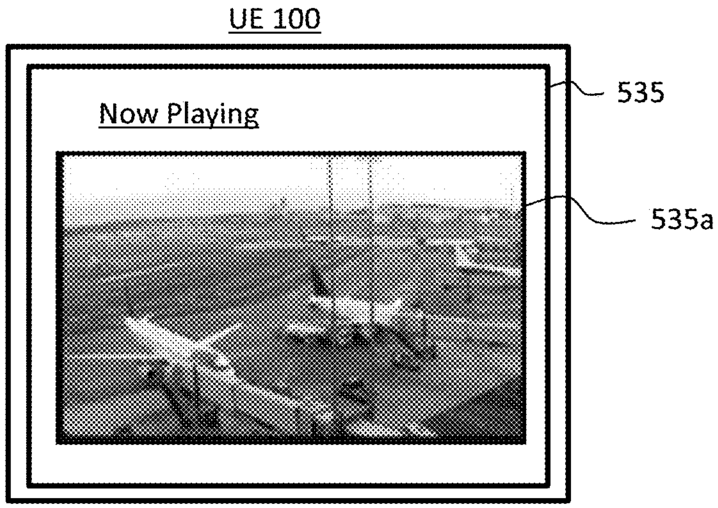
FIG. 13V schematically illustrates an example of a GUI for playback of a recorded video stream, according to some embodiments.

The destination UE 100 may play back, on a UI, the video file downloaded or streamed from the Internet server 200 (S124*d*) in response to the user selection of the GUI element 534*c* or 534*d*. FIG. 13V schematically illustrates an example of GUI 535 for playback of the video stream, where playback of the video stream 535*a* is provided on the GUI 535.

Figure 13W:
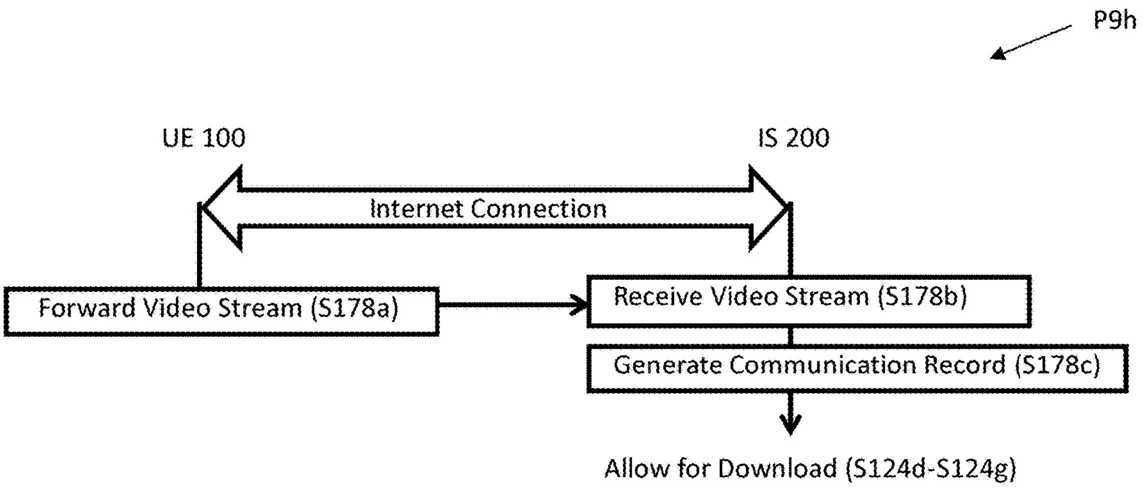
FIG. 13W is a flowchart illustrating an example of a process for a communication recording service between a UE and Internet server, according to some embodiments.

In some modifications to the embodiments, the communication recording service discussed above may be provided directly between each UE 100 and the Internet server 200 over the Internet 3, instead of between the MEC server 300 and Internet server 200 according to the process P4*e*. In the modified embodiments, each source UE 100 may send the video stream destined to the MEC server 300 also to the Internet server 200 over the Internet 3, in parallel to the transmission of the video stream to the MEC server 300, so that the Internet server 200 may generate and store therein a communication record by recording and organizing received video streams from respective source UEs 100, instead of generating the communication record based on the video files created by the MEC server 300 in the process P4*e* discussed above. FIG. 13W is a flowchart illustrating an example of a process P9*h* for the communication recording service, according to some modified embodiments. In the modified embodiments, each source UE 100 may send the video stream destined to the MEC server 300 also to the Internet server 200 over the Internet 3, in parallel to the transmission of the video stream to the MEC server 300 (S178*a*). In response to receipt of the video streams from respective source UEs 100 (S178*b*), the Internet server 200 may create one or more record files by recording the video streams received from the respective UEs 100 (S178*c*). At the step S178*c*, the Internet server 200 may make an individual video file per video stream from a specific source UE 100 just as discussed above with reference to FIG. 13O, or make a single merged video file by combining video streams from the respective source UEs 100 just as discussed above with reference to FIG. 13P. Each video file may be made in a predetermined format, such as mp4, as discussed above in the process P4*e*. The Internet server 200 may then organize and list the created video files to generate the communication record on a database (S178*c*), just as the database 62 or 63 discussed above with reference to FIG. 13Q or 13R. The Internet server 200 may then provide download or streaming of a video file on the communication record to the UEs 100 over the Internet 3, as discussed above, according to the process P4*e* (S124*d*-S124*g*).

Figure 13X:
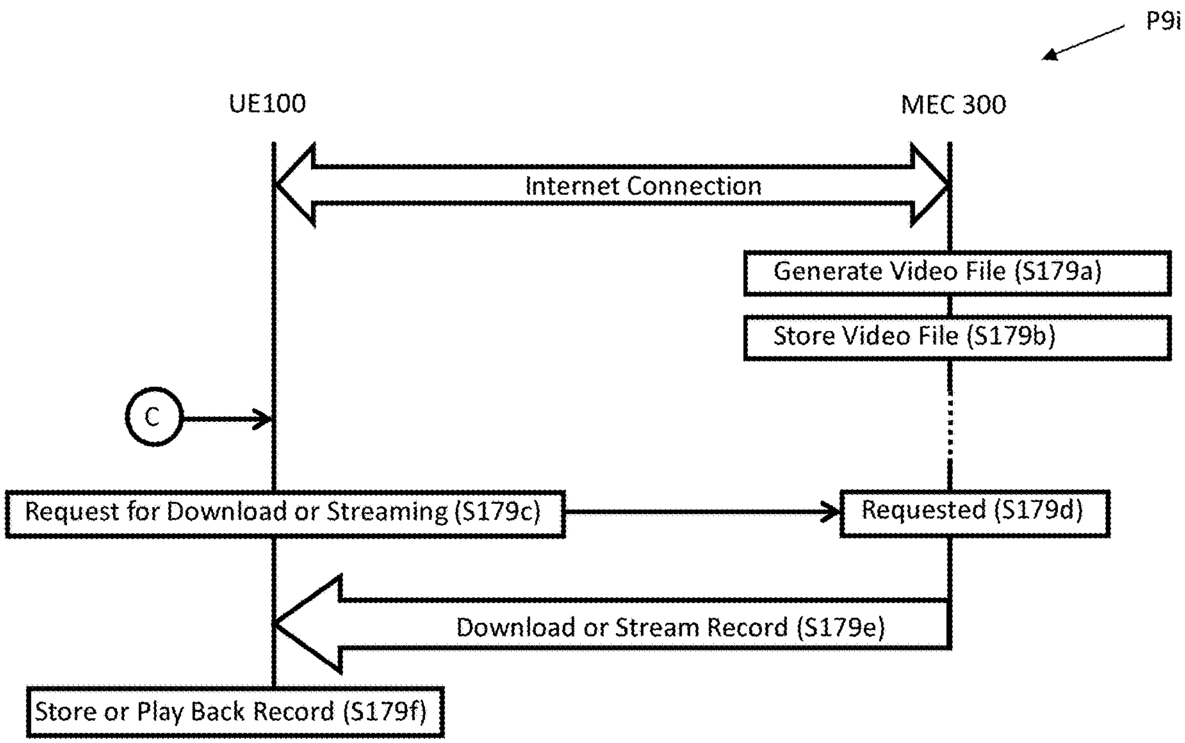
FIG. 13X is a flowchart illustrating an example of a process for provision of download or streaming of a video file from a MEC server to a destination UE, according to some embodiments.
Figure 13Y:
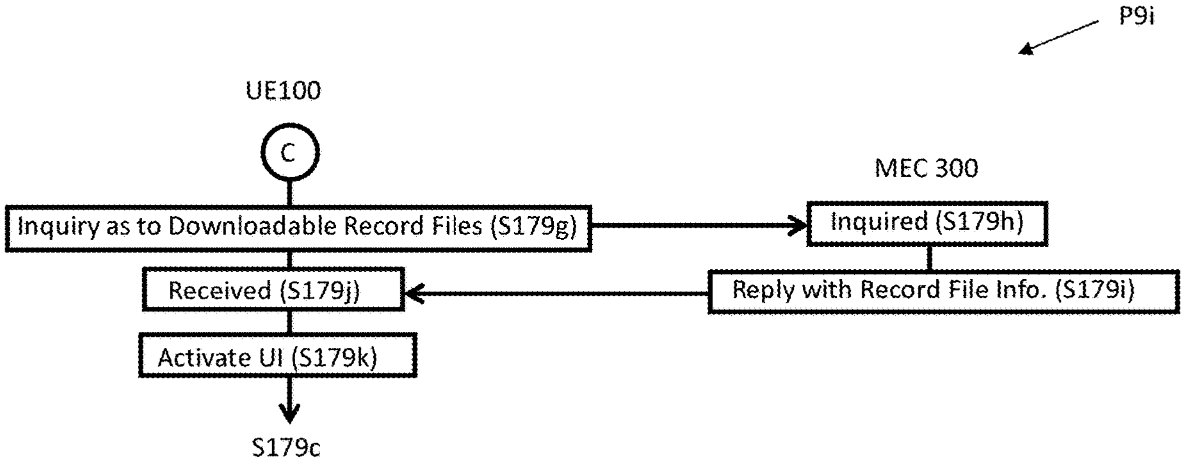
FIG. 13Y is a flowchart illustrating an example of a process for provision of download or streaming of a video file from a MEC server to a destination UE, according to some embodiments.

In some modified embodiments, the MEC server 300 may provide download or streaming of video files stored therein to a destination UEs 100 over the Internet 3. In the modified embodiments, the MEC server 300 may be accessible by the destination UEs 100 over the Internet 3 using the global IP address allocated to the MEC server 300 even when the destination UE 100 is not in the edge site ES, just as the Internet server 200 is accessible by the destination UEs 100 over the Internet 3 for download or streaming of a video file according to the process P4*e*. In the modified embodiments, each video file generated by the MEC server 300 may be stored in the MEC server 300 to be accessible by the destination UEs 100 for download or streaming to the destination UEs 100. FIGS. 13X and 13Y are flowcharts illustrating an example of a process P9*i* for provision of download or streaming of a video file from the MEC server 300 to a destination UE 100, according to some modified embodiments. In the process P9*i*, the MEC server 300 may generate at least one video file by recording the original video streams which have been routed by the MEC server 300 among the UEs 100 according to the step S114*b* (S179*a*), just as the MEC 300 does at the step S124*a* in the process P4*e*. The MEC server 300 may then store therein the video file as a communication record (S179*b*). At the step S179*b*, the MEC server 300 may organize and list the created video files to generate the communication record on a database, just as the database 62 or 63 discussed above with reference to FIG. 13Q or 13R. In the process P9*i*, the destination UE 100 may generate and send a record file request message for a video file stored in the MEC server 300 to the MEC server 300, just as it does to the Internet server 200 at the step S124*d* in the process P4*e* (S179*c*). In response to receipt of the video file request message (S179*d*), the MEC server 300 may identify and read out the requested video file out of video files stored in the MEC server 300, and then provide download or streaming of the requested video file to the requesting UE 100 over the Internet 3 (S179*e*). The UE 100 may receive streaming of the video file for instant playback, or download and store therein the video file for later playback (S179*f*). In an aspect, the video file request issued at the step S179*c* may be indicative of a user selection of a video file out of available video files presented by the MEC server 300, just as the video file request discussed above at the step S124*d* in the process P4*e*. In the aspect, the UE 100 may issue an inquiry message as to available video files to the MEC server 300 over the Internet 3 (S179*g*), just as it does at the step S177*a* in the process P9*g*, in reply to which the MEC server 300 may send back video file information indicative of one or more available video files (S179*h*, S179*i*), just as the Internet server 200 does at the steps 177*b* and 177*c* in the process P9*g*. The UE 100 may activate a UI presenting the one or more available video files to prompt the user to select one of the presented video files (S179*j*, S179*k*), just as the it does at the steps S177*d* and S177*e* in the process P9*g*, so that the video file request may be indicative of a particular video file selected through the UI.

In some modified embodiments, in the P4*e*, the MEC server 300 may forward the routed video streams to the Internet server 200 at the step S124*a* instead of making a video file to send the vide file to the Internet server 200, so that the video file may be produced on the part of the Internet server 200 at the step S124*c*. In the modified embodiments, in parallel to routing video streams at the step S114*b* in the process P3*b*, the MEC server 300 may forward the video streams to the Internet server 200 over the Internet 3 (S124*a*). At the step S124*a*, the MEC server 300 may downgrade the routed video streams in the quality (e.g., the sampling rate, frame rate, bit depth, bit rate, etc.) adapted for transmission over the Internet 3, and forward the downgraded video streams to the Internet server 200 (S124*a*). Then, in response to receipt of the forwarded video streams (S124*b*), the Internet server 200 may make a video file from the video streams and store therein the video file (S124*c*) for playback, streaming, and/or download thereof (S124*d*-S124*h*). At the step S124*c*, the Internet server 200 may make the video file just as the MEC server 300 does at the step S124*a* discussed above with reference to FIGS. 13O to 13R. The Internet server 200 may produce video files "REC01-A.mp4", "REC01-B.mp4", "REC01-C.mp4", and "REC01-D.mp4" from the respective video streams, as illustrated in FIGS. 13O and 13Q. The Internet server 200 may produce a single merged video file "REC01.mp4" from the video streams, as illustrated in FIGS. 13P and 13R. In the modified embodiments, the Internet server 200 may organize and store the produced video files on the database 62 for playback, streaming, and/or download thereof (S124*d*-S124*h*).

Figure 13Z:
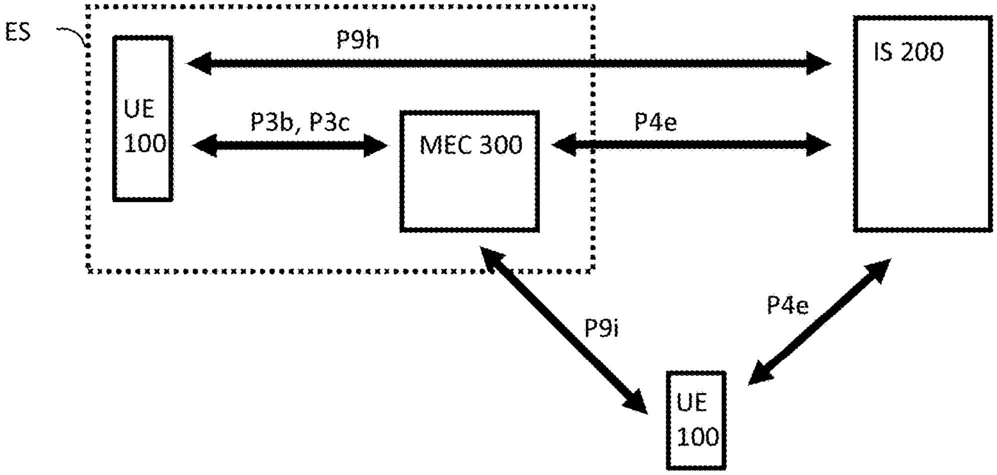
FIG. 13Z schematically illustrates a summary of complex communications in a local real-time video communication system, according to some embodiments.

The summary of the UE-to-UE real-time video communication system according to the embodiments discussed above is described blow with reference to FIG. 13Z. The video streams may be routed between the UEs 100 in the edge site ES by the MEC server 300 in the process P3*b* or P3*c*. In parallel to the routing of the video streams in the process P3*b* or P3*c*, the video streams may be recorded into a video file in the process P4*e* or P9*i*, so that the video file stored on the Internet server 200 can be downloaded or streamed from the Internet server 200 to the UE 100 in the process P4*e* or the video file stored on the MEC server 300 can be downloaded or streamed from the MEC server 300 to the UE 100 in the process P9*i*. In parallel to the routing of the video streams in the process P3*b* or P3*c*, the video streams may be sent also to the Internet server 200 from the UEs 100 in the edge site ES in the process P9*h*, so that the video streams may be received and recorded into a video file in the process P9*h* for download or streaming to the UE 100 in the process P4*e*. Advantageously, video communication between the UEs 100 sensitive to latency may be offloaded on the MEC server 300 when the UEs 100 are in the edge site ES. Advantageously, a record of the edge-based offloaded video communication between the UEs 100 in the edge site ES may be automatically generated to be accessible by the UEs 100 after the ongoing video communication, in parallel to the video communication.

(Image or Sound Analysis System)

In some embodiments, the MEC service may be an edge-based local image or sound analysis service that involves analysis of an video stream or audio stream generated by at least one UE 100 (source UE 100) capturing images or sound in the edge site ES, to find or identify a target which meets an analysis rule associated an image or sound in the edge site ES. The local image/sound analysis service may also involve notifying at least one other UE 100 (destination UE 100) of the result of the analysis over a local connection. The local image/sound analysis service may be performed under control of the MEC server 300 in the edge site ES according to the process P3*d*. In connection with the local image/sound analysis service, the Internet service may include at least one of (a) an analysis rule update service that involves update of the analysis rule based on which the MEC server 300 performs the local image/sound analysis and (b) an analysis history storage service that involve storing the history or record of the local analysis. The analysis rule update service may be performed according to the process P4*f*. The analysis history storage service may be performed according to the process P4*g*.

FIG. 14A schematically illustrates an example of a system for providing the MEC service (local image/sound analysis service) and the Internet service (analysis rule update service and analysis history storage service), according to some embodiments. The system may include at least one source UE 100 and at least one destination UE 100. The source UE 100 may be defined herein to be a UE 100 operative as a source of a video or audio stream that captures images or sound using a camera or microphone to generate a video or audio stream which will be locally analyzed by the MEC server 300. The destination UE 100 may be defined herein to be a UE 100 operative as a recipient of the analysis result generated by the MEC server 300 as a result of the local analysis.

Each source UE 100 may be provided with at least one of (a) a camera for capturing images based on which to generate and output a video stream for transmission at the step S116*a* in the process P3*d* or (b) a microphone for capturing sound based on which to generate and output an audio stream for transmission at the step S116*a* in the process P3*d*. Each destination UE 100 may be provided with an output on or through which to present the analysis result received from the MEC server 300. The analysis result may include a video stream, in which case the output may include a display on which to play back the video stream. The analysis result may include an audio stream, in which case the output may include a loudspeaker through which to play back the audio stream. Each UE 100 may be a dedicated source UE 100 that is preliminarily configured or designed to be operative as the source UE 100, not the destination UE 100. Each UE 100 may be a dedicated destination UE 100 that is preliminarily configured or designed to be operative as the destination UE 100, not the source UE 100. Each UE 100 may be a flexible source/destination UE 100 that can be flexibly or selectively operative as one of the source UE 100 and destination UE 100 according to a predetermined condition.

An example of the dedicated source UE 100 may be a camera product that comprises a camera with which to take images into a video signal and a processor configured to generate a video stream based on the video signal. The camera product may be a fixed one which is installed on a given filming position, or may be a mobile or portable one which can be carried by a user over various filming positions. The camera product may be a surveillance camera or security camera for surveillance of people or other objects in the edge site ES. The camera product may be a broadcasting camera for broadcasting of an event such as a sports game, music concert, etc. performed in the edge site ES. Another example of the dedicated source UE 100 may be a microphone product that comprises a microphone with which to take sound into an audio signal and a processor configured to generate an audio stream based on the audio signal. The microphone product may be a fixed one which is installed on a given sound-collecting position, or may be a mobile or portable one which can be carried by a user over various sound-collecting positions. The camera product and microphone product may be united or integrated into one, such as a surveillance camera with a built-in microphone.

An example of the dedicated destination UE 100 may be a display product that is provided with a display on which video is displayed as a result of playback of a video stream associated with the analysis result received from the MEC server 300. The display product may be a smartphone, tablet, personal computer, laptop, etc. that comprises at least one of a display and loudspeaker for output of the analysis result.

An example of the flexible source/destination UE 100 may be a computing device for personal use, industrial use, educational use, etc. such as a smartphone, tablet, personal computer, laptop, etc. that comprises both of (a) a camera or microphone for capture of images or sound and (b) an output such as a display and loudspeaker for output of the analysis result. The flexible source/destination UE 100 may be provided with a processor configured to: (a) generate a video or audio stream based on images or sound captured by the camera or microphone respectively when the flexible source/destination UE 100 is in operation as the source UE 100, and to (b) play back the analysis result on or through the display or loudspeaker when the flexible source/destination UE 100 is in operation as the destination UE 100. The flexible source/destination UE 100 may switch between a first mode of operation where the UE 100 operates as the source UE 100 and a second mode of operation where the UE 100 operates as the destination UE 100 manually in response to a user input on a UI or automatically in response to a predetermined event associated with the UE 100. For example, the UE 100 may switch between the first mode and second mode automatically depending on whether the camera of the UE 100 is in operation. Specifically, the UE 100 may set itself to operate as the source UE 100 in the first mode automatically in response to launching or activating the camera of the UE 100, whereas the UE 100 may set itself to operate as the destination UE 100 in the second mode automatically in response to terminating or deactivating the camera.

In the example illustrated in FIG. 14A, the system includes a surveillance camera 100*a* as a dedicated source UE 100*a* for capture of images, a microphone product 100*b* as a dedicated source UE 100 for capture of sound, and a smartphone 100*c* as a dedicated destination UE 100.

In some embodiments, each UE 100 may store therein attribute information indicative of its attribute of being one of the source UE 100 for image capture, source UE 100 for sound capture, and destination UE 100. The dedicated source UE 100 specially designed for capture of images or sound may have invariable attribute information indicative of being a source UE 100 for image capture or sound capture respectively. The dedicated destination UE 100 specially designed to act as a destination of the analysis result may have invariable attribute information indicative of being a destination UE 100. On the other hand, the flexible source/destination UE 100 may have variable attribute information indicative of being a source UE 100 or destination UE 100 depending on whether the UE 100 is set to be the source UE 100 or destination UE 100. In the embodiments, each UE 100 may issue a notification message to the MEC server 300 to notify the attribute information with the identity (e.g., UE ID) of the UE 100, so that the MEC server 300 may identify each UE 100 in the edge site ES as one of the source UE 100 and destination UE 100 for management of the UEs 100 in the edge site ES. Each UE 100 may send the UE ID of the UE 100 with the attribute information automatically in response to discovering and connecting to the MEC server 300, e.g., according to the process P2*a*, P2*b*, P2*c*, or P2*d*. Each flexible source/destination UE 100 may send the UE ID of the UE 100 with the attribute information automatically in response to every change among the source UE for image capture, source UE for sound capture, and destination UE. The MEC server 300 may generate and update a database for the management of the UEs 100 in response to the notified attribute information from the UEs 100.

Also, the MEC server 300 may manage the location or position of each source UE 100 with respect to an area corresponding to the edge site ES, on the database. Specifically, the MEC server 300 may store therein (a) a map for the area in the edge site ES where the source UE 100 may present (i.e., the area on which a fixed source UE 100 can be installed or over which a mobile source UE 100 can be positioned) and (b) location information indicative of the location relative to the area per source UE 100, so that the MEC server 300 may identify the location of each source UE 100 on the map. In an aspect, the MEC server 300 may prompt the user to plot the location of each source UE 100 on the map on a GUI to receive a user input of the plotting, so that the plotted location relative to the map may be stored per source UE 100 on the database, just as discussed with reference to FIG. 13D. In another aspect, the map may include geographical information indicative of coordinates for positions in the area, and each source UE 100 may be provided with a positioning system such as a GNSS and IPS to identify the coordinates of itself, in which case each source UE 100 may send location information indicative of the identified coordinates of its location to the MEC server 300 so that the MEC server 300 may identify the location of each source UE 100 on the map. The source UE 100 may send the location information to the MEC server 300 at least once when the source UE 100 is turned on, for example, at least once upon the source UE 100 being turned on, upon request from the MEC server 300, or otherwise regularly or irregularly. The source UE 100, when it is a mobile source UE 100 subject to change of its location as time goes by, may send the location information periodically at predetermined intervals.

FIG. 14B schematically illustrates an example of a database 65 for management of UEs 100 in the edge site ES, according to some embodiments. The database 65, similar to the database 60 discussed above, may list at least one participant 65*a* each of which is indicative of a UE 100 as a participant in a local communication under control of the MEC server 300, and an attribute 65*b* associated with each UE 100 (participant 65*a*) that is indicative of one of the source UE for video capture, source UE for sound capture, and destination UE with reference to the attribute information received form the corresponding UE 100. The participant 65*a* may be represented by the UE ID of the corresponding UE 100. In addition, the database 65 may include a map 65*d* that is a map discussed above that corresponds to the area in the edge site ES where the listed source UEs 100 can be present, and may list a location 65*c* associated with each source UE 100 that is indicative of the location of the corresponding source UE 100 on the map 65*d*. The location 65*c* may be listed with reference to the user's plotted location or the location information generated using a positioning system of the source UE 100. In the example illustrated in FIG. 14B, the database 65 lists three source UEs 100 for vide capture identified by UE001, UE003, and UE005 respectively; two source UEs 100 for sound capture identified by UE 025 and 026 respectively; and two destination UEs 100 identified by UE0040 and UE042 respectively, wherein the locations of the source UEs 100 for video capture (UE001, UE003, UE005) are identified on the map 65*d* by means of symbols A, B, and C, respectively while the locations of the source UEs 100 for sound capture (UE025, UE026) are identified on the map 65*d* by means of symbols D and E respectively.

In some embodiments, a GUI just as discussed above with reference to FIG. 13C may be used to receive a user selection to set the UE 100 to be one of the source UE 100 for video capture, source UE 100 for sound capture, and destination UE 100.

In some embodiments, a GUI with presentation of the map 65*d* just as discussed above with reference to FIG. 13D may be used to allow the user to plot the location of a source UE 100 on the map 65*d*.

In some embodiments, the MEC server 300 may receive video or audio streams from source UEs 100 (S116*b*), and analyze the video or audio streams based on the analysis rule obtained from the Internet server 200 (S116*c*). FIG. 14C is a flowchart illustrating an example of the analysis of the video or audio streams at the step S116*c*, according to some embodiments. At the step S116*c*, the MEC server 300 may analyze the video or audio streams using the analysis rule to identify a target which meets the analysis rule in images or sound obtained by playback of the video or audio streams (S180*a*). Upon determining that there is no such target found, the analysis may be continuously performed (S180*b*: No). Upon identifying a target which meets the analysis rule (S180*b*: Yes), the MEC server 300 may identify a source UE 100 associated with the identified target (S180*c*). At the step S180*c*, the MEC server 300 may identify a source UE 100 which is the source of the video or audio stream in which the target has been found. The MEC server 300 may then generate a notification message indicative of the result of the analysis, i.e., the discovery of the target, and send the notification message to the at least one destination UE 100 listed in the database 65 over a local connection (S180*d*). In response to receipt of the notification message from the MEC server 300 (S180*e*), the MEC server 300 may present the analysis result on a UI for notifying the analysis result to the user (S180*f*).

In an aspect, the analysis rule may include a target image based on which image recognition is performed. In the aspect, the MEC server 300 may perform image recognition to identify an image which contains the target image, out of the images represented by the video streams received from the source UEs 100, at the step S116*c*. More specifically, the MEC server 300 may decode the video streams received from the source UEs 100 to obtain images represented by the respective video streams, and perform image recognition on the images in comparison with the target image so as to identify an image which contains the target image (S180*a*, S180*b*). An example of the target image may be one which is associated with a license number on a license plate of a vehicle, etc. Another example of the target image may be one which is associated with the face of a person such as a wanted criminal, in which case the image recognition may involve face recognition. In the aspect, at the step S180*c*, the source UE 100 associated with the identified image, namely, the source UE 100 which is the source of the video stream conveying the identified image, may be identified. In the aspect, the analysis result in the notification message generated at the step S180*d* may include at least one of (a) the identified image; (b) location information indicative of the location 65*c* of the source UE 100 identified at the step S180*c*; and (c) the identifier (i.e., UE ID) of the source UE 100 identified at the step S180*c*. For example, when the image obtained by decoding a video stream from the source UE 100 (UE003) among source UEs 100 (UE001, UE003, UE005) is identified as containing the target image at the step S180*b*, the analysis result may include the location information and identifier of the source UE 100 (UE003).

In another aspect, the analysis rule may include an analysis module containing an algorithm for identifying a specific event by means of image recognition. The analysis module may include a computer program having instructions for executing the algorithm to identify a specific event. An example of the analysis module may be a module for identifying the event of a collision among two or more objects such as vehicles using detection of moving objects. In the aspect, the MEC server 300 may execute the analysis module to identify the specific event in an image, out of the images represented by the video streams received from the source UEs 100, at the step S116*c*. More specifically, the MEC server 300 may decode the video streams received from the source UEs 100 to obtain images represented by the respective video streams, and execute the analysis module on the images so as to identify the event in any image (S180*a*, S180*b*). In the aspect, at the step S180*c*, the source UE 100 associated with the identified event, namely, the source UE 100 which is the source of the video stream conveying the image in which the event has been identified, may be identified. In the aspect, the analysis result in the notification message generated at the step S180*d* may include at least one of (a) the image in which the event has been identified; (b) location information indicative of the location 65*c* of the source UE 100 identified at the step S180*c*; and (c) the identifier (i.e., UE ID) of the source UE 100 identified at the step S180*c*. For example, when the event is identified in the image obtained by decoding a video stream from the source UE 100 (UE003) among source UEs 100 (UE001, UE003, UE005) at the step S180*b*, the analysis result may include the location information and the identifier of the source UE 100 (UE003).

In yet another aspect, the analysis rule may include target voice based on which voice recognition is performed. In the aspect, the MEC server 300 may perform voice recognition to identify the target voice in the sound represented by the audio streams received from the source UEs 100, at the step S116*c*. More specifically, the MEC server 300 may decode the audio streams received from the source UEs 100 to obtain sound represented by the respective audio streams, and perform voice recognition on the sound in comparison with the target voice so as to identify the target voice in the sound (S180*a*, S180*b*). An example of the target voice may be one which is associated with a person such as a wanted criminal. In the aspect, at the step S180*c*, the source UE 100 associated with the identified target voice, namely, the source UE 100 which is the source of the audio stream conveying sound in which the target voice has been identified, may be identified. In the aspect, the analysis result in the notification message generated at the step S180*d* may include at least one of (a) the identified target voice; (b) location information indicative of the location 65*c* of the source UE 100 identified at the step S180*c*; and (c) the identifier (i.e., UE ID) of the source UE 100 identified at the step S180*c*. For example, when the target voice is identified in the sound obtained by decoding an audio stream from the source UE 100 (UE003) among source UEs 100 (UE001, UE003, UE005) at the step S180*b*, the analysis result may include the location information and the identifier of the source UE 100 (UE003).

In yet another aspect, the analysis rule may include an analysis module containing an algorithm for identifying a specific event by means of voice recognition. The analysis module may include a computer program having instructions for executing the algorithm to identify a specific event. An example of the analysis module may be a module for identifying the event of scream or loud cry uttered by a person. In the aspect, the MEC server 300 may execute the analysis module to identify the specific event in the sound represented by the audio streams received from the source UEs 100, at the step S116*c*. More specifically, the MEC server 300 may decode the audio streams received from the source UEs 100 to obtain sound represented by the respective audio streams, and execute the analysis module on the sound so as to identify the event (S180*a*, S180*b*). In the aspect, at the step S180*c*, the source UE 100 associated with the identified event, namely, the source UE 100 which is the source of the audio stream conveying sound in which the event has been identified, may be identified. In the aspect, the analysis result in the notification message generated at the step S180*d* may include at least one of (a) the sound in which the event has been identified; (b) location information indicative of the location 65*c* of the source UE 100 identified at the step S180*c*; and (c) the identifier (i.e., UE ID) of the source UE 100 identified at the step S180*c*. For example, when the event is identified in the sound obtained by decoding an audio stream from the source UE 100 (UE003) among source UEs 100 (UE001, UE003, UE005) at the step S180*b*, the analysis result may include the location information and the identifier of the source UE 100 (UE003).

In some embodiments, the presentation of the analysis result at the step S180*f* may include playback of a video or audio stream generated by the source UE 100 identified at the step S180*c*, allowing the user to watch or listen to images or sound associated with the image or sound in which the target has been identified at the step S180*b*. FIG. 14D is a flowchart illustrating an example of a process P10*a* for playback of the video or audio stream at the step S180*f*, according to some embodiments. In the process P10*a*, the analysis result sent by the MEC server 300 may include a video or audio stream which is being received by the MEC server 300 from the source UE 100 identified at the step S180*c* (S181*a*). At the step S181*a*, the MEC server 300 may forward the video or audio stream along with other items in the analysis result to the destination UE 100. In response to receipt of the video or audio stream (S181*b*), the destination UE 100 may play back the received video or audio stream (S181*c*).

Instead of receiving the video or audio stream from the MEC server 300 according to the process P10*a*, the destination UE 100 may receive the video or audio stream from the source UE 100 directly in a P2P manner. FIG. 14E is a flowchart illustrating an example of a process P10*b* for playback of the video or audio stream in a P2P manner at the step S180*f*, according to some embodiments. In the process P10*b*, upon receipt of the analysis result, the destination UE 100 may refer to the identifier of the source UE 100 in the analysis result, to issue a stream request to the source UE 100 (S182*a*). In response to stream request (S182*b*), the source UE 100 may initiate transmission of a video or audio stream generated by itself to the destination UE 100 over a local connection (S182*c*). In response to receipt of the video or audio stream (S182*d*), the destination UE 100 may play back the received video or audio stream (S182*e*). Thus, the video or audio stream may be provided directly in a P2P manner from the source UE 100 to the destination UE 100 over the local connection.

At the step S180*f*, the destination UE 100 may present the analysis result on a UI. FIG. 14F schematically illustrates an example of a GUI 540 for presentation of the analysis result at the step S180*f*, according to some embodiments. The GUI 540 may include a video presentation 540*a* that displays the image in the analysis result, allowing the user to watch the image at the time when the target has been identified at the step S180*b*. The GUI 540 may also include a location presentation 540*b* that displays the location of the source UE 100 associated with the image displayed by the video presentation 540*a*, with reference to the location information in the analysis result. The location presentation 540*b* may correspond to the location 65*c* of the source UE 100 on the map 65*d*. The GUI 540 may also include a video presentation 540*c* that provides playback of the video stream at the step S181*c* or S182*c*. When the analysis result includes sound or voice in place of an image, the sound or voice may be played back and outputted through a loudspeaker of the destination UE 100 in place of the video presentation 540*a*, in which case the location presentation 540*b* displays the location of the source UE 100 associated with the sound or voice with reference to the location information in the analysis result. When the destination UE 100 plays back an audio stream instead of an video stream at the step S181*c* or S182*c*, the audio stream may be played back and outputted through the loudspeaker of the destination UE 100 in place of the video presentation 540*c*.

At the step S180*f*, presentation of the analysis result may be added to the previous presentation of another past analysis result upon receipt of the analysis result on the UI, causing the UI to present multiple analysis results that have been received in the chronological order. FIG. 14G schematically illustrates another example of the GUI 540 which presents two or more analysis results. The GUI 540 may be updated in response to receipt of a new analysis result in such a manner where the video presentation 540*a* and associated location presentation 540*b* is added to the previously displayed video presentation 540*a* and location presentation 540*b*, thereby allowing the user to pay attention to the chronological change in target identifications. The GUI 540 may also include a timestamp presentation 540*d* that presents the substantial time at which the target associated with the video presentation 540*a* was identified at the step S180*b*. The timestamp presentation 540*d* may present the time indicated by the timestamp allocated on the analysis result, e.g., the timestamp allocated on the image or sound in the analysis result; the time at which the destination UE 100 actually received the analysis result at the step S180*e*; etc. In the example of FIG. 14G, the video presentation 540*a* and location presentation 540*b* for the target identified at 08:10 pm has been added to the previous video presentation 540*a* and location presentation 540*b* for the target identified at 08:02 pm, on the GUI 540.

For the analysis rule update service (Internet service) in the process P4*f*, the Internet server 200 may store therein one or more analysis rules based on which the MEC server 300 performs the analysis on the video or audio streams locally in the edge site ES at the step S116*c*. The one or more analysis rules may be stored and managed by the MEC server 300 on a database. In the process P4*f*, the Internet server 200 may regularly or irregularly send a specific analysis rule to the MEC server 300 over the Internet (S125*a*), so that the MEC server 300 may store therein the received analysis rule for use to perform the local analysis according to the process P3*d* (S125*b*, S125*c*). At the step S125*c*, the MEC server 300 may update an old analysis rule which was received previously in the past with the received new analysis rule, if such old analysis rule exits.

An example of the analysis rule may include the target image discussed above for image recognition. FIG. 14H schematically illustrates an example of database 66 for management of target images, according to some embodiments. The database 66 may list target images 66*c*. Each target image 66*c* may be associated with the ID 66*a* that uniquely identifies the target image 66*c*, and the attribute 66*b* of the target image 66*c*. An example of the attribute 66*b* may be the name of a person when the target image 66*c* is an image of the person for, e.g., face recognition as discussed above. In the example illustrated in FIG. 14H, the target image identified by RID001 for a person named "Adam W. D." and the target image identified by RID002 for a person named "Jessica H." are listed on the database 66. The database 66 may updated by a new target image 66*c* being added to or deleted from the database 66 in various manners. For example, when the database 66 lists the target images of the faces of wanted criminals for the purpose of arrest of the criminals, a new target image 66*c* may be added when a law enforcement authority newly issues an target image 66*c* for a wanted criminal, in which case the Internet server 200 may be operated by the law enforcement authority. In the process P4*f*, the Internet server 200 may automatically send the newly added target image 66*c* on the database 66 in response to a target image being newly added to the database 66 (S125*a*). The MEC server 300 may accumulatively store therein target images 66*c* by storing every received new target image 66*c* (S125*b*, S125*c*) in the process P4*f*, to perform image recognition with reference to every target image 66*c* (S116*c*) in the process P3*d*. When the analysis result is the result of analysis which has identified a target image 66*c* using the database 66, the analysis result may include information indicative of the ID 66*a* and attribute 66*b* associated with the identified target image 66*c*.

Another example of the analysis rule may include the analysis module discussed above for image or voice recognition. FIG. 14I schematically illustrates an example of database 67 for management of analysis modules, according to some embodiments. The database 67 may list analysis modules 67*c*. Each analysis module 67*c* may have computer program instructions for identifying a specific event according to a specific algorithm. On the database 67, each analysis module 67*c* may be associated with the ID 67*a* that uniquely identifies the analysis module 67*c*, and the specific event 67*b* which the analysis module 67*c* is programmed to identify. In the example illustrated in FIG. 14I, there are listed: "Car Crash Detection.exe" programmed to identify the event of a car crash using an algorithm for detection of collision of moving objects in an image by image recognition; "License Plate Detection.exe" programmed to identify the event of presence of a car with a specific license plate thereon using an algorithm for detection of license numbers on a license plate in an image by image recognition; and "Scream Detection.exe" programmed to identify the event of a scream by a person using an algorithm for detection of a scream by voice recognition. The database 67 may be updated by a new analysis algorithm being added to or deleted from the database 67 in various manners. For example, when the Internet server 200 is operated by a developer of analysis modules, the database 67 may be updated by a new analysis module 67*c* being added to the database 67 in response to the new analysis module 67*c* being developed by the developer. In the process P4*f*, the Internet server 200 may automatically send the newly added analysis module 67*c* in response to the analysis module being newly added to the database 67 (S125*a*). The MEC server 300 may accumulatively store therein analysis modules 67*c* by storing every received new analysis modules 67*c* (S125*b*, S125*c*) in the process P4*f*, to perform the local analysis to identify the specific events by executing every analysis module (S116*c*) in the process P3*d*. When the analysis result is the result of analysis which has identified an event 67*b* using an associated analysis module 67*c*, the analysis result may include information indicative of the ID 67*a* and the identified event 67*b*.

For the analysis history storage service, in the process P4*g*, the MEC server 300 may send the analysis result generated at the step S116*c* according to the process P3*d*, to the Internet server 200 over the Internet 3 (S126*a*). At the step S126*a*, the MEC server 300 may send the analysis result to the Internet server 200 regularly or irregularly in parallel to transmission of the analysis result to the destination UE 100 over the local connection at the step S180*d* in the process P3*d*.

The Internet server 200 may receive the analysis result from the MEC server 300 over the Internet 3 (S126*b*), and store therein the analysis result (S126*c*). At the step S126*c*, the Internet server 200 may make and store therein a video file from the image discussed above contained in the analysis result. Similarly, the Internet server 200 may make and store therein an audio file form the sound or voice discussed above contained in the analysis result. The MEC server 300 may send the analysis result to the Internet server 200 upon every generation of an analysis result, so that two or more individually generated analysis results may be organized and managed by the Internet server 200 on a database. FIG. 14J schematically illustrates an example of a database 68 for the management of the analysis results, according to some embodiments. The database 68 may list the generated video or audio files 68*c* each of which represents the image, sound, or voice contained in the corresponding analysis result. Each video or audio file 68*c* may be associated with the target 68*b* that indicates the target identified at the step S180*b* for which the corresponding analysis result has been generated. The target 68*b* may be identified with reference to information contained in the analysis result. When the analysis result is the result of analysis which identified an target image 66*c* using the database 66, the attribute 66*b* indicated by the information in the analysis result may be referred to, to identify the target 68*b*. When the analysis result is the result of analysis which identified an event 67*b* using the database 67, the identified event 67*b* indicated by the information in the analysis result may be referred to, to identify the target 68*b*. Each video or audio file 68*c* may also be associated with the time 68*a* that indicates the time at which the target was identified for the corresponding analysis result. The time 68*a* may correspond to the time indicated by the timestamp allocated to the analysis result. In the example illustrated in FIG. 14J, the database 68 lists three analysis results generated individually by the MEC server 300: the first analysis result with a video file entitled "FR001.mp4" which has been generated from an image identified as including the target image 66*c* associated with "Adam W. D." with reference to the database 66 (S180*b*); the second analysis result with an audio file entitled "ED001.mp3" which has been generated from sound identified as corresponding to the event 67*b* of a scream with reference to the database 67 (S180*b*); and the third analysis result with a video file entitled "ED002.mp4" which has been generated from an image identified as corresponding to the vent 68*b* of a car crash with reference to the database 67 (S180*b*). The video file "FR001.mp4" is associated with the target 68*b* of "Adam W. D." as indicated by the attribute 66*b* in the first analysis result and associated with the time 68*a* indicated by the timestamp allocated to the first analysis result; the audio file "ED001.mp3 is associated with the target 68*b* of "Scream" as indicated by the event 67*b* in the second analysis result and associated with the time 68*a* indicated by the timestamp allocated to the second analysis result; and the video file "ED002.mp4" is associated with the target 68*b* of "Car Crash" as indicated by the event 67*b* in the third analysis result and associated with the time 68*a* indicated by the timestamp allocated to the third analysis result.

The Internet server 200 may then provide download or streaming of a video or audio file managed on the database 68 to a destination UE 100 over the Internet 3 according to the process P4*g* (S126*d*-S126*g*). The Internet server 200 may respond to a file request message from a destination UE 100 for download or streaming of a video or audio file (S126*e*) by identifying and reading out the requested video or audio file from the database 68 and sending it to the destination UE 100 for download or streaming over the Internet 3 (S126*f*). At the step S126*h*, the Internet server 200 may play back a video or audio file selected using an input device of the Internet server 200, on a display of the Internet server 200 or through a loudspeaker of the Internet server 200 (S126*h*). The file request message issued at the step S126*d* may be a request for a video or audio file selected by a user out of the video or audio files managed on the database 68. In an aspect of the file request at the step S126*d*, the UE 100 may prompt the user to manually enter or specify search criteria through a UI, so that the file request message issued at the step S126*d* may include search criteria information indicative of the entered search criteria. The search criteria may include information equivalent to the target 68*b* for identifying a video or audio file 68*c*. In this case, the Internet server 200 may refer to the search criteria information to identify a video or audio file 68*c* which meets the search criteria, and (a) send the identified video or audio file to the UE 100 for download or (b) stream the identified video or audio file to the UE 100 for instant play back (S126*f*). For example, when the search criteria includes the name "Adam W. D.", the Internet server 200 may identify a video file "FR001.mp4" associated with "Adam W. D." in the target 68*b* on the database 68, to provide download or streaming of the video file "FR001.mp4" to the UE 100 over the Internet 3. For example, when the search criteria includes the event "Scream", the Internet server 200 may identify an audio file "ED001.mp3" associated with the event "Scream" in the target 68*b* on the database 68, to provide download or streaming of the audio file "ED001.mp3" to the UE 100 over the Internet 3.

FIG. 14K is a flowchart illustrating an example of a process P10*c* for providing download or streaming of a video or audio file identified based on the search criteria according to the process P4*g*, according to some embodiments. The process P10*c* may be performed by and between the UE 100 and Internet server 200 when the UE 100 is not in a local connection with the MEC server 300 for display of the GUI 540. In the process P10*c*, the UE 100 may generate and send a file request message containing search criteria to the Internet server 200 over the Internet 3 (S183*a*). At the step S183*a*, the UE 100 may activate the UI discussed above through which to enter or specify search criteria, to generate the first file request message containing the entered search criteria. In response to the first file request message request (S183*b*), the Internet server 200 may identify one or more video or audio files 68*c* on the database 68 which meets the search criteria in the first file request message (S183*c*). The Internet server 200 may then generate a reply message including information indicative of the identified one or more video or audio files, and send the reply message to the UE 100 (S183*d*). In response to receipt of the reply message (S183*e*), the UE 100 may present the one or more video or audio files indicated by the reply message on a UI through which to receive a user input to specify one of the presented video or audio files (S183*f*). The UE 100 may then generate a second file request message including information indicative of the finally specified video or audio file, and send the second file request message to the Internet server 200 for streaming or download of the video or audio file (S183*g*). In response to the second file request message (S183*h*), the Internet server 200 may perform the provision of streaming or download of the specified video or audio file according to the step S126*f*, causing the UE 100 to perform playback the streamed video or audio file or download of the video or audio file.

FIG. 14L schematically illustrates an example of a GUI 541 for entry of search criteria at the step S183*a*, according to some embodiments. The GUI 541 may include an input filed 541*a* in which the user is allowed to manually enter search criteria. The GUI 541*a* may include a selectable GUI element 541*b*. A user selection of the GUI element 541*b* may invoke issuance of the first file request message containing the search criteria entered in the input field 541*a*.

FIG. 14M schematically illustrates an example of a GUI 542 for presenting one or more video or audio files at the step S183*f*, according to some embodiments. The GUI 542 may include a search criteria presentation 542*a* that displays the search criteria contained in the first file request message, namely, the search criteria based on which the Internet server 200 has identified one or more video or audio files at the step S183*c*. The GUI 542 may include a file presentation 542*b* that displays icons that respectively correspond to the one or more video or audio files identified at the step S183*c*. A presentation of time 542*c* for each video or audio file with reference to the time 68*a* on the database 68, may appear along with the file presentation 542*b*. A user selection of one of the icons 542*b* may invoke selection of a corresponding video or audio file for download or streaming. The GUI 542 may also include a selectable GUI element 542*d* for request for download and a selectable GUI element 542*e* for request for streaming. A user selection of the GUI element 542*d* may invoke issuance of the second file request message for download of the selected video or audio file, causing the Internet server 200 to send the selected video or audio file to the UE 100 in order for the UE 100 to download and store therein the video or audio file (S126*d*-S126*g*). On the other hand, a user selection of the GUI element 542*e* may invoke issuance of the second file request message for streaming of the selected video or audio file, causing the Internet server 200 to stream the selected video or audio file to the UE 100 in order for the UE 100 to instantly play back the video or audio file (S126*d*-S126*g*).

FIG. 14N schematically illustrates an example of a GUI 543 for playback of the video or audio stream at the step S126*g*, where playback of the video stream 543*a* is provided on the GUI 543.

The image or sound analysis system may be operated by a law enforcement agency which uses the edge-based image or sound analysis at the MEC server 300 for prevention, detection, and/or investigation of crimes. In this case, the destination UE 100 may be a smartphone, tablet, laptop, etc. carried by each police officer, investigator, agent, etc. associated with the criminal prevention, detection, and/or investigation who works for the law enforcement agency, so that the result of the edge-based analysis may be timely notified to the law enforcement personnel in the edge site ES.

In some modified embodiments, the MEC server 300 may provide download or streaming of an audio/video file based on the analysis result to a destination UE 100 over the Internet 3. In the modified embodiments, the MEC server 300 may be accessible by the destination UEs 100 over the Internet 3 using the global IP address allocated to the MEC server 300 even when the destination UE 100 is not in the edge site ES, just as the Internet server 200 is accessible by the destination UEs 100 over the Internet 3 for download or streaming of an audio/video file based on the analysis result according to the process P4*g*. In the modified embodiments, each audio/video file generated by the MEC server 300 based on an analysis result may be stored in the MEC server 300 to be accessible by the destination UEs 100 for download or streaming to the destination UEs 100. FIGS. 14O and 14P are flowcharts illustrating an example of a process P10*d* for provision of download or streaming of an audio/video file from the MEC server 300 to a destination UE 100, according to some modified embodiments. In the process P10*d*, the MEC server 300 may generate an audio/video file based on each analysis result (S184*a*), just as the Internet server 200 does at the step S126*c* in the process P4*g*. The MEC server 300 may then store therein the created audio/video files (S184*b*). At the step S184*b*, the MEC server 300 may organize and list the created audio/video files on a database, just as the database 68 discussed above with reference to FIG. 14J. In the process P10*d*, the destination UE 100 may generate and send a request message for an audio/video file stored in the MEC server 300 to the MEC server 300, just as it does to the Internet server 200 at the step S126*d* in the process P4*g* (S184*c*). In response to receipt of the request message (S184*d*), the MEC server 300 may identify and read out the requested audio/video file out of audio/video files stored in the MEC server 300, and then provide download or streaming of the requested audio/video file to the requesting UE 100 over the Internet 3 (S184*e*). The UE 100 may receive streaming of the audio/video file for instant playback, or download and store therein the audio/video file for later playback (S184*f*). In an aspect, the request issued at the step S184*c* may be based on a search criteria entered by a user of the UE 100 through a UI, just as an aspect of the request message discussed above at the step S126*d* in the process P4*g*. In the aspect, the UE 100 may send a request message containing search criteria to the MEC server 300 (S184*g*), just as the UE 100 does at the step S183*a* in the process P10*c*, in reply to which the MEC server 300 may identify one or more audio/video files which meet the search criteria and send back a reply message indicative of the identified audio/video files (S184*h*-S184*j*), just as the UE 100 does at the steps S183*b*-S183*d* in the process P10*c*. The UE 100 may activate a UI presenting the one or more audio/video files indicated by the reply message to prompt the user to select one of the audio/video files (S184*k*, S1841), just as the MEC server 300 does at the steps S183*e* and S183*f*, so that the request message issued at the step S184*a* may include information indicative of the selected audio/video file.

The summary of the image/sound analysis system according to the embodiments discussed above is described blow with reference to FIG. 14Q. The analysis rule for analysis of audio/video streams may be uploaded from the Internet server 200 to the MEC server 300 in the process P4*f*. The audio/video streams originating from the UEs 100 in the edge site ES may be analyzed using the analysis rule by the MEC server 300 for notification of the analysis result to the destination UEs 100 in the edge site ES in the process P3*d*. In parallel to the analysis of the audio/video streams in the process P3*d*, audio/video files based on the analysis result may be generated in the process P4*g* or P10*d*, so that the audio/video files stored in the Internet server 200 may be downloaded or streamed from the Internet server 200 to the UE 100 in the process P4*g* or the audio/video files stored in the MEC server 300 may be downloaded or streamed from the MEC server 300 to the UE 100 in the process P10*d*. Advantageously, real-time analysis of audio/video streams that causes heavy network traffic and requires massive computing power may be offloaded on the MEC server 300. Advantageously, an audio/video file as a report on the result of the analysis may be automatically generated to be accessible by the UEs 100, in parallel to the analysis.

(Location Analysis System)

In some embodiments, the MEC service may be an edge-based local location analysis service that involves aggregating and analyzing location information indicative of locations of the respective UEs 100 in the edge site ES to detect and alert an event associated with their relative locations. The local location analysis service may be performed under control of the MEC server 300 in the edge site ES. In connection with the local location analysis service, the Internet service may include an event record storage service that involves storing the record, history, or log of the event detected as a result of the local location analysis. The event record storage service may be performed according to the process P4*g*.

FIG. 15A schematically illustrates an example of a system for providing the MEC service (local location analysis service) and the Internet service (event record storage service), according to some embodiments. The system may include UEs 100 each of which is provided with circuitry configured to periodically generate location information indicative of the current location or position of the UE 100. The circuitry may be one which is configured to generate location information using GPS or other satellite-based positioning system generally referred to as GNSS; IPS or other positioning system using WiFi access points, Bluetooth beacons, Radio Frequency Identification (RDID) readers and tags, magnetic field sensing, etc. The location or position of a UE 100 may be represented by the coordinate such as the altitude and longitude that uniquely identifies the geographical position at which the UE 100 is present. Each UE 100 may also be provided with an output on or through which to present the result of the local location analysis. The output may be a display on which to visually present the analysis result.

An example of each UE 100 may be a smartphone, tablet, laptop, GNSS tracking unit, or other portable electronic device carried by a user which includes a built-in circuit for locating the UE 100. Another example of each UE 100 may be such a vehicle as a car, truck, bus, etc. which includes an on-board circuit for locating the vehicle.

FIG. 15B is a flowchart illustrating an example of a process P12*a* for the edge-based local analysis of the locations of respective UEs 100 in the edge site ES, according to some embodiments. In the process P12*a*, each UE 100 in the edge site ES may continuously generate the location information indicative of the current location or position of the UE 100, and transmit a location information message including the location information to the MEC server 300 over a local connection (S200*a*). At the step S200*a*, the UE 100 may periodically transmit the location information messages at predetermined time intervals (e.g., every one millisecond). The MEC server 300 may analyze the location information in the location information messages received from respective UEs 100, to detect an event associated with the relationship between two or more UEs 100 (S200*b*, S200*c*). The analysis at the step S200*c* may be performed periodically at said predetermined time intervals at which the location information messages are transmitted from each UE 100. The event may be defined by a predetermined relationship between the locations of two or more UEs 100. Upon detecting the event (S200*d*: Yes), the MEC server 300 may generate and store therein a record, history, or log of the detected event (S200*e*). The MEC server 300 may also generate an event information message indicative of the detected event, and send the event information message to at least one UE 100 associated with the detected event over a local connection (S200*f*). In response to receipt of the event information message (S200*g*), the UE 100 may respond to the detected event indicated by the event information message (S200*h*). In the process P12*a*, the analysis of the locations of UEs 100 is performed by the MEC server 300, and therefore a high-performance processor for the analysis is centralized in the MEC server 300 without the need of each UE 100 being provided with such high-performance processor. Alternatively, the implementation can be modified into one in which each UE 100 performs the analysis instead of the MEC server 300.

FIG. 15C is a flowchart illustrating an example of a process P12*b* alternative to the process P12*a*, in which each UE 100 performs the local location analysis, according to some embodiments. In the process P12*b*, each UE 100 may continuously generate the location information indicative of the current location or position of the UE 100, and transmit a location information message including the location information to the MEC server 300 over a local connection (S201*a*). At the step S201*a*, the UE 100 may periodically transmit the location information messages at predetermined time intervals (e.g., every one millisecond). In response to receipt of the location information message (S201*b*), the MEC server 300 may forward the received location information message to the UEs 100 over a local connection (S201*c*). At the step S201*c*, the MEC server 300 may forward a location information message received from a UE 100 to every one of other UEs 100 in the edge site ES, so that locations of respective UEs 100 in the edge site ES are shared by the respective UEs 100. The forwarding of the location information messages at the step S201*c* may be performed periodically at said time intervals at which the location information messages are transmitted. Each UE 100 may analyze the location information in the received location information messages to detect an event associated with the location of the UE 100 itself and location(s) of at least one other UE 100 (S201*d*, S201*e*). The analysis at the step S201*e* may be performed periodically at said time intervals at which the location information messages are forwarded. The event may be defined by a predetermined relationship between the location of the UE 100 (analyzer UE 100 itself) and location(s) of at least one other UE 100 represented by the location information. Upon detecting the event (S201*f*: Yes), the UE 100 may respond to the detected event (S201*g*). The UE 100 may also generate and store therein a record, history, or log of the detected event (S201*h*). The UE 100 may also generate an event information message indicative of the detected event, and send the event information message to the MEC server 300 over a local connection (S201*i*). In response to receipt of the event information message (S201*j*), the MEC server 300 may store therein a record, history, or log of the detected event indicated by the event information message (S201*k*).

For the location analysis at the step S200*c* or S201*e*, the location of each UE 100 represented by the location information generated by said each UE 100 may be listed and managed on a database. The database may be updated by the MEC server 300 or UE 100 upon every receipt of the location information message at the step S200*b* or S201*d*, respectively. FIG. 15D schematically illustrates an example of database 70 for management of the locations of the UEs 100 for the location analysis, according to some embodiments. The database 70 may manage locations or positions (i.e., the latest position and past positions) indicated by the periodically-issued location information messages, per UE 100. In response to the periodic receptions of location information messages from a UE 100, the location or position of the UE 100 may be updated with reference to the location information in the location information messages to list the latest and past positions of the UE 100 that are subject to change as time goes by. The database 70 may include presentation of the identifier (e.g., UE ID) 70*a* of a specific UE 100, and positions 70*b* respectively indicative of the positions of the UE 100 that are indicated by the location information messages issued periodically by the UE 100, per UE 100. Each location information message may include the identifier (e.g., UE ID) that identifies the UE 100 (issuer UE 100) which has generated and issued the location information message, in which case the identifier in the location information message may be referred to for the identifier 70*a*. The positions identified in the chronological order with reference to the location information messages issued periodically from a specific UE 100 (with the same identifier 70*a*) may be listed as the positions 70*b* associated with the identifier 70*a*. For each UE 100 identified by the identifier 70*a*, the positions 70*b* indicate the current or latest position of the UE 100 that is indicated by the most-recently-received location information message and the past positions of the UE 100 that are indicated by the previously-received location information messages. In the example illustrated in FIG. 15D, the database 70 lists latest and past positions of three UEs 100 (UE001, UE002, UE003) with reference to the location information messages periodically issued by every one of the three UEs 100. For UE001, the latest position identified with reference to the most recent location information message from UE001 is represented by "36.114689 −115.163803" while the past positions identified with reference to the previous location information messages from UE001 are indicated by "36.114673, −115.163804", "36.114667, −115.163804", "36.114667, −115.163804", etc. For UE002, the latest position identified with reference to the most recent location information message from UE002 is represented by "36.114583 −115.163677" while the past positions identified with reference to the previous location information messages form UE002 are represented by "36.114587, −115.163647", "36.114589, −115.163626", "36.114587, −115.163593", etc. For UE003, the latest position identified with reference to the most recent location information message from UE003 is represented by "36.114336, −115.163857" while the past positions identified with reference to the previous location information messages from UE003 are represented by "36.114336, −115.163857", "36.114336, −115.163857, "36.114336, −115.163857", etc.

In an aspect of the location analysis, a determination may be made whether the position of a first UE 100 (e.g., UE001) is close to the position of a second UE 100 (e.g., UE002) within a predetermined distance threshold (S200*c*, S201*e*). In response to determining that the positions of the first and second UEs 100 being close to one another within the predetermined distance threshold, the event of collision between the first and second UEs 100 may be detected (S200*d*: Yes, S201*f*: Yes). For such determination, a detection area DA may be defined around the position P of each UE 100. Each detection area DA may be defined or formed as a perfect circle with the radius being constant around the position P of a specific UE 100, meaning that the predetermined distance threshold may be constant over 360 degrees around the UE 100, as schematically illustrated in FIG. 15E. Alternatively, each detection area DA may be defined or formed as a polygon, i.e., closed plane figure such as a rectangular, as schematically illustrated in FIG. 15F. At the step S200*c* or S201*e*, a determination may be made whether the respective detection areas DA of the first and second UEs 100 substantially overlap with one another (S200*c*, S201*e*). In response to determining that the respective detection areas DA of the first and second UEs 100 substantially overlapping with one another, the event of collision between the first and second UEs 100 may be detected (S200*d*: Yes, S201*f*: Yes). FIGS. 15G and 15H schematically illustrate respective exemplary situations where the detection area DA1 associated with the position P1 of the first UE 100 and the detection area DA2 associated with the position P2 of the second UE 100 overlap with one another, indicating that the UEs 100 are in danger of collision.

In the aspect, each detection area DA may be shaped or renewed depending on the movement of the UE 100. More specifically, the radius or apothem from the position P of the UE 100 may be extended to be longer along the direction of the movement, while the radius or apothem may be shortened along the other directions. Further, the radius or apothem from the position P of the UE 100 may be extended to be longer in proportion to the speed at which the UE 100 is moving or traveling along the direction of the movement. So, as a UE 100 moves faster, the detection area DA associated with the position P of the UE 100 may be extended further as the speed of the movement increases, in the direction to which the UE 100 is moving. In the aspect, to form the detection area DA, the direction of the current movement or travel of each UE 100 and the speed at which each UE 100 is currently moving or traveling may be estimated computationally by comparing the latest and past positions of the UE 100 with one another with reference to the database 70, so that the radius or apothem may be extended in proportion to the estimated travel speed along the estimated travel direction. The travel direction and speed of a UE 100 may be computationally estimated based on the differences between the positions of the UE 100 listed on the database 70 and the time intervals at which the location information message for the positions were received. The radius or apothem in the direction of the travel of the UE 100 may become longer as the estimated speed increases. The radius or apothem may not be extended so that the detection area DA is a perfect circle (FIG. 15E) or square (FIG. 15F) when the UE 100 is determined to be staying still without moving as a result of the computational estimation. FIG. 15I schematically illustrates an example of the circular detection area DA, in which the UE 100 at the position P is moving to the left (as shown by an arrow) and so the radius from the position P becomes longer to shape the detection area DA to be an oval or ellipse depending on the movement of the UE 100. FIG. 15J schematically illustrates an example of the polygonal detection area DA, in which the UE 100 at the position P is moving to the left (as shown by an arrow) and so the apothem from the position P becomes longer depending on the movement of the UE 100. FIG. 15K schematically illustrates an exemplary situation where the oval detection area DA1 associated with the position P1 of the first UE 100 traveling to the left and the oval detection area DA2 associated with the position P2 of the second UE 100 travelling downward overlap with one another, indicating that the UEs 100 are in danger of collision. FIG. 15L schematically illustrates an exemplary situation where the rectangular detection area DA1 associated with the position P1 of the first UE 100 travelling to the left and the rectangular detection area DA2 associated with the position P2 of the second UE 100 travelling downward to the right overlap with one another, indicating that the UEs 100 are in danger of collision.

In another aspect of the location analysis, the movement path of each UE 100 along which the UE 100 has traveled may be identified to determine whether some two or more UEs 100 are in danger of collision (S200*c*, S201*e*). In response to determining that two or more UEs 100 are likely to collide with one another based on the respective movement paths of the UEs 100, the event of collision between the UEs 100 may be detected (S200*d*: Yes, S201*f*: Yes). Identifying the movement path of a UE 100 may include plotting the latest and past positions of the UE 100 with reference to the database 70 and connecting each neighboring two positions together using a straight line, to create a path from the oldest position to the latest position, which corresponds to the path along which the UE 100 has traveled. The identified movement path of a UE 100 may be used to estimate the future path of the UE 100 that represents how the UE 100 will likely moves. The future path may comprise the future direction in which the UE 100 will likely go and the future position at which the UE 100 will be likely present predetermined time later (e.g., five milliseconds later, or at the next time of receiving the location information message from the UE 100, etc.). The respective future paths of UEs 100 may be compared with one another to detect the event of collision between the UEs 100. In response to determining that two or more future paths likely conflict with one another, the event of collision between the UEs 100 associated with the conflicting future paths may be detected (S200*d*: Yes, S201*f*: Yes).

FIG. 15M schematically illustrates an exemplary situation where a first movement path for a first UE 100 from the oldest position P1*d* to the latest position P1*a* is identified, a second movement path for a second UE 100 from the oldest position P2*d* to the latest position P2*a* is identified, a third movement path for a third UE 100 from the oldest position P3*d* to the latest position P3*a* is identified, and a fourth movement path for a fourth UE 100 from the oldest position P4*d* to the latest position P4*a* is identified. The first movement path indicates that the first UE 100 is currently moving in a given direction, based on which a first future path (dotted) is estimated and identified. The first future path may include the future direction D1*f* in which the first UE 100 will likely go and the future position P1*f* at which the first UE 100 will be likely present. Similarly, the second movement path indicates that the second UE 100 is currently moving in a given direction, based on which the a second future path (dotted) is estimated and identified. The second future path may include the future direction D2*f* in which the second UE 100 will likely go and the future position P2*f* at which the second UE 100 will be likely present. The third movement path indicates that the third UE 100 has ceased its movement since the time of the position P3*c* to stay still currently, based on which a third future path is estimated and identified. The third future path may include the future position P3*f* at the same position as the latest position P3*a*, with no future direction. Finally, the fourth movement path indicates that the fourth UE 100 has been staying still since the time of the oldest position P4*d*, based on which a fourth future path is estimated and identified. The fourth future path may include the future position P4*f* at the same position as the latest position P4*a*, with no future direction. The first to fourth future paths for the first to fourth UEs 100 are compared with one another to detect the event of collision. In the example illustrated in FIG. 15M, the first and second future paths are determined to likely conflict with one another, invoking detection of the event of collision between the first and second UEs 100.

In the process P12*a*, the MEC sever 300 may perform the above-discussed determination as to the closeness of UEs 100 by comparing the respective positions of the UEs 100 indicated by the location information messages received from the UEs 100 at the step S200*b* (S200*c*), to identify two or more UEs 100 which are in danger of collision between one another for detection of an event of collision between therebetween (S200*d*). The MEC server 300 may perform the above-discussed formation of detection areas DA associated with the respective positions of the UEs 100 indicated by the location information messages received from the UEs 100 at the step S200*b* (S200*c*), to identify two or more UEs 100 which are in danger of collision between one another for detection of an event of collision therebetween (S200*d*). The MEC server 300 may perform the above-discussed identification of moving paths and future paths from the positions of the UEs 100 indicated by the location information messages received from the UEs 100 at the step S200*b* (S200*c*), to identify two or more UEs 100 which are in danger of collision between one another for detection of an event of collision therebetween (S200*d*). At the step S200*f*, the MEC server 300 may generate the event information message indicative of the possible collision between the identified UEs 100, and send the event information message to the identified UEs 100, so that the UEs 100 may respond to the detected event (S200*g*, S200*h*). Assuming that first and second UEs 100 are identified at the step S200*d*, the MEC server 300 may generate and address first event information message indicative of the second UE 100 to the first UE 100 while the MEC server 300 may generate and address second event information message indicative of the first UE 100 to the second UE 100. The first event information message may be indicative of the position of the second UE 100 relative to the position of the first UE 100, which may be identified based on the analysis at the step S200*c*. The second event information message may be indicative of the position of the first UE 100 relative to the position of the second UE 100, which may be identified based on the analysis at the step S200*c*. At the step S200*h*, the UE 100 may respond to the event information message by generating and outputting a notification indicative of the event of collision (S200*h*). The notification generated by the first UE 100 may include indication of the position of the second UE 100 relative to the first UE 100 with reference to the first event information message, to let the user know what direction he/she should watch out for. Similarly, the notification generated by the second UE 100 may include indication of the position of the first UE 100 relative to the second UE 100 with reference to the second event information message. The notification may include a visual notification displayed on a display of the UE 100, an audible notification outputted through a speaker of the UE 100, etc. FIG. 15N schematically illustrates an example of a visual notification 550 displayed on a UE 100, which indicates that the position (right) of the other UE 100 with which the UE 100 is in danger of collision, relative to the UE 100. The event record generated at the step S200*e* may be a record, history, or log of each event of collision detected at the step S200*d*. The event record may list the two or more UEs 100 identified at the step S200*d*.

In the process P12*b*, each UE 100 may perform the above-discussed determination as to the closeness of UEs 100 by comparing the position of the UE 100 itself with the positions of other UEs 100 indicated by the location information messages received at the step S201*d* (S201*e*), to identify one or more other UEs 100 with which the UE 100 is in danger of collision for detection of an event of collision therewith (S201*f*). Each UE 100 may perform the above-discussed formation of detection areas DA by forming an own detection area DA associated with the own position of the UE 100 itself and detection areas DA associated with the positions of other UEs 100 indicated by the location information messages received at the step S201*d* (S201*e*), to identify one or more other UEs 100 with which the UE 100 is in danger of collision for detection of an event of collision therewith based on comparison of the own detection area DA with the other detection areas DA (S201*f*). Each UE 100 may perform the above-discussed identification of the moving paths and future paths by identifying the own moving path and own future path from the own positions of the UE 100 itself and the moving paths and future paths from the positions of the other UEs 100 indicated by the location information messages received at the step S201*d* (S201*e*), to identify one or more other UEs 100 with which the UE 100 is in danger of collision for detection of an event of collision therewith based on comparison of the own future path with the other future paths (S201*f*). At the step S201*g*, each UE 100 may respond to the detection of the event by generating and outputting a notification indicative of the event of collision with the identified UE 100. The notification may include indication of the position of the identified UE 100 relative to the UE 100 itself, to let the user know what direction he/she should watch out for. The notification may include a visual notification displayed on a display of the UE 100, an audible notification outputted through a speaker of the UE 100, etc. FIG. 15N schematically illustrates an example of a visual notification 550 displayed on a UE 100, which indicates that the position (right) of the identified UE 100 with which the UE 100 is in danger of collision, relative to the UE 100 itself. The event record generated at the step S201*h* may be a record, history, or log of each event of collision detected at the step S201*f*. The event record may list the one or more UEs 100 identified at the step S201*f*.

For the event record storage service (Internet service), the MEC server 300 may send the event record generated at the step S200*e* in the process P12*a* or at the step 201*k* in the process P12*b*, to the Internet server 200 over the Internet 3, so that the Internet server 200 may store therein the event record. FIG. 15O is a flowchart illustrating an example of a process P12*c* for transmission of the event record from the MEC server 300 to the Internet server 200, according to some embodiments. In the process P12*c*, the MEC server 300 may regularly or irregularly send the event record generated at the step S200*e* in the process P12*a* or at the step S201*k* in the process P12*b* (S202*a*). At the step S202*a*, the MEC server 300 may forward the event record in response to every generation of the event record at step S200*e* in the process P12*a* or at the step S201*k* in the process P12*b* (S202*a*). Alternatively, at the step S202*a*, the MEC server 300 may accumulate generated event records, and forward the accumulated event records to the Internet server 200 periodically according to a predetermined schedule (S202*a*).

In response to receipt of the event record from the MEC server 300 (S202*b*), the Internet server 200 may store therein the received event record (S202*c*). The event record may include the UE IDs of the UEs 100 associated with the detected event, the respective locations of the UEs 100 at the time of the detection of the event, and the timestamp indicative of the time of the detection of the event. The Internet server 200 may store therein a record file that lists the received event records, in which case the Internet server 200 may update the record file by entering a received new event record at the step S202*c* (S202*c*). Each record in the record file may include the UE IDs of the UEs 100 associated with the detected event, the respective locations of the UEs 100 at the time when the event was detected, and the time when the event was detected, as schematically illustrated in FIG. 15P. The exemplary record illustrated in FIG. 15P shows the event record for the event detected at 10:21 on Dec. 22, 2019 between the UE 100 identified by UE005 located at 36.114554, −115.164330 and the UE 100 identified by UE007 located at 36.114493, −115.164169. The record file stored on the Internet server 200 may be streamed and/or downloaded to a UE 100 over the Internet 3 (S202*d*). At the step S202*d*, the Internet server 200 may allow access to the record file from the UE 100 over the Internet 3, so that the user of the UE 100 is prompted to request for the stored record file through a UI such as a GUI presented on the UE 100 over the Internet 3 (S202*d*). The Internet server 200 may stream the requested record file to the UE 100 for instant playback of the record file on the UE 100 or transfer the requested record file to the UE 100 for download of the record file onto the UE 100 (S202*d*). Alternatively or in addition to the provision of download or streaming of the record file at the step S202*d*, the Internet server 200 may play back the record file locally on a display of the Internet server 200 (S202*e*).

In some modified embodiments, the MEC server 300 may provide download or streaming of a record file listing event records stored in the MEC server 300 to a UE 100 over the Internet 3. In the modified embodiments, the MEC server 300 may be accessible by the UEs 100 over the Internet 3 using the global IP address allocated to the MEC server 300 even when the UE 100 is not in the edge site ES, just as the Internet server 200 is accessible by the UEs 100 over the Internet 3 for download or streaming of the record file according to the process P12*c*. In the modified embodiments, the record file generated by and stored in the MEC server 300 at the step S200*e* in the process 12*a* or at the step S201*k* in the process P12*b* may be accessible by the UEs 100 for download or streaming to the UEs 100. FIG. 15Q is a flowchart illustrating an example of a process P12*d* for provision of download or streaming of a record file from the MEC server 300 to a UE 100, according to some modified embodiments. In the process P12*d*, the MEC server 300 may allow access to the record file from UE 100 over the Internet 3, prompting the user of the UE 100 to request for the stored record file through a UI such as a GUI presented on the UE 100 over the Internet 3, just as the Internet server 200 does in the process P12*c*. The MEC server 300 may stream the requested record file to the UE 100 for instant playback of the record file on the UE 100 or transfer the requested record file to the UE 100 for download of the record file (S203*a*), just as the Internet server 200 does at the step S202*d* in the process P12*c*.

The summary of the location analysis system according to the embodiments discussed above is described blow with reference to FIG. 15R. The locations of the UEs 100 in the edge site ES may be analyzed under control of the MEC server 300 to detect an event in the process P12*a* or P12*b*. In parallel to the analysis of the locations in the process P12*a* or P12*b*, a record file as a record of the detected event may be generated in the process P12*c* or P12*d*, so that the record file stored in the Internet server 200 may be downloaded or streamed form the Internet server 200 to the UE 100 in the process P12*c* or the record file stored in the MEC server 300 may be downloaded or streamed from the MEC server 300 to the UE 100 in the process P12*d*. Advantageously, real-time analysis of locations of the UEs 100 that causes heavy network traffic and requires massive computing power may be offloaded on the MEC server 300. Advantageously, a record of an event detected as a result of the location analysis may be automatically generated to be accessible by the UEs 100, in parallel to the location analysis.

(Media Upload System)

In some embodiments, the MEC service may be an edge-based local media upload service that involves upload of a media stream such as a video stream, audio stream, etc from at least one UE 100 to the MEC server 300 in the edge site ES for storage of the media stream on the MEC server 300 and/or Internet server 200. The local media upload service may be performed under control of the MEC server 300 in the edge site ES. In connection with the local media upload service, the Internet service may include at least one of (a) upload criteria transfer service that involves provision of the criteria for upload of the media stream and (b) media storage service that involves storing the media stream uploaded from the UE 100. The upload of a media stream may be initiated by the UE 100 automatically in response to discovering and connecting to the MEC server 300. Alternatively, the upload of a media stream may be initiated by the UE 100 conditionally when a media stream which meets the upload criteria is stored on the UE 100.

FIG. 16A schematically illustrates an example of a system for providing the MEC service (media upload service) and the Internet service (upload criteria transfer service, media storage service), according to some embodiments. The system may include UEs 100 each of which is provided with at least one of a video camera (a.k.a., camcorder) for capturing video and a microphone for capturing sound as well as a processor configured to generate a video stream based on the captured video and/or an audio stream based on the captured sound. Each UE 100 may also be provided with a storage on which the generated video/audio stream is recorded or stored as a video/audio file. Each UE 100 may also be provided with circuitry configured to periodically generate location information indicative of the current location or position of the UE 100. The circuitry may be one which is configured to generate location information using GPS or other satellite-based positioning system generally referred to as GNSS; IPS or other positioning system using WiFi access points, Bluetooth beacons, Radio Frequency Identification (RDID) readers and tags, magnetic field sensing, etc. The location or position of a UE 100 may be represented by the coordinate such as the altitude and longitude that uniquely identifies the geographical position at which the UE 100 is present. The location information indicative of the current location of the UE 100 may be associated with or tagged to the video/audio stream so as to identify where the video/audio stream was generated. The video/audio stream may also be timestamped so as to identify when the video/audio stream was generated. The location information and timestamp may be assigned to each segment (e.g., video frame or video sample for a video stream, or audio frame or audio sample for an audio stream) consisting of the video/audio stream, or may be assigned to each set of a predetermined number of the segments.

An example of each UE 100 may be a smartphone, tablet, laptop, or other portable electronic device carried by a user. The video camera and/or microphone may be a built-in camera and/or microphone housed in a housing of the UE 100. Alternatively, the video camera and/or microphone may be an external camera and/or microphone designed as an accessory for the UE 100, which is connected to the UE 100 via an interface such as a USB, audio jack, etc. The video camera and/or microphone may be arranged or positioned to capture video and/or sound around the UE 100 (i.e., video and/or sound in the area surrounding the UE 100). Another example of each UE 100 may be a vehicle such as a car, train, etc. The vehicle may include an on-board video camera and/or microphone that is equipped on the UE 100, which is arranged or positioned to capture video and/or sound at least one of (a) inside the compartment (e.g., cockpit) of the UE 100 and (b) outside the UE 100 (i.e., video and/or sound in the area surrounding the UE 100). The video camera and/or microphone may be a device designed as a dashcam mounted on the UE 100.

In an aspect, the media stream may be stored as one or more media files each of which has a predetermined size or duration. In the aspect, as the media stream grows larger and longer to have additional segments of the predetermined size or duration, a new media file of the predetermined size or duration may be produced from the segments. FIG. 16B schematically illustrates an example of a media stream 615 that is composed of segments, according to some embodiments. In the media stream 615, the timestamp 615T may be assigned to each segment of the media stream 615 or to each set of a predetermined number of the segments. The timestamp 651T is indicative of the time at which the corresponding media stream segment was generated. Similarly, the location information 615L may be assigned to each segment of the media stream 615 or to each set of a predetermined number of the segments. The location information 615L is indicative of the location or position at which the corresponding media stream segment was generated. In the example illustrated in FIG. 16B, a predetermined size S1 is defined for the size of a media file, so that a new media file having the predetermined size S1 is generated as the media stream 615 grows larger and longer to have additional media stream segments of the predetermined size S1. Accordingly, in the example illustrated in FIG. 16B, a media file "REC001.mp4" is generated based on the media stream segments from the time t0 to time t1; a media file "REC002.mp4" is generated based on the media stream segments from the time t1 to time t2; a media file "REC003.mp4" is generated based on the media stream segments from the time t2 to time t3; and a media file "REC004.mp4" is generated based on the media stream segments from the time t3 to time t4.

In another aspect, the media stream may be stored in a manner that ensures that the latest predetermined number of segments are stored. More specifically, the segments of the media stream may be continuously generated and stored in a first-in-first-out (FIFO) manner in a memory, thereby always holding the latest segments of a predetermined size that corresponds to the capacity of the memory.

The upload criteria may be generated by the Internet server 200 or an external computer 611 in communication with the Internet server 200. An example of the external computer 611 may be an electronic device comprising software programmed to generate and transfer the upload criteria over a communication with the Internet server 200, such as a smartphone, tablet, laptop, PC, etc. The external computer 611 may be connected to the Internet server 200 over the Internet, so that the upload criteria generated by the external computer 611 may be uploaded to the Internet server 200 over the Internet 3. The external computer 611 may be connected to the Internet server 200 via a wired interface including a cable such as a USB cable, so that the upload criteria generated by the external computer 611 may be copied and transferred to the Internet server 200 through the wired interface.

The upload criteria may include information associated with at least one of (a) time (e.g., date, hour, minutes, etc.) and (b) location or position for comparison with the location information and timestamp in the media stream. The upload criteria may be generated by the user inputting the time and location through a user interface on the Internet server 200 or external computer 611. FIG. 16C schematically illustrates an example of a GUI 560 through which to receive a user input to identify the time and location to create a upload criteria, according to some embodiments. The GUI 560 may be displayed on a display of the Internet server 200 to receive the user input using an input device of the Internet server 200, in which case the upload criteria is created and stored by the Internet server 200 on the Internet server 200. Alternatively, the GUI 560 may be displayed on a display of the external computer 611 to receive the user input using an input device of the external computer 611, in which case the upload criteria is created and transferred by the external computer 611 to the Internet server 200 so that the upload criteria is stored on the Internet server 200. The GUI 560 may include a time input field 560*a* in which to receive a user input of time and a location input field 560*b* in which to receive a user input of a location. The time input field 560*a* may receive a manual input of year, month, day, hour, minute, etc.; a user selection of a date on a calendar; etc. The time input field 560*a* may receive a user input to identify a range of time. The location input field 560*b* may receive a user input to identify a group of coordinates (e.g., geographical coordinates obtained by GNSS, coordinates obtained by IPS, etc.) locating a given place of the user's interest. In the example illustrated in FIG. 16C, the two minute range of time from 10:20 2019/12/22 to 10:22 2019/12/22 is inputted in the time input filed 560*a*, while the location represented by the coordinates "36.114560" and "115.165137" is inputted in the location input field 560*b*.

The location input field 560*b* may provide a map of an area, allowing the user to identify a location by identifying a given place on the map, as illustrated in FIG. 16D that schematically illustrates another example of GUI 560 according to some embodiments. The location input field 560*b* may allow the user to pinpoint a place on the map. The pinpointed place may be represented as a point icon 560*c* on the map. The location represented by the point icon 560*c* may be identified with reference to a group of coordinates such as geographical coordinates obtained by GNSS, coordinates obtained by IPS, etc. associated with the map. In addition or alternatively, the location input field 560*b* may allow the user to specify an area 560*d* of the user's interest around the point icon 560*c*. The user may be prompted to move the size of the area 560*d* to enlarge or shrink the area of the user's interest. The area 560*d* may be represented by a range of groups of coordinates such as geographical coordinates obtained by GNSS, coordinates obtained by IPS, etc., that represent respective locations contained in the area 560*d*.

The upload criteria may be generated using (a) the time or range of time specified in the time input field 560*a* and (b) the location or range of locations (560*c*, 560*d*) specified in the location input filed 560*b*. FIG. 16E schematically illustrates an example of upload criteria which includes information indicative of the time "10:20 2019/12/22" and location represented by the coordinates "36.114560, −115.165137".

FIG. 16F is a flowchart illustrating an example of a process P13*a* for the edge-based local media upload of a media content from a UE 100 in the edge site ES, according to some embodiments. In the process P13*a*, at least one UE 100 may upload a media stream stored therein to the MEC server 300 over a local connection (S210*a*). In response to upload of the media stream (S210*b*), the MEC server 300 may store therein the uploaded media stream (S210*c*). At the step S210*a*, the UE 100 may send the identifier (UE ID) of the UE 100 along with the media stream to identify who (what UE) is the origin of the uploaded media stream, as illustrated in FIG. 16G. At the step S210*c*, the MEC server 300 may associate the media stream with the UE ID in storing each media stream as illustrated in FIG. 16G, so that who (what UE) is the origin of the stored media stream can be identified.

In an implementation, at the step S210*a*, each UE 100 may conditionally upload a portion of a media stream which meets the upload criteria (S201*a*). FIG. 16H is a flowchart illustrating an example of the process P13*a* in further detail for the conditional upload of a media stream, according to some embodiments. In the implementation, the MEC server 300 may send the upload criteria to each UE 100 (S211*a*), so that each UE 100 may receive the upload criteria from the MEC server 300 when the UE 100 is in the edge site ES (S211*b*). At the step S211*a*, the MEC server 300 may unicast the upload criteria to each UE 100 one by one or broadcast the upload criteria to each UE 100 at a time (S211*a*). The MEC server 300 may push a notification message with the upload criteria to each UE 100 (S211*a*), so that each UE 100 may respond to the notification message (S211*b*). For example, in response to discovering and connecting with a UE 100 as the UE 100 participates in the edge site ES, the MEC server 300 may push the notification message to the discovered UE 100 (S211*a*). For example, in response to every generation of new upload criteria, the MEC server 300 may push a notification message with the upload criteria to each UE 100 in the edge site ES (S211*a*). Alternatively or in addition, the MEC server 300 may send a notification message with the upload criteria in reply to a request message from each UE 100 (S211*a*), so that each UE 100 may respond to the notification message (S211*b*). For example, each UE 100 may send the request message for the upload criteria to the MEC server 300 in response to discovering and connecting to the MEC sever 300 by participating in the edge site ES, causing the MEC server 300 to send back the notification message (S211*a*). For example, each UE 100 may send the request message to the MEC server 300 periodically at predetermined time intervals when the UE 100 is in the edge site ES, causing the MEC sever 300 to send back the notification message (S211*a*). In the implementation, at the step S210*a*, the UE 100 may search for a media stream stored in the UE 100 which meets the upload criteria (S211*c*) to determine if a media stream which meets the upload criteria is stored on the UE 100 (S211*d*) in response to receipt of the upload criteria (S211*b*). At the step S211*c*, the UE 100 may compare the timestamps and location information assigned to the stored media stream with the time (or range of time) and location (or range of locations) indicated by the upload criteria (S211*c*). The determination at the step S211*d* may be affirmative when time and location indicated by the timestamps and location information match those indicated by the upload criteria (S211*d*). When the determination is affirmative (S211*d*: Yes), a portion of the media stream which meets the upload criteria may be identified. For example, one or more segments of the media stream which meet the upload criteria may be identified (S211*d*: Yes). When the media stream is stored as one or more media files as discussed above, the search and determination (S211*c*, S211*d*) may be performed on each media file, so that one or more media files each of which meets the upload criteria may be identified (S211*d*: Yes). The UE 100 may then upload the identified portion of the media stream to the MEC server 300 (S211*e*). At the step S211*e*, the UE 100 may upload the identified one or more media files to the MEC server 300 (S211*e*). At the step S211*e*, the UE 100 may produce a new media file for upload ("for-upload" media file) from the identified portion of media stream, and upload the for-upload media file to the MEC server 300 (S211*e*). For example, the for-upload media file may be produced by collecting and encoding together the identified one or more segments which meet the upload criteria, into a media file such as one which is in a MPEG format.

In another implementation, at the step S210*a*, each UE 100 may automatically upload a media stream stored on the UE 100 in response to discovering and connecting to the MEC server 300 (S210*a*). In the implementation of the automatic upload, the entire of the media stream stored on the UE 100 may be uploaded. Alternatively, in the implementation of the automatic upload, each UE 100 may automatically upload a portion of a media stream which has not been uploaded yet (S210*a*). FIG. 16I is a flowchart illustrating an example of the process P13*a* in further detail for the automatic upload of a media stream, according to some embodiments. In the implementation, in response to discovering and connecting to the MEC server 300, each UE 100 may search for a media stream which has not been uploaded yet (S212*a*), to determine if there is an unuploaded portion in the stored media stream (S212*b*). In response to determining that there is unuploaded portion in the stored media stream (S212*b*: Yes), the UE 100 may upload the unuploaded portion of media stream to the MEC server 300 (S212*c*). When the media stream is stored as one or more media files as discussed above, the search and determination (S212*a*, S212*b*) may be performed on each media file, so that one or more unuploaded media files may be identified (S212*b*: Yes). At the step S212*c*, the UE 100 may upload the identified one or more media files to the MEC server 300 (S212*c*). At the step S212*c*, the UE 100 may produce a new media file for upload ("for-upload" media file) from the identified portion of media stream, and upload the for-upload media file to the MEC server 300 (S212*c*). For example, the for-upload media file may be produced by collecting and encoding together the identified one or more segments which have not been uploaded yet, into a media file such as one which is in a MPEG format.

In an aspect, for the search and determination at the steps S212*a* and S212*b*, each UE 100 may be configured to log or record every connection to the MEC server 300. The connection record may be managed on a database. FIG. 16J schematically illustrates an example of database 72 that manages the connection record by listing each time at which the UE 100 connected to a MEC server 300. The database 72 may list MEC ID 72*a* and time 72*b* per local connection to a MEC 300. The MEC ID 72*a* may be indicative of the identifier (MEC ID) of the MEC server 300 to which the UE 100 connected in the corresponding record of connection. The time 72*b* may be indicative of the range of time between which the UE 100 was in connection with the MEC server 300 in the corresponding record of connection. Each UE 100 may list time 72*b* by recording first time at which the UE 100 had discovered and initiated connection with the MEC server 300 and subsequently recording second time at which the UE 100 disconnected from the MEC server 300. Each UE 100 may be configured to update the database 72 upon every connection to and disconnection from the MEC server 300. In the aspect, at the step S212*a*, the UE 100 may search for a portion of media stream which has been produced since the UE 100 disconnected from a MEC server 300 last time with reference to the database 72 (S212*a*). With reference to the example illustrated in FIG. 16J, the UE 100 may search for a media stream which has been produced since 19:05 2019/12/22 indicated by the latest record of connection to the MEC server 300 identified by MEC011 (S212*a*). The determination at the step S212*b* may be affirmative when such portion is found and identified in the stored media stream (S212*b*: Yes).

In another aspect, for the search and determination at the steps S212*a*, and S212*b*, each UE 100 may be configured to log or record every upload of the media stream. The upload record may be indicative of what portion in the media stream has already been uploaded. The upload record may be an informative indicator such as a flag assigned to each segment or each set of segments, indicating whether the segment or set of segments has already been uploaded. FIG. 16K schematically illustrates an example of an upload record 615U in the form of a flag assigned to segments of the media stream 615, according to some embodiments. As illustrated in FIG. 16K, the upload record (flag) 615U may be assigned to each segment of the media stream 615 along with the timestamp 615T and location information 615L. Each flag 615U may have one of the value "0" and "1", wherein the value "0" may be set in the flag 615U as long as the corresponding segment has not been uploaded whereas the value "1" may be set in the flag 615U when the corresponding segment has been uploaded. FIG. 16L schematically illustrates another example of an upload record 651U assigned to each media file, when the media stream 615 is stored as one or more media files as discussed above. In the aspect, at the step S212*a*, the UE 100 may search for an unuploaded portion of media stream with reference to the upload record (S212*a*). With reference to the example illustrated in FIG. 16K, the UE 100 may search for a portion (segments) of media stream 615 which has the value "0" in the flag(s) 615U (S212*a*). The determination at the step S212*b* may be affirmative when such portion is found and identified in the stored media stream 615 (S212*b*: Yes). According to the example illustrated in FIG. 16K, the portion of eight segments from the right having the value "0" in the flags 615U in the media stream 615 may be identified (S212*a*, S212*b*: Yes). On the other hand, with reference to the example illustrated in FIG. 16L, the UE 100 may search for one or more media files each of which has the value "0" in the flag 615U (S212*a*). The determination at the step S212*b* may be affirmative when such media file is found and identified (S212*b*: Yes). According to the example illustrated in FIG. 16L, the two media files "REC003.mp4" and "REC004.mp4" both having the value "0" in the flag 615U may be identified (S212*a*, S212*b*: Yes). In the aspect, in response to uploading the identified portion (unuploaded portion) of media stream at the step S212*c* (S212*c*), the UE 100 may update the upload record for the uploaded portion to indicate that the portion has been uploaded. For example, the upload record may be updated by changing the value from "0" to "1" in the upload record (flag) 615U in the uploaded portion of media stream, in the examples illustrated in FIGS. 16K and 16L.

In some embodiments, in uploading a media stream by a UE 100 (S210*a*), the UE 100 may adaptively control the upload depending on the communication quality of the local connection over which the UE 100 uploads the media stream, once the local connection has been established. As the communication quality becomes worse, the UE 100 may be more likely to fail in completion of the upload of the media stream. Also, as the communication quality becomes worse, the UE 100 may be more likely to be going out of the edge site ES, away from the BS 12 or AP 23 which the UE 100 is in communication with. Thus, the amount of media stream which the UE 100 is expected to successfully upload to the MEC server 300 within the edge site ES may decrease as the communication quality becomes worse. In consideration of the fluctuation of potential uploadable amount of media stream, the UE 100 may adaptively change or adjust the amount of uploading media stream at the step S210*a* (S210*a*). An example of the communication quality may be represented by the bits-per-seconds (bps), round trip time (RRT), packet loss rate, etc. At the steps S211*c* and S211*d*, the UE 100 may determine the current communication quality of the local connection to determine the uploadable amount depending on the communication quality, in identifying the portion of media stream which meets the upload criteria (S211*c*, S211*d*). The UE 100 may then identify the uploadable portion of media stream within the determined uploadable amount, namely, not in excess of the determined uploadable amount (S211*c*, S211*d*). The uploadable amount can be determined greater as the communication quality is better. In case the media stream is stored as one or more media files as discussed above, the one or more media files the total size of which is within the uploadable amount may be identified and uploaded (S211*d*, S211*e*). At the step S211*e*, in case the UE 100 produces a for-upload media file as discussed above, the for-upload media file within the determined uploadable amount may be produced (S211*e*). Similarly, at the steps S212*a* and S212*b*, the UE 100 may determine the current communication quality of the local connection to determine the uploadable amount depending on the communication quality, in searching for an unuploaded portion of media stream (S212*a*, S212*b*). The UE 100 may then identify the unuploaded portion of media stream within the determined uploadable amount, namely, not in excess of the determined uploadable amount (S212*a*, S212*b*). The uploadable amount can be determined just as discussed above. In case the media stream is stored as one or more media files as discussed above, the one or more uploadable media files the total size of which is within the uploadable amount out of the entire unuploaded media files may be identified and uploaded (S212*b*, S212*c*). At the step S212*c*, in case the UE 100 produces a for-upload media file as discussed above, the for-upload media file within the determined uploadable amount may be produced (S212*c*). The adaptive control may include prohibiting upload of a media stream according to the step S210*a* when the determined uploadable amount is too small below a predetermined threshold. The adaptive control may include prohibiting upload of a media stream according to the step S210*a* when the determined communication quality is too low below a predetermined threshold. The UE 100 may perform the adaptive control once in initiating upload of a media stream, or may perform the adaptive control periodically at predetermined time intervals (e.g., every ten milliseconds) in the course of uploading the media stream for updating the uploadable amount adaptively as the UE 100 accelerates or deaccelerates in the course of the upload. In the periodical adaptive control, the adaptive control may include prohibiting upload of a media stream when the communication quality becomes worse steeply by more than a predetermined threshold. In the adaptive control, the UE 100 may perform the determination of the uploadable amount of media stream in response to discovering and connecting to the MEC server 300 by establishing a local connection with the BS 12 or AP 23, prior to initiation of the upload of a media stream at the step S210*a*.

In some embodiments, in uploading a media stream by a UE 100 (S210*a*), the UE 100 may adaptively control the upload depending on the current speed at which the UE 100 is moving or traveling. As the UE 100 is moving faster, the UE 100 is expected to exit or get out of the edge site ES to which the UE 100 is currently belonging earlier. Thus, the amount of media stream which the UE 100 is expected to successfully upload to the MEC server 300 within the edge site ES may decrease as the UE 100 travels faster. In consideration of the fluctuation of potential uploadable amount of media stream, the UE 100 may adaptively change or adjust the amount of uploading media stream at the step S210*a* (S210*a*). At the steps S211*c* and S211*d*, the UE 100 may determine the current speed or velocity at which the UE 100 is traveling (traveling speed) to determine the uploadable amount depending on the traveling speed, in identifying the portion of media stream which meets the upload criteria (S211*c*, S211*d*). The UE 100 may then identify the uploadable portion of media stream within the determined uploadable amount, namely, not in excess of the determined uploadable amount (S211*c*, S211*d*). The uploadable amount can be determined by: estimating potential time period in which the UE 100 will be staying in the edge site ES in communication with the MEC server 300 (potential stay period) based on the traveling speed of the UE 100 and the range of the edge site ES; and determining the uploadable amount based on the potential stay period and the bits-per-second (bps) of the local communication between the MEC server and the UE 100. For example, assuming that the uploadable mount is determined to be 500 megabytes (MB), the portion of media stream within 500 MB (not in excess of 500 MB) may be identified and uploaded (S211*d*, S211*e*). In case the media stream is stored as one or more media files as discussed above, the one or more media files the total size of which is within 500 MB may be identified and uploaded (S211*d*, S211*e*). At the step S211*e*, in case the UE 100 produces a for-upload media file as discussed above, the for-upload media file within the determined uploadable amount may be produced (S211*e*). Similarly, at the steps S212*a* and S212*b*, the UE 100 may determine the traveling speed to determine the uploadable amount depending on the traveling speed, in searching for an unuploaded portion of media stream (S212*a*, S212*b*). The UE 100 may then identify the unuploaded portion of media stream within the determined uploadable amount, namely, not in excess of the determined uploadable amount (S212*a*, S212*b*). The uploadable amount can be determined just as discussed above. Assuming that the uploadable amount is determined to be 500 MB, the uploadable portion of media stream within 500 MB, out of the entire unuploaded portion of media stream, may be identified and uploaded (S212*b*, S212*c*). In case the media stream is stored as one or more media files as discussed above, the one or more uploadable media files the total size of which is within 500 MB out of the entire unuploaded media files may be identified and uploaded (S212*b*, S212*c*). At the step S212*c*, in case the UE 100 produces a for-upload media file as discussed above, the for-upload media file within the determined uploadable amount may be produced (S212*c*). The adaptive control may include prohibiting upload of a media stream according to the step S210*a* when the determined uploadable amount is too small below a predetermined threshold. The adaptive control may include prohibiting upload of a media stream according to the step S210*a* when the determined traveling speed of the UE 100 is too fast above a predetermined threshold. The UE 100 may perform the adaptive control once in initiating upload of a media stream, or may perform the adaptive control periodically at predetermined time intervals (e.g., every ten milliseconds) in the course of uploading the media stream for updating the uploadable amount adaptively as the UE 100 accelerates or deaccelerates in the course of the upload. In the adaptive control, the UE 100 may perform the determination of the uploadable amount of media stream in response to discovering and connecting to the MEC server 300 by establishing a local connection with the BS 12 or AP 23, prior to initiation of the upload of a media stream at the step S210*a*.

For the upload criteria transfer service (Internet service), the Internet server 200 may send the upload criteria to the MEC server 300 over the Internet 3, so that the MEC server 300 stores therein the upload criteria. FIG. 16M is a flowchart illustrating an example of a process P13*b* for transfer of the upload criteria from the Internet server 200 to the MEC server 300, according to some embodiments. According to the process P13*b*, in response to generating the upload criteria locally as discussed above or receiving transfer of the upload criteria from the external computer 611 as discussed above, the Internet server 200 may forward the upload criteria to the MEC server 300 over the Internet 3 (S214*a*). A MEC database that lists MEC servers 300 connected to the Internet server 200 may be stored on the Internet server 200. At the step S214*a*, the Internet server 200 may address the upload criteria to the MEC servers 300 listed on the MEC database, so that every MEC server 300 connected to the Internet server 200 may receive transfer of the upload criteria from the Internet server 200. In response to receipt of the upload criteria from the Internet server 200 (S214*b*), the MEC sever 300 may store therein the upload criteria (S214*c*). The stored upload criteria may be forwarded by the MEC server 300 to the UE 100 at the step S211*a* in the process P13*a* as discussed above.

For the media storage service (Internet service), the MEC server 300 may send the media stream stored at the step S210*c* in the process P13*a*, to the Internet server 200 over the Internet 3, so that the Internet server 200 may store therein the media stream. FIG. 16N is a flowchart illustrating an example of a process P13*c* for transfer of the media stream from the MEC server 300 to the Internet server 200, according to some embodiments. In the process P13*c*, the MEC server 300 may regularly or irregularly forward the media stream stored therein at the step S210*c*, to the Internet server 200 over the Internet 3 (S215*a*). At the step S215*a*, the MEC server 300 may forward a media stream one by one in response to every storage of the media stream, or forward one or more media streams stored therein periodically according to a predetermined schedule (S215*a*). In response to receipt of the media stream from the MEC server 300 (S215*b*), the Internet server 200 may store therein the received media stream (S215*c*). At the step S215*a*, in forwarding the media stream, the MEC server 300 send the identifier (MEC ID) of the MEC server 300 and the identifier (UE ID) of the UE 100 associated with the media stream as illustrated in FIG. 16O, so that to whom (to what MEC server) the media stream was originally uploaded can be identified as well as who (what UE) originally generated the media stream can be identified. At the step S215*c*, the Internet server 200 may associate the MEC ID and UE ID with the media stream in storing each media stream as illustrated in FIG. 16O. Each media stream stored on the Internet server 200 may be streamed and/or downloaded to a UE 100 (S215*d*). At the step S215*d*, the Internet server 200 may allow access to the media file from the UE 100 over the Internet 3, so that the user of the UE 100 is prompted to request for the stored media file through a UI such as a GUI presented on the UE 100 over the Internet 3 (S215*d*). The Internet server 200 may stream the requested media file to the UE 100 for instant playback of the media file on the UE 100 or transfer the requested media file to the UE 100 for download of the media file onto the UE 100 (S215*d*). Alternatively or in addition to the provision of download or streaming of the record file at the step S215*d*, the Internet server 200 may play back the media file locally on a display of the Internet server 200 or through a loudspeaker of the Internet server 200 (S215*e*).

In some modified embodiments, the MEC server 300 may provide download or streaming of an uploaded media stream (audio/video stream) stored in the MEC server 300 to a UE 100 over the Internet 3. In the modified embodiments, the MEC server 300 may be accessible by the UEs 100 over the Internet 3 using the global IP address allocated to the MEC server 300 even when the UE 100 is not in the edge site ES, just as the Internet server 200 is accessible by the UEs 100 over the Internet 3 for download or streaming of the uploaded media stream according to the process P13*c*. In the modified embodiments, The uploaded media stream stored in the MEC server 300 at the step S210*c* in the process 13*a* may be accessible by the UEs 100 for download or streaming to the UEs 100. FIG. 16P is a flowchart illustrating an example of a process P13*d* for provision of download or streaming of an uploaded media stream from the MEC server 300 to a UE 100, according to some modified embodiments. In the process P13*d*, the MEC server 300 may allow access to the uploaded media stream from UE 100 over the Internet 3, prompting the user of the UE 100 to request for the uploaded media stream through a UI such as a GUI presented on the UE 100 over the Internet 3, just as the Internet server 200 does in the process P13*c*. The MEC server 300 may stream the requested media stream to the UE 100 for instant playback of the media stream on the UE 100 or transfer the requested media stream to the UE 100 for download of the media stream (S216*a*), just as the Internet server 200 does at the step S215*d* in the process P13*c*.

In some modified embodiments, the upload criteria may be uploaded from the Internet server 200 to each UE 100 directly over the Internet 3, instead of the upload criteria being provided to each UE 100 via the MEC server 300 at the step S211*a* in the process P13*a*. FIG. 16Q is a flowchart illustrating an example of a process P13*e* for provision of the upload criteria from the Internet server 200 to each UE 100, according to some modified embodiments. In the modified embodiments, regardless of whether or not the UE 100 is in the edge site ES, the UE 100 may be in communication with the Internet server 200 over the Internet 3. The UE 100 may be continuously in communication with the Internet server 200 over the Internet 3 as long as the UE 100 is turned on. In the process P13*e*, the Internet server 200 may send the upload criteria to the UE 100 over the Internet 3 (S217*a*), so that the UE 100 may receive and store therein the upload criteria which will be referred to for the search and determination at the steps S121*c* and S121*d* (S217*b*, S217*c*). At the step S217*a*, the Internet server 200 may push a notification message with the upload criteria to each UE 100 (S217*a*) just as the MEC server 300 may do at the step S211*a* in the process P13*a* as discussed above. For example, in response to every generation of new upload criteria, the Internet server 200 may push a notification message with the upload criteria to each UE 100 (S217*a*). Alternatively or in addition, the Internet server 200 may send a notification message with the upload criteria in reply to a request message from each UE 100 (S217*a*), just as the MEC server 300 may do at the step S211*a* in the process P13*a* as discussed above. For example, each UE 100 may send the request message to the Internet server 200 periodically at predetermined time intervals after the UE 100 initiates an Internet connection with the Internet server 200, causing the Internet server 200 to send back the notification message (S217*a*). In the modified embodiments, the upload criteria stored at the step S217*c* may be used for the search and determination at the step S211*c* and S211*d*.

The summary of the media upload system according to the embodiments discussed above is described blow with reference to FIG. 16R. The upload criteria for upload of media streams may be sent from the Internet server 200 to the MEC server 300 in the process P13*b*, which may then be forwarded from the MEC server 300 to the UE 100. The upload criteria for upload of media streams may be sent from the Internet server 200 to the UE 100 in the process P13*e*. The media stream generated by the UE 100 in the edge site ES may be uploaded and aggregated on the MEC server 300 with or without reference to the upload criteria in the process P13*a*. In parallel to the upload of the media stream in the process P13*a*, the uploaded media stream may be managed by the MEC server 300 in the process P13*c* or P13*d*, so that the uploaded media stream stored in the Internet server 200 may be downloaded or streamed form the Internet server 200 to the UE 100 in the process P13*c* or the uploaded media stream stored in the MEC server 300 may be downloaded or streamed from the MEC server 300 to the UE 100 in the process P13*d*. Advantageously, upload and aggregation of a media stream, such as a video stream recorded by a UE 100, that causes heavy network traffic may be offloaded on the MEC server 300. Advantageously, the uploaded media stream may be accessible by the UEs 100, in parallel to the upload of the media stream.

(MEC Service in Traffic System)

In some embodiments, the MEC service may be provided in a traffic system including vehicles and pedestrians for improving the quality such as efficiency, safety, etc. of the traffic. In the embodiments, the edge site ES may be formed to cover an area in which the passage of pedestrians and vehicles is present, in order for the MEC server 300 to process data from the pedestrians and vehicles in the edge site ES. FIG. 17A schematically illustrates an example of a traffic system 660, according to some embodiments. The traffic system 660 may include vehicles 661 and pedestrians 662 both of which are operative as a UE 100 and MEC servers 300 (e.g., 300*a*, 300*b*, 300*c*) forming respective edge sites ES (e.g., ES1, ES2, ES3). The vehicles 661 are a car, truck, bus, etc. that is supposed to travel on a roadway 663. The pedestrians 662 are a person who is supposed to walk on a sidewalk outside the roadway 663 and on a crosswalk 664. An intersection may be formed by intersecting at least two roadways 663.

In the traffic system 660, BSes 12 or APs 23 each having a corresponding coverage area may be provided on facilities associated with the traffic system 660 which are distributed over the area in the traffic system 660, so that the coverage areas of the BSes 12 or APs 23 are distributed over the area. Examples of such facility may include a traffic light, street lamp, outdoor surveillance camera, etc. A BS 12 or AP 23 may be collocated with a specific facility, so that the coverage area of a BS 12 or AP 23 is associated with a particular facility. The coverage areas of respective BSes 12 or APs 23 may overlap with one another, or may be so adjusted as to prevent the coverage areas from overlapping with one another. To collocate a BS 12 or AP 23 with a facility, the BS 12 or AP 23 may be provided on a fixture such as a pole extending from the ground, on which the facility is typically fixed. FIG. 17B schematically illustrates an example where a BS 12 or AP 23 is provided on a pole 671 on which at least one facility of a traffic signal 670*a*, street lamp 670*b*, and outdoor surveillance camera 670*c* is fixed, according to some embodiments. The pole 671, extending from the ground, may support the facility including at least one of traffic light 670*a*, street lamp 670*b*, and outdoor surveillance camera 670*c* so that the facility is positioned high above the roadway 663 or sidewalk. In the example illustrated in FIG. 17B, the BS 12 or AP 23 is collocated with the facility on the fixture (pole 671). Alternatively, the BS 12 or AP 23 may be provided on or in a control cabinet accommodating therein a controller configured to control the facility. The control cabinet may typically be placed near the fixture (e.g., pole 671). The facility may be in communication with the controller housed in the control cabinet, e.g., via a cable. The BS 12 or AP 23 may be housed together with the controller in the control cabinet, and may be in communication with the controller, e.g., via a cable. FIG. 17C schematically illustrates an example where the BS 12 or AP 23 is provided in the control cabinet 672 together with the controller 672*a* coupled to the facility 670, according to some embodiments. In an implementation where the facility 670 includes a traffic signal 670*a*, the controller 672*a* may control the operations (e.g., switching of light indications, etc.) of the traffic signal 670*a*. In an implementation where the facility 670 includes a street lamp 670*b*, the controller 672*a* may control the operations (e.g., turning on and off light, etc.) of the street lamp 670*b*. In an implementation where the facility 670 includes a surveillance camera 670*c*, the controller 672*a* may control the operations (e.g., recording of images, etc.) of the surveillance camera 670*c*.

A MEC server 300 may be connected to one or more BSes 12 or APs 23. The MEC server 300 may be in connection with a single BS 12 or AP 23 resulting in the edge site ES of the MEC server 300 being consistent with the coverage area of the BS 12 or AP 23, or in connection with a group of multiple BSes 12 or APs 23 resulting in the edge site ES being consistent with the total of the coverage areas of the BSes 12 or APs 23. The MEC server 300 may be provided on the fixture (e.g., pole 671) on which the facility 670 is fixed, together with the BS 12 or AP 23. Alternatively, the MEC server 300 may be housed in the control cabinet 672 together with the BS 12 or AP 23. The facility 670 may be installed on or near the roadway 663 or sidewalk at an intersection, at a crosswalk, etc. The exemplary traffic system 660 illustrated in FIG. 17A has a MEC server 300*a* forming the edge site ES1 deployed at an intersection (crossroad); a MEC server 300*b* forming the edge site ES2 deployed at a crosswalk 664; and a MEC server 300*c* forming the edge site ES3 deployed at another intersection (T-intersection).

FIG. 17D schematically illustrates an example of power supply to the BS 12 or AP 23 collocated with the facility 670, according to some embodiments. Power may be supplied to the facility 670 via a power line from a power source (e.g., commercial power source). The power line may be cabled in the pole 671. The BS 12 or AP 23 may be connected to the power line as well so that power supply via the power line may be shared by the facility 670 and the BS 12 or AP 23. The MEC server 300 in communication with the BS 12 or AP 23 may also be connected to the power line as well so that the power supply via the power line may be shared by the facility 670, BS 12 or AP 23, and MEC server 300.

In an implementation of the traffic signal 670*a*, each traffic signal 670*a* may switch lights between the green light, yellow light, and red light according to a switching cycle. The switching cycle, which corresponds to a sequence of signal indications from green to red, may be set and adjustable per traffic signal 670*a*. The cycle may include the green time during which the traffic signal 670*a* has the green indication; yellow time following the green time, during which the traffic signal 670*a* has the yellow indication; and red time following the yellow time, during which the traffic signal 670*a* has the red indication. Each of the green time, yellow time, and red time may be individually set and adjustable according to needs on traffic management. The switching cycle for a traffic signal 670*a* may be generated and stored on the traffic signal 670*a*, e.g., on a memory in communication with the traffic signal 670*a*. The memory may be coupled to the controller 672*a*, so that traffic signal 670*a* may switch lights under control of the controller 672*a* with reference to the switching cycle.

In the traffic system 660, each UE 100 may store therein attribute information indicative of its attribute of being one of a vehicle and non-vehicle. Each UE 100 as a car, truck, bus, or other vehicles designed to travel on the roadway 663 may have the attribute information indicative of a vehicle. On the other hand, each UE 100 as a smartwatch, smartphone, tablet, laptop, or other gadgets designed to be carried by a user (pedestrian) may have the attribute information indicative of a non-vehicle. The attribute information may be managed on a database stored on the UE 100. FIG. 17E schematically illustrates an example of a database 74 that lists the identifier (UE ID) 74*a* of the UE 100 and the attribute information 74*b* associated with the UE 100. FIG. 17E illustrates examples (a) and (b) where the attribute information 74*b* is indicative of a vehicle. The attribute information 74*b* may also be indicative of a detailed category of a vehicle (such as a car and bus as illustrated in FIG. 17E (a) and (b) respectively) to which the UE 100 (74*a*) belongs. FIG. 17E also illustrates examples (c) and (d) where the attribute information 74*b* is indicative of a non-vehicle, namely, gadget carried by the user (pedestrian). The attribute information 74*b* may also be indicative of a detailed category of a non-vehicle to which the UE 100 (74*a*) belongs. The detailed category may detail the category of the gadget (UE 100) carried by the user, such as smartphone as illustrated in FIG. 17E (c); or the category of the user carrying the gadget, such as a child as illustrated in FIG. 17E (d). The attribute information 74*b* may be invariable one indicative of the fixed category to which the UE 100 belongs, which may be preliminarily set by the manufacturer or supplier of the UE 100. Alternatively, the attribute information 74*b* may be variable one which is subject to change as per user selection.

In some embodiments, the edge-based local location analysis service discussed above with reference to FIGS. 15A to 15R may be provided in the traffic system 660. In the embodiments, the edge-based local location analysis service may involve aggregating and analyzing locations of UEs 100 to alert the event of collision between vehicles and pedestrians.

In the process P12*a*, the location information message transmitted by each UE 100 at the step S200*a* may include the attribute information 74*b* of the UE 100 itself with reference to the database 74 (S200*a*). The MEC server 300 may analyze the locations of UEs 100 each having the attribute information 74*b* of a vehicle (vehicle UEs 100) independently or distinctively from the locations of UEs 100 each having the attribute information 74*b* of a non-vehicle (non-vehicle UEs 100), in order to detect the event of collision between a vehicle UE 100 and a non-vehicle UE 100 (S200*b*, S200*c*, S200*d*). In response to detecting the event of collision between a vehicle UE 100 and a non-vehicle UE 100 (S200*d*: Yes), the MEC server 300 may generate the event information message for the vehicle UE 100 and non-vehicle UE 100 independently or distinctively from one another (S200*f*). At the step S200*f*, the MEC server 300 may generate a first event information message for the vehicle UE 100 indicative of the danger of collision with the non-vehicle UE 100 (i.e., collision with the pedestrian), and send the first event information message to the vehicle UE 100 (S200*f*). On the other hand, the MEC server 300 may generate a second event information message for the non-vehicle UE 100 indicative of the danger of collision with the vehicle UE 100 (i.e., collision with the vehicle), and send the second event information message to the non-vehicle UE 100 (S200*f*). The first event information message may include the attribute information 74*b* of the identified non-vehicle UE 100, while the second event information message may include the attribute information 74*b* of the identified vehicle UE 100. At the step S200*h*, the vehicle UE 100 may respond to the first event information message by generating and outputting the notification indicative of the event of collision with the pedestrian (S200*h*). The notification may include description of the non-vehicle UE 100 (e.g., smartphone, child, etc.) with reference to the detailed category indicated by the attributed information 74*b* contained in the first event information message. FIG. 17F schematically illustrates an example of the visual notification 550 displayed on the vehicle UE 100, which warns the possible collision of the pedestrian. On the other hand, at the step S200*h*, the non-vehicle UE 100 may respond to the second event information message by generating and outputting the notification indicative of the event of collision with the vehicle (S200*h*). The notification may include description of the vehicle UE 100 (e.g., car, truck, bus, etc.) with reference to the detailed category indicated by the attribute information 74*b* contained in the second event information message. FIG. 17G schematically illustrates an example of the visual notification 550 displayed on the non-vehicle UE 100, which warns the possible collision of the vehicle (S200*h*).

In the process P12*b*, the location information message transmitted by each UE 100 at the step S201*a* may include the attribute information 74*b* of the UE 100 itself with reference to the database 74 (S201*a*). At the step S201*c*, the MEC server 300 may forward the location information messages received from UEs 100 each having the attribute information 74*b* of a non-vehicle (non-vehicle UEs 100), to UEs 100 each having the attribute information 74*b* of a vehicle (vehicle UEs 100) (S201*c*). Meanwhile, the MEC server 300 may forward the location information messages received from vehicle UEs 100 to non-vehicle UEs 100 (S201*c*). Accordingly, the locations of vehicle UEs 100 and non-vehicle UEs 100 may be exchanged mutually by vehicle UEs 100 and non-vehicle UEs 100. At the step S201*e*, each vehicle UE 100 that received the location information messages of non-vehicle UEs 100 (S201*d*) may analyze the locations of the non-vehicle UEs 100 to detect an event of collision with a non-vehicle UE 100 (S201*e*). In response to detecting the event of collision with a non-vehicle UE 100 (S201*f*: Yes), the vehicle UE 100 may respond to it by generating and outputting a notification indicative of the event of collision with a pedestrian (S201*g*). The notification may include description of the non-vehicle UE 100 (e.g., smartphone, child, etc.) with reference to the detailed category indicated by the attributed information 74*b* contained in the location information message of the non-vehicle UE 100. FIG. 17F schematically illustrates an example of the visual notification 550 displayed on the vehicle UE 100, which warns the possible collision of the pedestrian (S201*g*). On the other hand, at the step S201*e*, each non-vehicle UE 100 that received the location information messages of vehicle UEs 100 (S201*d*) may analyze the locations of the vehicle UEs 100 to detect an event of collision with a vehicle UE 100 (S201*e*). In response to detecting the event of collision with a vehicle UE 100 (S201*f*: Yes), the non-vehicle UE 100 may respond to it by generating and outputting a notification indicative of the event of collision with a vehicle (S201*g*). The notification may include description of the vehicle UE 100 (e.g., car, truck, bus, etc.) with reference to the detailed category indicated by the attribute information 74*b* contained in the location information message of the vehicle UE 100. FIG. 17G schematically illustrates an example of the visual notification 550 displayed on the non-vehicle UE 100, which warns the possible collision of the vehicle (S201*g*). The event record generated by the vehicle UE 100 at the step S201*h* may include the attribute information 74*b* of the identified non-vehicle UE 100, so that the record in the vehicle UE 100 can be indicative of with what (whom) the vehicle was in danger of colliding. The event record generated by the non-vehicle UE 100 at the step S201*h* may include the attribute information 74*b* of the identified vehicle UE 100, so that the record in the non-vehicle UE 100 can be indicative of with what the pedestrian was in danger of colliding. The event information message generated and sent by the vehicle UE 100 or non-vehicle UE 100 may include the attribute information 74*b* of the identified non-vehicle UE 100 or identified vehicle UE 100, respectively (S201*i*), so that the event record stored on the MEC server 300 (S201*j*, S201*k*) may be indicative of what were in danger of colliding with one another.

In some embodiments, the edge-based media upload service discussed above with reference to FIGS. 16A to 16R may be provided in the traffic system 660. In the embodiments, the edge-based media upload service may involve aggregating media streams from vehicle UEs 100 in the edge site ES. The media stream may be a video stream captured by an onboard camera such as a dashcam mounted on the vehicle UE 100. In the embodiments, when the BS 12 or AP 23 is collocated with the traffic signal 670*a*, each vehicle UE 100 and/or MEC server 300 may have access to the switching cycle of a traffic signal 670*a* associated with a BS 12 or AP 23 with which the vehicle UE 100 has established a local connection, for adaptive control of upload of a media stream at the step S211*e* or S212*c*. In an aspect, in response to discovering and establishing a local connection with a BS 12 or AP 23, the vehicle UE 100 may obtain the switching cycle for the traffic signal 670*a* associated with (collocated with) the BS 12 or AP 23 over the local connection. More specifically, the vehicle UE 100 may send a request message for the switching cycle to the BS 12 or AP 23 over the established local connection, in reply to which the BS 12 or AP 23 may access to the memory of the traffic signal 670*a* collocated with the BS 12 or AP 23 to read out therefrom and send the switching cycle to the vehicle UE 100 over the local connection, so that the vehicle UE 100 may receive and store therein the switching cycle. Alternatively, the vehicle UE 100 may directly send the request message for the switching cycle to the traffic signal 670*a* collocated with the BS 12 or AP 23 over the established local connection, in reply to which the traffic signal 670*a* may read out the switching cycle from the memory to send it to the vehicle UE 100 over the local connection, so that the vehicle UE 100 may receive and store therein the switching cycle. In another aspect, in response to the vehicle UE 100 discovering and establishing a local connection with a BS 12 or AP 23, the MEC server 300 may obtain the switching cycle for the traffic signal 670*a* associated with (collocated with) the BS 12 or AP 23.

In the process P13*a*, in uploading a media stream by a UE 100 (S210*a*), the vehicle UE 100 may adaptively control the upload depending on the switching cycle of a traffic signal 670*a* associated with the BS 12 or AP 23 with which the vehicle UE 100 is in communication over the local connection. This adaptive control is based on the concept that the position (signal indication) in the switching cycle may affect the potential period in which the UE vehicle 100 will be staying in the edge site ES, thereby affecting the amount of media stream which the vehicle UE 100 is expected to successfully upload to the MEC server 300 until the vehicle UE 100 exits the edge site ES. According to the concept: (a) the period of red indication is the most positive, favorable, or beneficial to the upload of a media file because the vehicle UE 100 would be expected to have stopped at the traffic signal 670*a* to be not in motion, so upload of a media stream could be achieved stably; (b) the period of yellow indication is also positive to the upload because the vehicle UE 100 would be expected to be slowing down to stop at the traffic signal 670*a* in a moment as the yellow indication will soon goes forward to the red indication; and (c) the period of green indication is not positive to the upload because the vehicle UE 100 would be expected to be traveling fast to go out of the edge site ES. Therefore, according to the concept, the adaptive control may include controlling the upload of a media stream depending on the signal indication in the switching cycle in uploading the media stream. FIG. 17H schematically illustrates an example of a switching cycle 675 based on which the vehicle UE 100 controls the upload of a media stream, according to some embodiments. The switching cycle 675 includes the green indication having the duration of T1, the yellow indication having the duration of T2 subsequent to the green indication, and the red indication having the duration of T3 subsequent to the yellow indication. The transition of indications from the green indication to the red indication through the yellow indication is repeated cyclically. The green indication comes again after the red indication ends. The adaptive control may include determining the window for upload of a media stream depending on the signal indication in the switching cycle 675 in response to discovering and connecting to the MEC server 300. In other words, the signal indication of the traffic signal 670*a* may be determined at the time when the vehicle UE 100 participates in the edge site ES, namely, when the vehicle UE 100 enters the coverage area of the one or more BSes 12 or APs 23 associated with the MEC server 300. The adaptive control may include determining upload windows W1, W2, or W3 when the traffic signal 670*a* has the green indication, yellow indication, or red indication, respectively, as illustrated in FIG. 17H. The upload window W1 may be adjusted depending on the remaining time within the duration T1 at the time of determining the upload window W1. When the remaining time within the duration T1 is longer than a predetermined threshold, the upload window W1 may be the shorter one because the vehicle UE 100 would be likely to travel fast to go out of the edge site ES early before stopping at the red indication, whereas the upload window W1 may be the longer one when the remaining time is not longer than the predetermined threshold because the vehicle UE 100 would be likely to slow down at the yellow light soon to stop at the red light. The upload window W2 may be constant because the period of the yellow indication is typically very short, or may be adjusted depending on the remaining time within the duration T2 at the time of determining the upload window W2. When the remaining time within the duration T2 is longer than a predetermined threshold, the upload window W2 may be the longer one because the vehicle UE 100 would be likely to slow down to stop at the red light that will come after the yellow light, whereas the upload window W2 may be the shorter one when the remaining time is not longer than the predetermined threshold because the vehicle UE 100 would be likely to run the yellow light before it changes to the red light. The upload window W3 may be adjusted depending on the remaining time within the duration T3 at the time of determining the upload window W3. When the remaining time within the duration T2 is longer than a predetermined threshold, the upload window W3 may be the longer one because the vehicle UE 100 would be likely to stay still at the red light for a while before it changes to the green light, whereas the upload window W3 may be the shorter one when the remaining time is not longer than the predetermined threshold because the vehicle UE 100 would be likely to start moving out of the edge site ES at the green light that will come soon.

(Emergency Notification System)

In some embodiments, the MEC service may be an edge-based emergency notification service that involves notifying an emergency such as fire detected by at least one UE 100 (detector UE 100) to people through at least one other UE 100 (notifier UE 100), in the edge site ES. The local emergency notification service may involve distributing an audio/video stream for an audible or visual message for the emergency notification from the MEC server 300 to the notifier UE 100 over a local connection. The local emergency notification service may be performed under control of the MEC server 300 in the edge site ES. In connection with the local emergency notification service, the Internet service may include at least one of (a) a message upload service that involves upload of the audible/visual message from the Internet server 200 to the MEC server 300 and (b) an emergency notification history storage service that involve storing the history or record of the local emergency notification. The message upload service and emergency notification history storage service may be performed under control of the Internet server 200.

FIG. 18A schematically illustrates an example of a system for providing the MEC service (local emergency notification service) and the Internet service (message upload service and emergency notification history storage service), according to some embodiments. The system may include at least one detector UE 100 and at least one notifier UE 100. The detector UE 100 and notifier UE 100 may be installed on the same facility such as a residence, school, laboratory, university campus, mall, department store, airport, office building, etc. For example, one or more detector UEs 100 and one or more notifier UEs 100 may be installed on each area (e.g., room, floor, etc.) of the facility when the facility has two or more separate areas.

Each detector UE 100 may be defined herein to be a UE 100 operative as a detector or sensor to detect an emergency around the detector UE 100, i.e., in the area where the detector UE 100 is installed. Examples of the detector UE 100 may include: a smoke detector configured to detect smoke coming in the detector optically, etc. as an emergency; a heat detector configured to detect heat over a predetermined threshold temperature, rise of heat over a predetermined threshold steepness, etc. as an emergency; and other devices configured to detect an emergency automatically. Other examples of the detector UE 100 may include: a manual call point provided with a push button, to detect an emergency in response to the push button being pressed by a user; a pull station provided with a handle or lever, to detect an emergency in response to the handle being pulled by a user; and other manual alarm activation devices configured to detect an emergency in response to a user's manual operation. The detector UE 100 may comprise a processor configured to generate and send an alarm signal indicative of an emergency to the MEC server 300 over a local connection in response to detection of the emergency.

Each notifier UE 100 may be defined herein to be a UE 100 operative as a notifier that notifies an emergency detected by the detector UE 100 to people in the facility by way of an audible or visual message. Each notifier UE 100 may be provided with a processor configured to receive and play back an audio/video stream representing the audible/visual message, and an output on or through which to present the audible/visual message. The output may be a loudspeaker through which to play back the audio stream for the audible message. The output may be a display on which to play back the video stream for the visual message. Examples of the notifier UE 100 may include: a speaker product (e.g., network speaker or IP speaker) or the like that is dedicated for playback of an audio stream for audio output; a display product such as a digital signage or the like that is dedicated for playback of a video stream for visual output; and a combination thereof. The notifier UE 100 may be a product fixed on the structure of the facility, such as the ceiling, wall, etc. in the facility, or may be a mobile or portable product designed to be carried by a user in the facility, such as a smartphone, tablet, laptop, etc.

In the example illustrated in FIG. 18A, the system includes a smoke detector 100*a*, pull station 100*b*, and manual call point 100*c* each of which is a detector UE as well as a speaker product 100*d*, digital signage 100*e*, and smartphone 100*f* each of which is a notifier UE. In the system, the audible/visual message may be generated by the Internet server 200, or may be uploaded to the Internet server 200 from an external media source 680 so that the Internet server 200 may store therein the received audible/visual message at least temporarily for delivery to the MEC server 300. An example of the external media source 680 may be a message production device that is an electronic device comprising software programmed to produce and store an audible/visual message, such as a smartphone, tablet, laptop, and PC (e.g., 680*a* illustrated in FIG. 18A). The message production device 680 may be connected to the Internet server 200 over the Internet 3, so that the audible/visual message produced by the message production device 680 may be uploaded to the Internet server 200 over the Internet 3. The message production device 680 may be connected to the Internet server 200 via a wired interface including a cable such as a USB cable, so that the audible/visual message produced by the message production device 680 may be copied and transferred to the Internet server 200 through the wired interface. Another example of the external media source 680 may be removable storage on which the audible/visual message produced by the message production device 680 is stored, such as a HDD, USB flash drive, flash memory card, etc. (e.g., 680*b* illustrated in FIG. 18A). The Internet server 200 may comprise an interface, such as a USB port and memory card slot, through which to accept connection with the removable storage 680, so that the audible/visual message stored on the removable storage 680 may be copied and transferred to the Internet server 200 through the interface. The external media source 680 may be operated by a facility manager under control of which the emergency notification system is run in the facility.

In some embodiments, each UE 100 may store therein attribute information indicative of its attribute of being one of the detector UE 100 for detection of an emergency, a notifier UE 100 for the audible message, a notifier UE 100 for the visual message, and a notifier UE 100 for both of the audible and visual messages. In the embodiments, each UE 100 may issue a notification message to the MEC server 300 to notify the attribute information with the identity (e.g., UE ID) of the UE 100, so that the MEC server 300 may identify each UE 100 in the edge site ES as one of the detector UE 100 and notifier UE 100 for management of the UEs 100 in the edge site ES. Each UE 100 may send the UE ID of the UE 100 with the attribute information automatically in response to discovering and connecting to the MEC server 300, e.g., according to the process P2*a*, P2*b*, P2*c*, or P2*d*. The MEC server 300 may generate and update a database for the management of the UEs 100 in response to the notified attribute information from the UEs 100. Alternatively, the UE ID of the UE 100 with the attribute information may be manually input by a user on the MEC server 300, per UE 100, to generate the database.

Also, the MEC server 300 may manage the location or position of each UE 100 (each detector UE 100 and each notifier UE 100) in the facility, on the database. Specifically, the MEC server 300 may store therein (a) a map of one or more areas in the facility in which the detector UE(s) 100 and notifier UE(s) 100 are positioned (i.e., the area where a fixed UE 100 is installed or a mobile UE 100 is currently carried) and (b) location information indicative of the location relative to the area per UE 100, so that the MEC server 300 may identify the location of each detector UE 100 and each notifier UE 100 on the map. In an aspect, the MEC server 300 may prompt the user to plot the location of each detector UE 100 and each notifier UE 100 on the map on a GUI to receive a user input of the plotting, so that the plotted location relative to the map may be stored per UE 100 on the database, just as discussed with reference to FIG. 13D. In another aspect, each detector UE 100 and notifier UE 100 may be provided with a memory on which location information indicative of its location is stored, in which case each UE 100 may send the stored location information to the MEC server 300 so that the MEC server 300 may identify the location of each UE 100 on the map. The map may include geographical information indicative of coordinates for positions in the area, and the location information stored in each UE 100 may be indicative of the coordinates of its position identified using a positioning system such as GNSS and IPS. The detector UE 100 and notifier UE 100 may send the location information to the MEC server 300 at least once when the UE 100 is turned on, for example, at least once upon the UE 100 being turned on, upon request from the MEC server 300, or otherwise regularly or irregularly. The UE 100, when it is a mobile UE 100 subject to change of its location identified using the positioning system as times goes by, may send the location information periodically at predetermined intervals.

In the system, each detector UE 100 may send the alarm signal, attribute information, location information, etc. to the MEC server 300 over a local connection individually using its own communication circuitry. Similarly, each notifier UE 100 may send the attribute information, location information, etc. to the MEC server 300 over a local connection individually and receive the audio/video stream for the audible/visual message from the MEC server 300 over the local connection individually, using its own communication circuitry. FIG. 18B schematically illustrates an example of implementation where each detector UE 100 and each notifier UE 100 communicate with the MEC server 300 individually. Alternatively, two or more detector UEs 100 in the same area may be connected to one another, e.g., via a cable, via a short-range wireless communication link such as Bluetooth and Near Field Communication (NFC), so that the alarm signals, attribute information, location information, etc. originating from the connected detector UEs 100 in the same area may be aggregated and sent together to the MEC server 300 in one batch. A single detector UE 100 operative as the representative detector UE 100 connected to other detector UEs 100 may aggregate the alarm signals, attribute information, location information, etc. from said other detector UEs 100, and forward the aggregated data to the MEC server 300 over the local connection. The detector UEs 100 may be connected together in series in order for each UE 100 to forward its own data (alarm signal, attribute information, location information, etc.) to the next detector UE 100, so that the detector UE 100 at the end of the series may operate as the representative detector UE 100. Similarly, tow or more notifier UEs 100 in the same area may be connected to one another, e.g., via a cable, via a short-range wireless communication link such as Bluetooth and NFC, so that the attribute information, location information, audio/video streams, etc. originating from and addressed to the connected notifier UEs 100 in the same area may be aggregated and communicated together with the MEC server 300 in one batch. A single notifier UE 100 operative as the representative notifier UE 100 connected to other notifier UEs 100 may aggregate the attribute information and location information from said other notifier UEs 100 to forward the aggregated data to the MEC server 300 over the local connection. The representative notifier UE 100 may also receive audio/video streams addressed to said other notifier UEs 100 from the MEC server 300 to distribute the audio/video streams to the other notifier UEs 100 respectively as so addressed. FIG. 18C schematically illustrates an example of implementation where one of the two connected detector UEs 100 operates as the representative detector UE 100 while one of the two connected notifier UEs 100 operates as the representative notifier UE 100.

FIG. 18D schematically illustrates an example of a database 75 for management of detector UEs 100 and notifier UEs 100, according to some embodiments. The database 75 may list, per facility, one or more detector UEs 100 and one or more notifier UEs 100 belonging to the facility. The database 75 may include a facility identification (facility ID) 75*a* that uniquely identifies the facility to which the listed detector UEs 100 and notifier UEs 100 belong. A UE ID 75*b*, category 75*c*, location 75*d*, and map 75*e* may be associated with and listed under the facility ID 75*a*. Each UE ID 75*b* may be the identifier that uniquely identifies a corresponding UE 100 in the facility identified by the associated facility ID 75*a*. The category 75*c* may be associated with a corresponding UE ID 75*b*, indicating the attribute (i.e., one of the detector UE 100, notifier UE 100 for audible message, notifier UE 100 for visual message, and notifier UE 100 for both of audible and visual messages) of the UE 100 identified by the corresponding UE ID 75*b*. The location 75*d* may be associated with a corresponding UE ID 75*b*, indicating the location or position of the UE 100 identified by the corresponding UE ID 75*b*. Preferably, the location 75*d* may be indicative of the location or position in the map 75*e*. The map 75*e* may be a map of the facility identified by the facility ID 75*a*. The map 75*e* may include sets of coordinates (e.g., geographical coordinates) of positions in the map 75*e*, while the location 75*d* may be represented by a set of coordinates on the map 75*e*, indicating the position in the positions on the map 75*e*. The UE ID 75*b*, category 75*c*, and location 75*d* may be manually inputted by the user to be stored on the database 75 as discussed above, or may be generated and stored on the database 75 based on the UE ID, attribute information, location information sent by the UE 100 as discussed above. The map 75*e* may be an image uploaded by the user on the database 75. Icons each of which represents a corresponding listed UE 100 may be generated automatically and plotted on the map 75*e* at the positions identified by the locations 75*d*, letting the user easily know where the listed UEs 100 are present in the facility. The facility ID 75*a* may be manually inputted by the user in listing the UE ID 75*b*, category 75*c*, location 75*d*, and map 75*e* on the database 75, or may be generated automatically in listing the UE ID 75*b*, category 75*c*, location 75*d*, and map 75*e* on the database 75. The facility identified by the facility ID 75*a* may include two or more separate areas (e.g., floors) in which the detector UEs 100 and notifier UEs 100 are positioned, in which case the map 75*d* may include separate maps corresponding to the areas of the facility.

In the example illustrated in FIG. 18D, the UEs 100 in the facility identified by the facility ID of FA001 are listed in the database 75. The facility has two areas (i.e., floors), and the map 75*e* includes a first map corresponding to the first floor of the facility and a second map corresponding to the second floor of the facility. The database 75 lists UE001, UE002, and UE003 (UE ID 75*b*) which are identified as a detector UE (category 75*c*) and determined to be positioned at A, B, and C respectively (location 75*d*). The database 75 lists UE010 and UE011 (UE ID 75*b*) which are identified as a notifier UE for audio output (category 75*c*) and determined to be positioned at D and E respectively (location 75*d*). The database 75 lists UE012 (UE ID 75*b*) which is identified as a notifier UE for video output (category 75*c*) and determined to be positioned at F (location 75*d*). The database 75 lists UE013 (UE ID 75*b*) which is identified as a notifier UE for audio and video output (category 75*c*) and determined to be positioned at G (location 75*d*). The locations A to G represent respective positions in the first floor of the facility (i.e., on the first map of the map 75*e*). The database 75 lists UE020, UE021, and UE022 (UE ID 75*b*) which are identified as a detector UE (category 75*c*) and determined to be positioned at H, I, and J respectively (location 75*d*). The database 75 lists UE030, UE031, and UE032 (UE ID 75*b*) which are identified as a notifier UE for audio output (category 75*c*) and determined to be positioned at K, L, and M respectively (location 75*d*). The database 75 lists UE033 (UE ID 75*b*) which is identified as a notifier UE for video output (category 75*c*) and determined to be positioned at N (location 75*d*). The locations H to N represent respective positions in the second floor of the facility (i.e., on the second map of the map 75*e*).

In the system, the MEC server 300 may store therein at least one audible or visual message for the emergency notification associated with the facility ID 75*a*. The audible message may be composed of an audio file adapted to be played back by the notifier UE 100 for audio output or notifier UE 100 for audio and video output. The visual message may be composed of a video file adapted to be played back by the notifier UE 100 for video output or notification UE 100 for audio and video output. The audible message may represent a speech that notifies the emergency by way of audio, while the visual message may represent a text and image that notify the emergency by way of video. FIG. 18E schematically illustrates an example where the audible message "Message A. mp3" and visual message "Message V.mp4" representing the message for notifying the occupants of an emergency and urging them to evacuate (e.g., "Fire is detected. Please evacuate immediately.") are associated with the facility FA001.

In some detailed implementations, different two or more audible/visual messages may be associated with the detector UEs 100 under the same facility ID 75*a* so that different audible/visual messages can be selected depending on which detector UE 100 has detected the emergency. This may be advantageous, for example, for notifying different specifics of emergency depending on which detector UE 100 has detected the emergency. A separate audible/visual message may be associated with every one of the detector UEs 100, or may be associated with a group of the detector UEs 100. FIG. 18F schematically illustrates an example where the detector UE 100 identified by UE001 is associated with the audible message "Message A1.mp3" and visual message "Message V1.mp4"; the detector UEs 100 identified by UE002 and UE003 are associated with the audible message "Message A2.mp3" and visual message "Message V2.mp4"; the detector UE 100 identified by UE020 is associated with the audible message "Message A3.mp3" and visual message "Message V3.mp4"; and the detector UEs 100 identified by UE021 and UE022 are associated with the audible message "Message A4.mp3" and visual message "Message V4.mp4". Each set of audible/visual messages may represent the message for notifying the occupants of an emergency, with the specifics of the emergency determined based on the locations of one or more associated detector UEs 100. Examples of the specifics of the emergency may include: the whereabouts of the emergency that corresponds to the locations where the one or more associated detector UEs 100 are positioned; the exit or stairs the occupants should use to evacuate safely, which may be far from the locations where the one or more associated detector UEs 100 are positioned; etc. For example, the audible/visual messages associated with UE001 may represent the message for notifying the occupants of an emergency occurred near the fire exit on the first floor where UE001 is positioned.

In some detailed implementations, different two or more audible/visual messages may be associated with the notifier UEs 100 under the same facility ID 75*a* so that different audible/visual messages can be selected depending on which notifier UE 100 plays back a message. This may be advantageous, for example, for providing more targeted notification depending on where recipients of the notification are in the facility. A separate audible/visual messages may be associated with every one of the notifier UEs 100, or may be associated with a group of the notifier UEs 100. FIG. 18G schematically illustrates an example where the notifier UEs 100 identified by UE010, UE012, and UE013 are associated with the audible message "Message A1.mp3" and visual message "Message V1.mp4"; the notifier UE 100 identified by UE011 is associated with the audible message "Message A2.mp3" and visual message "Message V2.mp4"; the notifier UE 100 identified by UE030 is associated with the audible message "Message A3.mp3" and visual message "Message V3.mp4"; the notifier UEs 100 identified by UE031 and UE032 are associated with the audible message "Message A4.mp3" and visual message "Message V4.mp4"; and the notifier UEs 100 identified by UE033 is associated with the audible message "Message A5.mp3" and visual message "Message V5.mp4". Each set of audible/visual messages may represent the message for notifying the occupants of an emergency, with the specifics of the emergency determined based on the locations where one or more associated notifier UEs 100 are positioned. Examples of the specifics of the emergency may include: the exit or stairs the recipients of the message should use for evacuation, which may be near the location where the one or more associated notifier UEs 100 are positioned; etc. For example, the audible/visual messages associated with UE010, UE012, and UE013 may represent the message for notifying the occupants of an emergency and urging them to evacuate from the exit on the North side, to which UE010, UE012, and UE013 are closer than to other exits.

The implementations illustrated in FIGS. 18F and 18G may be combined together for more targeted notification. In other words, different two or more audible/visual messages may be associated with combinations of the detector UEs 100 and notifier UEs 100 under the same facility ID 75*a*. A separate audio/visual messages may be associated with every combination of one or more detector UEs 100 and one or more notifier UEs 100. FIG. 18H schematically illustrates an example where the a combination of the detector UE 100 identified by UE001 and the notifier UEs 100 identified by UE010, UE011, UE12, UE013 are associated with the audible message "Message A1.mp3" and visual message "Message V1.mp4"; a combination of the detector UE 100 identified by UE001 and the notifiers UEs 100 identified by UE030, UE031, UE032, UE033 are associated with the audible message "Message A2.mp3" and visual message "Message V2.mp4"; a combination of the detector UE 100 identified by UE002 and the notifier UEs 100 identified by UE010, UE012 are associated with the audible message "Message A3.mp3" and visual message "Message V3.mp4"; a combination of the detector UE 100 identified by UE002 and the notifier UE 100 identified by UE013 are associated with the audible message "Message A4.mp3" and visual message "Message V4.mp4"; a combination of the detector UE 100 identified by UE002 and the notifier UE 100 identified by UE011 are associated with the audible message "Message A5.mp3" and visual message "Message V5.mp4"; a combination of the detector UE 100 identified by UE002 and the notifier UEs 100 identified by UE030, UE031, UE032, UE033 are associated with the audible message "Message A6.mp3" and visual message "Message V6.mp4"; etc. Each set of audible/visual message may represent the message for notifying the occupants of an emergency, with the specifics of the emergency determined based on the locations where one or more associated detector UEs 100 and one or more associated notifier UEs 100 are positioned. For example, the audible/visual message associated with UE001, UE010, UE011, UE012, and UE013 may represent the message for notifying the occupants of an emergency occurred on the North side on the first floor where UE001 is positioned and for urging them to evacuate from the exit on the South side which is far from the North side.

In some embodiments, the MEC server 300 may provide an emergency notification using an audible/visual message associated with the facility ID 75*a*. FIG. 18I is a flowchart illustrating an example of a process P15*a* for the emergency notification, according to some embodiments. The process P15*a* may commence in response to a detector UE 100 detecting an emergency and generating and sending an alarm signal to the MEC server 300 (S220*a*). In response to receipt of the alarm signal (S220*b*), the MEC server 300 may identify what detector UE 100 has detected the emergency, namely, the UE ID of the detector UE 100 indicated by the alarm signal received at the step S220*b* (S220*c*). The MEC server 300 may then identify one or more notifier UEs 100 associated with the detector UE 100 identified at the step S220*c*, as one or more targets of emergency notification, with reference to the database 75 (S220*d*). At the step S220*d*, the MEC server 300 may identify the facility ID 75*a* associated with the detector UE 100, and then identify one or more notifier UEs 100 associated with the facility ID 75. Namely, the MEC server 300 may identify one or more notifier UEs 100 under the same facility ID 75 as that to which the detector UE 100 belongs. The MEC server 300 may then identify one or more audible/visual messages for the one or more identified notifier UEs 100 (S220*e*), and generate and send audio stream(s) of the identified audible message(s) and/or video stream(s) of the identified visual message(s) to the identified one or more notifier UEs 100 over a local connection (S220*f*). At the step S220*f*, the MEC server 300 may address the audio stream(s) and/or video stream(s) to the UE ID(s) of the identified one or more notifier UEs 100. At the step S220*e*, the MEC server 300 may select one or both of the audible message and visual message for each notifier UE 100 depending on whether the notifier UE 100 is for audio output, video output, or both, with reference to the category 75*c* of the notifier UE 100. More specifically, the MEC server 300 may: select solely an audible message for each notifier UE 100 for audio output, to generate and send the audio stream of the audible message to the notifier UE 100 for audio output; select solely a visual message for each notifier UE 100 for video output, to generate and send the video stream of the visual message to the notifier UE 100 for video output; and select both of the audible message and visual message for each notifier UE 100 for audio/video output, to generate and send the audio stream of the audible message and video stream of the visual message to the notifier UE 100 for audio/video output.

In case a separate audible/visual messages are associated with individual one or more detectors UE 100 as discussed above with reference to FIG. 18F, the MEC server 300 may identify the audible/visual messages associated with the detector UE 100 identified at the step S220*c* (S220*e*), so that the identified audible/visual messages may be streamed to the notifier UEs 100 (S220*f*). For example, if UE003 is identified as the source of the alarm signal at the step S220*c*, the audible message "Message A2. mp3" and visual message "Message V2.mp4" associated with UE003 are identified (S220*e*), resulting in the audible message "Message A2.mp3" being selected and streamed to UE010, UE011, UE013, UE030, UE031, and UE032 capable of audio output (S220*f*) and the visual message "Message V2.mp4" being selected and streamed to UE012, UE013, and UE033 capable of video output (S220*f*).

In case a separate audible/visual messages are associated with individual one or more notifier UEs 100 as discussed above with reference to FIG. 18G, the MEC server 300 may identify a separate set of audible/visual messages per associated one or more notifier UEs 100 (S220*e*), so that the identified audible/visual messages may be streamed to the notifier UEs 100 associated with the audible/visual messages respectively (S220*f*). For example, the audible message "Message A1.mp3" and visual message "Message V1.mp4" are identified for UE 010, UE012, UE013 (S220*e*), resulting in the message "Message A1.mp3" being selected and streamed to UE010 and UE013 capable of audio output (S220*f*) and the message "Message V1.mp4" being selected and streamed to UE012 and UE013 capable of video output (S220*f*). The audible message "Message A2.mp3" and visual message "Message V2.mp4" are also identified for UE 011 (S220*e*), resulting in the message "Message A2.mp3" being selected and streamed to UE011 capable of audio output (S220*f*). The audible message "Message A3.mp3" and visual message "Message V3.mp4" are identified for UE030 (S220*e*), resulting in the message "Message A3.mp4" being selected and streamed to UE030 capable of audio output (S220*f*). The audible message "Message A4.mp3" and visual message "Message V4.mp4" are also identified for UE031 and UE032 (S220*e*), resulting in the message "Message A4.mp4" being selected and streamed to UE031 and U032 capable of audio output (S220*f*). The audible message "Message A5.mp3" and visual message "Message V5.mp4" are identified for UE033 (S220*e*), resulting in the message "Message V5.mp4" being selected and streamed to UE033 capable of video output (S220*f*).

In case a separate audio/visual messages are associated with every combination of one or more detector UEs 100 and one or more notifier UEs 100 as discussed above with reference to FIG. 18H, the MEC server 300 may identify one or more sets of audible/visual messages associated with the detector UE 100 identified at the step S220*c* (S220*e*), so that the identified audible/visual messages may be streamed to the notifier UEs 100 associated with the audible/visual messages respectively (S220*f*). If UE001 is identified as the source of the alarm signal at the step S220*c*, the audible message "Message A1.mp3" and visual message "Message V1.mp4" for the notifier UEs 100 (UE010, UE011, UE012, UE013) associated with UE0001 as well as the audible message "Message A2.mp3" and visual message "Message V2.mp4" for the other notifier UEs 100 (UE030, UE031, UE032, UE033) associated with UE001 are identified (S220*e*). The audible message "Message A1.mp3" is selected and streamed to UE010, UE011, and UE013 capable of audio output, while the visual message "Message V1.mp4" is selected and streamed to UE012 and UE013 capable of video output. The audible message "Message A2.mp3" is selected and streamed to UE030, UE031, and UE032 capable of audio output, while the visual message "Message V2.mp3" is selected and streamed to UE033 capable of video output.

In the process P15*a*, in response to receipt of the audio stream and/or video stream from the MEC server 300 (S220*g*), each notifier UE 100 may play back the received audio stream through a speaker and/or play back the received video stream on a display (S220*h*).

In the process P15*a*, the MEC server 300 may generate and store therein an emergency notification record that is a record, log, or history of the emergency detected based on the alarm signal received at the step S220*b* (S220*i*). The emergency notification record may include the timestamp indicative of the time of the reception of the alarm signal as well as the facility ID (facility ID 75*a*), the UE ID of the detector UE 100 (UE ID 75*b*), the UE ID(s) of the notifier UE(s) 100 (UE ID 75*b*), the respective locations of the detector UE 100 and notifier UE(s) 100 (location 75*d*), and the audible/visual message(s) which are identified at the steps S220*c*-S220*e*. The MEC server 300 may generate and store therein the emergency notification record timely in response to the identification at the steps S220*c*-S220*e*, in parallel to the transmission of the audio/video stream at the step S220*f* (S220*i*).

The database 75 may be generated and stored therein by the MEC server 300 by (a) receiving the UE ID, attribute information, and location information (for UE ID 75*a*, category 75*b*, and location 75*d*, respectively) from each UE 100 over a local connection and (b) receiving the map of the facility (for map 75*e*) from the Internet server 200 over the Internet 3. To generate the database 75, the MEC server 300 may: (a) enter the received map as the map 75*e* on the database 75*a*; (b) list the UE ID 75*b* with reference to the received UE ID of each UE 100; (c) identify the attribute of each UE 100 to list the category 75*c* associated with each UE ID 75*b*, with reference to the received attribute information; (d) identify the location of each UE 100 to list the location 75*d* associated with each UE ID 75*b*, with reference to the received location information; and (e) plot each UE 100 on the map 75*e* by way of an icon, based on the location 75*d* of each UE 100. Alternatively, the database 75 may be preliminarily generated by the Internet server 200 and uploaded to the MEC server 300 over the Internet 3, so that the MEC server 300 may store therein the received database 75.

The database 75 may be static after once generated as long as the items (UE ID 75*a*, category 75*b*, location 75*d*, map 75*e*) are not subject to change. The database 75 may be dynamic, namely, timely updated at least in part in response to change of the items. For example, the UE ID 75*a* may be updated in response to a new detector/notifier UE 100 being added to the facility, an exiting detector/notifier UE 100 being removed from the facility, etc. The location 75*d* associated with a UE ID 75*a* may be updated in response to change of the location or position of the corresponding detector/notifier UE 100 as it moves, for example, when the detector/notifier UE 100 is mobile.

The database 75 may list two or more facility IDs 75*a* identifying respective separate facilities, and list the detector/notifier UEs 100 associated with each facility ID 75*a*, when the MEC server 300 manages emergency notification to two or more separate facilities. In this case, each facility ID 75*a* may be associated with one or more audible/visual messages which are targeted to the facility identified by the facility ID.

The message upload service (Internet service) may be performed according to the process P4*a*. For the message upload service, the Internet server 200 may send one or more audible/visual messages to the MEC server 300 over the Internet 3 (S120*a*). In the upload of an audible/visual message, the user may be prompted to specify (a) the audible/visual message the user intends to upload and (b) one or more facility IDs to which the user intends to target the audible/visual message, though a user interface (UI). The Internet server 200 may send the specified audible/visual message with facility information indicative of the specified one or more facility IDs to the MEC server 300 (S120*a*). In an aspect, the UI may be provided by the external media source 680 (e.g., smartphone 680*a*, PC 680*a*, etc.), in which case the facility information indicative of the specified facility IDs may be uploaded from the external media source 680 to the Internet server 200 along with the specified audible/visual message, so that the Internet server 200 may forward the audible/visual message and facility information to the MEC server 300. In another aspect, the UI may be provided by the Internet server 200. In response to receipt of the audible/visual message and facility information from the Internet server 200 over the Internet 3 (S120*b*), the MEC server 300 may store therein the received audible/visual message associated with the facility ID (i.e., facility ID 75*a*) indicated by the facility information (S120*c*), as discussed above with reference to FIGS. 18E to 18H. The MEC server 300 may receive a plurality of separate audible messages and/or visual messages associated with the same facility ID 75*a* from the Internet server 200 (S120*b*), to associate the received audible/visual messages with the detector UEs 100, notifier UEs 100, or combinations thereof under the same facility ID 75*a* as discussed above with reference to FIGS. 18F to 18H (S120*c*). In an aspect, the MEC server 300 may associate the individual audible/visual messages with the detector UEs 100, notifier UEs 100, or combinations thereof under the same facility ID 75*a* automatically using a specific algorithm and/or an artificial intelligence (AI). For example, according to the specific algorithm and/or AI, the association may be achieved by: determining the locations of evacuation points such as exits and stairs on the map 75*e*; determining the locations of the respective detector UEs 100 on the map 75*e*; determining location of the respective notifier UEs 100 on the map 75*e*; determining the correlation between the locations of the evacuation points, detector UEs 100, and notifier UEs 100; and selecting an audible/visual message the most suited for each detector UE 100, each notifier UE 100, or each combination based on the determined correlation. In another aspect, the user may be prompted to specify one or more detector UEs 100, one or more notifier UEs 100, or one or more combinations thereof associated with each audible/visual message on the UI, in which case specification information indicative of the specification may be sent by the Internet server 200 to the MEC server 300 along with the audible/visual messages, so that the MEC server 300 may associate each audible/visual message with the one or more detector UEs 100, one or more notifier UEs 100, or one or more combinations thereof as indicated by the specification information as illustrated in FIGS. 18F to 18H.

For the emergency notification history storage service (Internet service), the MEC server 300 may send the emergency notification record generated at the step S220*i* in the process P15*a*, to the Internet server 200 over the Internet 3, so that the Internet server 200 may store therein the emergency notification record. FIG. 18J is a flowchart illustrating an example of a process P15*b* for transmission of the emergency notification record from the MEC server 300 to the Internet server 200, according to some embodiments. In the process P15*b*, the MEC server 300 may regularly or irregularly send the emergency notification record generated at the step S220*i* in the process P15*a* (S221*a*). At the step S221*a*, the MEC server 300 may forward the emergency notification record in response to every generation of the emergency notification record at step S220*i* in the process P15*a* (S221*a*). Alternatively, at the step S221*a*, the MEC server 300 may accumulate generated emergency notification records, and forward the accumulated emergency notification records to the Internet server 200 periodically according to a predetermined schedule (S221*a*). In response to receipt of the emergency notification record from the MEC server 300 (S221*b*), the Internet server 200 may store therein the received emergency notification record (S221*c*). The emergency notification record may include information indicative of the facility ID (facility ID 75*a*), the UE ID of the detector UE 100 (UE ID 75*b*), the UE ID(s) of the notifier UE(s) 100 (UE ID 75*b*), the respective locations of the detector UE 100 and notifier UE(s) 100 (location 75*d*), and the audible/visual message(s) which are identified at the steps S220*c*-S220*e*, as well as the timestamp indicative of the time of the reception of the alarm signal at the step S220*b*. The Internet server 200 may store therein a record file that lists the emergency notification records, in which case the Internet server 200 may update the record file by entering a received new emergency notification record at the step S221*c* (S221*c*). Each record in the record file may include information indicative of the facility ID (facility ID 75*a*), the UE ID of the detector UE 100 (UE ID 75*b*), the UE ID(s) of the notifier UE(s) 100 (UE ID 75*b*), the respective locations of the detector UE 100 and notifier UE(s) 100 (location 75*d*), and the audible/visual message(s) which are identified at the steps S220*c*-S220*e* as well as the time when the alarm signal was received (S220*b*), as schematically illustrated in FIG. 18K. The exemplary record illustrated in FIG. 18K shows the emergency notification record for the emergency based on the alarm signal from the detector UE 100 identified by UE001 received at 10:21 on Dec. 22, 2019 which invoked broadcast of the audible message "Message A1.mp3" and visual message "Message V1.mp4" destined to the notifier UEs 100 identified by UE010, UE011, UE012, and UE013 as well as broadcast of the audible message "Message A2.mp3" and visual message "Message V2.mp4" destined to the notifier UEs 100 identified by UE030, UE031, UE032, and UE033. The record file stored on the Internet server 200 may be streamed and/or downloaded to a UE 100 (S221*d*). At the step S221*d*, the Internet server 200 may allow access to the record file from the UE 100 over the Internet 3, so that the user of the UE 100 is prompted to request for the stored record file through a UI such as a GUI presented on the UE 100 over the Internet 3 (S221*d*). The Internet server 200 may stream the requested record file to the UE 100 for instant playback of the record file on the UE 100 or transfer the requested record file to the UE 100 for download of the record file onto the UE 100 (S221*d*). Alternatively or in addition to the provision of download or streaming of the record file at the step S221*d*, the Internet server 200 may play back the record file locally on a display of the Internet server 200 (S221*e*).

In some embodiments, the edge-based emergency notification service (MEC service) may be provided to UEs 100 in a local service group formed according to the process P6*a* or P6*b* as discussed above. In the embodiments, a local service group may be formed per facility to which the MEC sever 300 provides the emergency notification. The facility ID 75*a* identifying a facility on the database 75 may correspond to the local service group ID 52*a* identifying the local service group to which the facility belongs. The detector UEs 100 and notifier UEs 100 listed under a facility ID 75*a* on the database 75 may be consistent with the participants 52*c* associated with the corresponding local service group ID 52*a* on the database 52, and therefore the databases 52 and 75 may be integrated or united into a single database.

In some modifications to the embodiments, the message upload service discussed above may be provided directly between the MEC server 300 and external media source 680 over the Internet 3, instead of between the MEC server 300 and Internet server 200 according to the process P4*a*. In the modified embodiments, the MEC server 300 may be accessible by the external media source 680 over the Internet 3 using the global IP address allocated to the MEC server 300, just as it is accessible by the Internet server 200 according to the process P4*a*, so that the external media source 680 may upload the audible/visual message to the MEC server 300 over the Internet 3. FIG. 18L is a flowchart illustrating an example of a process P15*c* for upload of the audible/visual message from the external media source 680 to the MEC server 300, according to some modified embodiments. In the modified embodiments, the external media source 680 may send the audible/visual message stored therein to the MEC server 300 (S222*a*). In response to receipt of the audible/visual message (S222*b*), the MEC server 300 may store therein the received audible/visual message (S222*c*) just as it does at the step S120*c* in the process P4*a* with reference to FIG. 18E, 18F, 18G, or 18H.

In some modified embodiments, the MEC server 300 may provide download or streaming of a record file listing emergency notification records stored in the MEC server 300 to a UE 100 over the Internet 3. In the modified embodiments, the MEC server 300 may be accessible by the UEs 100 over the Internet 3 using the global IP address allocated to the MEC server 300 even when the UE 100 is not in the edge site ES, just as the Internet server 200 is accessible by the UEs 100 over the Internet 3 for download or streaming of the record file according to the process P15*b*. In the modified embodiments, The record file generated by and stored in the MEC server 300 at the step S220*i* in the process 15*a* may be accessible by the UEs 100 for download or streaming to the UEs 100. FIG. 18M is a flowchart illustrating an example of a process P15*d* for provision of download or streaming of a record file from the MEC server 300 to a UE 100, according to some modified embodiments. In the process P15*d*, the MEC server 300 may allow access to the record file from UE 100 over the Internet 3, prompting the user of the UE 100 to request for the stored record file through a UI such as a GUI presented on the UE 100 over the Internet 3, just as the Internet server 200 does in the process P15*b*. The MEC server 300 may stream the requested record file to the UE 100 for instant playback of the record file on the UE 100 or transfer the requested record file to the UE 100 for download of the record file (S223*a*), just as the Internet server 200 does at the step S221*d* in the process P15*b*.

The summary of the emergency notification system according to the embodiments discussed above is described blow with reference to FIG. 18N. The audible/visual message may be uploaded on the MEC server 300 from the external media source 680 in the process P15*c* or from the Internet server 200 in the process P4*a*. The alarm signal and audible/visual message for emergency notification may be communicated in the edge site ES in the process P15*a*. In parallel to the communication of the audible/visual message for emergency notification in the process P15*a*, a record file as a record of the emergency notification may be generated in the process P15*b* or P15*d*, so that the record file stored in the Internet server 200 may be downloaded or streamed form the Internet server 200 to the UE 100 in the process P15*b* or the record file stored in the MEC server 300 may be downloaded or streamed from the MEC server 300 to the UE 100 in the process P15*d*. Advantageously, the emergency notification localized to a limited area (facility) with the need for low latency may be offloaded on the MEC server 300. Advantageously, a record of emergency notification may be automatically generated to be accessible by the UEs 100, in parallel to the emergency notification.

(UE-to-UE Mutual Media Stream Distribution System)

In some embodiments, at least one UE 100 in the edge site ES and at least one other UE 100 out of the edge site ES may communicate with one another over a local connection and Internet 3 for communication of media streams therebetween mutually. The MEC service may be an edge-based audio/video outbound distribution service that involves distributing an audio/video stream generated by a UE 100 in the edge site ES (internal UE 100) from the MEC server 300 to the Internet server 200 outside the edge site ES. In connection with the MEC service (edge-based audio/video outbound distribution service), the Internet service may be a post-edge audio/video distribution service that involves distributing the outbound audio/video stream from the Internet server 200 to a UE 100 outside the edge site ES (external UE 100) over the Internet 3. The Internet service may also be a pre-edge audio/video distribution service that involves distributing an audio/video generated by the external UE 100 from the Internet server 200 to the MEC server 300 over the Internet 3. In connection with the Internet service (pre-edge audio/video distribution service), the MEC server 300 may also be an edge-based audio/video inbound distribution service that involves distributing the inbound audio/video stream from the MEC server 300 to the internal UE 100 over a local connection. In the embodiments, distribution of an audio/video stream originating an internal UE 100 to an external UE 100 outwardly from the edge site ES may be referred to as an "outbound" distribution, whereas distribution of an audio/video stream originating from an external UE 100 to an internal UE 100 inwardly into the edge site ES may be referred to as an "inbound" distribution.

FIG. 19A schematically illustrates an example of a system for providing the MEC service (edge-based audio/video outbound distribution service, edge-based audio/video inbound distribution service) and the Internet service (post-edge audio/video distribution service, post-edge audio/video distribution service), according to some embodiments. The system may include at least one "internal" UE 100 and at least one "external" UE 100. The internal UE 100 may be defined herein to be a UE 100 which is in communication with the MEC server 300 in the edge site ES. The external UE 100 may be defined herein to be a UE 100 which is not in the edge site ES and thus is not able to communicate with the MEC server 300. An external UE 100 out of the edge site ES may turn into an internal UE 100 when the UE 100 discovers and connects to the MEC server 300 by entering the edge site ES. An internal UE 100 in the edge site ES may turn into an external UE 100 when the UE 100 disconnects from the MEC server 300 by departing from the edge site ES. Each internal UE 100 may be categorized into one of a source UE 100 (internal source UE 100) and destination UE 100 (internal destination UE 100). The internal source UE 100 may be defined herein to be a UE 100 operative as a source of an audio/video stream for an outbound distribution thereof to the external UE 100, whereas the internal destination UE 100 may be defined herein to be a UE 100 operative as a recipient of an audio/video stream originating from the external UE 100 for the inbound distribution thereof. Each internal source UE 100 may be provided with at least one of (a) a camera for capturing images based on which to generate and output a video stream and (b) a microphone for capturing sound based on which to generate and output an audio stream, for the outbound distribution. Each internal destination UE 100 may be provided with at least one of (a) a video output such as a display for output of video produced as a result of playback of a video stream and (b) an audio output such as a loudspeaker for output of sound produced as a result of playback of an audio stream, for the inbound distribution. Each source UE 100 may be a dedicated source UE 100 that is preliminarily configured or designed to be operative as the source UE 100, not the destination UE 100. Each destination UE 100 may be a dedicated destination UE 100 that is preliminarily configured or designed to be operative as the destination UE 100, not the source UE 100. Each internal UE 100 may be a flexible source/destination UE 100 that can be flexibly or selective operative as one of the source UE 100 and destination UE 100 according to a predetermined condition, e.g., according to a user selection.

An example of the dedicated source UE 100 may be a camera product that comprises a camera with which to take images into a video signal and a processor configured to generate a video stream based on the video signal. The camera product may be a fixed one which is installed on a given filming position, or may be a mobile or portable one which can be carried by a user over various filming positions. The camera product may be a surveillance camera or security camera for surveillance of people or other objects in the edge site ES. The camera product may be a broadcasting camera for broadcasting of an event such as a sports game, music concert, etc. performed in the edge site ES. Another example of the dedicated source UE 100 may be a microphone product that comprises a microphone through which to take sound into an audio signal and a processor configured to generate an audio stream based on the audio signal. The microphone product may also be a fixed one or mobile one.

An example of the dedicated destination UE 100 may be a display product that is provided with a display on which video is displayed as a result of playback of a video stream. Another example of the dedicated destination UE 100 may be a loudspeaker product such as a network speaker a.k.a., IP speaker that is provided with a speaker through which sound is outputted as a result of playback of an audio stream.

An example of the flexible source/destination UE 100 may be a computing device for personal use, industrial use, educational use, etc. such as a smartphone, tablet, personal computer, laptop, etc. The flexible source/destination UE 100 may comprise a microphone and/or camera for audio/video input and a loudspeaker and/or display for audio/video output as well as a processor configured to: (a) generate an audio/video stream based on the audio/video input for transmission when the flexible source/destination UE 100 is in operation as the source UE 100, and to (b) play back an incoming audio/video stream when the flexible source/destination UE 100 is in operation as the destination UE 100. The flexible source/destination UE 100 may switch between a first mode of operation where the UE 100 operates as the source UE 100 and a second mode of operation where the UE 100 operates as the destination UE 100 manually in response to a user input on a UI or automatically in response to a predetermined event associated with the UE 100. For example, the UE 100 may switch between the first mode and second mode automatically depending on whether the camera or microphone of the UE 100 is in operation. Specifically, the UE 100 may set itself to operate as the source UE 100 in the first mode automatically in response to launching or activating the camera or microphone of the UE 100, whereas the UE 100 may set itself to operate as the destination UE 100 in the second mode automatically in response to terminating or deactivating the camera or microphone.

Each external UE 100 may be a flexible source/destination UE 100 such as a computing device for personal use, industrial use, educational use, etc. like a smartphone, tablet, personal computer, laptop, etc. that comprises an audio/video input such as a microphone and/or camera and an audio/video output such as a loudspeaker and/or display as well as a processor configured to (a) generate an audio/video stream based on the audio/video input for transmission and to (b) play back an incoming audio/video stream through the loudspeaker and/or on the display. The external UE 100 may operate as the source UE 100 and destination UE 100 concurrently.

In the example illustrated in FIG. 13A, the system includes a smartphone 100*a* as an internal flexible source/destination UE 100, camera product 100*b* as an internal dedicated source UE 100, and a display product 100*c* as an internal dedicated destination UE 100 in the edge site ES, as well as a smartphone 100*d* as an external UE 100 out of the edge site ES.

In an implementation of the embodiments, the MEC server 300 may be set up in an event venue where an event is held. The event venue corresponds to the edge site ES. An example of the event venue may be an arena, stadium, etc. where a sport competition between sport players is held. Another example of the event venue may be a stadium, arena, music hall, club, theater, etc. where a music concert by music players is held. The system may include one or more cameras and/or microphones 100 (internal source UEs 100) arranged in the event venue to capture images and/or sound of the event players, colorcasters, etc., and one or more external UEs 100 held by remote audience who enjoy the event by remotely watching and listening to the performance of the event players.

Each internal UE 100 may have attribute information indicative of one of the source UE and destination UE. The attribute information of each internal UE 100 may be managed by the MEC server 300 on a database just as the database 55 or 60 discussed above with reference to FIG. 12B, 12C, or 13B, so that the MEC server 300 may identify each internal UE 100 in the edge site ES to be one of the source UE and destination UE. One or more MEC server 300 in communication with the Internet server 200 may be listed and managed by the Internet server 200 on a database, just as the database 50 discussed above with reference to FIG. 5A. In the embodiments, each MEC server 300 may have event information indicative of the event associated with the MEC server 300. Namely, the event information of a MEC server 300 may be indicative of the event held in the event venue (edge site ES) in which the MEC server 300 is deployed. The event information may be provided from each MEC server 300 to the Internet server 200, e.g., in the process P1*a* (S100*a*) or P1*b* (S101*f*), so that the database 50 may include the event information per MEC ID 50*a*. The event information may include the event name and even venue. FIG. 19B schematically illustrates an example of the database 50 including the event 50*f* associated with each MEC server 300, according to some embodiments. The event name of the event information may be listed as the event 50*f*. The event venue of the event information may be listed as the coverage area 50*c*. The example illustrated in FIG. 19B shows that: the MEC server 300 identified by MEC001 is deployed in AA Arena to provide distribution of live audio/video of the event "NBA Finals 2020"; the MEC server 300 identified by MEC002 is deployed in BB Arena to provide distribution of live audio/video of the event "WWE SmackDown Friday Night"; and the MEC server 300 identified by MEC003 is deployed in CC Hall to provide distribution of live audio/video of the event "Pop Music Concert".

In the embodiments, a connection may be virtually established between the external UE 100 and the MEC server 300 via the Internet server 200. More specifically, the Internet server 200 may allow the external UE 100 to select a MEC server 300 out of one or more MEC servers 300 managed by the Internet server 200, and allow communication between the selected MEC server 300 and external UE 100. FIG. 19C is a flowchart illustrating an example of a process P16*a* for establishing a communication between a MEC server 300 and an external UE 100 out of the edge stie ES, according to some embodiments. The process P16*a* may commence when the external UE 100 is in communication with the Internet server 200 over the Internet 3. The external UE 100 may generate a inquiry message as to one or more available MEC servers 300, and send the inquiry message to the Internet server 200 over the Internet 3 (S240*a*). In response to the inquiry message (S240*b*), the Internet server 200 may identify one or more MEC servers 300 that are in communication with the Internet server 200, with reference to the database 50 (S240*c*). The Internet server 200 may then generate a reply message indicative of the identified one or more MEC servers 300, and send the reply message to the external UE 100 (S240*d*). In response to the reply message (S240*e*), the external UE 100 may activate a user interface (UI) through which to receive a user selection of one of the MEC servers 200 indicated by the reply message (S240*f*). The external UE 100 may then generate a request message for connection with a selected MEC server 300 in response to the user selection, and send the request message to the Internet server 200 (S240*g*). In response to the request message (S240*h*), the Internet server 200 may identify the selected MEC server 300 indicated by the reply message, and establish a virtual connection between the selected MEC server 300 and the external UE 100 (S240*i*). The reply message issued at the step S240*d* may include the identifier (MEC ID) of each identified MEC server 300, and the request message issued at the step S240*g* may include the MEC ID of the selected MEC server 300. The reply message issued at the step S240*d* may also include the event information (event name 50*f* and event venue 50*c*) for each MEC server 300 with reference to the database 50.

FIG. 19D schematically illustrates an example of a GUI 570 displayed on a display of the external UE 100 at the step S240*f*, according to some embodiments. The GUI 570 may present or list one or more MEC servers 300 in communication with the Internet server 200, as indicated by the reply message, by way of selectable GUI elements 570*a*. Each GUI element 570*a* may represent a specific MEC server 300, so that a user selection of a GUI element 570*a* may invoke issuance of the request message (S240*g*) indicative of the MEC server 300 associated with the selected GUI element 570*a*. As illustrated in FIG. 19D, the GUI 570 may also include display of the event 570*b* for each MEC server 300 represented by the corresponding GUI element 570*a*, with reference to the event information indicated by the reply message.

Once a connection is virtually established between the external UE 100 and the selected MEC server 300 (S240*i*), the connection may be managed by the Internet server 200. In response to establishing the connection between the external UE 100 and the selected MEC server 300 (S240*i*), the Internet server 200 may store therein a database that lists the UE ID of the external UE 100 associated with the MEC ID of the selected MEC server 300, just as a database 80 schematically illustrated in FIG. 19E. With reference to the database, an inbound audio/video stream from an external UE 100 may be addressed to the MEC server 300 associated with the external UE 100, while an outbound audio/video stream from an MEC server 300 may be addressed to the external UE 100 associated with the MEC server 300. According to the process P16*a*, the same MEC server 300 associated with a specific event may be selected and virtually connected with two or more external UEs 100 of remote audience of the event. In this case, the database 80 may list two or more external UEs 100 associated with the single selected MEC server 300.

Once a connection is virtually established between the external UE 100 and the selected MEC server 300 (S240*i*), the MEC service (edge-based audio/video outbound distribution, edge-based audio/video inbound distribution) and Internet service (post-edge audio/video distribution, pre-edge audio/video distribution) may be performed under control of the Internet server 200 and MEC server 300. FIG. 19F is a flowchart illustrating an example of a process P16*b* for provision of the MEC service and Internet service over the virtual connection between the external UE 100 and selected MEC server 300, according to some embodiments. In the process P16*b*, the Internet server 200 may generate a request message to request for the edge-based audio/video outbound distribution, and send the request message to the selected MEC server 300 over the Internet 3 (S241*a*). At the step S241*a*, the Internet server 200 address the request message to the MEC ID listed on the database 80. In response to receipt of the request message (S241*b*), the MEC server (selected MEC server 300) may initiate the edge-based audio/video outbound distribution (S241*c*-S241*g*). In the edge-based audio/video outbound distribution service, the MEC server 300 may aggregate audio/video streams from one or more internal source UEs 100 in the edge site ES and distribute the aggregated audio/video streams to the Internet server 200 over the Internet 3 (S241*c*-S241*g*). Specifically, the MEC server 300 may generate a request message for an audio/video stream, and send the request message to each internal source UE 100 over a local connection (S241*c*). At the step S241*c*, the MEC server 300 may address the request message to the UE ID of each source UE 100 with reference to the database 55 or 60. In response to receipt of the request message (S241*d*), each internal source UE 100 may initiate sending an audio/video stream generated by itself to the MEC server 300 over a local connection (S241*e*). The MEC server 300 may then forward the audio/video stream received from each internal source UE 100 to the Internet server 200 over the Internet 3 (S241*g*). At the step 241*g*, when the MEC server 300 receives multiple audio/video streams from two or more internal source UEs 100 respectively, the MEC server 300 may mix or combine the audio/video streams into a combined audio/video stream to send the combined audio/video stream to the Internet server 200 (S241*g*). At the step S241*g*, the audio stream generated by a microphone 100 (internal source UE 100) and video stream generated by a camera 100 (internal source UE 100) may mixed or combined into a combined stream. At the step S241*g*, the MEC server 300 may create a video wall by mixing multiple video streams, just as discussed above in the process P9*b* (S171*b*). At the step S241*g*, the MEC server 300 may encode or transcode the received audio/video stream to downgrade the stream in the quality (e.g., the sampling rate, frame rate, bit depth, bit rate, etc.) adapted for transmission over the Internet 3, and forward the downgraded audio/video stream to the Internet server 200. The audio/video stream processed at the steps S241*c*-S241*g* may be treated as an "outbound" audio/video stream because the audio/video stream goes outside the edge site ES. In response to receipt of the forwarded audio/video stream, the Internet server 200 may initiate the post-edge audio/video distribution (S241*h*-S241*k*). In the pose-edge audio/video distribution service, the Internet server 200 may forward the received audio/video stream to the external UE 100 over the Internet 3 (S241*h*, S241*i*), so that the external UE 100 may receive and play back the audio/video stream through the speaker and/or on the display of the external UE 100 (S241*j*, S241*k*). At the step S241*i*, the Internet server 200 may address the audio/video stream to the UE ID of each external UE 100 with reference to the database 80. In parallel to the post-edge audio/video distribution, the pre-edge audio/video distribution may be performed under control of the Internet server 200 (S2411-S2410). Specifically, in parallel to the playback of the audio/video stream at the step S241*k*, the external UE 100 may accept input of at least one of sound through the microphone and image through the camera on the external UE 100 (S2411). The external UE 100 may generate an audio/video stream from the inputted sound and/or image, and send the audio/video stream to the Internet server 200 over the Internet 3 (S241*m*). In response to receipt of the audio/video stream from each external UE 100 (S241*n*), the Internet server 200 may forward the audio/video stream to the MEC server 300 over the Internet 3 (S2410). At the step S2410, the Internet server 200 may address the audio/video stream to the MEC ID of the MEC server 300 with reference to the database 80. In response to receipt of the audio/video stream from the Internet server 200, the MEC server 300 may initiate the edge-based audio/video inbound distribution (S241*p*-S241*s*). In the edge-based audio/video inbound distribution service, the MEC server 300 may forward the received audio/video stream to each internal destination UE 100 over a local connection (S241*p*, S241*q*), so that each internal destination UE 100 may receive and play back the audio/video stream through the speaker and/or on the display (S241*r*, S241*s*). At the step S241*q*, the MEC server 300 may address the audio/video stream to the UE ID of each internal destination UE 100 with reference to the database 55 or 60. When the MEC sever 300 concurrently receives multiple audio/video streams originating from two or more external UEs 100 respectively at the step S241*p*, the MEC server 300 may mix or combine the multiple audio/video streams into a combined audio/video stream, and forward the combined audio/video stream to each internal destination UE 100 (S241*q*). The audio/video stream processed at the steps S241*p*-S241*s* may be treated as an "inbound" audio/video stream because the audio/video stream has come inside the edge site ES.

The playback of the outbound audio/video stream at the step S241*k* and input of the inbound audio stream at the step S2411 may be performed on a user interface (UI) on the external UE 100. FIG. 19G schematically illustrates an example of a GUI 571 displayed on the external UE 100 at the step S241*k*, according to some embodiments. FIG. 19G illustrates the example where the outbound audio/video stream includes a video stream and the inbound audio/video stream includes an audio stream. The GUI 571 may include a video presentation 571*a* on which playback of the received video stream is presented (S241*k*). In the example illustrated in FIG. 19G, a video presentation for a sport competition (basketball game) as a result of playback of the video stream generated by a camera (internal source UE 100) arranged in a sport arena The GUI 571 may also include a selectable GUI element 571*b* for input of sound such as the user's voice. A user selection of the GUI element 571*b* may invoke activation of a microphone of the external UE 100 for generating an audio stream based on voice inputted through the microphone (S2411, S241*m*). In the example illustrated in FIG. 19G, the GUI element 571*b* is labelled "CHEER!" for input of voice to cheer the sport players in the video presentation. The GUI 571 may allow the user of the external UE 100 to throw his/her voice to the sport players in the sport stadium (edge site ES) concurrently while viewing their activity in the video presentation.

In an implementation of the embodiments, the system may be applied to a sport completion in a sport venue such as an arena, stadium, etc., in which case the sport venue corresponds to the edge site ES. For example, live video of the sport completion captured by one or more broadcasting cameras (internal source UEs 100) in the sport venue may be streamed to and played back by remote audience's devices such as smartphones (external UEs 100). In parallel to the playback, audio of the audience's voice to cheer the sport players in the sport venue may be streamed to and played back by one or more network speakers (internal destination UEs 100) in the sport venue. In another implementation of the embodiments, the system may be applied to a music concert in a music venue like a hall, club, theater, etc., in which case the music venue corresponds to the edge site ES. For example, live video of the music performance captured by one or more cameras (internal source UEs 100) in the music venue may be streamed to and played back by remote audience's devices such as smartphones (external UEs 100). In parallel to the playback, audio of the audience's voice or applause to praise the music performance by the music player(s) in the music venue may be streamed to and played back by one or more network speakers (internal destination UEs 100) in the music venue. In other implementations, the system may be applied to a variety of event venues each of which corresponds to the edge site ES, so that audio and/or video associated with an event in the event venue may be streamed to and played back by external UEs 100 of remote audience of the event, in parallel to which audio and/or video for the audience's reaction to the players or performers of the event may be streamed from the external UEs 100 to an internal destination UE 100.

The summary of the mutual media stream distribution system according to the embodiments discussed above is described blow with reference to FIG. 19H. The audio/video stream generated in the edge site ES may be communicated to an external UE 100 out of the edge site ES in the process P16*b*, in parallel to which the audio/video stream generated by the external UE 100 may be communicated inside the edge site ES in the process P16*b*. The audio/video stream generated inside the edge site ES and the audio/video stream generated outside the edge site ES may be mutually communicated between the inside of the edge site ES and the outside of the edge site ES through the MEC server 300 and Internet server 200, in the process 16*b*. Advantageously, first audio and/or video associated with the performance of an event (e.g., sport game, music concert, etc.) held in a limited venue and second audio and/or video for audience's reaction to the event performance may be mutually communicated across the limited venue through the MEC server 300 and Internet server 200.

(Structures of UE 100)

Various structures associated with hardware components and/or software components may be employed for the UE 100.

FIG. 20A is a block diagram illustrating an example of the structure of the UE 100, according to some embodiments. FIG. 20A schematically illustrates an exemplary general structure of the UE 100. The UE 100 may comprise a processor 1000. The processor 1000 may be a circuit, circuitry, module, or other electronically and/or mechanically structured assembly configured to control components of the UE 100. The processor 1000 may be configured generally to process instructions of computer programs stored in a memory to execute the computer programs, so as to realize a variety of functions of the UE 100. The processor 1000 may be a central processing unit (CPU), micro processing unit (MPU), digital processing unit (DSP), or another general or dedicated processing circuit.

The UE 100 may comprise communication circuitry 1001. The communication circuitry 1001 may perform the mobile communication using a multiple access protocol such as Code Division Multiple Access (CDMA) protocol to communicate over the mobile network 1. In addition or alternatively, the communication circuitry 1001 may include circuitry for establishing a LAN communication through the router 22 (e.g., WLAN communication through the AP 23) over the LAN 2. The WLAN communication may be one which is pursuant to IEEE 802.11 specifications also known as Wi-Fi, IEEE 802.15 specifications, wireless optical communication or visible light communication also known as Light Fidelity (Li-Fi), or other short-range or close-range wireless communication for local area networking. The communication circuitry 1001 may also include circuitry for establishing an internet communication over the Internet 3. The internet communication may be established through the gateway (e.g., PGW 31, UPF 32, etc.) in the mobile network 1, through the modem 21 in the LAN 2, etc. The communication circuitry 1001 may be a circuit designed to perform communication in accordance with a single protocol, or a circuit or a combination of circuits designed to perform communications in accordance with multiple protocols. The communication circuitry 1001 may be used to perform the local communications outside the Internet 3 for the edge-based local services and Internet communications over the Internet 3 for the Internet services discussed above.

The UE 100 may comprise a speaker 1002. The speaker (loudspeaker) 1002 may be a hardware component and/or circuitry configured to convert electrical signals into sound. The speaker 1002 may be configured to output sound based on audio signals fed thereto by the processor 1000. The speaker 1002 may be used to output sound generated as a result of playback of an audio/video stream. The speaker 1002 may also be used to provide a voice user interface (VUI) or audio user interface (AUI). The speaker 1002 may be used by the destination UE 100 discussed above for audio output. The speaker 1002 may be used to provide the audible notification discussed above. The speaker 1002 may be activated or deactivated through a UI, e.g., the GUI 526 or GUI 531 discussed above.

The UE 100 may comprise a microphone 1003. The microphone 1003 is a hardware component and/or circuitry configured to convert sound into electrical signals. The microphone 1003 may be configured to feed the electrical signals representing the sound (audio signals) to the processor 1000. The microphone 1003 may be used to input voice to generate an audio/video stream. The microphone 1003 may also be used to input a voice command through a VUI or AUI. The microphone 1003 may be used by the source UE 100 discussed above for audio input. The microphone 1003 may be activated or deactivated through a UI, e.g., the GUI 526 or GUI 531 discussed above.

The UE 100 may comprise an input device 1004. The input device 1004 may be a circuit, circuitry, or other electronically and/or mechanically structured assembly configured to receive inputs from the user and feed signals indicative of the inputs to the processor 1000. The input 1004 may include a set of mechanical alphabetical and/or numeral keys such as a keyboard and keypad; touch-sensitive sensor configured to detect touches (i.e., taps) of a physical object such as the user's finger and stylus onto the surface of the sensor; microphone through which voice commands are inputted; or another similar type of input device. The input device 1004 may be used to receive user inputs and user selections through the UIs, e.g., GUI 500, GUI 501, GUI 505, GUI 511, GUI 512, GUI 513, GUI 521, GUI 522, GUI 525, GUI 526, GUI 530, GUI 531, GUI 534, GUI 541, GUI 542, GUI 570, and GUI 571 discussed above.

The UE 100 may comprise a display 1005. The display 1005 is configured to display video (i.e., graphics) in accordance with video signals generated by and fed from the processor 1000 for visual presentation of information to the user. The display 1005 may be a liquid crystal display (LCD), electro-luminance (EL) display, or another similar type of display device. The input device 1004 and the display 1005 may be integrated with each other to constitute a touch-sensitive display (i.e., touch screen display) that is operable to provide both of display of information and reception of inputs. The GUIs discussed above (e.g., GUI 500, GUI 501, GUI 502, GUI 503, GUI 505, GUI 511, GUI 512, GUI 513, GUI 521, GUI 522, GUI 525, GUI 526, GUI 530, GUI 531, GUI 532, GUI 534, GUI 535, GUI 540, GUI 541, GUI 542, GUI 543, GUI 550, GUI 570, and GUI 571) may be displayed on the display 1005.

The UE 100 may comprise a camera 1006. The camera 1006 may be a circuit, circuitry, module, or other electronically and/or mechanically structured assembly configured to take a photo or video by capturing or recording a still image or a sequence of images. The camera 1006 may be configured to feed a video signal representing the image or images to the processor 1000. The camera 1006 may be used to capture images to generate a video stream. The camera 1006 may be activated to capture a barcode, e.g., in the process P6*a* or P6*b* discussed above. The camera 1006 may be used by the source UE 100 discussed above for image capture. The camera 1006 may be activated or deactivated through a UI, e.g., the GUI 530 discussed above. The UE 100 may be automatically set as the source UE 100 when the camera 1006 is activated in the edge-based local video communication system discussed above.

The UE 100 may comprise a video/audio input 1007. The video/audio input 1007 may be an input port or terminal through which to receive video and/or audio signals from an external source through a cable. A peripheral or accessary device such as an external microphone, camera, speaker, headphone, display, removal storage, etc. may be plugged into the video/audio input 1007. The video/audio input 1007 may be an AUX or audio interface such as an audio jack in compliance with Open Mobile Terminal Platform (OMTP), Cellular Telephone Industry Association (CTIA), or other standards. The video/audio input 1007 may be a USB port. The UE 100 may be automatically set as the source UE 100 in response to an audio input device (e.g., microphone) or video input device (e.g., camera) being plugged in the video/audio input 1007 in the edge-based local audio communication system or edge-based local video communication system. The UE 100 may be automatically set as the destination UE 100 in response to an audio output device (e.g., speaker) or video output device (e.g., display) being plugged in the video/audio input 1007 in the edge-based local audio communication system or edge-based local video communication system.

The UE 100 may comprise a memory 1008. The memory 1008 may be a memory device or a storage device configured to store information (i.e., digital data) therein. The memory 1008 may include primary storage accessible directly by the processor 1000 for storing information for immediate use in a computing system, and may also include secondary storage for storing information accessible indirectly by the processor 1000 via the primary storage for storing large amount of data. Examples of the memory 1008 may include a volatile memory such as a random access memory (RAM) (e.g., a dynamic random access memory (DRAM) or a static random access memory (SRAM)); a non-volatile memory such as a flash memory, an electrically erasable programmable read-only memory (EEPROM), a hard disc drive (HDD), and a solid state drive (SSD); and a combination thereof. A variety of data accessible by the processor 1000 may be stored on the memory 1008. An operating system (OS), one or more firmwares, and one or more application programs (apps, for short) each designed to be executed by the processor 1000 may also be stored (installed) on the memory 1008. The app stored on the memory 1008 may include a web browser, email client, messaging app, text editor, media player, voice communication app, video communication app, video game app, etc. The OS, firmware, an/or app may include computer program instructions associated the processes discussed above (e.g., processes P1*c*, P2*a*, P2*b*, P2*c*, P2*d*, P3*a*, P3*b*, P3*c*, P3*d*, P4*b*, P4*c*, P4*d*, P4*e*, P4*g*, P5*a*, P5*b*, P5*c*, P5*d*, P6*a*, P6*b*, P7*a*, P7*b*, P7*d*, P8*a*, P8*b*, P8*c*, P8*d*, P8*e*, P9*a*, P9*b*, P9*c*, P9*d*, P9*e*, P9*f*, P9*g*, P9*h*, P9*i*, P10*a*, P10*b*, P10*c*, P10*d*, P12*a*, P12*b*, P12*c*, P12*d*, P13*a*, P13*c*, P13*d*, P15*a*, P15*b*, P15*d*, P16*a*, and P16*b*). A media stream may be generated, cached, and/or stored on the memory 1008. The databases discussed above (e.g., databases 50, 51, 52, 53, 54, 55, 56, 60, 62, 63, 65, 66, 67, 68, 70, 71, 72, 74, 75, and 80) may be generated, stored, and/or updated on the memory 1008. Other information and data used in the processes discussed above may be generated, cached, stored, and/or updated on the memory 1008.

The UE 100 may comprise positioning circuitry 1009. The positioning circuitry 1009 may be configured to periodically generate location information indicative of the current location or position of the UE 100. The circuitry may be one which is configured to generate location information using a GPS or other satellite-based positioning system generally referred to as GNSS; IPS or other positioning system using WiFi access points, Bluetooth beacons, Radio Frequency Identification (RDID) readers and tags, magnetic field sensing, etc. The location information generated by the positioning circuitry 1009 may be fed to the processor 1000. The positioning circuitry 1009 may be used to locate the UE 100 in the processes discussed above, e.g., for generation of the database 60, 65, 70, or 75.

The UE 100 may comprise a sensor 1010. The sensor 1010 may be a circuit, circuitry, or other electronically and/or mechanically structured assembly configured to react to changing physical conditions to detect an event. The sensor 1010 may be a smoke detector configured to detect smoke coming in the detector optically, etc.; a heat detector configured to detect heat over a predetermined threshold temperature, rise of heat over a predetermined threshold steepness, etc.; etc. The sensor 1010 may include a manually-operable element such as a push button, handle, etc. to detect an event in response to the manually-operable element being operated by a user. The sensor 1010 may be used to detect an emergency in the emergency notification system discussed above.

The UE 100 may comprise a bus 1011. The bus 1011 may be a bus through which the components (e.g., processor 1000, communication circuitry 1001, speaker 1002, microphone 1003, input device 1004, display 1005, camera 1006, video/audio input 1007, memory 1008, positioning circuitry 1009, and sensor 1010) are connected to one another.

In some implementations, the UE 100 may be a speaker product (e.g., network speaker or IP speaker) or the like that is dedicated for playback of an audio stream for audio output. In the implementations, the UE 100 may comprise at least the speaker 1002 as well as the processor 1000, communication circuitry 1001, and memory 100, which are housed in a housing of the UE 100.

In some implementations, the UE 100 may be smart TV, digital signage, video wall, or the like that is dedicated for playback of a video stream for video output. In the implementations, the UE 100 may comprise at least the display 1005 as well as the processor 1000, communication circuitry 1001, and memory 100, which are housed in a housing of the UE 100.

In some implementations, the UE 100 may be a wireless microphone product or the like that is dedicated for audio input based on which an audio stream is generated. In the implementations, the UE 100 may comprise at least the microphone 1003 as well as the processor 1000, communication circuitry 1001, and memory 100, which are housed in a housing of the UE 100.

In some implementations, the UE 100 may be a camera product (e.g., surveillance camera, camcorder, etc.) or the like that is dedicated for video input based on which a video stream is generated. In the implementations, the UE 100 may comprise at least the camera 1006 as well as the processor 1000, communication circuitry 1001, and memory 100, which are housed in a housing of the UE 100.

In some implementations, the UE 100 may be a smartphone, tablet, personal computer (PC), laptop, or the like that is a multifunctional device capable of audio/video input and audio/video output. In the implementations, the UE 100 may comprise the speaker 1002, microphone 1003, display 1005, and camera 1006 as well as the processor 1000, communication circuitry 1001, and memory 100, which are housed in a housing of the UE 100. The camera 1006 may be arranged at such a position of the UE 100 as to capture an image of the face of a user when the user watches the display 1005, e.g., at such a position as to have the imaging direction (i.e., the optical axis of the camera 1006) substantially aligned with the display direction of the display 1005. The camera 1006 may be arranged at such a position of the UE 100 as to capture an image around the UE 100, e.g., at such a position as to have the imaging direction substantially opposed to the display direction.

In some implementations, the UE 100 may be a GNSS tracking device designed to be carried by a user to locate the UE 100. In the implementations, the UE 100 may comprise at least the positioning circuitry 1009 as well as the processor 1000, communication circuitry 1001, and memory 100, which are housed in a housing of the UE 100.

In some implementations, the UE 100 may be a vehicle such as a car, truck, bus, etc. In the implementations, the camera 1006 may be an onboard camera mounted on the UE 100. The onboard camera 1006 may be a dashcam provided on the cockpit of the UE 100, so positioned to shoot passengers in the cockpit or capture images outside the UE 100 through the windshield. The onboard camera 1006 may be a camera embedded on or in the body of the UE 100, positioned to capture images outside the UE 100 for driving assistance. The display 1005 may an onboard display provided in the cockpit of the UE 100. The onboard display 1005 may be embedded on or in the dashboard, mounted on the dashboard, etc. The onboard display 1005 may be a head-up display (HUD) configured to display information on the windshield. The components 1000 to 1010 may be coupled to or part of an electronic control unit (ECU) for control of the vehicle embedded in the UE 100.

In some implementations, the UE 100 may be a detector product, such as a smoke detector, heat detector, manual call point, pull station, etc. for detection of an emergency. In the implementations, the UE 100 may comprise at least the sensor 1010 as well as the processor 1000, communication circuitry 1001, and memory 100, which are housed in a housing of the UE 100.

(Structures of MEC Server 300)

Various structures associated with hardware components and/or software components may be employed for the MEC server 300. The MEC server 300 may be composed of a single computer or a combination of multiple computers to provide an edge-based local service to clients over a local connection.

FIG. 20B is a block diagram illustrating an example of the structure of the MEC server 300, according to some embodiments. FIG. 20B schematically illustrates an exemplary general structure of the MEC server 300. The MEC server 300 may comprise a processor 3000. The processor 3000 may be a circuit, circuitry, module, or other electronically and/or mechanically structured assembly configured to control components of the MEC server 300. The processor 3000 may be configured generally to process instructions of computer programs stored in a memory to execute the computer programs, so as to realize a variety of functions of the MEC server 300. The processor 3000 may be a central processing unit (CPU), micro processing unit (MPU), digital processing unit (DSP), or another general or dedicated processing circuit.

The MEC server 300 may comprise communication circuitry 3001. The communication circuitry 3001 may perform a local communication with the UE 100 over the mobile network 1 or LAN 2. More specifically, the communication circuitry 3001 may perform a local communication in the RAN 10 (e.g., with the SGW 30*a*, PGW 31*a*, UPF 32*a*, etc.) or in the CN 11 (e.g., with the PGW 31, UPF 32, etc.) to communicate with the UE 100 through the BS 12. In addition or alternatively, the communication circuitry 3001 may include circuitry for establishing a LAN communication through the router 22 (e.g., WLAN communication through the AP 23) over the LAN 2. The WLAN communication may be one which is pursuant to IEEE 802.11 specifications also known as Wi-Fi, IEEE 802.15 specifications, wireless optical communication or visible light communication also known as Light Fidelity (Li-Fi), or other short-range or close-range wireless communication for local area networking. The communication circuitry 3001 may also include circuitry for establishing an internet communication over the Internet 3. The internet communication may be established through the gateway (e.g., PGW 31, UPF 32, etc.) in the mobile network 1, through the modem 21 in the LAN 2, etc. The communication circuitry 3001 may be a circuit designed to perform communication in accordance with a single protocol, or a circuit or a combination of circuits designed to perform communications in accordance with multiple protocols. The communication circuitry 3001 may be used to perform the local communications outside the Internet 3 for the edge-based local services and Internet communications over the Internet 3 for the Internet services discussed above. A local communication may be established between the MEC server 300 and a UE 100 in the edge site ES using the communication circuitry 3001, in parallel to which an internet communication may be established between the MEC server 300 and a UE 100 inside/outside the edge site ES or between the MEC server 300 and the Internet server 200 using the communication circuitry 3001.

The MEC server 300 may comprise a memory 3008. The memory 3008 may be a memory device or a storage device configured to store information (i.e., digital data) therein. The memory 3008 may include primary storage accessible directly by the processor 3000 for storing information for immediate use in a computing system, and may also include secondary storage for storing information accessible indirectly by the processor 3000 via the primary storage for storing large amount of data. Examples of the memory 3008 may include a volatile memory such as a random access memory (RAM) (e.g., a dynamic random access memory (DRAM) or a static random access memory (SRAM)); a non-volatile memory such as a flash memory, an electrically erasable programmable read-only memory (EEPROM), a hard disc drive (HDD), and a solid state drive (SSD); and a combination thereof. A variety of data accessible by the processor 3000 may be stored on the memory 3008. An operating system (OS), one or more firmwares, and one or more application programs (apps, for short) each designed to be executed by the processor 3000 may also be stored (installed) on the memory 3008. The OS, firmware, and/or app may include computer program instructions associated the processes discussed above (e.g., processes P1*a*, P1*b*, P1*c*, P2*a*, P2*b*, P2*c*, P2*d*, P3*a*, P3*b*, P3*c*, P3*d*, P4*a*, P4*e*, P4*f*, P4*g*, P5*a*, P5*b*, P5*c*, P5*d*, P6*a*, P6*b*, P7*a*, P7*c*, P8*b*, P8*c*, P8*e*, P9*a*, P9*b*, P9*c*, P9*e*, P9*i*, P10*a*, P10*d*, P12*a*, P12*b*, P12*c*, P12*d*, P13*a*, P13*b*, P13*c*, P13*d*, P15*a*, P15*b*, P15*c*, P15*d*, and P16*b*). A media stream may be generated, cached, and/or stored on the memory 3008. The databases discussed above (e.g., databases 50, 51, 52, 53, 54, 55, 56, 60, 62, 63, 65, 66, 67, 68, 70, 71, 72, 74, 75, and 80) may be generated, stored, and/or updated on the memory 3008. Other information and data used in the processes discussed above may be generated, cached, stored, and/or updated on the memory 3008.

The bus 3010 may be a bus through which the components (e.g., processor 3000, communication circuitry 3001, and memory 3008) are connected to one another.

(Structures of Internet Server 200)

Various structures associated with hardware components and/or software components may be employed for the Internet server 200. The Internet server 200 may be composed of a single computer or a combination of multiple computers to provide an Internet service to clients over the Internet 3.

FIG. 20C is a block diagram illustrating an example of the structure of the Internet server 200, according to some embodiments. FIG. 20C schematically illustrates an exemplary general structure of the Internet server 200. The Internet server 200 may comprise a processor 2000. The processor 2000 may be a circuit, circuitry, module, or other electronically and/or mechanically structured assembly configured to control components of the Internet server 200. The processor 2000 may be configured generally to process instructions of computer programs stored in a memory to execute the computer programs, so as to realize a variety of functions of the Internet server 200. The processor 2000 may be a central processing unit (CPU), micro processing unit (MPU), digital processing unit (DSP), or another general or dedicated processing circuit.

The Internet server 200 may comprise communication circuitry 2001 for establishing an internet communication with an client (e.g., MEC server 300, UE 100, etc.) over the Internet 3. The communication circuitry 2001 may be used to perform the Internet communications over the Internet 3 for the Internet services discussed above. An internet communication may be established between the Internet server 200 and MEC server 300 using the communication circuitry 2001, in parallel to which another internet communication may be established between the Internet server 200 and a UE 100 using the communication circuitry 2001. The communication circuitry 2001 may be used to communicate with the external media source 610 for receiving a media file from the external media source 610. The communication circuitry 2001 may be used to communicate with the external computer 611 for receiving the upload criteria from the external computer 611. The communication circuitry 2001 may be used to communicate with the external media source 680 for receiving upload of the audible/visual message from the external media source 680.

The Internet server 200 may comprise an input device 2004. The input device 2004 may be a circuit, circuitry, or other electronically and/or mechanically structured assembly configured to receive inputs from the user and feed signals indicative of the inputs to the processor 2000. The input 2004 may include a set of mechanical alphabetical and/or numeral keys such as a keyboard and keypad; touch-sensitive sensor configured to detect touches (i.e., taps) of a physical object such as the user's finger and stylus onto the surface of the sensor; microphone through which voice commands are inputted; or another similar type of input device. The input device 2004 may be used to receive user inputs and user selections through the UIs, e.g., GUI 510 and GUI 560 discussed above.

The UE 100 may comprise a display 1005. The display 2005 is configured to display video (i.e., graphics) in accordance with video signals generated by and fed from the processor 2000 for visual presentation of information to the user. The display 2005 may be a liquid crystal display (LCD), electro-luminance (EL) display, or another similar type of display device. The input device 2004 and the display 2005 may be integrated with each other to constitute a touch-sensitive display (i.e., touch screen display) that is operable to provide both of display of information and reception of inputs. The GUIs discussed above (e.g., GUI 510 and GUI 560) may be displayed on the display 2005.

The Internet server 200 may comprise a video/audio input 2007. The video/audio input 2007 may be an input port or terminal through which to receive video and/or audio signals from an external source through a cable. A peripheral or accessary device such as an external microphone, camera, speaker, headphone, display, removal storage, etc. may be plugged into the video/audio input 2007. The video/audio input 2007 may be an AUX or audio interface such as an audio jack in compliance with Open Mobile Terminal Platform (OMTP), Cellular Telephone Industry Association (CTIA), or other standards. The video/audio input 2007 may be a USB port into which a USB connector can be plugged for connection with a USB flash drive, external HDD, etc. The video/audio input 2007 may be a memory card slot into which a flash memory card can be inserted. The video/audio input 2007 may be used to communicate with the external media source 610. The video/audio input 2007 may be used to communicate with the external computer 611.

The Internet server 200 may comprise a memory 2008. The memory 2008 may be a memory device or a storage device configured to store information (i.e., digital data) therein. The memory 2008 may include primary storage accessible directly by the processor 2000 for storing information for immediate use in a computing system, and may also include secondary storage for storing information accessible indirectly by the processor 2000 via the primary storage for storing large amount of data. Examples of the memory 2008 may include a volatile memory such as a random access memory (RAM) (e.g., a dynamic random access memory (DRAM) or a static random access memory (SRAM)); a non-volatile memory such as a flash memory, an electrically erasable programmable read-only memory (EEPROM), a hard disc drive (HDD), and a solid state drive (SSD); and a combination thereof. A variety of data accessible by the processor 2000 may be stored on the memory 2008. An operating system (OS), one or more firmwares, and one or more application programs (apps, for short) each designed to be executed by the processor 2000 may also be stored (installed) on the memory 2008. The OS, firmware, and/or app may include computer program instructions associated the processes discussed above (e.g., processes P1*a*, P1*b*, P2*a*, P2*b*, P2*d*, P4*a*, P4*b*, P4*c*, P4*d*, P4*e*, P4*f*, P4*g*, P5*a*, P5*b*, P5*c*, P5*d*, P6*a*, P7*b*, P7*d*, P8*a*, P8*d*, P9*g*, P9*h*, P10*c*, P12*c*, P13*b*, P13*c*, P15*b*, P16*a*, and P16*b*). A media stream may be generated, cached, and/or stored on the memory 2008. The databases discussed above (e.g., databases 50, 51, 52, 53, 54, 55, 56, 60, 62, 63, 65, 66, 67, 68, 70, 71, 72, 74, and 80) may be generated, stored, and/or updated on the memory 2008. Other information and data used in the processes discussed above may be generated, cached, stored, and/or updated on the memory 2008.

The bus 2010 may be a bus through which the components (e.g., processor 2000, communication circuitry 2001, input device 2004, display 2005, video/audio input 2007, and memory 2008) are connected to one another.

CONCLUSION AND NOTE

As discussed above, embodiments of the present invention provides improvement, enhancement, or augmentation in provision of services using edge computing over wireless communication platforms.

Further modifications and alternative embodiments will be apparent to those skilled in the art in view of this disclosure. Accordingly, the above description is to be construed as illustrative only and is for the purpose of teaching those skilled in the art the manner of carrying out the invention. It is to be understood that the forms of the invention herein shown and described are to be taken as exemplary embodiments. Various modifications may be made without departing from the scope of the invention. For example, equivalent elements or materials may be substitute for those illustrated and described herein, and certain features of the invention may be utilized independently of the use of other features, all as would be apparent to one skilled in the art after having the benefit of this description of the invention. In addition, the terms "a" and "an" are generally used in the present disclosure to mean one or more.

What is claimed is:

1. An edge-based communication system, comprising:

a multi-access edge computing (MEC) server deployed in a wireless local communication network for providing a MEC service in an edge site that corresponds to a service area of the wireless local communication network, wherein the wireless local communication network includes at least one selected from the group including (a) a radio access network (RAN) in a cellular communication system, (b) a core network (CN) in the cellular communication system, (c) a wireless local area network (WLAN) defined in IEEE 802.11 standards;

an Internet server accessible over the Internet for providing an Internet service in connection with the MEC service;

MEC server software hosted on the MEC server, including computer program instructions that cause the MEC server to perform the MEC service only when the one or more client devices are in the edge site by being connected to the wireless local communication network, wherein the MEC service comprises at least one selected from the group including (a) a first MEC service that comprises locally communicating a local audio and/or video (audio/video) stream with the one or more client devices within the edge site without access to the Internet beyond the wireless local communication network and (b) a second MEC service that comprises communicating position data with the one or more client devices within the edge site without access to the Internet beyond the wireless local communication network wherein the position data is indicative of respective positions of the one or more client devices; and Internet server software hosted on the Internet server, including computer program instructions that cause the Internet server to perform the Internet service in connection with the MEC service, wherein the Internet service comprises at least one selected from the group including the following (a), (b), (c), and (d):

(a) a first Internet service that comprises communicating first digital data associated with the local audio/video stream with the one or more client devices over the Internet in preparation to the local communication of the local audio/video stream through the first MEC service so that the local audio/video stream is generated by the one or more client devices using the first digital data;

(b) a second Internet service that comprises communicating second digital data associated with the local audio/video stream with the one or more client devices over the Internet as an alternative to the local communication of the local audio/video stream in case the local communication of the local audio/video stream through the first MEC service is unavailable;

(c) a third Internet service that comprises communicating third digital data associated with the local audio/video stream with the MEC server over the Internet in preparation to the local communication of the local audio/video stream through the first MEC service so that the local audio/video stream is generated by the MEC server using the third digital data; and (d) a fourth Internet service that comprises communicating fourth digital data associated with the local audio/video stream or position data with the MEC server over the Internet as a result of the local communication of the local audio/video stream or position data through the first or second MEC service, wherein the fourth digital data is generated based on the local audio/video stream of position data.

2. The edge-based communication system according to claim 1, wherein the MEC service and the Internet service include a handover process for automatically switching between one another, said handover process comprising:

when the first MEC service is in progress with the one or more client devices in the edge site, automatically initiating the second Internet service as the alternative to the first MEC service through an Internet communication between the one or more client devices and the Internet server, in response to the local communication between the MEC server and the one or more client devices being determined to be no longer maintained.

3. The edge-based communication system according to claim 1, wherein the MEC service and the Internet service include a handover process for automatically switching between one another, said handover process comprising:

when the second Internet service is in progress with the one or more client devices out of the edge site over the Internet, automatically terminating the second Internet service and initiating the first MEC service through the local communication between the one or more client devices and the MEC server, in response to the one or more client devices entering the edge site by connecting to the wireless local communication network.

4. The edge-based communication system according to claim 1, embodied as an audio/video distribution system, wherein:

the third digital data includes an audio/video file stored on the Internet server;

the third Internet service includes sending the stored audio/video file to the MEC server over the Internet before initiation of the first MEC service; and the first MEC service includes receiving the audio/video file, generating the local audio/video stream based on the audio/video file, and then sending the local audio/video stream to the one or more client devices in the edge site, so that the one or more client devices receive and play back the local audio/video stream.

5. The edge-based communication system according to claim 4, wherein:

the second digital data includes an internet audio/video stream generated by the Internet server based on the audio/video file; and the second Internet service includes sending the internet audio/video stream to the one or more client devices when the one or more client devices are out of the edge site, so that the one or more client devices receive and playback the internet audio/video stream in place of playback of the local audio/video stream.

6. The edge-based communication system according to claim 1, embodied as an audio/video distribution system, wherein:

the first MEC service includes generating the local audio/video stream based on an audio/video file stored on the Internet server, and sending the local audio/video stream to the one or more client devices in the edge site, so that the one or more client devices receive and play back the local audio/video stream;

the first MEC service further includes counting a number of client devices to which the first MEC service has sent the local audio/video stream, generating statistics information indicative of the counted number of client devices as audience, and then sending the statistics information to the Internet server over the Internet, wherein the statistics information includes an identification of the audio/video file and the edge site;

the fourth digital data includes the statistics information generated through the first MEC service; and the fourth Internet service includes receiving and storing the statistics information on the Internet server.

7. The edge-based communication system according to claim 1, embodied as a live audio/video communication system, wherein:

the one or more client devices include (a) one or more source client devices each of which acts as a source of the local audio/video stream and (b) one or more destination client devices each of which acts as a destination of the local audio/video steam;

the first MEC service includes receiving the local audio/video stream from each of the one or more source client devices, and forwarding the local audio/video stream to the one or more destination client devices in the edge site, so that each of the one or more destination client devices receives and plays back the local audio/video stream;

the first MEC service further includes generating an audio/video file by encoding the local audio/video stream in parallel to said forwarding of the local audio/video stream, and sending the audio/video file to the Internet server over the Internet;

the fourth digital data includes the audio/video file generated through the first MEC service; and the fourth Internet server includes receiving and storing therein the audio/video file.

8. The edge-based communication system according to claim 1, embodied as a live audio/video communication system, wherein:

the one or more client devices include (a) one or more source client devices each of which acts as a source of the local audio/video stream and (b) one or more destination client devices each of which acts as a destination of the local audio/video steam;

the first MEC service includes receiving the local audio/video stream from each of the one or more source client devices, and forwarding the local audio/video stream to the one or more destination client devices in the edge site, so that each of the one or more destination client devices receives and plays back the local audio/video stream;

the first MEC service further includes forwarding the local audio/video stream also to the Internet server over the Internet;

the fourth digital data includes an audio/video file based on the local audio/video stream; and the fourth Internet service includes receiving the forwarded local audio/video stream, generating the audio/video file by encoding the local audio/video stream, and then storing therein the audio/video file.

9. The edge-based communication system according to claim 7 embodied as at least one selected from the group including:

(a) a public address system where each of the one or more source client devices includes a microphone while each of the one or more destination client devices includes a loudspeaker, wherein the local audio/video stream is an audio stream generated based on voice inputted through the microphone;

(b) a live sound reinforcement system where each of the one or more source client devices includes a music instrument while each of the one or more destination client devices includes a loudspeaker, wherein the local audio/video stream is an audio stream generated based on sound outputted by the music instrument; and (c) a live video communication system where each of the one or more source client devices includes a camera while each of the one or more destination client devices includes a display, wherein the local audio/video stream is a video stream generated based on video captured by the camera.

10. The edge-based communication system according to claim 8 embodied as at least one selected from the group including:

(a) a public address system where each of the one or more source client devices includes a microphone while each of the one or more destination client devices includes a loudspeaker, wherein the local audio/video stream is an audio stream generated based on voice inputted through the microphone;

(b) a live sound reinforcement system where each of the one or more source client devices includes a music instrument while each of the one or more destination client devices includes a loudspeaker, wherein the local audio/video stream is an audio stream generated based on sound outputted by the music instrument; and (c) a live video communication system where each of the one or more source client devices includes a camera while each of the one or more destination client devices includes a display, wherein the local audio/video stream is a video stream generated based on video captured by the camera.

11. The edge-based communication system according to claim 1, embodied as an audio/video analysis system, wherein:

each of the one or more client devices is provided with an audio input and/or a video input, so that the local audio/video stream is generated by each of the one or more client devices based on audio inputted through the audio input and/or video inputted through the video input;

the first MEC service includes receiving the local audio/video stream from each of the one or more client devices, analyzing the local audio/video stream using an analysis rule, generating a notification message if a specific event that meets the analysis rule is identified as a result of the analysis, and then sending the notification message to the Internet server over the Internet;

the fourth digital data includes the notification message generated through the first MEC service, wherein the notification message is indicative of the identification of the specific event; and the fourth Internet service includes receiving the notification message from the MEC server, and storing therein the notification message.

12. The edge-based communication system according to claim 11, wherein:

the first MEC service includes analyzing the local audio/video stream to identify target sound and/or a target image defined by the analysis rule in the local audio/video stream, and generating the notification message in response to identifying the target sound and/or target image in the local audio/video stream; and the notification message is indicative of the target sound and/or target image identified as a result of the analysis.

13. The edge-based communication system according to claim 1, embodied as an audio/video analysis system, wherein:

each of the one or more client devices is provided with an audio input and/or a video input, so that the local audio/video stream is generated by each of the one or more client devices based on audio inputted through the audio input and/or video inputted through the video input;

the third digital data includes a analysis rule stored on the Internet server for analysis of the local audio/video stream;

the third Internet service includes sending the analysis rule to the MEC server over the Internet; and the first MEC service includes receiving the analysis rule from the Internet server over the Internet, receiving the local audio/video stream from each of the one or more client devices in the edge site, analyzing the local audio/video stream using the analysis rule, and then generating a notification message if a specific event that meets the analysis rule is identified as a result of the analysis.

14. The edge-based communication system according to claim 13, wherein:

the analysis rule defines target sound and/or a target image; and the first MEC service includes analyzing the local audio/video stream to identify the target sound and/or target image in the local audio/video stream, and generating the notification message in response to identifying the target sound and/or target image in the local audio/video stream.

15. The edge-based communication system according to claim 13, wherein the first MEC service includes analyzing the local audio/video stream using a voice recognition and/or video recognition to identify the specific event in sound and/or video represented by the local audio/video stream.

16. The edge-based communication system according to claim 13, wherein:

the analysis rule defines a target image of a person for analysis of the local video stream; and the first MEC service includes analyzing the local video stream to identify the target image using a face recognition in the local video stream, and generating the notification message in response to identifying the garget video image in the local video stream.

17. The edge-based communication system according to claim 13, wherein:

the third Internet service further includes updating the analysis rule, and sending an updated analysis rule to the MEC server in response to the update; and the first MEC service includes analyzing the local audio/video stream using the updated analysis rule.

18. The edge-based communication system according to claim 1, embodied as a traffic safety system, wherein:

each of the one or more client devices is provided with circuitry to locate itself using a positioning system to generate its position data indicative of its current position, so that each of the one or more client devices periodically sends its position data to the MEC server;

the second MEC service includes receiving the position data from each of the one or more client devices, comparing positions of the one or more client devices indicated by the position data to detect a potential collision between at least first and second client devices out of the one or more client devices in the edge site;

the second MEC service further includes, in response to detection of the potential collision, generating a notification message indicative of the potential collision to at least one of the first and second client devices, and then generating and sending an event log indicative of the detection of the potential collision to the Internet server over the Internet;

the fourth digital data includes the event log generated through the second MEC service; and the fourth Internet service includes receiving the event log from the MEC server over the Internet, and storing therein the event log.

19. A computer program product installable on a client device in an edge-based communication system, the edge-based communication system having (a) one or more multi-access edge computing (MEC) servers deployed respectively in wireless local communication networks, each MEC server providing a MEC service in an edge site that corresponds to a service area of the wireless local communication network and (b) an Internet server accessible over the Internet for providing an Internet service associated with the MEC service, wherein the wireless local communication network includes at least one selected from the group including (a) a radio access network (RAN) in a cellular communication system, (b) a core network (CN) in the cellular communication system, and (c) a wireless local area network (WLAN) defined in IEEE 802.11 standards, said computer program product including computer program instructions that, when executed by a processor of the client device, cause the client device to perform a method comprising:

performing a discovery process to discover a MEC server deployed in a wireless local communication network to which the client device belongs;

in response to discovering a MEC server as a result of the discovery process, establishing a local connection with the discovered MEC server over the wireless local communication network;

communicating local digital data with the MEC server over the wireless local communication network for the MEC service, wherein communicating the local digital data includes (a) locally communicating an audio and/or video (audio/video) stream with the MEC server without access to the Internet beyond the wireless local communication network and/or (b) locally communicating position data with the MEC server without access to the Internet beyond the wireless local communication network wherein the position data is generated using a positioning system indicative of a current position of the client device; and establishing an Internet connection with the Internet server over the Internet for the Internet service, wherein the Internet service includes at least one selected from the group including (a) a first Internet service that comprises communicating first digital data associated with the local audio/video stream with the Internet server over the established Internet connection in preparation to the local communication of the local audio/video stream in order to generate the local audio/video stream based on the first digital data and (b) a second Internet service that comprises communicating second digital data associated with the local audio/video stream with the Internet server over the established Internet connection as an alternative to the local communication of the local audio/video stream in case the local communication of the local audio/video stream is unavailable.

20. A computer program product installable on a multi-access edge computing (MEC) server in an edge-based communication system, the MEC server being deployed in a wireless communication network for providing a MEC service in an edge site that corresponds to a service area of the wireless local communication network, wherein the wireless local communication network includes at least one selected from the group including (a) a radio access network (RAN) in a cellular communication system, (b) a core network (CN) in the cellular communication system, and (c) a wireless local area network (WLAN) defined in IEEE 802.11 standards, said computer program product including computer program instructions that, when executed by a processor of the MEC server, cause the MEC server to perform a method comprising:

establishing a local connection over the wireless local communication network with a client device in the edge site belonging to the wireless local communication network in which the MEC server is deployed;

communicating local digital data with the client device over the established local connection for the MEC service, without access to the Internet beyond the wireless local communication network for low latency, wherein communicating the local digital data includes (a) locally communicating an audio and/or video (audio/video) stream with the client device and/or (b) locally communicating position data with the client device wherein the position data is generated using a positioning system indicative of a current position of the client device; and establishing an Internet connection over the Internet with an Internet server for an Internet service in connection with the MEC service, wherein the Internet service includes at least one selected from the group including (a) a first Internet service that comprises communicating first digital data associated with the local audio/video stream with the Internet server over the established Internet connection in preparation to the local communication of the local audio/video stream and (b) a second Internet service that comprises communicating second digital data associated with the local audio/video stream or position data with the Internet server over the established Internet connection as a result of the local communication of the local audio/video stream or position data.

* * * * *